US008631456B2

(12) United States Patent
Reisman

(10) Patent No.: US 8,631,456 B2
(45) Date of Patent: *Jan. 14, 2014

(54) METHOD AND APPARATUS FOR BROWSING USING ALTERNATIVE LINKBASES

(71) Applicant: Richard Reisman, New York, NY (US)

(72) Inventor: Richard Reisman, New York, NY (US)

(73) Assignee: Convergent Media Solutions, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/662,246

(22) Filed: Oct. 26, 2012

(65) Prior Publication Data

US 2013/0055315 A1  Feb. 28, 2013

Related U.S. Application Data

(63) Continuation of application No. 13/094,505, filed on Apr. 26, 2011, which is a continuation of application No. 10/434,032, filed on May 8, 2003, now Pat. No. 7,987,491.

(60) Provisional application No. 60/379,635, filed on May 10, 2002, provisional application No. 60/408,605, filed on Sep. 6, 2002, provisional application No. 60/455,433, filed on Mar. 17, 2003.

(51) Int. Cl.
*H04N 7/173* (2011.01)
*H04N 7/16* (2011.01)

(52) U.S. Cl.
USPC ........... 725/133; 725/110; 725/113; 725/141; 725/153

(58) Field of Classification Search
USPC .................. 725/110, 112–113, 133, 141, 153
See application file for complete search history.

(56) References Cited

U.S. PATENT DOCUMENTS

| 4,706,121 A | 11/1987 | Young |
| 4,807,031 A | 2/1989 | Broughton et al. |
| 4,843,562 A | 6/1989 | Kenyon et al. |
| 5,343,239 A | 8/1994 | Lappington et al. |

(Continued)

FOREIGN PATENT DOCUMENTS

| EP | 1061490 A2 | 12/2000 |
| GB | 2348587 A | 10/2000 |

(Continued)

OTHER PUBLICATIONS

Bacon, Location-Oriented Multimedia, IEEE Personal Communications, Oct. 1997, pp. 48-57.

(Continued)

*Primary Examiner* — Jason J Chung
*Assistant Examiner* — Sumaiya A Chowdhury
(74) *Attorney, Agent, or Firm* — Clay McGurk; The Law Office of Clay McGurk

(57) ABSTRACT

Systems and methods for navigating hypermedia using multiple coordinated input/output device sets. Disclosed systems and methods allow a user and/or an author to control what resources are presented on which device sets (whether they are integrated or not), and provide for coordinating browsing activities to enable such a user interface to be employed across multiple independent systems. Disclosed systems and methods also support new and enriched aspects and applications of hypermedia browsing and related business activities.

29 Claims, 10 Drawing Sheets

(56) References Cited

U.S. PATENT DOCUMENTS

| | | | |
|---|---|---|---|
| 5,355,480 A | 10/1994 | Smith et al. | |
| 5,396,546 A | 3/1995 | Remillard | |
| 5,404,393 A | 4/1995 | Remillard | |
| 5,410,326 A | 4/1995 | Goldstein | |
| 5,479,268 A | 12/1995 | Young et al. | |
| 5,648,824 A | 7/1997 | Dunn et al. | |
| 5,689,353 A | 11/1997 | Darbee et al. | |
| 5,699,526 A | 12/1997 | Siefert | |
| 5,721,906 A | 2/1998 | Siefert | |
| 5,761,606 A | 6/1998 | Wolzien | |
| 5,774,664 A | 6/1998 | Hidary et al. | |
| 5,778,181 A | 7/1998 | Hidary et al. | |
| 5,778,256 A | 7/1998 | Darbee | |
| 5,790,423 A | 8/1998 | Lau et al. | |
| 5,809,204 A | 9/1998 | Young et al. | |
| 5,831,664 A | 11/1998 | Wharton et al. | |
| 5,832,496 A | 11/1998 | Anand et al. | |
| 5,850,340 A | 12/1998 | York | |
| 5,861,881 A | 1/1999 | Freeman et al. | |
| 5,872,712 A | 2/1999 | Brenneman | |
| 5,887,243 A | 3/1999 | Harvey et al. | |
| 5,892,536 A | 4/1999 | Logan et al. | |
| 5,905,865 A | 5/1999 | Palmer et al. | |
| 5,907,322 A | 5/1999 | Kelly et al. | |
| 5,949,437 A | 9/1999 | Clark | |
| 5,951,643 A | 9/1999 | Shelton et al. | |
| 5,954,798 A | 9/1999 | Shelton et al. | |
| 5,961,603 A | 10/1999 | Kunkel et al. | |
| 5,986,692 A | 11/1999 | Logan et al. | |
| 5,990,883 A | 11/1999 | Byrne et al. | |
| 5,991,791 A | 11/1999 | Siefert | |
| 6,008,777 A | 12/1999 | Yiu | |
| 6,018,768 A | 1/2000 | Ullman et al. | |
| 6,025,837 A | 2/2000 | Matthews, III et al. | |
| 6,026,403 A | 2/2000 | Siefert | |
| 6,037,933 A | 3/2000 | Blonstein et al. | |
| 6,049,539 A | 4/2000 | Lee et al. | |
| 6,064,377 A | 5/2000 | Hoarty et al. | |
| 6,073,119 A | 6/2000 | Bornemisza-Wahr et al. | |
| 6,078,348 A | 6/2000 | Klosterman et al. | |
| 6,085,223 A | 7/2000 | Carino, Jr. et al. | |
| 6,085,247 A | 7/2000 | Parsons, Jr. et al. | |
| 6,097,441 A | 8/2000 | Allport | |
| 6,104,334 A | 8/2000 | Allport | |
| 6,118,492 A | 9/2000 | Milnes et al. | |
| 6,130,726 A | 10/2000 | Darbee et al. | |
| 6,141,003 A | 10/2000 | Chor et al. | |
| 6,151,601 A | 11/2000 | Papierniak et al. | |
| 6,157,319 A | 12/2000 | Johns et al. | |
| 6,161,142 A | 12/2000 | Wolfe et al. | |
| 6,166,732 A | 12/2000 | Mitchell et al. | |
| 6,169,997 B1 | 1/2001 | Papierniak et al. | |
| 6,182,094 B1 | 1/2001 | Humpleman et al. | |
| 6,209,028 B1 | 3/2001 | Walker et al. | |
| 6,215,526 B1 | 4/2001 | Barton et al. | |
| 6,216,129 B1 | 4/2001 | Eldering | |
| 6,219,109 B1 | 4/2001 | Raynesford et al. | |
| 6,219,839 B1 | 4/2001 | Sampsell | |
| 6,233,389 B1 | 5/2001 | Barton et al. | |
| 6,240,555 B1 | 5/2001 | Shoff et al. | |
| 6,253,203 B1 | 6/2001 | O'Flaherty et al. | |
| 6,253,238 B1 | 6/2001 | Lauder et al. | |
| 6,256,019 B1 | 7/2001 | Allport | |
| 6,263,503 B1 | 7/2001 | Margulis | |
| 6,278,499 B1 * | 8/2001 | Darbee et al. | 348/734 |
| 6,308,327 B1 | 10/2001 | Liu et al. | |
| 6,317,885 B1 | 11/2001 | Fries | |
| 6,323,911 B1 | 11/2001 | Schein et al. | |
| 6,324,338 B1 | 11/2001 | Wood et al. | |
| 6,330,593 B1 | 12/2001 | Roberts et al. | |
| 6,360,053 B1 | 3/2002 | Wood et al. | |
| 6,377,986 B1 | 4/2002 | Philyaw et al. | |
| 6,388,714 B1 | 5/2002 | Schein et al. | |
| 6,389,472 B1 | 5/2002 | Hughes et al. | |
| 6,425,131 B2 * | 7/2002 | Crandall et al. | 725/106 |
| 6,469,753 B1 | 10/2002 | Klosterman et al. | |
| 6,486,892 B1 | 11/2002 | Stern | |
| 6,513,069 B1 | 1/2003 | Abato et al. | |
| 6,526,581 B1 | 2/2003 | Edson | |
| 6,543,051 B1 | 4/2003 | Manson et al. | |
| 6,567,011 B1 | 5/2003 | Young et al. | |
| 6,637,028 B1 | 10/2003 | Voyticky et al. | |
| 6,732,369 B1 | 5/2004 | Leftwich et al. | |
| 6,754,904 B1 | 6/2004 | Cooper et al. | |
| 6,901,429 B2 | 5/2005 | Dowling | |
| 6,931,656 B1 | 8/2005 | Eshelman et al. | |
| 6,973,669 B2 * | 12/2005 | Daniels | 725/112 |
| 6,983,312 B1 | 1/2006 | O'Neil | |
| 7,069,575 B1 | 6/2006 | Goode et al. | |
| 7,191,233 B2 | 3/2007 | Miller | |
| 7,218,921 B2 | 5/2007 | Mendiola et al. | |
| 7,284,202 B1 | 10/2007 | Zenith | |
| 7,444,659 B2 | 10/2008 | Lemmons | |
| 7,853,438 B2 | 12/2010 | Caruso et al. | |
| 7,917,645 B2 | 3/2011 | Ikezoye et al. | |
| 2001/0018771 A1 | 8/2001 | Walker et al. | |
| 2001/0030644 A1 | 10/2001 | Allport | |
| 2002/0004839 A1 | 1/2002 | Wine et al. | |
| 2002/0010652 A1 | 1/2002 | Deguchi | |
| 2002/0010928 A1 | 1/2002 | Sahota | |
| 2002/0010932 A1 | 1/2002 | Nguyen et al. | |
| 2002/0019984 A1 | 2/2002 | Rakib | |
| 2002/0032698 A1 | 3/2002 | Cox | |
| 2002/0072982 A1 | 6/2002 | Barton et al. | |
| 2002/0078144 A1 | 6/2002 | Lamkin et al. | |
| 2002/0083060 A1 | 6/2002 | Wang et al. | |
| 2002/0083464 A1 | 6/2002 | Tomson et al. | |
| 2002/0088011 A1 | 7/2002 | Lamkin et al. | |
| 2002/0104090 A1 | 8/2002 | Stettner | |
| 2002/0162120 A1 * | 10/2002 | Mitchell | 725/135 |
| 2002/0162121 A1 | 10/2002 | Mitchell | |
| 2003/0018980 A1 | 1/2003 | Gorbatov et al. | |
| 2003/0093802 A1 | 5/2003 | Cho et al. | |
| 2003/0154242 A1 | 8/2003 | Hayes et al. | |
| 2003/0154398 A1 | 8/2003 | Eaton et al. | |
| 2003/0159153 A1 | 8/2003 | Falvo et al. | |
| 2003/0182429 A1 | 9/2003 | Jagels | |
| 2003/0188322 A1 * | 10/2003 | Bontempi | 725/139 |
| 2005/0262542 A1 | 11/2005 | DeWeese et al. | |

FOREIGN PATENT DOCUMENTS

| | | |
|---|---|---|
| WO | WO 99/10822 | 3/1999 |
| WO | WO 00/04707 | 1/2000 |
| WO | WO 00/07372 | 2/2000 |
| WO | WO 01/06361 A2 | 1/2001 |
| WO | WO 01/06365 A2 | 1/2001 |
| WO | WO 01/09714 A2 | 2/2001 |
| WO | WO 01/65832 A1 | 9/2001 |
| WO | WO 01/89207 A1 | 11/2001 |
| WO | WO 02/07013 A2 | 1/2002 |
| WO | WO 02/19716 A1 | 3/2002 |
| WO | WO 02/21841 A1 | 3/2002 |
| WO | WO 02/28102 A1 | 4/2002 |
| WO | WO 02/37297 A1 | 5/2002 |
| WO | WO 03/007189 A1 | 1/2003 |
| WO | WO 03/107196 A1 | 12/2003 |

OTHER PUBLICATIONS

Baldus, WWICE—An Architecture for In-Home Digital Networks, Multimedia Computing and Networking 2000, vol. 3969, SPIE—The International Society for Optical Engineering, San Jose, CA, Jan. 24, 2000-Jan. 26, 2000, pp. 196-203.

Hong, A Networking Architecture for Mobility Sevices Using Mobile Agent Approach, Global Convergence of Telecommunications and Distributed Object Computing Conference, 1997, pp. 297-307.

Huang, Making Computers Disappear: Appliance Data Services, ACM Sigmobile, Rome, Italy, Jul. 2001, pp. 108-121.

Kristoffersen, Mediate: Video as a First-order Datatype, Group 97, Phoenix, Arizona, pp. 395-404.

(56) References Cited

OTHER PUBLICATIONS

Phan, A New TWIST on Mobile Computing: Two-Way Interactive Session Transfer, Internet Applications, 2001, WIAPP 2001, San Jose, CA, 2001, pp. 2-11.

Phan, A Scalable, Distributed Middleware Service Architecture to Support Mobile Internet Applications, WMI '01 Wireless Mobile Internet Conference, Rome, Italy, Jul. 21, 2001, pp. 27-33.

Phan, Handoff of Application Sessions Across Time and Space, IEEE International Conference on Communications, 2001 vol. 5, pp. 1367-1372.

Pinto, TINA-based Environment for Mobile Multimedia Services, IEEE, 1999, pp. 54-65.

Richardson, Teleporting in an X Window System Environment, IEEE Personal Communications, Third Quarter, 1994, pp. 6-12.

Wang, Mobility Support in Unified Communication Networks, (WoWMoM '00 The Third ACM International Workshop on Wireless Mobile Multimedia Conference) Boston, MA, Aug. 11, 2000, pp. 95-102.

Welling, Session Mobility Support for Multimedia Applications, Multimedia Computing and Networking 1999, vol. 3654, SPIE—The International Society for Optical Engineering, San Jose, CA, Jan. 25, 1999-Jan. 27, 1999, pp. 52-63.

Zou, Mobile ID Protocol: A Badge-Activated Application Level Handoff of a Multimedia Streaming to Support User Mobility, Thesis, B. S. Nankai University, Urbana, IL, 2000.

Prototypes, field tryouts proceed for enhanced TV, by Steve Behrens, http://www.current.org/dtv/dtv013e.html, printed Jun. 30, 2004 (document states Jul. 17, 2000).

PBS ventures into cable's interactive 'walled gardens', by Steve Behrens, http://www.current.org/tech/tech021cable.html, printed Jun. 30, 2004 (document states Nov. 13, 2000).

ETV Cookbook: System Reference: Transports, http://etvcookbook.org/system/transports.html, printed Jul. 1, 2001 (document states Jun. 25, 2001).

ETV Cookbook: System Reference: Platforms, http://etvcookbook.org/system/platform.html, printed Jul. 1, 2001 (document states Jun. 25, 2001).

ETV Cookbook: System Reference: Localization, http://etvcookbook.org/system/localization.html, printed Jul. 1, 2001 (document states Jun. 25, 2001).

ETV Cookbook: System Reference: Middleware, http://etvcookbook.org/system/middleware.html, printed Jul. 1, 2001 (document states Jun. 25, 2001).

ETV Cookbook: System Reference: Storage, http://etvcookbook.org/system/storage.html, printed Jul. 1, 2001 (document states Jun. 25, 2001).

ETV Cookbook: System Reference: Application Services, http://etvcookbook.org/system/application.html, printed Jul. 1, 2001 (document states Jun. 25, 2001).

ETV Cookbook: System Reference: Authoring Tools, http://etvcookbook.org/system/authoring.html, printed Jul. 1, 2001 (document states Jun. 26, 2001).

Intel's E-home Vision, Press Backgrounder, Apr. 2000.

Turn on Audiences with Enhanced Programming, Intel, 1999.

Intel Intercast Viewer 2.0: Broadcaster's Guide, downloaded Aug. 14, 2000 (document states May 1998).

IAL Digital Entertainment Initiative: Media Appliances, http://developer.intel.com/ial/home/digentertain/media.htm, printed Aug. 14, 2000 (document states 2000).

Intel's Barrett Charts Course for "Extended PC Era" at Consumer Electronics Show, http://appzone.intel.com/pressroom/PrintPressRelease.asp?file=http://www.intel.com/pressroom/arc . . . , printed Jul. 1, 2004 (document states Jan. 5, 2001).

2001 International CES Pre-Event Kickoff Keynote, Craig R. Barrett, Jan. 5, 2001.

And the Synchronized Telewebber Oscar Goes to ABC, http://ruel.net/top/box.news.abc.oscars.enhanced.tv.20010325.htm, printed Jul. 1, 2004 (document states Mar. 25, 2001).

ETV Cookbook: Consumer Electronics Show Jan. 5-Jan. 9, 2001, Las Vegas, http://etvcookbook.org/extra/ces01.html, printed Jul. 1, 2001 (document states Jun. 26, 2001).

What is Enhanced TV?, http://heavy.abc.go.com/etvHome/etvfootball/what.html, printed Sep. 18, 2000.

Enhanced TV Help, http://heavy.abc.go.com/etvHome/etvfootball/help.html, printed Sep. 18, 2000 (document states 2000).

Welcome to Enhanced TV—Tour, http://heavy.abc.go.com/etvHome/mil/site/tour.html, printed Jan. 2, 2001.

ABC's Dual-Screen Millionaire Experiment, Jupiter Communications, Apr. 12, 2000.

No PC for Enhanced TV, by Brad King, http://www.wired.com/news/print/0,1294,36239,00.html, printed Jul. 1, 2004 (document states May 9, 2000).

Do Touch That Dial, Bill Syken, Time Digital, Sep. 2000.

Serving Up Data for Enhanced DTV Programs, Gomer Thomas, downloaded Jul. 1, 2001 (document states Oct. 18, 2000-Oct. 21, 2000).

ETV Cookbook: Recipes: PVR Record Triggers, http://etvcookbook.org/appetizers/pvr_triggers.html, printed Jan. 15, 2003 (document states Oct. 16, 2002).

QVC Program Guide, Select Time Zone, http://www.qvc.com/pguidelpgaide_main.asp?productlisting=yes&date=, printed Jul. 25, 2002 (document states 1995-2002).

Interactive Television Industry Botmdarics Map, http://www.itvalliance.org/indexprgiTV.htm, downloaded Jun. 10, 2002 (document states 2002).

ICTV HeadendWare Overview, www.ictv.com, downloaded Aug. 8, 2002 (document states 2002).

ICTV HeadendWare Datasheet, www.ictv.com, downloaded Aug. 30, 2002 (document states 2002).

ICTV HeadendWare Scalability, www.ictv.com, downloaded Aug. 30, 2002 (document states 2002).

ICTV HeadendWare Maximum ROI, www.ictv.com, downloaded Aug. 30, 2002 (document states 2002).

ICTV HeadendWare Minimum Risk, www.ictv.com, do Wrilciaded Aug. 30, 2002 (document states 2002).

ICTV HeadendWare Platform diagram, http://www.ictv.com/main/products/platfrm_smple.html, printed Aug. 30, 2002.

ICTV I leadendWare STX and DigiMux service subsequent requests, littp://www.ictv.com/main/products/platfrm_detail.html, printed Aug. 30, 2002.

ISeeTV: More Than Just a Pretty Face, http://gigaweb.com/content_display/print_friendly/0,2482,260677,00.html, printed Feb. 1, 2003 (document states May 10, 2002).

Go Ahead, Kill Your Television. NBC Is Ready, by Randall Rothenberg, http://www.wired.com/wirediarchive/6.12/nbc_prltml, printed Jul. 1, 2004 (document states Dec. 1998).

MetaTV: Universal Portal Platform, http://1,vww.metatv.comisolutions/uupihtm, printed Jul. 1, 2001 (document states 2001).

MetaTV: Universal Portal Platform, http://www.metatv.comisolutions/uup_cleploylitin, printed Jul. 1, 2001 (document states 2001).

MetaTV: Universal Portal Platform, http://wwwimetatv.comisolutionsluup_design.htm, printed Jul. 1, 2001 (document stales 2001).

MetaTV: Universal Portal Platform, http://www.metatvicomisolutionsititip_manage.htm, printed Jul. 1, 2001 (document states 2001).

MetaTV: TV services, http://www.metatv.comisolutions/TV_services.htm, printed Jul. 1, 2001 (document states 2001).

MetaTV: Network, http://vv'ww.metatvicom/solutions/meta_netihtm, printed Jul. 1, 2001 (document states 2001).

MetaTV Solutions for eBusinesses & Merchants, lutp://www.metatv.comisolutions/ebus_merch.htm, printed Jul. 1, 2001 (document states 2001).

Eonline Navigation, screenshot image of non-printable page from www.metatv.com, printed Jul. 1, 2001.

Eonline Readability, screenshot image of non-printable page from www.metatv.com, printed Jul. 1, 2001.

MetaTV Solutions for eBusinesses, www.metatv.com, printed Jul. 1, 2001 (document states 2000).

Sorceron Technology, http://www.sorceron.con'corporatelstech.html, printed Jul. 16, 2001 (document states 2001).

(56) References Cited

OTHER PUBLICATIONS

Sorceron Products, http://www.sorceron.com/corporate/prodserv.html, printed Jul. 16, 2001 (document states 2001).
Tools, http://www.spiderdance.net/spiderdance/toolsframentml, printed Sep. 26, 2002 (document states 1999-2002).
TruSync System, http://www.spiderdance.net/spiderdanceitechnology_right.html, printed Sep. 26, 2002 (document states 1999-2002).
Infrastructure, http://wspiderdance.net/spiderdance/infrastructure_righthtml, printed Sep. 26, 2002 (document states 1999-2002).
Company, http://www.spiderdance.net/spiderdance/company_right.html, printed Sep. 26, 2002 (documents states 1999-2002).
Two Way TV (US)—Technology, http://vv_ww_.1.wovv aytvus.cornitcchnology.html, printed Sep. 25, 2002 (document states 2002).
Two Way TV: 4.0 Patents Map, http://www.twowaylv.comiversion4/patent_map.asp, printed Sep. 25, 2002.
RespondTV Products, http://www.respondtv.com/products.html, printed Apr. 3, 2002.
RespondTV, http://wvvw.respondtv.com/whyrespond.html, printed Feb. 15, 2001.
RespondTV, http://www.respondtv.com/lools.html, printed Feb. 15, 2001.
An Open Interface to a DTV Data Server, Dinkar Bhat, Dave Catapano, Brad Holcombe, Ilya Shnayder, Gomel-Thomas, NAB2001 Broadcast Engineering Conference, Las Vegas, Apr. 21-26, 2001.
TargetTV, http://sciall.com/developers/TargetTV.1rtm, printed Mar. 27, 2002 (document states 2002).
VeonStudio FAQs, http://www.vcon.comicorporate/cicycloper/studio_faq.Itml, printed Jan. 12. 2000.
VeonPlayer, VeonStudio, VconServer, http://www.veon.comicorporate/prothicts/micldleproducts.litml, printed Jan. 12, 2000.
Creation, Deploying and Serving, Reporting, http://www.veon.com/corporate/products/middle_services.html, printed Jan. 12, 2000.
Q&A with Joanna Shields, CEO of Veon, by José Alvear, http://www.streamingmedia.com/article.asp?id=6230, printed Jul. 1, 2004 (document states Sep. 26, 2000).
Making Streaming Interactive, by Andrew W. Davis, http://www.wainhouse.com/articles/article_d.html, printed Feb. 22, 2002.
Interactive TV Today, White Paper, HyperVideo and SMIL, http://www.itvt.com/etvwhitepaper-6.html, printed Feb. 22, 2002.
Veon—Interactive Media Applications, http://www.w3.org/Architecture/1998/06/Workshop/paper33/, printed Feb. 22, 2002.
What is ITV?, MetaTV, downloaded Dec. 7, 2001 (document states 2001).
OpenTV Solutions for Interactive Television, http://www.opentv.com/industry/tvexperts/s_itvpaper.html, printed Feb. 15, 2001.
PRAJA Products: Technology, http://www.praja.com/products/technology.html, printed Sep. 11, 2000.
The PRAJA Event Suite: Event Experience System, http://www.praja.com/products/event_exp_sys.html, printed Sep. 11, 2000 (document states 2000).
The PRAJA Event Suite: Event Management System, http://www.praja.com/products/event_mgmnt_sys.html, printed Sep. 11, 2000 (document states 2000).
The PRAJA Event Suite: Event Experience System: Detail, http://www.praja.com/products/ees_detail.html, printed Sep. 11, 2000 (document states 2000).
The PRAJA Event Suite: Event Management System, http://www.praja.com/products/ems_detail.html, printed Sep. 11, 2000 (document states 2000).
EMS Frequently Asked Questions, http://www.praja.com/support/ems_faq.html, printed Sep. 11, 2000.
Features, http://www.praja.com/tracker/WebHelp/Features.htm, printed Sep. 11, 2000.
Preferences, http://www.praja.com/tracker/WebHelp/Preferences.htm, printed Sep. 11, 2000.
Interactive Video Technologies Leads the Convergence of Multimedia and the Internet, Press Release, http://videotechnologies.com/about_us/pr/pr_011701ivop.htm, printed Jul. 1, 2004 (document states Jan. 17, 2001).
Interactive Video Technologies: Internet Video Operating Platform, http://videotechnologies.com/solutions/operating_platform.htm, printed Feb. 5, 2001.
Hotel Guests to Experience Interactive Television Services from InnMedia and MetaTV, http://www.thetimesharebeat.com/archives/2001/htl/htlmay70.htm, printed Jul. 2, 2004 (document states May 15, 2001).
MbTV Content/Advertising Manager, http://www.mbtv.com/technology/admanager.htm, printed Jul. 9, 2001.
SkyScraper Interactive: Interactive Broadcast System, Triveni Digital, PDF file properties "created" dated May 22, 2001.
Time Warner Cable mailing: iwink, Time Warner Cable, 1999.
Interactive Television and Its Impact on the Wireless Industry, Scott Newnam, Wireless Business & Technology, Nov. 2002.
Ops Eye Set-Tops to Track Viewing, by Linda Moss, http://www.eff.org/Privacy/GII_NII/settop_box_monitoring_960520.article, printed Jul. 2, 2004 (document states May 20, 1996).
The Webification of TV is happening, by Kevin Werbach, http://news.com.com/2010-1071-281523.html, printed Jul. 2, 2004 (document states Jul. 26, 2001).
An Interactive TV Reality Check, by Ken Freed, http://www.broadbandweek.com/news/0009/print/0009_news_08.htm, printed Jul. 2, 2004 (document states Sep. 2000).
Skip-the-Ads TV Had Madison Ave. Upset, by Amy Harmon, http://limbo.ime.usp.br/educar2002/index.php?SkipTheAds, printed Jul. 2, 2004 (document states May 23, 2002).
Standard Handbook of Video and Television Engineering, (Update) Chapter 17.3 Consumer Video and Networking Issues, tvhandbook.com, downloaded May 4, 2002 (document states "[p]ortions of this chapter were adapted from: Pizzi, Skip: 'Internet and TV Convergence,' in *Interactive TV Survival Guide*, Jerry C. Whitaker ed., McGraw-Hill, New York, N.Y., 2001".
Maybe TVs Should Just Stay Dumb, Robert La Franco, Red Herring, Aug. 2000.
Interactive TV Revisited, Howard Wolinsky, Upside, Aug. 2000.
The Status of Interactive Television, http://www.gigaweb.com/Content/GIB/RIB-032000-00307.html, printed Aug. 22, 2000 (document status Mar. 27, 2000).
iTV Production Standards White Paper, Apr. 8, 2002.
iTV Production Standards Draft Specification v1.1 (pp. 1-28, 56-57), itvstandards.org, downloaded Dec. 5, 2002 (document states Nov. 2002).
iTV Production Standards Specification v1.0, itvstandards.org, downloaded May 16, 2002 (document states May 2002).
Jini to the rescue, Morgan, S.; IEEE Spectrum, Apr. 2000.
Flash graphics land prime time on TV, by Stefanie Olsen, http://zdnet.com.com/2100-11_2-258319.html, printed Jul. 9, 2004 (document states May 25, 2001).
Television Futures—Java TV Technology Looms Large, by Michael Meloan, http://developer.java.sun.com/servlet/PrintPageServlet, printed Dec. 27, 2000.
Enhanced Content Specification, Advanced Television Enhancement Forum (ATVEF), ATVEF Specification v1.1 r 26, http://atvef.com/library/spec1_la.html, downloaded Aug. 14, 2000 (document states 1998, 1999).
NewsML—enabling a standards-led revolution in news publishing, A. Allday, EBU Technical Review—Jun. 2001.
DVB-HTML—an optional declarative language within MHP 1.1, EBU Technical Review—Sep. 2001.
Standard Handbook of Video and Television Engineering, (Update) Chapter 13.7 Interactive Television, tvhandbook.com, downloaded Jul. 2, 2001.
Overview of the MPEG-7 Standard, Sections 1-3, http://www.cselt.it/mpeg/standards/mpeg-7/mpeg-7.htm, printed Aug. 11, 2000 (document states May/Jun. 2000).
Post Phase One Definition, Features & Scenarios, tv-anytime.org, downloaded May 2, 2002.

(56) References Cited

OTHER PUBLICATIONS

The TV-Anytime Forum, Specification Series: S-2 System Description, WD455, tv-anytime.org, downloaded May 2, 2002 (document states Dec. 7, 2001).
Battle over DTV standards goes global, by Junko Yoshida, http://www.eetimes.com/article/showArticle.jhtml?articleID=18304239, printed Jul. 10, 2004 (document states Jun. 9, 2000).
Displaying TV Broadcasts in Web Pages, http://developer.msntv.com/Developer/displaytv.asp, printed Mar. 4, 2002 (document states 2001).
Welcome to Everstream, Campaign Director, http://www.everstream.com/cd.htm, printed Jul. 12, 2002 (document states 2002).
Welcome to Everstream, Campaign Decision Engine, http://www.everstream.com/cde.htm, printed Jul. 12, 2002 (document states 2002).
Welcome to Everstream, Benefits, http://www.everstream.com/benefits.htm, printed Jul. 12, 2002 (document states 2002).
Ad Enabling the Next Generation of iTV & Broadband, downloaded Jul. 12, 2002.
Navic Network Services, http://navic.tv/servicesbody.html, printed Jul. 13, 2002 (document states 2001).
Click to Web Ads From TV Video Programming, http://www.adage.com/news.cms?newsId=33590, printed Jul. 12, 2002 (document states Dec. 10, 2001).
Coming Soon: Commercials on Demand, Alan Breznick, Cable Sales Professional, Spring 2002.
Install WebTV for Windows 98, http://www.zdnet.com/filters/printerfriendly/0,6061,2227443-77,00.html, printed Dec. 31, 2000 (document states Mar. 17, 1999).
W3C Workshop on Web Device Independent Authoring: Position Statements and Papers, http://www.w3.org/2000/10/DIAWorkshop/statements.html, printed Dec. 15, 2004 (document states Sep. 29, 2000).
Developing TV Applications Using Internet Technology, http://www.w3.org/2000/10/DIAWorkshop/hayes/text.html, printed Aug. 6, 2004, target of "Developing TV Applications using Internet Technology" link in W3C Workshop on Web Device Independent Authoring: Position Statements and Papers (W3C Workshop on Web Device Independent Authoring: Position Statements and Papers states date of Sep. 29, 2000).
TV Platform Technology Acquired for Basic Set-Tops, Dominic Gates, http://www.redcomm.com/sample/DOMIS/update/2000/04apr/0400tptafb.htm, printed Dec. 26, 2000.
WebTV for Windows, http://www.microsoft.com/windows98/usingwindows/fun/articles/811Nov/funfoundation3.asp, printed Aug. 14, 2000 (document states May 5, 1999).
What do you want to see today?, http://broadcast.microsoft.com/, printed Aug. 14, 2000.
System Software Components, http://msdn.microsoft.com/library/psdk/bpc/intro_6wvn.htm, printed Aug. 14, 2000 (document states Jan. 5, 2000).
AOLTV, Frequently Asked Questions, http://www.aoltv.com/anywhere/aoltv/faq.html, printed Jul. 1, 2001.
Sony, AOL in PlayStation 2 Alliance, http://dailynews.yahoo.com/htx/nm/20010515/bs/tech_sony_aol_dc_1.html, printed May 15, 2001 (document states May 15, 2001).
Microsoft's X-Box Changes the Desktop Landscape, http://www.gigaweb.com/Content/PA/RPA-032000-00020.html, printed Dec. 21, 2000 (document states Mar. 20, 2000).
TiVo's new Home Media Option, http://www.tivo.com/5.3.1.1.asp?article=162, printed Apr. 3, 2003 (document states Jan. 9, 2003).
FAQs: TiVo Home Media Option, http://www.tivo.com/4.9.1.asp, printed Apr. 3, 2003.
Industry briefs: Viant, Interactions (ACM), vol. 8, Issue 2 (Mar./Apr. 2001).
Sony Vs. Microsoft: The Fight for Interactive Television, Victoria Murphy, http://forbes.com/2003/01/10/cz_vm_0110tv_print.html, printed Sep. 9, 2004 (document states Jan. 10, 2003).
The Inevitability of the Media Center and Media Gateway, by Michael Collette, http://www.ucentric.com/d1/Ucentric_MediaCenterWhitePaper_030803.pdf, (archive.org states archive date of Mar. 30, 2003).
www.POSM.tv: the Project for Open Source Media, http://posm.tv, printed Oct. 29, 2004 (document states Aug. 1, 2004).
White Paper: A Strategy for New Television, http://interactive.wgbh.org/etv/NEW-TELEVISION.html, printed Sep. 9, 2004, target of "White Paper: A Strategy for New Television" link in www.POSM.tv: the Project for Open Source Media (www.POSM.tv: the Project for Open Source Media states date of White Paper: A Strategy for New Television as Apr. 4, 2003).
Microsoft Debuts Concept Home, http://www.microsoft.com/presspass/press/2000/Jan00/HomeDebutCESpr.asp, printed Sep. 9, 2004 (document states Jan. 6, 2000).
WebTV Networks Takes the Lead in Personal TV Services, http://www.microsoft.com/presspass/press/2000/Jan00/PersonalTVpr.asp, printed Sep. 9, 2004 (document states Jan. 6, 2000).
Remarks by Bill Gates, CES International 2000, http://www.microsoft.com/billgates/speeches/01-05ces.asp, printed Sep. 9, 2004 (document states Jan. 5, 2000).
Microsoft's Craig Mundie Discusses Microsoft's Vision for Making Technology More Personal and Useful for Consumers, http://www.microsoft.com/presspass/features/2000/01-06mundieqa.asp, printed Sep. 9, 2004 (document states Jan. 6, 2000).
Home networks connect everything (really!), by Patrick Houston, http://reviews-zdnet.com.com/4520-7298_16-4207809.html, printed Aug. 6, 2004 (document states Jan. 10, 2003).
Displays get some smarts, by Patrick Houston, http://reviews-zdnet.com.com/4520-6033_16-4207808.html, printed Aug. 6, 2004 (document states Jan. 8, 2003).
Remarks by Bill Gates, 2002 International Consumer Electronics Show; http://www.microsoft.com/billgates/speeches/2002/01-07ces.asp, printed Aug. 6, 2004 (document states Jan. 7, 2002).
Remarks by Bill Gates, 2003 International Consumer Electronics Show; http://www.microsoft.com/billgates/speeches/2003/01-08ces.asp, printed Aug. 10, 2004 (document states Jan. 8, 2003).
Connection Configuration in Terminal Server (Q186566), http://support.microsoft.com/default.aspx?scid=kb;EN-US;q186566, printed Jan. 21, 2002 (document states Dec. 11, 2001).
Session-to-Session Activation with a Session Moniker, http://msdn.microsoft.com/library/en-us/termserv/tsovr_9tbm.asp?frame-true, printed Jan. 21, 2002 (document states 2002).
Joe Belfiore Talks Windows XP Media Center Edition, http://www.winsupersite.com/showcase/freestyle_joeb.asp, printed Aug. 10, 2004 (document states Sep. 3, 2002).
Windows Embedded for Thin Clients, downloaded Jan. 21, 2002 (document states 2001).
The X Protocol, http://www.x.org/about_x.htm, printed Apr. 15, 2002.
A Brief Intro to CoKinetic's Player, I$_3$ML and how they work, cokinetic.com, downloaded Mar. 4, 2002.
Microsoft Unveils New Home PC Experiences With "Freestyle" and "Mira", http://www.microsoft.com/presspass/press/2002/jan02/01-07FreestyleMiraPR.asp, printed Aug. 10, 2004 (document states Jan. 7, 2002).
Microsoft Launches Windows CE .NET, http://www.microsoft.com/presspass/press/2002/jan02/01-07CENetLaunchPR.asp, printed Aug. 10, 2004 (document states Jan. 7, 2002).
Industry Leaders Announce Plans to Power Smart Devices With Windows CE .NET, http://www.microsoft.com/presspass/press/2002/jan02/01-07CustCommitPR.asp, printed Aug. 10, 2004 (document states Jan. 7, 2002).
Telescript: General Magic Active Web Tools Roadmap Version 1.0 Pre-release (chapters "Introduction" and "The view from 10,000 feet"), General Magic, 1996.
Commercialization of Personal IT Television "airboard", http://www.sony.net/SonyInfo/News/Press/200009/00-044/, printed Aug. 11, 2004 (document states Sep. 28, 2000).
Meta Pad: IBM's Prototype Modular Computer, http://domino.research.ibm.com/Comm/bios.nsf/pages/metapad.html, printed May 1, 2002 (document states Feb. 6, 2002).

(56) References Cited

OTHER PUBLICATIONS

Modular Computing: The Next Generation of Personal Computing, http://www.gigaweb.com/content_display/print_friendly/0,2482,260474,00.html, printed Apr. 17, 2002 (document states Apr. 16, 2002).
Bringing Affordable Digital Television and the Next Generation of High Bandwidth Connectivity to the Home, http://www.pcdtv.org/PCDTV/press/, printed Dec. 31, 2000 (document states Aug. 21, 2000).
PCDTV Frequently Asked Questions, http://www.pcdtv.org/PCDTV/more_info/, printed Dec. 31, 2000 (document states 2000).
WinTV screen image, http:/www.hauppauge.com/html/images/wtv2000.jpg, printed Dec. 31, 2000.
Multi-Monitor FAQ, http://www.realtimesoft.com/multimon/faq.asp, printed Jan. 2, 2001.
Realtime Soft UltraMon, http://www.realtimesoft.com/ultramon, printed Jan. 2, 2001.
HiFi-Link: Overview, http://www.xitel.com/content/hifilink.htm, printed Jul. 22, 2002.
HiFi-Link: Why use a hifi-link, http://www.xitel.com/content/hifilink_why.htm, printed Jul. 22, 2002.
Total Remote & Pocket PC, http://www.griffintechnology.com/griffinmobile/totalremote/index.html, printed Nov. 20, 2003 (document states 2002).
Total Remove v1.1x user guide, www.griffintechnology.com, downloaded Nov. 20, 2003.
Philips iPronto: Dashboard for the Digital Home, downloaded Nov. 21, 2002 (document states 2002).
Philips builds bridge between TV and PC, by Richard Shim, http://news.com.com/2100-1040-966106.html?tag=st.util.print, printed Aug. 11, 2004 (document states Nov. 19, 2002).
HeadendWare Ir Adaptor for Cable Modems, ICTV, 2003.
ICTV to Demonstrate Docsis-Based Device Enabling ITV Delivery to Cable Ready Digital Televisions, http://ictv.com/main/company/press_2003Feb10CR-DTV.html, printed Aug. 11, 2004 (document states Feb. 10, 2003).
One for All, Universal Remote Control (URC-9910) User's Guide: Using the IR/RF Command Center (p. 52-54), downloaded Dec. 17, 2002 (document states Apr. 4, 2002).
Xantech System Applications: p. 4-7, downloaded Dec. 28, 2002.
Nirvis Slink-e, http://www.nirvis.com/slink-e.htm, printed Dec. 28, 2002.
Slink-e Specs, http://www.nirvis.com/slinke_specs.htm, printed Dec. 28, 2002.
Slink-e Package, http://www.nirvis.com/slinke_features.htm, printed Dec. 28, 2002.
Nirvis Slink-e Help, Overview, http://www.nirvis.com/help/help.htm, printed Dec. 28, 2002.
Nirvis Slink-e Help, IR Zones, http://www.nirvis.com/help/help.htm, printed Dec. 28, 2002.
The SlinkX ActiveX Control, http://www.nirvis.com/help/SlinkX/slinkx.htm, printed Dec. 28, 2002.
SlinkX Methods, Properties and Events, http://www.nirvis.com/help/SlinkX/MethProp/methprop.htm, printed Dec. 28, 2002.
Nirvis User Downloads, http://www.nirvis.com/user_submitted.htm, printed Dec. 28, 2002.
Nirvis FAQ, http://www.nirvis.com/nirvis_faq.htm, printed Dec. 28, 2002.
Qcast Tuner PSE Software Review, http://broadq.com/reviews/ascully.pdf, printed Dec. 1, 2002.
Prismiq Unveils the Future of Networked Home Entertainment with the Release of the PRISMIQ MediaPlayer, http://prismiq.com/press/101402.asp, printed Aug. 11, 2004 (document states Oct. 14, 2002).
Intel Technology Journal: Q2 2001 issue, http://intel.com/technology/itj/q22001.htm, printed Dec. 19, 2004 (document states May 8, 2001).
Wireless Convergence of PC and Consumer Electronics in the e-Home, Steve Bard, downloaded Nov. 6, 2002, accessible via "Wireless Convergence of PC and Consumer Electronics in the e-Home" link in Intel Technology Journal: Q2 2001 issue (Intel Technology Journal: Q2 2001 issue states date of May 8, 2001).
Sony to ease PC-entertainment networks, by Michael Kanellos, http://news.com.com/2100-1040-965565.html?tag=st.util.print, printed Aug. 11, 2004 (document states Nov. 12, 2002).
Building Digital Media Adapters to Extend the PC, Intel, downloaded Nov. 6, 2002 (document states 2002).
Enhancing Internet Gateways, A/V Devices and PC Applications with the UPnP Standard, Intel, downloaded Nov. 6, 2002 (document states 2002).
Remote I/O: Freeing the Experience from the Platform with UPnP* Architecture, Walker, et al., Intel Technology Journal, vol. 6, Issue 4, 2002 (Nov. 15, 2002).
Nielsen Audio Video Encoder II product brochure, 2002.
Arbitron Inc. and Nielsen Media Research Expand Agreement for Testing Portable People Meter, http://www.arbitron.com/newsroom/archive/03_04_03.htm, printed Aug. 11, 2004 (document states Mar. 4, 2003).
Summary Report of the Active/Passive (A/P) Meter Regional Test, Nielsen Media Research, p. 1-8, Nov. 11, 2002.
Idioma SmartLog AdScanner White Paper, Mar. 2003.
Audible Magic: Broadcast Monitoring, http://www.audiblemagic.com/broadcast_monitoring.html, printed Oct. 27, 2002 (document states 1999-2002).
Audible Magic: Technology, http://www.audiblemagic.com/technology.html, printed Oct. 27, 2002 (document states 1999-2002).
I got music, I got algorithm, Michael Parsons, http://redherring.com/PrintArticle.aspx?a=5874&sector=Archive, printed Aug. 12, 2004 (document states May 9, 2002).
Veil adds new ring-kle to Ericsson TV spots, Ken Kershbaumer, Broadcasting & Cable, Oct. 23, 2000.
Xenote: 1. Listen & Click, http://www.xenote.com/products_1, printed Nov. 13, 2002 (document states 1999-2000).
Xenote: 2. Upload Your Tags, http://www.xenote.com/products_2, printed Nov. 13, 2002 (document states 1999-2000).
Xenote: 3. View & Interact, http://www.xenote.com/products_3, printed Nov. 13, 2002 (document states 1999-2000).
Sony eMarker: How a Clever System Works, http://www.bricklin.com/emarker.htm, printed Aug. 20, 2002 (document states 1999-2000).
Getting Started With Voyager CDLink, http://web.archive.org/web/19961219040639/www.voyagerco.com/cdlink/geststarted/started.h . . . , printed Aug. 21, 2002 (archive.org states archive date of Dec. 19, 1996).
Voyager CDLink VCD Control language Reference, http://web.archive.org/web/19961219073913/www.voyagerco.com/cdlink/about/vcd_ref/ . . . , printed Aug. 21, 2002 (document states Aug. 8, 1995).
The RealOneTM Platform, realnetworks.com, downloaded Jun. 10, 2002 (document states 2001).
TCPA Frequently Asked Questions, trustedcomputing.org, downloaded Nov. 15, 2002 (document states Jul. 3, 2002).
Rearden Steel Technologies Becomes Moxi Digital and Unveils its Plans for Transforming the Home Entertainment Experience, Jan. 7, 2002.
A Cybernaut Plans Software for Navigating TV, by John Schwartz, http://query.nytimes.com/search/restricted/article?res=FA0B15FB3C550C778EDDAB0994D940 . . . , printed Nov. 29, 2004 (document states Dec. 24, 2001).
NetTopBox Status Report, http://mappa.mundi.net/pub/docs/ntb/2002_oscon/index.html, downloaded Dec. 28, 2002 (document states Jul. 25, 2002).
nSTREAMS Application Note Series #10, Web Based VOD Ordering Supports Open Architecture and Integration Into E-Commerce for Digital Cable Head-End Equipment Revision 1.1, nstreams.com, downloaded Feb. 9, 2003 (document states Oct. 16, 2000).
Welcome to Digital Convergence, http://www.crq.com/master_templ.cfm?view=products&products=CueTv, printed Jul. 1, 2001.
Welcome to Digital Convergence, Where Can I Use :Cue Tv? http://www.crq.com/master_templ.cfm?view=products&products=cuetv&pid=546, printed Jul. 1, 2001 (document states 2001).
Welcome to NBCIQ, http://nbciq.reachback.com/login/default.asp, printed Jul. 1, 2001 (document states 2001).

(56) References Cited

OTHER PUBLICATIONS

Welcome to Digital Convergence: Developer, http://www.crq.com/master_templ.cfm?view=developer, printed Jul. 1, 2001 (document states 2001).
Digital Convergence: CRQ Plug-in Developer's Guide Version 1.0, p. 1-10, downloaded Jul. 1, 2001 (document states May 17, 2001).
Nevo for Smart Displays Specifications, http://www.mynevo.com/spec.smd.htm, printed Jan. 13, 2003.
Nevo Frequently Asked Questions, http://www.mynevo.com/faq_smd.htm, printed Jan. 13, 2003 (document states 2003).
Nevo for Smart Displays (screen shot), http://www.mynevo.com/nevo_smd.htm, printed Jan. 13, 2003.
ViewSonic Adopts Nevo Home Connectivity Solution to Bridge Computing and Consumer Electronics in the Home, http://www.uei.com/press/pr_archive/2003/pr_010803.html, printed Aug. 23, 2004 (document states Jan. 7, 2003).
National Study Reveals Consumers Want Interactive Tv Services, http://cnet.com/investor/news/newsitem-printer/0/9900-1021-5508614.html?tag=ni, printed May 15, 2001 (document states Apr. 4, 2001).
Five Industry Leaders Demonstrate Technology That Allows Consumers to Individualize Interactive TV Today, http://198.3.103.147/news/pr/001127/ca-liberty-livewire, printed Jan. 3, 2001 (document states Nov. 27, 2000).
WorldGate, Universal Electronics Team Up to Download IPG, Interactive Services to Mosaic Touch Screen Remote, http://builder.cnet.com/investor/news/newsitem/0-9900-1028-3546039-0.html, printed May 15, 2001 (document states Oct. 25, 2000).
Universal Electronics' Revolutionary 'Mosaic' Touch-Screen Device Individualizes Interactive TV Experience, http://biz.yahoo.com/bw/01127/ca_univers_2.html, printed Jan. 3, 2001 (document states Nov. 27, 2000).
Universal Electronics Unveils Nevo: A Platform for the Connected Home and Office,, http://www.uei.com/press/pr_current/pr_061802.html, printed Jul. 5, 2002 (document states Jun. 18, 2002).
Mosaic User's Guide, pp. 2-3, 7-10, 58-61, 66-85, uei.com, downloaded Jan. 3, 2001.
Microsoft to Showcase .NET at Western Show 2001: Motorola to Launch Windows CE .Net-Based EVr-8401 Enhanced TV Viewer at Show, http://www.microsoft.com/presspass/press/2001/nov01/11-27NETVisionPR.asp, printed Aug. 30, 2004 (document states Nov. 27, 2001).
Motorola Introduces the EVr-8401 Enhanced TV Viewer, http://www.motorola.com/mediacenter/news/detailpf/0,,817_564_23,00.html, printed Aug. 30, 2004 (document states Nov. 28, 2001).
Motorola Broadband to Integrate Macromedia Flash Player Into the Motorola EVr-8401 Enhanced TV Viewer, http://www.macromedia.com/macromedia/proom/pr/2002/Motorola_flashplayer.html, printed Aug. 30, 2004 (document states Feb. 6, 2002).
Philips' Palm app woos couch potatoes, by Richard Shim, http://news.com.com/2100-1040_3-955754.html?tag=st.util.print, printed Aug. 30, 2004 (document states Aug. 28, 2002).
Wind River Software Supports Interactive TV Viewing eRemote Wins Wind River's 'Cool Customer Design' Award, http://ir.windriver.com/phoenix.zhtml?c=91814&p=irol-newsArticle_print&ID=122133&highlight=, printed Aug. 30, 2004 (document states Oct. 10, 2000).
Evolve Communications FAQ, http://www. evolvecomm.com/evolvefaq.html, printed Oct. 23, 2001 (document states 2001).
Backgrounder, http://www.evolvecomm.com/Background.html, printed Oct. 23, 2001 (document states 2001).
Evolve Guild Remote, Remote Basics, http://www.guideremote.com/Nonmembers/AboutRemote/basic.cfm?Sess=1s012310022816 . . . , printed Oct. 23, 2001 (document states 2001).
Evolve Guild Remote, Specifications, http://www.guideremote.com/Nonmembers/AboutRemote/Spec.cfm?Sess=1s012310022816 . . . , printed Oct. 23, 2001 (document states 2001).

Evolve Guild Remote, Remote Help, http://www.guideremote.com/Nonmembers/supports/help.cfm?Sess=1s0123100228160294, printed Oct. 23, 2001 (document states 2001).
Evolve Guild Remote, FAQ, http://www.guideremote.com/Nonmembers/supports/FAQ.cfm?Sess=1s0123100228160294, printed Oct. 23, 2001 (document states 2001).
Return of the Rich Clients, http://www.gigaweb.com/content_display/print_friendly/0,2482,263618,00.html, printed Apr. 26, 2003 (document states Apr. 22, 2003).
Developing Rich Internet Applications with Macromedia MX, macromedia.com, downloaded Apr. 29, 2002 (document states Apr. 2002).
Macromedia Flash MX—A next-generation rich client, macromedia.com, downloaded Apr. 29, 2002 (document states Mar. 2002).
Macromedia—Flash TechNotes: What is a local Shared Object?, http://www.macromedia.com/support/flash/ts/documents/local_so.htm, printed Apr. 29, 2002 (document states Apr. 5, 2002).
Open Financial Exchange (OFX) Downloads, http://www.gigaweb.com/content_display/print_friendly/0,2482,257450,00.html, printed Jul. 24, 2001 (document states Jun. 29, 2001).
Browser Helper Objects: The Browser the Way You Want it, http://msdn.microsoft.com/library/en-us/dnbrowse/html/bho.asp?frame=true, printed Jan. 14, 2002 (document states Jan. 1999).
About the Browser, http://msdn.microsoft.com/workshop/browser/overview/overview.asp, printed Mar. 12, 2002 (document states 2002).
WebBrowser Customization, http://msdn.microsoft.com/workshop/browser/hosting/wbcustomization.asp?frame=true, printed Mar. 12, 2002 (document states 2002).
Browser Extensions Overviews and Tutorials, http://msdn.microsoft.com/workshop/browser/ext/overview/browser_ext_ovw_entry.asp?frame . . . , printed Mar. 12, 2002 (document states 2002).
Programming and Reusing the Browser, http://msdn.microsoft.com/workshop/browser/prog.browser_node_entry.asp?frame=true, printed Mar. 12, 2002 (document states 2002).
Hyperlinks, http://msdn.microsoft.com/workshop/misc/hlink/hlink.asp/frame=true, printed Mar. 12, 2002 (document states 2002).
Associated Browser Reference, http://msdn.microsoft.com/workshop/browser/browser/reference/reference.asp?frame=true, printed Mar. 12, 2002 (document states 2002).
A Call for the Home Media Network—Technical Report MSR-TR-2001-52—Draft v8, www.microsoft.com, downloaded Jul. 9, 2002 (document states May 4, 2001).
SmartHomes, http://www.gigaweb.com/Content/PA/RPA-072000-00009.html, printed Sep. 11, 2000 (document states Jul. 18, 2000).
The CrestronHome Total Control System, Oct. 1999.
Crestron CNMSX-PRO Next Generation Integrated Control System, Jan. 2000.
ShareWave (consumer applications, http://www.sharewave.com/Applications/applications.html, printed Oct. 5, 2000.
Sharewave tv terminal, http://www.sharewave.com/Applications/Network_UI/TV_terminal/tv_terminal.html, printed Oct. 4, 2000.
Sharewave pc-to-pc connection, http://www.sharewave.com/Applications/Network_UI/second_PC/second_pc.html, printed Oct. 4, 2000.
Sharewave mobile pad, http://www.sharewave.com/Applications/Network_UI/mobile_pad/mobile_pad.html, printed Oct. 4, 2000.
I, Set-Top, David Iler, http://www.cedmagazine.com/ced/2002/0702/id5.htm, printed Aug. 25, 2004 (document states Jul. 2002).
Digital Video Broadcasting (DVB); DVB Commercial Module—Multimedia Home Platform, User and Market Requirements, DVB Document A062, Apr. 2001.
OCAP 1.0 Profile OC-SP-OCAP1.0-I02-020405, 7 Basic Architecture (pp. 49-57), opencable.com, downloaded Jun. 17, 2002 (document states Apr. 5, 2002).
OCAP 2.0 Profile OC-SP-OCAP2.0-I01-020419, 6 OCAP 2.0 Correspondence Map (pp. 11-12), opencable.com, downloaded Jun. 17, 2002 (document states Apr. 19, 2002).
OpenCable Set-top Terminate CORE Functional Requirements for Bi-directional Cable, CFR-OCS-BDC-INT03-000818, Interim Specification (p. i-21), opencable.com, downloaded Jan. 1, 2001 (document states Aug. 18, 2000).

(56) References Cited

OTHER PUBLICATIONS

Interactive Television for the DCT 2000, OpenTV White Paper, opentv.com, downloaded May 4, 2002 (document states Sep. 5, 2000).
The PowerTV White Paper, http://www.powertv.com/product/completewhite.html, printed Dec. 28, 2000 (document states Oct. 11, 1996).
Networking Home Entertainment Devices with HA Vi, Rodger Lea, Simon Gibbs, Alec Dara-Abrams, Edward Eytchison, IEEE Computer, Sep. 2000 (vol. 33, No. 9).
An Overview of Cable Modem Technology and Market Perspectives, Amitava Dutta-Roy, IEEE Communications Magazine, Jun. 2001.
OpenCable Michael Adams, Don Dulchinos, IEEE Communications Magazine, Jun. 2001.
The Emergence of Middleware in Home Telecommunication Equipment, So Vang, Jean-Pol L. Zundel, IEEE Communications Magazine, Jun. 2001.
Home Networking and the CableHome Project at CableLabs, Glenn T. Edens, IEEE Communications Magazine, Jun. 2001.
Networking Technologies Incorporated in the Cisco NetWorks Product Development Kit, cisco.com, downloaded Dec. 27, 2000 (document states Oct. 1998).
IEEE 1394, the A/V Digital Interface of Choice by Gary A. Hoffman, Technologist, http://www.1394ta.org/Technology/About/digital_av.htm, printed Jan. 1, 2001.
Internet Access to a Home Area Network, Umar Saif, Daniel Gordon, David J. Gre, IEEE Internet Computing, Jan./Feb. 2001 (vol. 5, No. 1).
A Software Architecture for Open Service Gateways, Li Gong, IEEE Internet Computing, Jan./Feb. 2001 (vol. 5, No. 1).
Autohan Core Services Whiter Paper One—Feb. 2000, DJ Greaves, A Blackwell, DL Gordon, U Saif, A McNeil, SB Suh—Third Draft, http://www.cl.cam.ac.uk/Research/SRG/netos/han/AutoHAN/autohan/autohan_paper1.html, printed Jan. 4, 2001 (document states Feb. 2000).
Universal Plug and Play Device Architecture, www.upnp.org, downloaded Sep. 13, 2000 (document states Jun. 8, 2000).
Open Services Gateway Initiative (OSGi) Specification Overview, Version 1.0, osgi.org, downloaded Sep. 13, 2002 (document states Jan. 2000).
Device Message Protocal (DMP): An XML based format for Wide Area Communication with Networked Appliances, Internet Engineering Task Force Internet Draft, http://www.cs.columbia.edu/sip/drafts/draft-khurana-dmp-appliances-00.txt, printed Aug. 24, 2004 (document states Nov. 2000).
HA Vi Specification 1.0—2 Overview and 11.9 HA Vi System Event Types (pp. 8-24, 458-459), havi.org, downloaded Sep. 13, 2000 (document states Jan. 18, 2000).
ISO/IEC CD1 15045-01: Information technology—Interconnection of information technology equipment—Architecture for HomeGate, the residential gateway (AHRG): Introduction & Scope, Part 1—Architecture of Residential Gateways (pp. ii-21), downloaded Dec. 27, 2000 (document states Apr. 1, 2000).
XUP—Extensible User Interface Protocol: Sections 1-5, http://www.w3.org/TR/2002/NOTE-xup-20020528, printed Aug. 30, 2004 (document states May 28, 2002).
XUL Programmer's Reference Manual, Fifth Draft: Updated for XUL 1.0, http://www.mozilla.org/xpfe/xulref/intro.html, printed Aug. 30, 2004 (document states Apr. 5, 2001).
ATSC Recommended Practice: Program and System Information Protocol Implementation Guidelines for Broadcasters, Advanced Television Systems Committee, Doc. A/69 (p. 15-63, 75), Jun. 25, 2002.
ATSC Implementation Subcommittee Finding: Program Interchange Identification Requirements and Solutions, Advanced Television Systems Committee, Doc. IS-214, Jul. 28, 2001.
American National Standard ANSI/SCTE 21 2001, Standard for Carriage of NTSC VBI Data in Cable Digital Transport Streams (p. 3-15), Society of Cable Telecommunications Engineers, downloaded Dec. 1, 2002.
Architectural Design of a Multi-Agent System for Handling Metadata Streams, Don Cruickshank et al., ACM Agents '01, May 28-Jun. 1, 2001, Montreal, Quebec.
Its About Time: Link Streams as Continuous Metadata, Kevin R. Page et al., Proceedings of the Twelfth ACM Conference on Hypertext and Hypermedia (Hypertext '01), pp. 93-102, downloaded Dec. 21, 2004 (document states Aug. 2001).
Implementing an Open Link Service for the World-Wide Web, Carr et al., World Wide Web Journal 1(2):61-71, 1998.
Link Services or Link Agents?, Can et al., Ninth ACM Conference on Hypertext, Pittsburgh, Jun. 1998.
The Distributed Link Service: A Tool for Publishers, Authors and Readers, Can et al., http://www.ecs.soton.ac.uk/data/1487/html/html/, printed Mar. 30, 2002.
Open and Reconfigurable Hypermedia Systems: A Filter-Based Model, Hill, G.J., Wilkins, R.J. And Hall, W., Technical Report, University of Southampton, http://www.ecs.soton.ac.uk/data/1422/html/html, printed Apr. 1, 2002.
Integrating Temporal Media and Open Hypermedia on the World Wide Web, Niels Olof Bouvin & Rene Schade, http://www8.org/w8-papers/3c-hypermedia-video/integrating/integrating.html, printed Mar. 31, 2002.
A Distributed Link Service using Query Routing, David De Roure, Samhaa El-Beltagy, Les Carr and Wendy Hall, http://www.esc.soton.ac.uk/~dder/qdls, printed Mar. 30, 2002.
Open Hypermedia applied to Audio, D De Roure, S Goose, N Ridgeway, http://www.ecs.soton.ac.uk/publications/rj/1997-1998/MMRG/paper11.pdf, (archive.org states archive date of Oct. 12, 2000).
The Flag Taxonomy of Open Hypermedia Systems, Kasper Osterbye U'e Kock Wail, Hypertext '96, Washington, D.C.
IRIS Hypermedia Services, Bernard J. Haan, Paul Kahn, Victor A. Riley, James H. Coombs, Norman K. Meyrowitz, Communications of the ACM, vol. 35, No. 1, Jan. 1992, pp. 36, 38-51.
XML After 1.0: You Ain't Seen Nothin' Yet, James Tauber, IEEE Internet Computing, May/Jun. 1999.
XML Linking and Style, http://www.w3.org/TR/2001/NOTE-xml-link-style-20010605/, printed Sep. 2, 2004 (document states Jun. 5, 2001).
Multipurpose Internet Mail Extensions (MIME) Part Two: Media Types, Network Working Group, Request for Comments: 2046, p. 1-5, http://www.ietf.org/rfc/rfc2046.txt, printed Sep. 2, 2004 (document states Nov. 1996).
Google cache of http://www.dashes.com/anil, (document states Feb. 18, 2002).
HTML 4.01 Specification—12. Links, http://www.w3.org/TR/REC-html40, http://www.w3.org/TR/REC-html40/struct/links.html, printed Nov. 4, 2004 (document states Dec. 24, 1999).
HTML 4.01 Specification—16. Frames, http://www.w3.org/TR/REC-html40, http://www.w3.org/TR/REC-html40/present/frames.html, printed Nov. 4, 2004 (document states Dec. 24, 1999).
Targeting Windows, http://wp.netscape.com/eng/mozilla/2.0/relnotes/demo/target.html, printed Jan. 15, 2002 (document states 1999).
XML Linking Language (XLink) Version 1.0, http://www.w3.org/TR/2001/REC-xlink-20010627/, printed Sep. 2, 2004 (document states Jun. 27, 2001).
The Dexter hypertext reference model, Frank Halasz and Mayer Schwartz, Communications of the ACM, 37(2):30-39, Feb. 1994.
The "HyTime": Hypermedia/Time-Based Document Structuring Language, Steven R. Newcomb, Neill A. Kipp, Victoria T. Newcomb, Communications of the ACM, vol. 34 Issue 11, Nov. 1991.
XML XLink Requirements Version 1.0, http://w3c.org/TR/NOTE-xlink-req/, printed Sep. 2, 2004 (document states Feb. 24, 1999).
The Role of XML in Open Hypermedia Systems, http://aue.auc.dk~kock/OHS-HT98/Papers/ossenbruggen.html, printed Jan. 15, 2002 (document states 1998).
Modularization of XHTML—4. Defining Abstract Modules, http://www.w3.org/TR/xhtml-modularization, http://www.w3.org/TR/xhtml-modularization/abstraction.html, printed Nov. 4, 2004 (document states Apr. 10, 2001).

(56) References Cited

OTHER PUBLICATIONS

The Amsterdam hypermedia model: Adding Time and Context to the Dexter Model, Lynda Hardman, Dick C. A. Bulterman, Guido van Rossum, Communications of the ACM, vol. 37 Issue 2, Feb. 1994.
Synchronized Multimedia Integration Language (SMIL 2.0)—6. The SMIL 2.0 Linking Modules, http://www.w3.org/TR/smil20, http://www.w3.org/TR/smil20/extended-linking.html, printed Nov. 4, 2004 (document states Aug. 7, 2001).
Synchronized Multimedia Integration Language (SMIL 2.0)—10. The SMIL 2.0 Timing and Synchronization Module (Sections 10.1-10.2, 10.6), http://www.w3.org/TR/smil20, http::/www.w3.org/TR/smil20/smil-timing.html, printed Nov. 4, 2004 (document states Aug. 7, 2001).
Still Too Early for SMIL and XML Streaming Video, Uttam Narsu, http://www.gigaweb.com/Content/GIB/RIB-092000-00069.html, printed Sep. 11, 2000 (document states Sep. 7, 2000).
Re: SMPTE Standardization of Declarative Content for Television, http://lists.w3.org/Archives/Public/www-tv/2000JanMar/0019. html, printed Sep. 3, 2004 (document states Mar. 23, 2000).
Television and the Web, http://www.w3.org/TV/, printed Aug. 10, 2000 (document states Jun. 15, 2000).
"Television and the Web" Interest Group Charter, http://www.w3.org/TV/tvweb-ig-charter, printed Jan. 3, 2001.
Hyperlinked television research at the MIT Media Laboratory, Bove et al., IBM Systems Journal, vol. 39, Nos. 3&4, 2000.
Accessibility Features of SMIL, http://www.w3.org/TR/SMIL-access/, printed Sep. 3, 2004 (document states Sep. 21, 1999).
Composite Capabilities/Preference Profiles: Requirements and Architecture, http://www.w3.org/TR/2000/WD-CCPP-ra-20000721/, printed Sep. 3, 2004 (document states Jul. 21, 2000).
Overview of B-XML/BML draft specification developed by ARIB, Association of Radio Industries and Businesses (ARIB)(document states http://lists.w3.org/Archives/Public/www-tv/1999OctDec/att-0031/02-BML-BXML-Abst3.doc, document states Nov. 8, 2000).
TV Broadcast URI Schemes Requirements, http://www.w3.org/TR/1999/NOTE-TVWeb-URI-Requirements-19991021,printed Sep. 3, 2004 (document states Oct. 21, 1999).
Uniform Resource Identifiers for Television Broadcasts, Network Working Group Request for Comments: 2838, ftp://ftp.isi.edu/in-notes/rfc2838.txt., printed Sep. 3, 2004 (document states May 2000).
XML Dataspaces for Mobile Agent Coordination, Cabri et al., ACM SAC '00, Como, Italy, Mar. 19-21, 2000.
Multimodal Interaction Requirements, http://w3.org/TR/mmi-reqs/, printed Sep. 7, 2004 (document states Jan. 8, 2003).
W3C Multimodal Interaction Framework, http://w3.org/TR/mmi-framework/, printed Sep. 7, 2004 (document states May 6, 2003).
Multimodal Requirements for Voice Markup Languages, http://w3.org/TR/multimodal-reqs, printed Sep. 7, 2004 (document states Jul. 10, 2000).
Device Independence Principles, http://www.w3.org/TR/2001/WD-di-princ-20010918, printed Sep. 7, 2004 (document states Sep. 18, 2001).
Multimodal Interaction Activity, http://w3.org/2002/mmi, printed Feb. 26, 2002 (document states Feb. 21, 2002).
Multimodal Interaction Working Group Charter, http://w3.org/2002/01/multimodal-charter.html, printed Feb. 26, 2002 (document states Feb. 1, 2002).
Multi-modal Browser Architecture, Maes, http://www.w3.org/2002/mmi/2002/MM-Arch-Maes-20010820.pdf, downloaded Feb. 26, 2002.
Multi-modal Web IBM Position, Maes and Raman, http:// www.w3.org/2000/09/Papers/IBM.pdf, downloaded Feb. 25, 2002.
Position paper for the W3C/WAP Workshop on the Multi-modal Web, http://www.w3.org/2000/09/Papers/IBM.html, printed Feb. 25, 2002.
Document Object Model (DOM) Activity Statement, http://www.w3.org/DOM/Activity, printed Feb. 26, 2002 (document states Oct. 22, 2001).
Towards SMIL as a foundation for multimodal, multimedia applications by Jennifer Beckham (University of Wisconsin), Giuseppe Di Fabbrizio, and Nils Klarlund (AT&T Labs), http://www.w3.org/2002/mmi/2002/smil-rexx.pdf, downloaded Feb. 26, 2002.
SDP: Session Description Protocol, Network Working Group Request for Comments: 2327, http://www.ietf.org/rfc/rfc2327.txt, printed Sep. 7, 2004 (document states Apr. 1998).
SIP: Session Initiation Protocol, Internet Draft, p. 1-26, http://www.ietf.org/internet-drafts/draft-ietf-sip-rfc2543bis-08.txt, printed Feb. 26, 2002 (document states Feb. 21, 2002).
Dual Modes—SDI and MDI in Opera 6, http://www.searchengineworld.com/opera/v6/ui.htm, printed Jan. 26, 2003 (document states Nov. 14, 2001).
Opera 6 User Interface From Chaos to Perfection, http://www.searchengineworld.com/opera/v6/startup.htm, printed Jan. 26, 2003 (document states Nov. 14, 2001).
New SDI Mode, http://www.searchengineworld.com/opera/v6/sdi.htm, printed Jan. 26, 2003 (document states Nov. 14, 2001).
Opera 6 Multi-Instances!, http://www.searchengineworld.com/opera/v6/multi-instances.htm, printed Jan. 26, 2003 (document states Nov. 14, 2001).
Opera's Page-tab Interface, http://www.opera.com/support/tutorials/win/newbie/page_tab/, pp. 1-4, 6, printed Jan. 24, 2003.
eDualHead, matrox.com, downloaded Jan. 16, 2002 (document states Feb. 2, 2001).
Marvel G450 eTV, matrox.com, downloaded Jan. 16, 2002 (document states Sep. 15, 2000).
The total entertainment solution, matrox.com, downloaded Jan. 16, 2002.
eDualHead—Matrox's newest weapon in it's war against ATI and NVIDIA, http://www.rolotech.com/reviews/videocard/eDualHead/eDualHeadp2.htm, printed Jan. 16, 2002.
How to Exploit Multiple Monitor Support in Memphis and Windows NT 5.0, David Campbell, http://www.microsoft.com/msj/0697/monitor/monitor.aspx, printed Sep. 7, 2004 (document states Jun. 1997).
Working with Multiple Monitors, by Gregory Shultz, http://msdn.microsoft.com/library/default.asp?url=/library/en-us/dnwinpro01/html/w9p0136.asp?frame=true, printed Sep. 7, 2004 (document states Mar. 2001).
Appian Hydravision, apian.com, downloaded Aug. 17, 2001.
Macintosh: Video Mirroring and Extended Desktop Defined, http://til.info.apple.com/techinfo.nsf/artnum/n8405, printed Jan. 14, 2000 (document states Aug. 25, 1999).
SGI Reality Center Solutions, sgi.com, Jun. 1999.
Onyx2 GroupStation, Datasheet, sgi.com, Aug. 1998.
AvidNet Peer-to-Peer Networking Architecture: System Description, avid.com, 1997.
Client-side Environment for ASP Pages—Part 2, Dino Esposito, http://msdn.microsoft.com/msdnmag/issues/1000/cutting/print.asp, printed Sep. 7, 2004 (document states Oct. 2000).
1,001 Ways to Get Input from Web Users, Michael Edwards, http://msdn.microsoft.com/library/default.asp?url=/library/en-us/dnscrpt/html/1001ways.asp, printed Sep. 7, 2004 (document states Oct. 21, 1997).
IHTMLFormElement Interface, http://msdn.microsoft.com/workshop/browser/mshtml/reference/ifaces/FormElement/ . . . , printed Feb. 1, 2001.
Using the DHTML Object Model, http://msdn.microsoft.com/workshop/browser/mshtml/mshtml.asp, printed Feb. 1, 2001 (document states 2001).
IPersistHistory Interface, http://msdn.microsoft.com/workshop/components/com/references/ifaces/ipersisthistory/ipersist . . . , printed Jan. 16, 2001 (document states 2001).
IPersistHistory::SaveHistory Method, http://msdn.microsoft.com/workshop/components/com/references/ifaces/IPersistHistory/SaveHis . . . , printed Jan. 16, 2001 (document states 2001).
IPersistHistory::LoadHistory Method, http://msdn.microsoft.com/workshop/components/com/references/ifaces/IPersistHistory/LoadHis . . . , printed Jan. 16, 2001 (document states 2001).
Groove Application and Platform Architecture, groove.net, downloaded Dec. 5, 2000.
Users Guide for Groove version 1—Chapter 6 Groove Accounts and Identities, Chapter 7 Shared Space Tools, groove.net, downloaded Oct. 24, 2000 (document states 2000).

(56) References Cited

OTHER PUBLICATIONS

Groove Web Browser Tool, http://docs.groove.net/htmldocs/guide/tools/general/webbrowser/web_browser.htm, printed Jan. 20, 2002 (document states 2001).
A New Groove: Lotus Notes creator Ray Ozzie develops a powerful new peer-to-peer collaboration platform, by Steve Gillmor, devx.com, downloaded Jan. 21, 2002 (document states Winter 2000/2001).
Groove Brief: Enterprise Integration, groove.net, downloaded Jan. 19, 2002 (document states 2001).
Peer Computing Comes to the Internet, downloaded Oct. 24, 2000.
Distributed MVC: An Architecture for Windows DNA Applications, roguewave.com, downloaded Mar. 16, 2003 (document states 1999).
MS Internet Cellular Smart Access (ICSA) Overview, http://www.microsoft.com/TechNet/exchange/prodfacts/icsa.asp, printed Sep. 11, 2000 (document states Oct. 1999).
Using Roaming User Profiles with Microsoft Office 2000, http://support.microsoft.com/support/Office/OFF2K/Roaming.asp, printed Sep. 11, 2000 (document states Dec. 17, 1999).
Intellimirror: Following Users into the Next Generation of Computing, http://www.microsoft.com/directaccess/feature/99/1206.html, printed Sep. 11, 2000 (document states Feb. 29, 2000).
Comparing RDP and ICA: MetaFrame and Terminal Servers' Protocols, Guy Yost, Technical Support May '99.
A Primer on the H.323 Series Standard, http://gw.databeam.com/h323/h323primer.html, printed Oct. 15, 2000.
A Primer on the T.120 Series Standard, databeam.com, downloaded Oct. 16, 2000 (document states May 14, 1997).
Remote Control Saves Steps, by Sean Doherty, http://www.networkcomputing.com/shared/printArticle.jhtml?article=/1102/1102f3full.html&pub= . . . , printed Sep. 8, 2004 (document states Feb. 7, 2000).
Compaq Carbon Copy Access Edition, 2000.
Microsoft Exchange 2000 Conferencing Server Infosheet, microsoft.com, downloaded Oct. 16, 2000.
Application Sharing Channel Object Details, http://msdn.microsoft.com/library/psdk/netmeet/nm3com1_3z3n.htm, printed Oct. 16, 2000 (document states Aug. 14, 2000).
INmChannelAppShare, http://msdn.microsoft.com/library/psdk/netmeet/nm3com2_0tt1.htm, printed Oct. 16, 2000 (document states Aug. 14, 2000).
NM_SHARE_*State, http://msdn.microsoft.com/library/psdk/netmeet/nm3com4_5rz9.htm, printed Oct. 16, 2000 (document states Aug. 14, 2000).
Microsoft Internet Explorer 4.0 White Paper: Conferencing—Microsoft NetMeeting, http://www.microsoft.com/Windows/ie/press/whitepaper/iwhite/WHITE007.HTM, printed Oct. 16, 2000 (document states Jul. 2, 1997).
Virtual Shop and Virtual Meeting Point—Two Prototype Applications of Interactive Services Using the New Multimedia Coding Standard MPEG-4, http://bs.hhi.de/products/virtualmeetingpoint.html, downloaded May 29, 2001.
Suitability of Java for Virtual Collaboration, V. Darlagiannis, R. Ackermann, A El-Saddik, N.D. Georganas, R. Steinmetz, Proc. Net. Object Days 2000, Erfurt, Germany, Oct. 2000.
Learning in collaborative virtual environments—Impressions from a trial using the Dovre framework, http://www.cyberedge.com/vru_papers/odegardl.htm, printed May 30, 2001.
Integrating Real-World and Computer-Supported Collaboration in the Presence of Mobility, Bates, J., Spiteri, M., Halls, D. and Bacon, J., IEEE Seventh International Workshops on Enabling Technologies: Infrastructure for Collaborative Enterprises (Wet Ice '98), IEEE Computer Society Press, Jun. 17-19, 1998.
Middleware Support for Mobile Multimedia Applications, John Bates, David Halls, and Jean Bacon, ICL Systems Journal, 12(2):289-314, Nov. 1997.
An Architecture for the—Notification Storage and Storage and Retrieval of Events: Chapter 7 Experiments, Mark David Spiteri, dissertation submitted for the degree of doctor of philosophy, Darwin College University of Cambridge, Jan. 2000.

The 8th International Workshop on Network and Operating Systems Support for Digital Audio and Video (NOSSDAV 98), http://www.nossdav.org/1998/, printed Dec. 22, 2004 (document states Jul. 8, 1998-Jul. 10, 1998).
A Toolkit for Building Migratory Continuous Media Applications, Tatsuo Nakajima and Hiroyuki Aizu, downloaded Dec. 20, 2000 (the 8th International Workshop on Network and Operating Systems Support for Digital Audio and Video (NOSSDAV 98 states "1998 . . . Thursday Jul. 9 . . . A Toolkit for Building Migratory Continuous Media Applications, Tatsuo Nakajima and Hiroyuki Aizu").
Migratory Applications, K. Bharat and L. Cardelli, in Proceedings of the Eighth ACM Symposium on User Interface Software and Technology, Pittsburgh, PA, Nov. 14-17, 1995, pp. 133-142.
JTransport: Collaborative Mobile Java Applications, Jason Hong, http://www.cs.berkeley.edu/-jasonh/classes/cs294-7/cs294-7-finalreport.html, printed Oct. 18, 2000 (document states Mar. 8, 1998).
PDAs and Shared Public Displays: Making Personal Information Public, and Public Information Personal, Greenberg, S., Boyle, M., and Laberg, J., Personal Technologies vol. 3 No. 1, Mar. 1999.
State Synchronization in Heterogeneous Groupware, Ivan Marsic, rutgers.edu, downloaded Dec. 20, 2000.
Process Migration, Milojicic et al., ACM Computing Surveys vol. 32 No. 3, Sep. 2000, pp. 241-299.
Teleporting—Making Applications Mobile, Frazer Bennett, Tristan Richardson, Andy Harter, ftp://ftp.uk.research.att.com/pub/docs/att/tr.94.11.html/paper.html, printed Oct. 18, 2000 (document states Jan. 26, 1996).
Flexible Collaboration Transparency: Supporting Worker Independence in Replicated Application-Sharing Systems, James Begole, Mary Beth Rosson, and Clifford A. Shaffer, ACM Transactions on Computer-Human Interaction vol. 6 No. 2, Jun. 1999, pp. 95-132.
Insisting on Persistent Mobile Agent Systems—Silva, Silva (ResearchIndex), http://citeseer.ist.psu.edu/miradasilva97insisting.html,printed Dec. 22, 2004.
Insisting on Persistent Mobile Agent Systems, M.M. da Silva and A.R da Silva, downloaded Dec. 21, 2000 (Insisting on Persistent Mobile Agent Systems—Silva, Silva (ResearchIndex) states "M.M. da Silva and A.R. da Silva, 'Insisting on Persistent Mobile Agent Systems,' . . . 1997").
A comparative analysis of virtual versus physical process-migration strategies for distributed modeling and simulation of mobile computing networks, Kwun Han and Sumit Ghosh, Wireless Networks 4 (1998) 365-378.
Flexible Collaboration Transparency: Supporting Worker Independence in Replicated Application-Sharing Systems, James Michael Allen Begole, Dissertation submitted to the faculty of Virginia Polytechnic Institute and State University, Blacksburg, Virginia, Dec. 1998.
The Design and Use of a Generic Context Server, Daniel Salber and Gregory D. Abowd, in the Proceedings of the Perceptual User Interfaces Workshop (PUI '98), San Francisco, CA, Nov. 5-6, 1998. pp. 63-66.
Context Servers May Link Disparate Systems to Crunch Data, by Elliot Borin, http://destinationcrm.com/print/default.asp?ArticleID=1012, printed Sep. 9, 2004 (document states Dec. 20, 2000).
Interaction Issues in Context-Aware Interactive Environments. Shafer, S.A.N., Brumitt, B., and Cadiz, J.J., Interactions (to appear), http://research.microsoft.com/easyliving/Documents/2001%2003%20Shafer.doc, downloaded Mar. 15, 2002.
A conceptual framework and a toolkit for supporting the rapid prototyping of context-aware applications, A. K. Dey, D. Salber, and G. D. Abowd, Human-Computer Interaction, 16. 2001.
Design Principles for Intelligent Environments, M. H. Coen, http://www.ai.mitedu/people/mhcoen/IEsymposium.ps, downloaded Mar. 15, 2002 (document states "To Appear AAAI 1998 Spring Symposium").
CAMP: A context-aware mobile portal, Davide Mandato, Ernö Kovacs, Fritz Hohl and Hamid Amir-Alikhani, IEEE Communications Magazine, Jan. 2002, pp. 90-97.

(56) References Cited

OTHER PUBLICATIONS

Margin Notes: Building a Contextually Aware Associative Memory, http://rhodes.www.media.mit.edu/people/rhodes/Papers/mnotes-iui00.html, printed Oct. 24, 2000 (document states Jan. 9, 2000-Jan. 12, 2000).

RM3D: ISO/IEC 14772-1:200x—4 Concepts, downloaded Jun. 1, 2001.

Electronic/Interactive Program Guides Playing a Crucial Role, by Michael Lafferty, http://www.cedmagazine.com/ced/2002/0502/05d.htm, printed Sep. 8, 2004 (document states May 2002).

Collaborative Virtual Environments, Steve Benford, Chris Greenhalgh, Tom Rodden, James Pycock, Communications of the ACM vol. 44 Issue 7, Jul. 2001.

Inhabited Television: Broadcasting Interaction From Within Collaborative Virtual Environments, Benford et al., ACM Transactions on Computer-Human Interaction (TOCHI), vol. 7 Issue 4, Dec. 2000.

Overview of the MPEG-4 Standard (V.18—Singapore Version) ISO/IEC JTC1/SC29/WG11 N4030, www.cselt.it, downloaded May 25, 2001 (document states Mar. 2001).

International Organisation for Standardisation ISO/IEC JTC1/SC29/WG11 Coding of Moving Pictures and Audio, http://mpeg.telecomitalialab.com/standards/mpeg-21/mpeg21.htm, printed Apr. 25, 2002 (document states Dec. 2001).

Shared Web Annotations As a Platform for Third-Party Value-Added Information Providers: Architecture, Protocols, and Usage Examples, Report No. CS-TR-97/1582, Martin Röscheisen, Christian Mogensen, Terry Winograd, Jan. 1997.

What is Third Voice?, http://www.cse.msu.edu/~bowersj2/third.voice/node2.html, printed Dec. 10, 2001 (document states Jan. 17, 2000).

A Graphical User Interface Toolkit Approach to Thin Client Computing., Simon Lok, Steven Feiner, William Chiong, Yoav Hirsch, Proceedings of the 11th International World Wide Web Conference 2002, Honolulu, HI, May 7-11, 2002.

Application-Layer Mobility using SIP, Henning Schulzrinne and Elin Wedlund, Mobile Computing and Communications Review, vol. 4, No. 3, Jul. 2000.

Using handhelds and PCs together, Brad A. Myers, Communications of the ACM, vol. 44, No. 11, Nov. 2001, pp. 34-41.

Collaboration Using Multiple PDAs Connected to a PC, Brad A. Myers, Herb Stiel, and Robert Gargiulo, Proceedings CSCW '98: ACM Conference on Computer-Supported Cooperative Work, Nov. 14-18, 1998, Seattle, WA, pp. 285-294.

Synchronizing Clipboards of Multiple Computers, Robert C. Miller and Brad A. Myers, CHI Letters: ACM Symposium on User Interface Software and Technology, UIST '99, vol. 1, No. 1, Nov. 7-10, 1999, Asheville, NC, pp. 65-66.

Web Assistant: From the Pittsburgh Pebbles PDA Project, http://www-2.cs.cmu.edu/~pebbles/webassist/index.html, printed Jan. 29, 2002.

RemoteClipBook and RemoteClipHack: From the Pittsburgh Pebbles PDA Project, http://www-2.cs.cmu.edu/~pebbles/clipboard/index.html, printed Jan. 29, 2002.

BIAP Enables Web Access of its TV Personalization Service, http://biap.com/press/media_coverage/112502.html, printed Mar. 25, 2003 (document states Nov. 25, 2002).

Portal Server Technology, by Christian Wege, IEEE Internet Computing, May-Jun. 2002, pp. 73-77.

IEEE Xplore: MiTV. rethinking interactive TV, http://intl.ieeexplore.ieee.org/xpl/abs_free.jsp?arNumber=969691, printed Dec. 19, 2004 (document states 2004).

MiTV: Rethinking Interactive TV, J. Bing, J. Dubreuil, J. Espanol, L. Julia, M. Lee, M. Loyer, M. Serghine, downloaded Oct. 4, 2002 (IEEE Xplore: MiTV: rethinking interactive Tv states "MiTV• rethinking interactive TV . . . Meeting Date: Oct. 25, 2001-Oct. 27, 2001").

AOL Time Warner and Sony Collaborate to Accelerate Next-Generation Online Entertainment and Other Consumer Broadband Experiences, http://www.sony.com/cgi_bin/pf.cgi?page=SCA/press/011112_2.shtml, printed Sep. 10, 2004 (document states Nov. 12, 2001).

Cultivate Consumers With ITV Ads, The Forrester Report, Nov. 2001.

VODLINK, SeaChange International, downloaded Jul. 10, 2003 (document states 2003).

Digital Media on a Media Center PC, by Galan Bridgman, http://www.microsoft.com/windowsxp/using/mce/expert/bridgman_02november25.mspx, printed Sep. 13, 2004 (document states Nov. 25, 2002).

Media Center PC Extensibility Guide, http://msdn.microsoft.com/library/en-us/dnwmt/html/extensibility_guide.asp?frame=true, printed Sep. 13, 2004 (document states Sep. 2002).

Using the Remote Control Device with Windows, http://msdn.microsoft.com/library/en-us/dnwmt/html/remote_control.asp?frame=true, printed Sep. 13, 2004 (document states Sep. 2002).

Welcome to GoldPocket Interactive: Reinventing what it means to be entertained, http://www.goldpocket.com/corporate/interactive.aspx?pageID=2, printed Sep. 26, 2002 (document states 2002).

Welcome to GoldPocket Interactive: Creating value for all,http://www.goldpocket.com/corporate/interactive.aspx?pageID=3, printed Sep. 26, 2002 (document states 2002).

Welcome to GoldPocket Interactive: Eventmatrix, http://www.goldpocket.com/corporate/interactive.aspx?pageID=12, printed Sep. 26, 2002.

Welcome to GoldPocket Interactive: EM Production Suite, http://www.goldpocket.com/corporate/interactive.aspx?pageID=13, printed Sep. 26, 2002 (document states 2002).

Welcome to GoldPocket Interactive: Em Broadcast Suite, http://www.goldpocket.com/corporate/interactive.aspx?pageID=14, printed Sep. 26, 2002 (document states 2002).

Welcome to GoldPocket Interactive: EM Operator Suite, http://www.goldpocket.com/corporate/interactive.aspx?pageID=15, printed Sep. 26, 2002 (document states 2002).

Welcome to GoldPocket Interactive: EM Connect, http://www.goldpocket.com/corporate/interactive.aspx?pageID=33, printed Sep. 26, 2002 (document states 2002).

Welcome to GoldPocket Interactive: Professional Services, http://www.goldpocket.com/corporate/interactive.aspx?pageID=16, printed Sep. 26, 2002 (document states 2002).

Welcome to GoldPocket Interactive: Industry-leading partners, http://www.goldpocket.com/corporate/interactive.aspx?pageID=4, printed Sep. 26, 2002 (document states 2002).

Welcome to GoldPocket Interactive: Technical, http://www.goldpocket.com/corporate/interactive.aspx?pageID=19, printed Sep. 26, 2002 (document states 2002).

Worldgate's Global Operations Center Delivering 'Go!TV Links' for Dynamic Interactive TV, http://www.wgate.com/news/newsReleases/2002/0815.html, printed Aug. 15, 2002 (document states Aug. 15, 2002).

Go!TV, http://www.gotv.com/gotv.web/index.web.html, printed Dec. 5, 2002.

WorldGate ITV, http://www.wgate.com/company/products/platformsitv_itv.html, printed Dec. 3, 2002 (document states 2002).

WcrldGate CableWare, http://www.wgate.com/company/products/platforms_cableware.html, printed Dec. 3, 2002 (document states 2002).

WorldGate Walled Garden, http://www.wgate.com/company/products/apps_garden.html, printed Dec. 3, 2002 (document states 2002).

WorldGate TVGateway, http://www.wgate.com/company/products/platforms_tvgateway.html, printed Dec. 3, 2002 (document states 2002).

WorldGate Channel Hyperlinking, http://www.wgate.com/company/products/platforms_hyper.html, printed Dec. 3, 2002 (document states 2002).

WorldGate Communications, http://www.wgate.com/company/products/apps_comm.html, printed Dec. 3, 2002 (document states 2002).

WorldGate Channel Hyperlinking, http://www.wgate.com/company/products/apps_hyper.html, printed Dec. 3, 2002 (document states 2002).

(56) References Cited

OTHER PUBLICATIONS

WorldGate Company Profile, http://www.wgate.com/company/about_Wgate/index.html, printed Dec. 3, 2002 (document states 2002).
WorldGate Internet Packages, http://www.wgate.com/company/products/apps_internet.html, printed Dec. 3, 2002 (document states 2002).
WorldGate Games, http://www.wgate.com/company/products/apps_games.html, printed Dec. 3, 2002 (document states 2002).
WcrldGate Database Reporting, http://www.wgate.com/company/products/services_reporting.html, printed Dec. 3, 2002 (document states 2002).
WorldGate Technology Partners, http://www.wgate.com/partner/partner.html, printed Dec. 3, 2002 (document states 2002).
Half of U.S. Internet Users Have a Television and PC in the Same Room, http://www.comscore.com/press/release.asp?press=88, printed Sep. 14, 2004 (document states Sep. 17, 2002).
The DiMAS Report: An Analysis of Advertising Opportunities and Hurdles in Digital Media, http://dimagroup.com/report/index.html#dimasreport, downloaded Jun. 10, 2003 (document states Apr. 2003).
Smart Syndication, Tor Hyams, tor.net, downloaded Apr. 18, 2003 (document states 2000).
MerlinTV Debuts Real-Time T-Commerce Engine Synchronizing Product Recommendations with Specific Show Content, http://web.archive.org/web/20020718212718/209.10.240.101/Merlintv/frame_pr_717.html, printed Dec. 9, 2004.
MerlinTV FAQs, http://web.archive.org/web/20020922175904/http://209.10.240.101/Merlintv/frame_faq.html, printed Dec. 9, 2004 (archive.org states archive date of Sep. 22, 2002).
PCT International Search Report.
Johns, Heath, "Understanding Zerocof and Multicast DNS", Dec. 20, 2002, published on Wireless Dev. Center; http://www.oreillynet.com/1pt/a/3046, downloaded Oct. 22, 2012.
Hibbard, Justin, "Apps for Streaming Servers", Information Week, http://www/informationweek.com/670/70iustr.htm; downloaded Oct. 15, 2002.
Introducing the New Entertainment Experience from Xbox, Oct. 22, 2012, TechNet Blogs, http://blogs.technet.com/b/microsoft_blog/archive/2012/10/22/introducing-the-new-entert . . . , downloaded Oct. 26, 2012, pp. 1-4.

* cited by examiner

TYPICAL DISPLAYS

METHOD AND APPARATUS FOR BROWSING USING ALTERNATIVE LINKBASES

PRIORITY CLAIM

This application is a continuation of and claims priority under 35 U.S.C. §120 to U.S. patent application Ser. No. 13/094,505 filed on Apr. 26, 2011 and entitled "Method and Apparatus for Browsing using Alternative Linkbases," which in turn claims priority to U.S. patent application Ser. No. 10/434,032, filed May 8, 2003 and entitled "Method and Apparatus for Browsing using Alternative Linkbases," which in turn claims priority to U.S. Provisional Application No. 60/379,635, filed May 10, 2002, U.S. Provisional Application No. 60/408,605, filed Sep. 6, 2002, and U.S. Provisional Application No. 60/455,433, filed Mar. 17, 2003. The entire contents of the aforementioned applications are expressly incorporated herein by reference.

FIELD OF THE INVENTION

The present invention is directed generally to interactive television and similar interactive hypermedia such as from television or Internet sources, and more particularly to the provision and use of user interfaces that permit interaction using multiple coordinated device sets.

BACKGROUND OF THE INVENTION

While "convergence" of television (TV) and computer technology have been a major focus of innovation and commercial development since the early 1990s, particularly in the area of "interactive television" (ITV), there remains a huge gulf in the nature of the user experience of ITV and of computer-based media such as the World Wide Web. Convergence has taken hold in infrastructure technologies, with digital and computer-based TV (DTV) editing, production, distribution, transmission, and devices. At heart ITV is a matter of hypermedia browsing, the process of browsing linked media resources like the Web, differing only on its emphasis on video as the central medium.

However, there remains a divide relating to the dramatic difference in how TV-centric and computer-centric media are used, and to the cultural divide between the TV production and distribution industry and the computer and Web industries that has prevented a convergence in user experience from developing or even being seen as possible and desirable. TV usage and directions are focused on its character as a lean-back, across-the-room, low resolution, and relatively passive, relaxed experience of couch potatoes viewing large, often shared TV screens with simple remote controls. PC usage and directions are focused on its character as lean-forward, up-close, high resolution, and intensive, highly interactive experiences of individuals with PC-styles displays, keyboards, and pointing devices. Variant device sets and applications, such as PDAs, tablets, and video games, could be taken as suggestive of the desirability of selecting among alternative usage modes and form factors, but only very limited aspects of these suggestions have been recognized.

The limitations of these radically disparate device set form factors have severely limited the appeal of ITV. ITV promises to greatly enrich the TV experience by allowing interactive features that can range from access to supplementary enhancement material such as background on programs, casts and players, sports statistics, polls, chat messaging, and interactive advertisements and purchase offers ("t-commerce"), and all manner of other tangential information, to ways to vary the core program content by acting on viewer input and choices as to camera angles or even alternative plots, as well as providing improved control of the core experience with electronic program guides (EPGs), personal video recorders (PVRs) and video on demand (VOD) and similar features.

The problem is that these interactive features are not well served by the TV usage mode and form factor, and their use interferes with the basic TV experience. Rich interaction with a TV is inherently difficult. Presentation of information is limited by the poor capabilities of a TV screen for presenting text, menus, and navigations controls, and the crude input capabilities of a remote control. The rich information and navigation functionality available on a Web browser or other PC-based user interface (e.g., UI, especially graphical user interfaces, GUIs) must be "dumbed-down" and limited for use on a TV, and even use of high-definition TV (HDTV) may not significantly ease that—people do not like to read or do fine work from across-the-room, it is just not comfortable ergonomics. Furthermore, the attempt to show interactive controls and enhancements on the TV interferes with viewing by the person interacting, as well as any other viewers in the room. Compounding these issues and slowing recognition of better solutions is the dominance of the cable TV industry, its struggles in developing and deploying the advanced set-top boxes (STBs) needed to offer meaningful ITV services of the form it envisions, and its orientation to closed, proprietary systems that do not fully exploit or adapt to advances in the PC and Internet world.

The computer community has attempted to market PCs that include a TV tuner to support TV function in a PC-centric model, as promoted by the PC-DTV Consortium. However, these systems suffer from the converse problem, in that their form factors are not suited to the fact that most people do not want to watch TV at a PC, with its lean-forward, up-close form factor. Furthermore, such devices cannot effectively receive protected cable or satellite programming. And here, as with conventional TVs, the use of a single system forces technical, economical, and usage constraints on the inherently complex, multi-tasking, man-machine behavior that is desired in a rich hypermedia browsing experience.

There has also been some recognition that PCs provide a way around the limited installed base of advanced STBs, but this is generally perceived only as a limited stopgap. So called Enhanced TV or Extended TV or "telewebbing" has emerged to exploit the fact that tens of millions of households have PCs in the same room as their TVs, and can surf related content on the Web while watching TV. Some broadcasters such as ABC and PBS have exploited this to offer Web content synchronized to a TV program; but it is the user who must coordinate the use of the PC with the TV, by finding the appropriate Web site. In spite of the fact that the installed base for such open hardware is some ten times that of ITV-capable set-top boxes, the ITV community generally views such "two-box" solutions as an unfortunate and awkward stopgap that may be desirably supplanted by advanced "one-box" systems whose wide deployment must be awaited. Some major reasons for this lack of acceptance are that this simplistic two-box model supports only very limited, pre-defined synchronization of the availability of TV and enhancement content that is built into a rigidly fixed two-box structure at the content source, and, even more importantly, that it completely fails to address any coordination of user activity at the two separate boxes.

Across all of this, the key elements that are lacking are provision of a broadly flexible, powerful, selective, and simple user interface paradigm for browsing hypermedia across multiple device sets, whether they are integrated or not, with related methods for user and/or authoring control of such a UI, and provision of an effective method for independent systems to coordinate browsing activities to enable such a user interface to be employed across multiple independent systems. Further lacking across all of these aspects is delivery of these services in a way that provides the user with a smoothly integrated experience in which interactions on the multiple systems are coupled or decoupled to the degree appropriate to the task of the moment.

SUMMARY OF VARIOUS EMBODIMENTS THE INVENTION

According to embodiments of the present invention there are provided systems and methods for navigating hypermedia using multiple coordinated input/output device sets. Embodiments of the invention allow a user and/or an author to control what resources are presented on which device sets (whether they are integrated or not), and provide for coordinating browsing activities to enable such a user interface to be employed across multiple independent systems. Embodiments of the invention support new and enriched aspects and applications of hypermedia browsing and related business activities.

BRIEF DESCRIPTION OF THE DRAWINGS

Further aspects of the instant invention will be more readily appreciated upon review of the detailed description of the preferred embodiments included below when taken in conjunction with the accompanying drawings, of which.

DETAILED DESCRIPTION OF THE INVENTION

Overview

Figure 1:
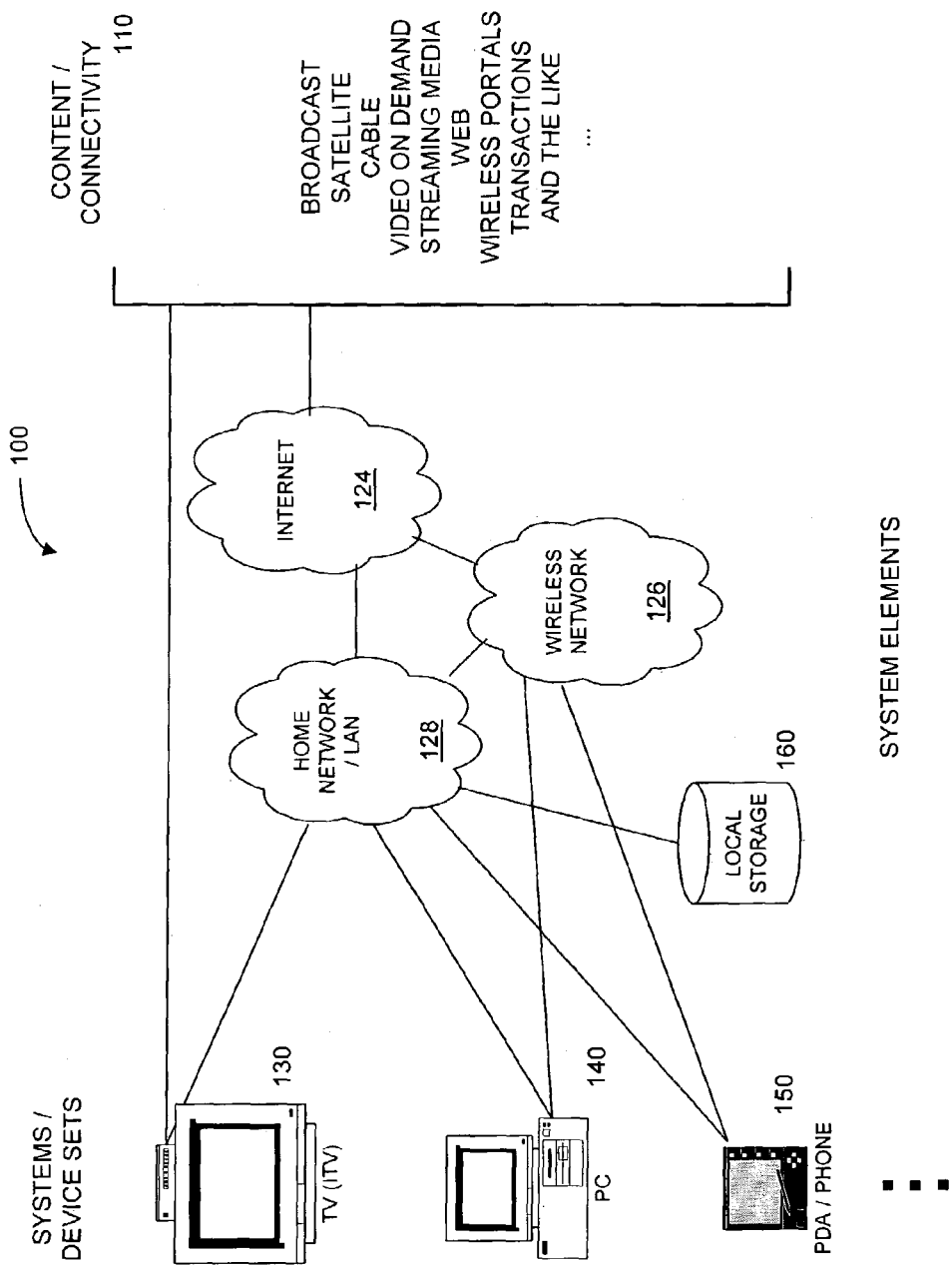
FIG. 1 is a block diagram of an exemplary assemblage of user systems, networks, and remote services for implementing certain embodiments of the present invention.

The present invention may be described, in various embodiments, as a system and method for navigating hypermedia using multiple coordinated input/output device sets. It provides a broadly flexible, powerful, selective, and simple user interface paradigm for browsing that allows the user (and/or an author) to control what resources are presented on which device sets (whether they are integrated or not), and provides an effective method for coordinating browsing activities to enable such a user interface to be employed across multiple independent systems.

One aspect is, in the spirit of human-centered design, to anticipate and be responsive to the user's desires (and the author's suggestions) as to what resources to present where, in order to make the best possible use of the hardware resources at a user's disposal. Homes, offices, and other personal environments of the future will have a rich array of computer-based input output devices of various kinds, some general purpose, and some more or less dedicated to specific uses. The desire is to minimize constraints on what system resources can be used for a given task, to enable the most powerful browsing experience possible. Browsing of hypermedia, such as in the case of ITV is a task in which the use of multiple devices might be valuable because it may be expected to be a dominant activity, if supported effectively, and because of the disparity of UI issues between watching extended video segments and doing intensive interactions (such as with Web media) that may be more or less closely coupled with such video segments.

Prior work has generally not recognized that it is inherent in rich ITV and similar forms of video-centric hypermedia browsing to be best served as "two-box," multitasking experiences, at least much of the time, and the problem is not to squeeze it into one box (and fight over which box's functionality and form factor is better), but to enable effective coordination of both boxes. While the TV vendors and the PC vendors might fervently wish to offer a single system that meets the needs of ITV users, that is not an effective solution. If one assumes that an ideal level of coordination among device sets can be enabled and explores usage scenarios, it can then be seen that different modes of viewing are best served by different device set form factors. These modes are not fixed for the duration of a session or task, but can blend, overlap, and vary as the flow of a set of linked tasks changes. What begins as a TV-centric browsing (or pure viewing) experience may shift to casual use of a PC for light interaction (such as looking at menus and options or doing a quick lookup) to intensive PC-centric activity (and then back again). The user may shift focus from the TV to both, to primarily the PC for a time, then become involved in the TV again. Conversely, an user at a PC may shift to immersion in a TV program or movie, then return to intensive use of the PC. While some broad usage patterns tend to favor video on the lean-back TV device set and interactivity on the lean-forward PC-type device set, other issues may relate to incidental viewing of video from a PC centric phase of activity, and casual interactions with enhancements in a TV-centric experience, as well as a complex mix of secondary issues, such as quality-of-service factors, whether an alternative device set is at hand and ready for use, other activities, presence of other people, location/setting, mood, and the like.

The point in a session at which a user may wish to shift device sets may depend not only on the immediate task, but the user's expectation of where that task is leading, so an intensive task soon to end may not warrant a shift from TV to PC, but a less intensive task leading to deeper interaction may warrant an early shift. Varying form factors of different TV devices and of the range of PCs, PDAs, tablets, and Internet appliances may also affect what tasks a user wants to do on what device, with what UI. At the same time, to avoid burdening the user with the complications of too much flexibility and too many choices, it may be desirable that both the user and the content author be able to pre-set affinities, preferences, and recommendations, relating to task types, content types, and device availabilities, that could automatically place elements on the device set or device set group that is presumably best suited to the apparent context, while leaving the user with the ability to recognize that expected targeting (based on conventions and/or unobtrusive cues) and to accept it with no further action, or override it if desired.

Providing the desired flexibility can be viewed in terms of three interrelated issues, one of structuring an effective and flexible multimachine user interface (MMUI) for browsing by a user, one of providing methods (such as markup) for the resource creator/author/producer to aid in exploiting that MMUI, and one of implementing such an interface on a wide range of hardware and software, including systems for which such usage may not be a primary mission (including both new systems and legacy systems).

A general approach to a MMUI for browsing that provides both user control and authoring support may advantageously build on the concept of targets for presentation of linked resources already present in hypermedia formats such as HTML (and XLink). In HTML, the link target attribute can be used to specify which of multiple frames a linked resource is to be presented in, with options that include the current frame, another existing frame, or a new frame. Coded specifications within the link are typically set by authors/producers of content, and controls in the browser allow the user to override and alter these settings, such as (with MICROSOFT Internet Explorer, MSIE) by using a shift-click combination to indicate that a link should be opened in a new window. Extending this to an MMUI can be done by expanding the coding of target attributes and by adding new browser control options, such as control-click, to target a window on an alternate device set. Additional control can be achieved by extending the richer drop-down control that is invoked in MSIE by right-clicking on a link. That drop-down list can be extended to list windows on alternate device sets. This provides a very flexible, general, and simple way to shift activity from one device set to another. Similar controls can be provided on simpler devices, such as for example, with a TV remote control, instead of select to activate a link to an enhancement overlay on the TV, a combination such as exit-select could be used to activate that link to an associated PC, or a new control button could be provided. As with current browsers, variations on such controls can also be defined to open the current resource at a second location (cloning).

To implement such an interface on multiple independent device sets, the ending system must be given information to inform it when a link is to be activated, to what resource, with what browser attributes, and with what context information. A basic method is to transfer from the starting system to the ending system a link activation message that that includes a state record and contains relevant link arc information. The state record contains essential information on the state of the browser and related activities on the starting system that can be used at the ending system to configure its browser and related context accordingly. A state exporter/importer/tracker component may be provided as an addition to a standard browser to provide these functions (with exporter/importer function being sufficient for simple applications).

In simple embodiments, export from the starting system and import at the ending system need be done only once per transfer of locus. In certain embodiments, full event synchronization can be maintained, when desired, by the state tracker to provide ongoing collaborative functionality, as well. This is useful in the case of multiple users, and also can be useful for a single user that desires the ability to use both device sets in a fully replicated mode. However an advantage of the proposed method over conventional collaboration and synchronization systems, is that such ongoing event synchronization is not needed for basic MMUI browsing by a single user, and the complications and overhead of continually logging, exporting and importing all events that may alter state can be avoided. Instead, state information need be assembled for transfer only when a transfer is actually invoked, and only at the necessary granularity. This simple, occasional, coarse-grained transfer is readily added to any browser of existing architecture, unlike more fine-grained full synchronization approaches, which require either excessive tracking activity, display replication approaches, or rearchitecting of browsing to use model-view-controller architectures, such as in event replication approaches.

Another key benefit of this method is that it is readily applied to heterogeneous systems with only simple addition of an exporter/importer and some new UI functions to each system's own native browser. This exploits the fact that the underlying resources being browsed can be common to all systems, and that at a high level, browsing state is relatively independent of system architecture. Thus the method is readily applied to both TV and PC-based systems, and could be added to existing or new systems by manufacturers, integrators, distributors, service providers, or by end users themselves. The proposed methods are well suited to standardization, which could facilitate the inherent capability of the methods described here to allow any suitably functional device sets and systems to be used together in the desired coordinated fashion, regardless of its internal software and hardware architecture, vendor, or provisioning. Use of XML, RDF, and related standards is suggested to facilitate this. These features for ad hoc provisioning and use of devices acquired for other purposes removes a major hurdle to the introduction of MMUIs for ITV and other hypermedia browsing applications. Thus, for example, a household need not buy a lean forward device for ITV, but can simply use an existing PC, PDA, tablet, or the like.

As a further perspective on the range of ways to use a MMUI for interactive TV and similar hypermedia browsing as described herein it may be helpful, perhaps with regard to varied levels of multitasking and (correspondingly) of how closely enhancement resources relate to the viewing of a "primary program", to consider the term "interactivity." The term "interactive TV" might tend to suggest that a viewer interacts with a TV device and/or with TV content. Such a view may be appropriate to many kinds of ITV interaction. However, in considering the embodiments of MMUI browsing described herein, it is noted that many cases of what might be broadly described in terms of "interactive TV" could involve interactions that need not directly involve the TV device, or even the actual program content that is "on the TV", but that, for instance, involve other content perhaps more or less closely related to the program content that is on the TV.

From such a standpoint, the term "coactivity" might be considered as useful to emphasize the possible distinction between what is interacted with and what is on TV. Thus, for example, in the case of a loosely coupled interactive sub-task on a PC that relates to a program on the TV, the interactivity that takes place as part of that sub-task might be described as "coactivity".

The concept of coactivity could be useful, for instance, in clarifying certain motivations for using a MMUI. To the extent that one might think of a task as "interacting with the TV," the idea of using another device set (for example, a PC) might seem odd and unnatural to the task. However, by recognizing that many interactive tasks actually involve coactivity with content that might not be "on the TV", but that relates to what is on the TV, the use of a separate device set might be more readily recognized as possibly being natural and appropriate. Accordingly, "two-box" embodiments of the present invention could be seen as potentially well suited to the essential nature of ITV and similar hypermedia browsing, and not as a "stopgap" or "work-around" embodiments. Development of this new paradigm for man-machine-media interaction affords enriched capabilities and supports new and enriched applications.

As used herein, the term "hypermedia" is meant to refer to any kind of media that may have the effect of a non-linear structure of associated elements represented as a network of information-containing nodes interconnected by relational links. Hypermedia is meant to include "hypertext", and the two may at times be used synonymously in the broad sense, but where stated or otherwise clear in context, "hypertext" can refer particularly to text content, and "hypermedia" to extend that to content that includes other formats such as graphics, video, and sound. The terminology used herein is meant of be generally consistent with that used in World Wide Web Consortium (W3C) recommendations.

The associations of elements may be specified as "hyperlinks" or "links," such as described by the XLink (XML Linking Language), SMIL (Synchronized Multimedia Integration Language), HTML, XHTML, and similar W3C recommendations. Links define an association between a "starting resource," the source from which link traversal is begun, and an "ending resource," the destination, collectively referred to as "participating resources." A "resource" is used to refer to any addressable unit of information or service and may at times refer to a resource portion rather than a whole resource, and a "content resource" to refer to any resource suited to presentation to a user. In the context of hypermedia, "node" may be used synonymously with resource. "Navigation" is meant to refer to the process of following or "traversing" links. Unless specifically indicated as "link navigation" or otherwise clear in context, navigation also is meant to include the control of presentation within a resource, such as scrolling, panning, and zooming, using VCR-like controls to play a continuous media resource, and the like. Addresses for Internet resources are typically in the form of Universal Resource Locators (URLs) or Universal Resource Names (URNs) or other Universal Resource Identifiers (URIs), but may be based on any other suitable addressing mechanism. Hypermedia resources may contain content (also referred to as mediadata) and metadata (including hyperlinks), aspects of a resource may be declarative (such as markup) or procedural (such as embedded logic or program code elements) and may include embedded resources.

Links may have information about how to traverse a pair of resources, including direction and application behavior information, called an "arc," and such information may include link "elements" having "attributes" that take on "values." Behavior attributes include "show" to specify how to handle the current state of the presentation at the time the link is activated, "external" to specify whether the link is to be opened in the current application, or an external application, such as one suited to a special media type, "activate" or "actuate" to specify whether the link is triggered by some event, typically user interaction, or automatically traversed when its time span is active, and "target" to specify either the existing display environment in which the link should be opened (e.g., a SMIL region, an HTML frame or another named window), or trigger the creation of a new display environment with the given name. It should be noted that the term target is sometimes also used in the art to refer to an ending resource as the target of a link, as for a "target resource" or "target page."

Links may be contained in the starting or ending resource, "outbound" or "inbound" respectively, or may be independently stored as "third-party" arcs. Standard HTML links are typically outbound, but inbound and third-party link arcs may be useful, such as for adding links that are external to read-only or third-party content. By providing such external, third-party links, resources not originally intended to be used as hypermedia can be made into hypermedia. Third-party links may be collected in "linkbases." Linkbases may be directly associated with their starting resources by a resource that leads to both the starting resource and the linkbase, referred to herein as "coupled" linkbases, such as a set of image map links in a Web page that has an embedded image link, or may be "decoupled" and obtained by other means.

Where so indicated or clear in context, the term hypermedia may also be used to include "hypermedia-like" resources and systems that do not use coded links as such, but which support functionally similar non-linear resource relationships using other more or less similar mechanisms, such as special coding and logic that implements structures such as menu structures that have a defined graph structure, transaction request forms that have an associated address or other process identifier for transaction submission, and selectable content elements having a defined relationship to other resources or actions. This is meant to include any scheme that associates defined resource anchors or triggers with corresponding actions. Use of VCR-like or audio recorder-like controls to add non-linearity to a linear medium (e.g., fast forward/reverse, and skip ahead), also referred to as "trick-play" functionality, is also considered as hypermedia-like.

According to embodiments of the invention, links may refer to specific portions of a node or resource, such a by an "anchor" that associates the link to a position in text (such as in a HTML "A element"), or an "area" or "region" that associates the link to a spatial portion of an object's visual display, or to non-spatial portions, such as temporal subparts that may be defined by "begin" and "end" attributes, also referred to as "time positions" or together as a "time scope" or "time-span." Similar facilities are provided by XPointer, which supports addressing into the internal structures of XML documents, and provides an "origin" function to enable addressing relative to third-party and inbound links. Unless otherwise indicated or clear in context, "anchor" may used herein to be synonymous with similar forms, such as origin and "area."

Hypermedia structures may also be understood in graph-theoretic terms, and modeled as a-directed graph, consisting of a set of abstract "nodes," the resources, joined by directional "edges," the hyperlinks. In this usage, a linkbase defines a directed graph.

As used herein, and consistent with the Dexter Hypertext Reference Model, a "hypermedia system" allows users to create, manipulate, and/or examine hypermedia, and consists of a "run-time layer" that provides tools for accessing, viewing, navigating, and manipulating hypermedia, a "storage layer" that models the basic node/link or resource/link network structure of the hypermedia, and a "within component layer" that addresses the structure of components or resources of various given types. The storage layer, as used herein, includes media that may be streamed directly from a media capture device, such as a camera, microphone, or other sensor, and may not actually be stored. "Streaming" as used herein, unless otherwise indicated or clear from context, refers to this process of transmitting a resource representation, whether or not the resource is stored or not, and the representation may be in a format suited to storage, or one specifically suited to streaming. Streaming may also refer more particularly to realtime streaming, in which the flow of the stream is managed, such as through buffering and/or network quality of service controls, to support realtime presentation of continuous media at a steady rate with limited interruptions and without need for pre-downloading of an entire resource before presentation begins. A data stream may itself contain multiple data streams, including both continuous media streams and other kinds of data or resources, including discrete resources, metadata, and the like. Depending on the particular embodiment, streams may contain channels, or channels may contain streams. Linkbases associated with streamed media may also take the form of continuous metadata streams, whether embedded with the mediadata stream or as an independent stream.

As used herein, a "browser" or "media browser" is meant to include any kind of presentation system capable of presenting media, and is used synonymously with "user agent" as a process within a device that renders the presentation data for a resource into physical effects that can be perceived and interacted with by the user. A "hypermedia browser" includes browsers that support hypermedia, including standard Web browsers, SMIL players, interactive television presentation systems (including self-contained advanced TVs and TVs with set-top boxes), and the like, and specialized applications capable of presenting hypermedia, including word processors, multimedia and video editors, virtual reality presentation systems, game players, and the like. "Player" or "viewer" may be used as synonymous with browser, and use of any media type descriptor as an adjective with "browser" refers to a browser capable of that media type. Thus any conventional TV set is included as a "browser" or a "TV browser," and music players and radios are also included as browsers unless otherwise indicated or clear in context. Cases where hypermedia functions are not used are referred to as "linear" or "simple" presentation, viewing, or listening. "Media player" is used to refer to all such players collectively. Similarly, "browsing" is used to refer to any kind of viewing or playing experience, inclusive of hypermedia browsing and simple or linear viewing (such as watching TV), unless otherwise indicated or clear in context.

Web browsers are commonly limited to read-only use, except perhaps in use of forms, but other hypermedia systems are not so limited, and as used herein, unless otherwise stated, such as by the term "pure browser" or clear in context, "browser" is meant to include systems capable of resource creation and editing as well, including sound and video editing. Key functions of a browser include, but need not be limited to, providing access to resources, presentation of resources to the user and navigation of hyperlinks under user control or as directed by the hypermedia resources and links.

"Presentation" is meant to include any means of making a resource sensible to a human user, including visual display and audio, as well as any other sensible presentation such as used in current and future virtual or augmented reality systems affecting the sight, sound, touch, haptic, smell, taste, motion sensing, heat sensing, neural or other physiological interface, and the like. In addition to such "output," presentation also includes recognizing and responding appropriately to user "input" and/or "signals" of any kind that may be provided for, including keyboard, character recognition, touchpad, pointing device, haptic, microphone/speech, and camera, as well as more exotic inputs such as gesture, body movement, brain wave/electroencephalogram, neural or other physiological interface, and the like.

"Media format" or, synonymously, "resource format," as used herein refers to the format of a resource as retained, or potentially retained, as when streamed; in the storage layer and accessed by the browser, including access from local storage, via communications from a remote storage location or server or as streamed from storage or a live capture source. "Presentation format" refers to the format as rendered or otherwise processed by a browser or equivalent viewer or player or presentation system for actual presentation to a human user in sensible form.

Hypermedia linking systems can provide for starting and ending resources to be specified that not only present media content resources, but also that can specify arbitrary software programs or actions. In current Web technology, for example, such generality of function can be achieved by specifying the URL of a Web service, such as one called using SOAP or other forms of transactions or procedure calls, such as using Common Gateway Interface (CGI). Arbitrarily rich control of such actions can be achieved by passing parameters to ending resources from starting resources, as modified by browsers or other software. Unless indicated otherwise or clear from context, the term "Web service" as used herein may refer loosely to any service accessed via the Web, as well as more particularly to Web services based on SOAP and XML and related standards, or on similar architectures. The more particular use of the term relates to interprogram communications and integration architectures involving programmatic interfaces. Such programmatic interfaces are generally not suited to direct use by a user with only a simple browser, and generally rely on other applications to provide any needed user interface. This is in contrast to the looser usage relating to services delivered over the Web that are intended for direct use by a user with a browser, and which typically define a browser-based user interface that is to be rendered based on HTML and/or similar facilities. The narrower meaning may be referred to herein as "interprogram Web services" or as "Web services based on SOAP," or similar phrasing, and such reference to SOAP is meant to be inclusive of related and/or equivalent protocols unless indicated otherwise.

"Hypermedia system" as used herein refers broadly to all system elements comprising such a system, including the hardware, software, communications, and storage, including portions at a user location, portions at server/peer locations providing content and processing services, potentially including the entire Internet or any similar network to the extent that those elements are usable with a hypermedia presentation system and the resources that may be accessible to it. "User system" refers to the portions local to or controlled by an individual user or a group of users of a shared presentation system. "Server" or "server system" refers to any system, whether hardware or software, providing auxiliary services that may be supportive of a user system. "Remote servers" include content servers or repositories, application servers that may perform information processing, searching, e-commerce, or other transaction or support services remote from the user, including TV and video servers, audio servers, other storage servers, including storage area networks (SANs), network addressable storage (NAS), game servers, virtual reality servers, cable and satellite TV and ITV head-end systems, network servers such as proxies and caching servers, and the like. "Head-end server" is meant to be inclusive of other remote servers that may be reached via the head-end, regardless of actual location or function. "Local servers" include analogous services that may be local to the user, including media servers, gateways, controllers, PCs, hubs, storage servers, storage area networks, DVRs (also referred to a PVRs). Peer systems may also provide services in "peer-to-peer" (P2P) systems, and unless otherwise indicated or clear in context, the term server is meant to include peers acting in service provider roles.

"User" as used herein refers to any human end-user of a system, and may include users of a shared system. Users may be private consumers or workers in an organization or enterprise. User and "viewer" may be used synonymously. Depending on context, "subscriber" may refer to a user of a subscription service or more loosely to any user. "User interaction session" or "user session" as used herein refers to a series of interactions with a hypermedia system by a user, especially a series having a degree of continuity and relationship in time and with regard to an activity workflow or series of workflows, including concurrent workflows that may be related by a multitasking user. Depending on context, and the details of particular embodiments, a user may be a distinct individual (an "individual user") and/or a grouping of associated individual users of a device set, such as a family or household or work-group (a "collective user").

According to embodiments of the invention, a user session may be composed of one or more "browser sessions," and well as other "application sessions" with other applications. The relationship of such sessions with each other within a user session may vary with different embodiments and with the settings and circumstances. For example, with enhancements to a TV-centric browsing experience, it might normally be appropriate that the base TV program and the related enhancement session be considered as "linked sessions" or sub-sessions that are distinct from one another, so that a browser session transfer is understood to transfer the enhancement session, but not the base TV session. The terms "transfer" and "migrate" are used synonymously to refer to the movement of the locus of work of a session, such as from one system or device set to another. The term "clone" is used to refer to a transfer that duplicates the current resource presentation of a session at a second device set. A migration that deactivates the session at the original device set is referred to as a "complete migration" or "terminal migration."

A user session may be local to the user system or may involve one or more "communications sessions" with remote server or peer systems, where such communications sessions may be defined in accord with a communications protocol. A user session may be composed of multiple "client/server sessions" (or "peer sessions" or "client/server/peer sessions", or collectively "remote sessions"), including concurrent such sessions. A "server session" refers to a series of activities performed by a server in support of a series of client/server service requests (and similarly for a "peer session" and "remote session"). Except where indicated otherwise or clear from context, references to peer-to-peer and client/server are meant to be inclusive of one another. Some protocols, such as HTTP for example, may be sessionless (based on request-response sets only), so that a remote HTTP communications session may strictly speaking be composed of multiple separate communications interchanges at the protocol level that are related by the server into a single server session, and this can be thought of as constituting a single virtual communications session. Unless otherwise stated or clear from context, communications session is meant to include such virtual sessions.

"Shared sessions" or "multi-user sessions" are applicable to multi-user systems where users cooperate or collaborate in controlling an interactive session, are recognized as individuals, and retain their individual identity and state.

"State" refers to the representation of the current state of a system relating to one or more tasks or sessions, usually in discrete values of some set of "state variables" that can be stored as a "state record" sufficient to define the state fully enough to allow the current activity to be deactivated and then reactivated, such as in a context switch or shutdown, using the state record to reset it so that it then behaves as if never interrupted.

"Session state" refers to the state of a user session, for a browser session typically including, depending on the granularity desired, a selection of such state variables as the user identity and related authentication information (including for example password and certificate information), the identification of active hypermedia resources and details of how they are currently rendered (such as window sizes and locations, and scrolling state), link arc data for any link currently being traversed, the execution state of embedded logic components such as Java applets (including the state of a Java Virtual Machine, JVM), ActiveX controls, Javascript (or ECMAScript, or Jscript, or other scripts), or FLASH, or other plug-ins, or helper applications, or the like, navigation path history (the ordered list of resources back and forward from the current resource, corresponding those activated by the back and forward browsing controls, as well as, optionally, next and previous with regard to tree branches), selected interaction history, variable user preferences, status of communications and server/peer sessions (including addresses, ports, identities, and authentication information), and other current context regarding other internal and external resources, including such information as may be stored in cookies. Any or all of such information may be stored in a "state record." State records may include details of user interactions not yet saved in the storage layer, including edits and forms field inputs not yet submitted. State may also include data on link arcs, including trigger data, and on resources, if such data must be transferred to establish state in a coordination embodiment in which such information cannot be obtained directly by the coordinated system. Sessions, software processes, and the like that are characterized by state variables are referred to as "stateful" and those that are not, as "stateless."

"Software process state" refers to the program environment state of a software process as it runs on a system. A process typically runs with the support of an operating system, and its state typically includes the current values of the instruction counter, registers, dynamic memory, input/output activities, and open or assigned operating system, network, and hardware resources, as well as active sessions with external systems, and is used synonymously with "task," as an operating system concept that refers to the combination of a program being executed and bookkeeping information used by the operating system. Note however that "task" is more commonly used herein to refer to tasks at the user and/or session level. A software process is meant to include any of application software, middleware, and system software, and the case of a pure hardware, firmware, or dedicated implementation is also meant to be included in this usage.

A "process instance" refers to a single process with its associated state information. It may be possible to run multiple browser process instances on a single computer, sharing some system resources, such as caches, persistent storage, network access, and the like, in common, and thus having some state elements in common. Depending on implementation, a browser instance may allow for multiple presentation windows to be open, each presenting a different resource (and, as for example in MSIE, each supported by a separate process thread within one browser process). In such cases, depending on context, browser state may refer to the entire set of state information for all active browsers or the information for one browser instance (also referred to as one browser), for all its active windows. The term "current state" may be used to denote more limited state information on the single window, or single browser instance that is currently in focus for user interaction.

"Context" may be used as generally synonymous with state in referring to the information needed to allow a session to be interrupted, moved, copied, restarted, or otherwise shifted without apparent loss of context beyond the intended change. Context may also be used to refer to broader aspects of state that go beyond and are external to the state of the application, hardware, software, and network, to include the user, both in regard to his session, and potentially to the broader situation and environment of the session, including aspects that may be sensed or inferred. This broad usage of context is defined (by Dey in "A Conceptual Framework and a Toolkit for Supporting the Rapid Prototyping of Context-Aware Applications") as: "any information that can be used to characterize the situation of entities (i.e. whether a person, place or object) that are considered relevant to the interaction between a user and an application, including the user and the application themselves. Context is typically the location, identity and state of people, groups and computational and physical objects." "Context-aware applications" refer to those that exploit this broader class of external knowledge of "where," "what," "when,", "who," and "why," and that may involve the interplay of situational awareness and informational relevancy. As used herein, this broader use of context and context-awareness is meant to include all aspects of the user's state, including the user's attention. This includes the methods of attentive user interfaces (AUIs), and variations, including those referred to as attentional, attention-based, or awareness systems, which sense and draw inferences from cues to user attention; including such factors as presence, proximity, orientation, speech, activity, and/or gaze, which may be sensed using microphones, cameras, tactile sensors, object sensors, eye trackers, accelerometers, global positioning systems, and the like.

"Client/server state" refers to the aspects of state relevant to a client/server session between a client system and a local or remote server system that provides it with resources or other services. "Server state" refers to those portions of client/server state maintained at a server, and "client state" to those maintained at a client (and similarly for "peer-to-peer" sessions). "Transaction" is meant to broadly include any discrete activity, but with emphasis on activities such as database inquiry, search, and update, which may or may not relate to business transactions, especially those that involve client/server (or peer) interaction and that may involve multiple processing, database update, and intermediate interaction steps.

"Granularity" of state refers to the level of detail captured as state and thus determines the number and kind of discrete points at which is can be saved and restored without loss of context or need for the user to re-establish lost context details. Examples of varied granularity include the relatively coarse grain of browsing link traversals, the intermediate level of user interactions for editing, data entry, and manipulation of controls and the like, and the very fine grain of internal software process state. The later is of lesser concern for much of the present work, so that the granularity of user input, which is "relatively fine" in comparison to link traversals, may also be referred to herein as "fine grained."

"Interactive Television" (ITV) as used herein is meant to refer to any combination of video with displayable supplementary information and/or control elements that invite or aid in user interaction, including Enhanced TV (ETV) (or Extended TV), Synchronized TV (SyncTV), and similar services, and all forms of hypermedia containing a significant video component. This may broadly include the full range from "TV-centric" media in which the video program is expected to be the core experience in which interactive enhancements and features serve as complements, to "PC-centric" or "Web-centric" media in which computer-based media such as Web pages are the core experience and video serves as an enhancement or offshoot to that, but as may be stated or clear in context, ITV may be used to suggest TV-centric media. It is also meant to include specialized or more limited forms of interactivity with TV, including video on demand (VOD), near video on demand (NVOD), subscription video on demand (SVOD), pay-per-view (PPV), Enhanced (or Interactive) Program Guides (EPG/IPG), Digital Video Recorders (DVRs, also known as Personal Video Recorders, PVRs), Multi-camera angle or Individualized TV. Included are closed services such as "walled gardens" or "virtual channels" or ITV portals, and open services such as those based on Internet resources. More advanced forms of ITV include "viewer participation" capabilities, in which view interactions may result in changes to the program seen by other viewers, such as in polls or voting to select winners in contests, or even to alter the plot of a story ("interactive storytelling".) ITV includes systems using TV industry standards, such as ATVEF (Advanced Television Enhancement Forum) and the related DASE (Digital TV Applications Software Environment) and DDE (Declarative Data Essence), OCAP (Open Cable Application Platform), JavaTV, DVB-MHP (Digital Video Broadcast-Multimedia Home Platform), DAVIC (Digital Audio Visual Council), ATM Forum, Interactive Services Architecture, or similar standard or proprietary systems (including for example ACTV/HyperTV, WORLDGATE, WINK, WebTV, and VEON, and the like), as well as Internet and Web standards, such as for example SMIL (Synchronized Multimedia Integration Language), MHEG (Multimedia and Hypermedia information coding Expert Group) and HyTime (Hypermedia/Time-based Structuring Language, ISO/IEC standard), and the like.

As used herein in reference to content resources, unless indicated otherwise or clear in context, "television" may be used as broadly inclusive of any video content or resource, including all forms of TV distribution, as well as movies, however distributed, live or recorded video, animations, 3DVR, or any other continuous visual media or audio/visual combinations.

Reference to "identity" of a "TV program" or for a radio program or other hypermedia resource external to the Web or an equivalently structured storage layer is meant to refer to resource identification information for any such resource, and identity of a "current" program may be limited to the channel (or equivalent) or may use a globally unique channel identifier, but may also include time-position information, such as a fixed time position from the start of a given segment, or a current position in real-time play, which may be specified in terms of a fixed position and a real time at which play begins from that position. "Identity," "program identifier" and "resource identifier" are used broadly to include any identifying information, including specific names or addresses or other unique program resource identifiers, including titles, naming codes, URIs, URNs, URLs and the like, Digital Object Identifiers (DOIs), MPEG-21 Digital Item Identifiers, TV Anytime Content Reference Identifiers (CRIDs), ISO/SMPTE/ATSC International Standard Audiovisual Number (ISAN) and Versioned-ISAN (V-ISAN), Universal Program Identifiers (UPIDs), SMPTE Unique Media Identifiers (UMIDs), NIELSEN Automated Measurement of Lineups (AMOL or AMOL I) and AMOL II, and relative identifiers, including time and channel identifiers, and other metadata types described below. Such systems may distinguish between identifications used to logically reference a resource, and locators used to actually retrieve the resource, possibly involving a resolution process and/or service to convert such identifiers to locators, and possibly supporting multiple alternative locations, and may apply to editorial or media levels. Such identification systems may or may not distinguish multiple instances of a program, such as in repeated broadcasts, or variant versions of programs, such as with regard to edits, updates, languages, format, and the like. Such systems may also retain a relative identifier such as time and channel in association with a stored form of the resource, such as to be usable even after a broadcast.

The term "program" is meant to be used as broadly inclusive of any complete identifiable video (or audio or other media) segment or grouping of segments, including conventional broadcast or cable/satellite TV programs that may be identified by name or by channel and start time or other identifiers, as well as such alternatives as VOD or streamed programs from TV distribution industry or Internet sources, stored programs on cassette, CD, DVD, DVR, hard disk, or other storage media or systems, and ad hoc programs such as might be obtained from a camera (or microphone) or computer-based image (or sound) generation source (such as 3DVR). Program is also meant to refer to advertisements, as just another class of program segment. The distinction between a program as a single resource and an interactive hypermedia experience as composed of multiple resources viewed in flexible, linked and/or assembled combinations may depend on the context for cases where a program may involve some customization and/or personalization and variability in such aspects as multiple camera angles, sound tracks, short or long forms, composition from multiple components, and the like, and similarly as to whether advertisements are included or excluded as part of their surrounding programming. Program as used herein may be synonymous with ATSC terminology of a "television program" or "event." The terms "primary program," "core program," and "base program" may be used to refer to a program that serves as a starting resource for enhancements. As may be indicated or clear from context, those terms may also be used to distinguish a program, sometimes referred to as a "content program," from advertisements that may be presented in association with that program, such as before, between, or after segments of that program.

As used herein, "channel" may include any relevant form of channel. This may include "physical channels," which may correspond to radio frequencies or other physical locators, "virtual channels," such as used in digital television systems, such as in the ATSC PSIP protocol, to decouple programming to be identified by users from the physical channels that might carry them, as specified with mapping tables for example, and "logical channels," which may include virtual channels or any other groupings of channels that may be useful as logical groupings. Virtual channels may have a multidimensional structure, such as the ATSC PSIP scheme of major and minor channels that provide a two dimensional navigation structure, and in which the major channels may have a branding significance.

As used herein, "user interface" (UI) refers to all aspects of facilitating man-machine interaction, including the hardware and software input/output (I/O) devices, and the control paradigms, models, and metaphors that exist in the user's mental model of the interaction, the real physical world, and the virtual world presented to the user as a shared conceptual medium that links the real, the mental, and the internal model of this world represented in the machine. "Graphical user interfaces" (GUIs) are widely used to facilitate user understanding and to implement virtual controls ("widgets") that may metaphorically represent physical controls (such as a virtual button image on a screen). Less capable devices may be limited to simpler UIs based on menus and simple buttons. Multimachine user interfaces (MMUIs) refer to UIs that are capable of presentation on multiple machines having input/output devices and processors that are physically independent. This corresponds to the idea of systems, originally used with regard to data processing servers, that could be used independently, but in which software and network connections are used to give the effect to the user of a "single system image". Unless otherwise indicated or clear in context, MMUI is also used as a superset that is inclusive of the simpler cases of UIs that support multiple input/output devices driven by a single processor, including simple cases of multiple monitors, and of standard single machine UIs, and "full MMUI" or "true MMUI" or "independent MMUI" may be used to refer specifically to aspects or implementations that involve independent systems, and "multidevice user interface" (MDUI) may be used to more properly describe the broader, more inclusive use of MMUI. "Single machine user interface" (SMUI) may be used to refer to the case where no provision is made for a MMUI. "Machine" and "system" are used synonymously. Further clarification the usage of the term "independent" is provided in the discussion below As used herein, "presentation device set" or "device set" refers to the input/output devices managed by a system as a related set for combined use as an access mechanism suite to support a user interaction session at a locus of work. Typically, independent systems have independent device sets. "Locus of work" refers to the spatial proximity of devices in a device set as related to the user, which can be thought of the "working set" of devices for a task, and device set and locus of work are used as roughly synonymous. "Lean forward" device sets refer to devices designed for intensive interaction and use in close proximity to a user, for "close work," such as PC devices, including display monitors, keyboards, mice, touchscreens, and the like. "Lean back" device sets refer to devices suited to use at a distance, or "across-the-a room," such as TVs or music systems, and directly associated input devices, such as remote controls.

In this usage, the locus of work for a device relates more to the perceived locus of its effect than its actual location, so, for example the locus of work for a remote control or wireless keyboard used to interact with a distant TV is primarily across-the-room, with the TV (as a projection of action to the TV), but secondarily in the user's hand. A screen is typically the dominating device, and other members of its device set will ordinarily have the same primary locus of work. For music systems, this locus is more diffuse, and the device set includes the speakers, the control devices, and microphones, if used. Similarly, voice input, gestures, or the like may have an ambiguous association with device sets. Specific commands or scoping conventions may be used to selectively direct voice commands (and similar ambiguous inputs) to specific device sets, systems and application components. "Physical locus of work" refers to the actual device sets and form factors as just described, while "logical locus of work" is meant to refer to the context of a session, and especially the presentation features, such as navigation position and essential aspects of resource presentation that a user could reasonably expect to be invariant after a well-effected transfer of physical locus.

As used herein, "coordinated" systems or device sets are those that are operated as an ensemble, in a coupled manner using the methods of the kind described herein or other similar methods. Such coordination or coupling may range from tight to loose, as described herein, and tight coordination may include synchronization. Coordinated devices sets may or may not be controlled by independent systems. Device sets that are recognized as being available for coordinated use at any given time are referred to collectively as a "device set group" or simply a "device group." As used herein the term "collocated" is meant to refer to devices that are in local proximity, whether packaged together or separated by a distance that might be linked by direct cabling and/or local network communications, typically within meters or tens of meters and typically within a single building. With regard to coordination of multiple device sets, collocation refers to proximity such that they could be used with reasonable effectiveness by a single user as one or more concurrently active and coordinated loci of work, or used by collaborating users who are within direct sight and/or sound of one another.

Except where indicated otherwise or clear in context, terminology used herein is meant to be generally consistent with that used (with respect to the Web) in Device Independence Principles (W3C Working Draft 18 Sep. 2001), and specifically including the terms listed in its glossary, and with that used in the W3C Multimodal Interaction Working Group Charter (Feb. 1, 2002), and in Multimodal Requirements for Voice Markup Languages (W3C Working Draft 10 Jul. 2000). A notable area of variation from W3C convention is that, except where indicated otherwise or clear in context, "mode" is used herein as inclusive of differences with respect to work style modes and device set usage modes, such as lean-back versus lean-forward, which primarily relate to form-factor, as well as of differences with respect to sensory mode, especially speech, such as text (with image and pointing) versus voice (as supported by voice recognition or text-to-speech). The former are referred to herein as "homologous modes" and the latter as "heterologous modes." W3C usage of "multimodal" is specific to multiple heterologous modes, where one mode is a speech mode, and one is non-speech. Also in variation from W3C, "coordinated" as used herein includes cases of sequential coordination of device sets over the course of a user session, such as by session transfer, which W3C usage could refer to as uncoordinated using their definition of coordinated as being interpreted together (with regard to heterologous multimodal inputs or outputs). That narrower usage is referred to herein as "coordinated interpretation" or "synchronized coordination." "Personalization" is meant to include any process for user control of how resources are presented or used, both before the fact and at the time, including controls at a server or proxy at an application or adaptation level or in the browser or other associated user agent components, including selection of profiles that may be created by others. "Customization" is meant to include personalization as well as similar processes and controls that may be specified by an author/producer. However, consistent with common usage, "personalization" may also be used as synonymous with "customization," unless otherwise indicated or clear from context.

"Form factor" as used herein is used to broadly characterize the ergonomic or human factors aspects of size, shape, and configuration of a system and its input/output device set, primarily with regard to hardware characteristics unless otherwise indicated. "Adaptation" of a presentation refers to changes associated with different form factors of the device sets used. "Basic adaptation" refers to changes inherent in the form factor, including changes in display resolution and color depth, as well as the related issues of input devices relating to keyboards and pointing devices. "Rich adaptation" refers to substantive changes in the nature of the user interface such as use of menus, icons, text, and controls suited to high or low resolution display and varying abilities to enter text and control complex widgets such as drop down lists (but still with regard to homologous modes). "Heterologous adaptation" refers to the still richer adaptation to differing heterologous modes, such as speech.

"Author" is used to refer to any or all of the original author or creator of a resource, and editor or producer or programmer, or system operator, or other participant in the resource creation and distribution process (including advertisers, advertising agencies, and sponsors, in the case of resources which involve such parties), and thus inclusive of both content creators and content providers. As will be clear from context, "programmer" may be used to relate to TV content programs or to software code programs. Compound forms, such as "author/producer" or similar combinations, are meant to be synonymous with this inclusive use of author, and not to exclude unnamed roles unless otherwise indicated or clear from context. "Operator" or "system operator" or "service operator" is meant to refer broadly to operators of a TV distribution system, including Multiple System Operators (MSOs), TV networks, local broadcast stations, cable and satellite TV operators, as well as operators of Internet-based or other new channels of distribution (such as streaming media services), and of physical media distribution channels (such as CD and DVD). Author is also meant to be inclusive of both "human authors," including any human editing processes, and "automated authors," including dynamic content management/delivery systems, software agents, association, filtering, and annotation systems, and the like.

Notwithstanding the distinctions made herein among TV, PC and other classes of user systems (such as listed below) that relate to such issues as the type of media they are oriented to present and to separations of reception, control, and storage functions, it should be understood that such distinctions are not inherent or essential to the methods described, and will gradually dissolve as these products continue to converge. These distinctions are used to address current and near-term product configurations, and not to imply restrictions in the applicability of the methods described. Thus for example, TV and PC, TV and STB, TV and DVR, and similar currently disparate configurations should be understood to be synonymous with regard to future fully converged products.

"Television system" (TV) or simply "television" as used herein refers to a system for presenting video, whether from a transmitted or stored resource, and unless stated or otherwise clear from context includes reception and control components such as typically contained in a TV "receiver," as well as advanced control, reception, and storage functions which may be separately contained in a "set-top box" (STB) (but not necessarily including advanced media gateway and server functions that may be packaged together with a set-top box). Television systems may also be componentized, such as comprising a separate monitor and a receiver and/or control unit. Also included are associated input devices, such as remote controls, and storage devices such as VCRs (Video Cassette Recorders) and DVRs. "TV-like" or "TV-type" are used to refer broadly to all systems having a predominant function of playing video. Unless otherwise indicated or clear from context, set-top box or STB is used both to refer to a separate set-top box unit, and to include the equivalent functions (control, signal management and conversion, intelligence, and the like) that may be integrated into an advanced TV system or receiver, as well as possible future configurations that may combine STB functions with a gateway or other system or that may distribute such functions into multiple units to control multiple TV receivers or monitors or other display systems. In this broad sense, STB and TV may be used interchangeably. Also, as noted above, while television and other video may be described herein as primary examples of embodiments of the present invention, similar methods may be applicable to audio, music, radio, or other media and associated media players. All such audio and/or video systems ("AV" or "A/V") may be loosely referred to as "entertainment" devices, appliances, or systems, and such products may also be loosely referred to as "consumer electronics" (CE) products.

"Computer system" or simply "computer" when used herein in the context of a user system, refers to any kind of intelligent system used predominantly as a general purpose intelligent device capable of running "application programs" for various purposes. A variety of conventional distinctions may be used to categorize computers as to functional capability and form factor, such as, for example, those listed in the next paragraph, but such categorization should be understood to be fuzzy, and likely to evolve over time as capabilities change, improve, and converge (both within the computer category, and between computers and televisions and other entertainment/media devices) and usage patterns co-evolve. "Computer-like" or "computer-type" are used to emphasize inclusion of all such systems and exclusion of systems where computer function is absent or predominantly subordinate to television functions. User systems that do not predominantly function as general-purpose computers may nonetheless contain "embedded computers" to provide supporting intelligence, such as for example, in media players or other entertainment devices.

Personal computer" (PC) may be used to refer broadly to any computer for personal or individual use, but as will be clear in context, usually suggests a desktop or laptop/notebook (or sub-notebook) form factor that provides for a high-function, high-resolution user interface. "Personal Digital Assistant" (PDA) refers to a wide range of handheld and portable devices that provide PC-like capabilities in a reduced size and weight form factor, typically with small screens and no keyboard. "Tablet" may refer to a complete system that provides an intermediate form factor, with a screen, and a touchpad or stylus interface and possibly including a compact keyboard, but can also refer to a similar device that serves as terminal to a base system. Additional computer-like systems are Internet appliances, perhaps taking the form of "webpad" tablet devices, and wireless phones and pagers, which are gradually converging with PDAs.

It should be understood that advanced TV/entertainment device remote controls may include display screens and stylus or touchscreen entry that is comparable to a PDA in form factor, and that PDAs typically have infrared communications and may be used with software that can enable them to serve as TV/entertainment remote controls. "Dedicated" is used to refer to devices are designed to work with a specific class of associated devices, especially those with a specific architecture, and which may generally be expected to be "provisioned" together, and "non-dedicated" or "open" to those designed for flexible use and interfacing to a wide variety of system types and architectures. Such dedicated devices may commonly also be "limited function" devices, lacking the "general-purpose," open programmability typical of a PC or PDA, a capability that allows for an open-ended range of applications. As a result, dedicated devices may be limited in utility and unable to achieve the economies of scale and breadth of function of more flexible platforms. "Universal" may be used to refer to the very partial step of a device such as a "universal remote control" that is designed for use with a limited class of associated devices (in this case TVs and other entertainment devices) from any of multiple vendors, but which lacks broader function (in this case use as an independent PDA).

As used herein, the term "continuous media" is meant of refer to any representation of "content" elements that have an intrinsic duration, that continue (or extend) and may change over time, including one or more of "audio data," "video data," animation, virtual reality data, hybrid natural and synthetic video data, including both "stored formats" and "streams" or streaming transmission formats, and further including "continuous hypermedia" which contain both simple continuous media and hyperlinks. Continuous media may contain descriptive metadata, time codes (such as in Society of Motion Picture and Television Engineers, SMPTE, or European Broadcasting Union, EBU, coding), and other metadata. Resources that are not continuous, and have no temporal dimensionality are referred to as "discrete." Continuous media is also inclusive of "time-based documents" as used in the HyTime standard to refer to documents with scheduled presentation. "Time code" is meant to include specific time code values embedded in the video, such as SMPTE/EBU, or other signal data that can map to exact time positions, as well as external measures of time position that may or may not be exact, including for example such timing systems as are used in SMIL, and MIDI.

"Video data" refers to all forms of moving-images, with or without accompanying sound, including analog and digitally coded video, television, Internet television or IPTV or IP video, film, animation, virtual reality data, hybrid natural and synthetic video data, and the like. Video image data is most commonly represented as a series of still images, whether in analog or digitally coded forms, including ATSC (American Television Systems Committee), NTSC (National Television Systems Committee), PAL (Phase Alternate Line)/SECAM (Sequential Couleur avec Memoire), DTV (Digital TV), HDTV (High Definition TV), EDTV (Enhanced Definition TV), SDTV (Standard Definition TV), MPEG (MPEG-1, MPEG-2, and MPEG-4, and supplemented by MPEG-7 and MPEG-21, and other standards), DVB (Digital Video Broadcasting), International Telecommunications Union H.26x and H.32x, RTP (Real-Time Transport Protocol), RTSP (Real Time Streaming Protocol), SMIL (Synchronized Multimedia Integration Language), ISMA (Internet Streaming Media Alliance), QUICKTIME, WINDOWS MEDIA, and REALMEDIA, and the like, but may also be coded as object data, including formats provided for in MPEG-4.

"Audio data" refers to all stored forms of sound, whether part of a video form or not, including analog and digitally coded sound or music or other audio information in formats such as PCM (Pulse Code Modulation), CD-AUDIO, MP3, REALAUDIO, MIDI (Musical Instrument Digital Interface), and the like. Audio data is most commonly represented as amplitude data over time, whether in analog or digitally coded form, although object data representations can also be used, such as using MIDI.

Animation or virtual reality data is commonly represented in various image-like forms, raster or vector graphic forms, or as object-based structures, such as scene graphs, including SHOCKWAVE FLASH (including SWF and Open SWF), SVG (Scalable Vector Graphics), VRML (Virtual Reality Modeling Language), RM3D (Rich Media 3D), X3D (eXstensible 3D), and MPEG-4/BIFS (Binary Format for Scenes), Computer Aided Design (CAD) or wireframe animation, and the like. Unless otherwise indicated or clear from context, "virtual reality" is meant to be inclusive of augmented reality.

Another media content type is still images, including photographs, drawings, cartoons, diagrams and facsimiles, which may be coded in such formats as JPEG (Joint Photographic Experts Group)/JFIF (JPEG File Interchange Format), GIF (Graphic Interchange Format), TIFF (Tagged Image File Format), PTP (Picture Transfer Protocol), including object formats such as CAD and the other object formats listed above, and the like.

A further common media content type is text, which may be coded in such formats as ASCII (American Standard Code for Information Interchange), HTML (Hypertext Markup Language), DHTML (Dynamic HTML), XHTML (eXtensible HTML), PDF (Portable Document Format), SGML (Structured Generalized Markup Language), Postscript, word processing formats, and the like. Other media content includes active formats, such as spreadsheets, for example.

"Media content" (or "media") is used herein to refer generally to any content, or information that is understandable to humans. "Content" refers to any form of transmitted or stored information. "Objects," when used in the context of stored content objects refers to any content item or element or grouping of items or elements, including objects within a file, and objects stored as files or sets of files. When used in the context of object-based media formats, the term is meant herein to be used in accordance with the definitions applicable to such formats. It will also be understood that in the context of software system architectures, "object" refers to object-oriented software design, modeling, and programming, in which all relevant entities are structured as objects, computation is performed by objects communicating with one another by passing messages that request actions and convey any arguments or parameters that characterize that action, and objects have memory and are instances of classes which serve as repositories for behaviors associated with objects and which are organized into a class hierarchy.

"Storage" as used herein is meant to refer to the process of storing information or content for future use, or to any memory, "storage device" or "storage system." "Storage system" refers to any device or any combination of one or more devices with software that supports the use of storage, including SANs and NAS. "Storage device" refers to the element or elements of a storage system that include actual fixed or removable "storage media" capable of retaining content in an electromagnetic or other machine-readable form using any technology, including electronic, magnetic, optical, time-delay, molecular, atomic, quantum, transmission-delay and the like, including all future storage technologies.

"Transmission" as used herein is meant to refer to any form of "communication" or "transport," including connections to directly attached devices, local area networks (LANs) including home and office networks, and wide area networks (WANs). Transmission may be over any suitable medium, including the Internet and World Wide Web, cable and wireline networks, including DSL (Digital Subscriber Loop) telephonic, Hybrid Fiber/Coax (HFC), powerline or others, ATM (Asynchronous Transfer Mode) networks, fiber-optic networks including use of SONET (Synchronous Optical Network) and DWDM (Dense Wavelength Division Multiplexing), satellite and terrestrial fixed and mobile wireless networks, including broadcast, direct-to-home (DTH) satellite or DBS (Direct Broadcast Satellite), cellular, 3G (3rd Generation), future 4G or NextGeneration, UMTS (Universal Mobile Telecommunications System), LMDS (Local Multipoint Distribution Services), MMDS (Multipoint Microwave Distribution System), and wireless LANs (WLANs) such as IEEE 802 series (802.11a, 802.11b, 802.11g, 802.16) wireless Ethernet or Wi-Fi networks, ETSI HiperLAN, and other wired or wireless LANs and HANs (Home Area Networks) and PANs (Personal Area Networks) or WPANs, including Bluetooth, HomeRF, infrared (including IrDA, Infrared Data Association), powerline, including HomePlug (HomePlug Powerline Alliance) and X10, phoneline, including HomePNA (Home Phoneline Networking Alliance), and variations based on Software Defined Radio (SDR) and spread spectrum methods, as well as ad-hoc networks. Unless otherwise indicated or clear from context, LAN, HAN, and PAN (and their wireless variants) are meant to be substantially equivalent and inclusive on one another.

Transmission includes direct (point-to-point) wired paths, including special purpose local connections using proprietary or standard physical and signaling methods, including audio/visual (A/V) connections such as baseband video, channel 3/4 ATSC RF, RF bypass, S video, S-Link, baseband audio, and SP/DIF digital audio, cable connections, twisted pair, Digital Visual Interface (DVI), High-Definition Multimedia Interface (HDMI), Universal Serial Bus (USB), IEEE 1394 Firewire, and the like, as well as wireless equivalents such as wireless 1394 and infrared. Unless otherwise indicated or clear from context, transmission is meant to include physical transport of storage media. Transmission involves both a logical path, which is meant to refer to higher-level protocol and routing considerations, and a physical path, which relates to the lower level of the specific wired or wireless media signaling paths used. Transmission may be one-way, such as broadcast, or two-way. Two-way cable television networks may provide for a return channel that is in-band or out-of-band, or may use telephone lines and modems to achieve similar return connectivity, thus supporting push or pull activity.

Transmission or network protocols may include IP (Internet Protocol, including IPv4 and IPv6), TCP (Transmission Control Protocol), UDP (User Datagram Protocol), SCTP (Stream Control Transmission Protocol), RTP, RTCP (RTP Control Protocol), RSTP, IP Multicast, ASF (Advanced Streaming Format), HTTP (Hypertext Transfer Protocol) and the secure variant HTTPS, UHTTP (Unidirectional HTTP), Internet Relay Chat (IRC), Short Message Service (SMS), Multimedia Messaging Service (MMS), Simple Mail Transfer Protocol (SMTP), Jabber, Wireless Village, proprietary instant messaging networks such as Yahoo!, Microsoft Network (MSN), ICQ, and AOL Instant Messenger, NetMeeting, T.120, WAP (Wireless Applications Protocol), ATM, Ethernet, GSM (Global System for Mobile Communications) and similar wireless protocols, cable TV and Hybrid Fiber/Coax protocols, DOCSIS (Data Over Cable Service Interface Specification), DSM-CC (Digital Storage Media-Command and Control), DMIF (Delivery Multimedia Integration Framework), and many other current and future protocols, and may use baseband or broadband signaling. In multi-node networks, transmission may be directed to a network node address, examples of which are IP addresses, STB or cable drop or satellite receiver node addresses, and logical addresses, such as URLs and URIs/URNs.

"The Internet" is meant to include both the current embodiment of the Internet with its current suite of protocols, services, nodes, and facilities, and future extensions (with extended protocols, services, nodes, and facilities) as an open, public internetwork that links and subsumes all networks that are not intentionally isolated from internetworking, including a multinetwork that uses an adaptation layer to bridge networks having diverse protocols. Unless otherwise indicated or clear from context, the Internet is meant to be inclusive of other networks or sub-networks using similar technologies or providing similar services, including intranets or extranets or ad-hoc network assemblages. "Internet" may also be used in various contexts to refer to network elements, such as those that use Internet protocols and/or connect to Internet facilities, and/or to other attributes relating to the Internet. In distinguishing Internet paths and/or connections from non-Internet paths and/or connections, the terms "public Internet" and/or "open Internet" are meant to refer to the open connectivity of the Internet. This open connectivity may be understood as being provided if a path provides connectivity to the full Internet on at least one side, and permits connectivity of any Internet node on one side to any Internet node on the other side, given the use of appropriate protocols by the nodes and their mutual willingness to communicate with one another. As used herein, a single physical path might carry logical paths that may include logical paths that are open, public Internet paths, and other logical paths that are closed and/or proprietary and that might use non-Internet protocols, such as for example, in the case of a cable TV HFC network path that carries both closed cable TV channels and open DOCSIS Internet service. Similarly an open, public Internet path might include segments that use non-Internet protocols, but that provide open, public Internet connectivity by encapsulation and/or translation and/or other methods that make the non-Internet segment transparent to open, public Internet traffic that may be passed over that segment. It is noted that on an Internet path that is inherently open, the effect of a closed subnetwork can be created among a defined set of nodes by using various methods to effect a "virtual private network" (VPN), such as for purposes of security, possibly in conjunction with use of gateways, routers, and/or firewalls, or similar network nodes, and that, unless otherwise indicated or clear from context, references herein to open, public Internet paths are meant to include paths that may in fact be used with restriction by such means.

"Metadata" refers to data about data, including descriptors of data content and of data format and "program information." Metadata formats include XML (eXtensible Markup Language), RDF (Resource Description Framework), SDP (Session Description Protocol), SAP (Session Announcement Protocol), MIME (Multipurpose Internet Mail Extensions), MPEG-7, MPEG-21 (including Digital Item Declaration, Digital Item Identification and Description, Content Handling and Usage, Intellectual Property Management and Protection, Terminals and Networks/Digital Item Adaptation, Content Representation, and Event Reporting), SMPTE Unique Media Identifiers (UMIDs), SMPTE/EBU time codes, QUICKSCAN addresses, MPEG-2 Program Specific Information (PSI), ATSC-PSIP (ATSC-Program Service Integration Protocol), DVB-SI (Digital Video Broadcast-Service Information), and SMIL, as well as data contained in Electronic Program Guides (EPGs) and media asset management systems such as may be used in home media server/repository systems. Metadata also includes markup, such as that used to define the presentation and handling of content, including link arc data, and markup is a coding method that can be used to express metadata. Unless otherwise indicated or clear from context, reference to XML is also meant to include use of the expanding suite of tools for working with XML including XLink, XPointer (XML Pointer Language), XPath (XML Path Language), XSL (Extensible Stylesheet Language), XSLT (XSL Transformations), Namespaces, Document Object Model (DOM), XML Information Set, XML Fragments, Canonical XML, and XML Schemas and DTDs (Document Type Definitions), XML Query, and ongoing enhancements to these tools and standards, as documented by the W3C, as well as other tools related to that work. Metadata can also include the program identification information described above, and metadata may be embedded within the content itself, and/or in associated portions of a distribution format, such as in VBI or in digital structures, or may be associated by reference.

"Multicast" as used herein is meant to refer to the transmission of data to a defined group of recipients. Internet multicast protocols, such as supported by the Internet Multicast Backbone (MBone) and IP Multicast, provide for this in the form of a stream or channel to which recipients may subscribe. "Broadcast" is meant to apply broadly to any form of distribution intended to go simultaneously to many recipients (one-to-all, one-to-many), including conventional TV and radio terrestrial broadcast, cable and satellite, distribution, and the like. Unless otherwise indicated or clear from context, broadcast is also meant to include other forms of simultaneous distribution, whether true broadcast (one-to-all) or equivalents, such as realtime Internet streaming, whether using multicasting (one-to-many), or simultaneous unicast via multiple direct individual (one-to-one) sessions.

It should be noted that "synchronization" is used in two different senses, which will be clear from context. One relates to synchronization of usage activities among device sets, as a high degree of coordination, such that events at one device set are fully replicated at another for some continuing period. The other usage relates to synchronization of resource presentation, where the originating resource of a link is time-bounded, so that a link is enabled at the start of that interval and disabled at the end, such as is often desired in ITV, where presentation of video resources and associated enhancements are intended to be synchronized, so that an enhancement appears at the same time as a corresponding video segment. The latter usage may refer to any of a range of degrees of synchronization, including tight "frame-accurate" cases and very loose cases. Further terminology related to timing of enhancements is suggested by Behrens, Prototypes, Field Tryouts Proceed For Enhanced TV in Current, Jul. 17, 2000, and usage herein is meant to be generally consistent with that:

"Synchronous enhancements that are transmitted for use at specific times in a program." (This may also be referred to as "program-synchronous.")

"Always-on enhancements, such as navigation bars, that are constantly accessible at the click of a remote control or mouse."

"Asynchronous or post-broadcast enhancements that are silently transmitted into the DTV receiver's memory and can be activated when the viewer chooses."

"Interpolated (for lack of better word) enhancements that the viewer can choose to insert seamlessly into an ongoing program." (This causes the first program to stop, then resume after the enhancement, giving the effect of an insertion.)

FIGURES

Referring now to FIGS. 1-7, wherein similar components are referenced in like manner, various features for a method and apparatus for navigating hypermedia using multiple coordinated input/output device sets are disclosed.

Turning now to FIG. 1, therein is depicted a schematic of an exemplary home system environment 100, which with its key systems and device sets and related elements. A number of typically independent systems, are represented (having associated device sets not shown here in detail), including TV or ITV system 130, PC 140, and PDA and/or phone 150, and the like. The TV/ITV 130 is understood to commonly include a set-top box. These systems typically contain their own transient and persistent storage subsystems, not shown, and may share a common local storage system 160. These systems may connect to each other and the outside world via a home network or LAN (local area network) or hub 128, which may use wired and/or wireless technology. Auxiliary services may also be provided by a home gateway server, which may be combined with the LAN, STB, PC, or other device capable of acting as a server, and with other service components. External connections may be made directly from a single system, as shown for cable 122 connecting to the TV (STB), but may preferably be connected to a home network to facilitate shared use by multiple systems, as shown for the connection to the Internet 124, and connection to wireless network 126 (which could also be an Internet connection, such as using Mobile IP). These external connections provide access to various servers and other sources for a variety of sources of content and connectivity 110, which may include broadcast, satellite, and cable TV, video on demand, IPTV, streaming media, Web content, wireless portals, transaction servers, and the like.

Figure 2A:
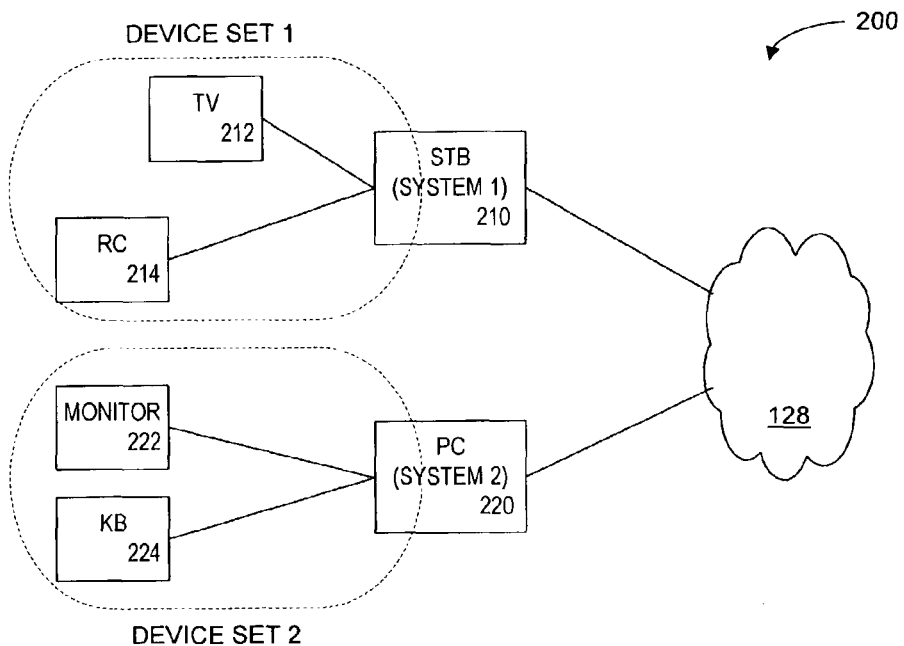
FIGS. 2a and 2b are a set of block diagrams of exemplary groupings of device sets and systems in the assemblage of FIG. 1.

Referring now to FIG. 2, therein is depicted a more detailed exemplary schematic of typical TV and PC systems and associated device sets. FIG. 2a depicts the case of independent systems, showing home area network 128 connecting to both TV STB 210 and PC 220. TV STB 210 is used in conjunction with TV receiver or monitor 212 and remote control (RC) 214. The TV receiver 212 and RC 214 together constitute a device set, DS1. The controlling device TV STB 210 may for some purposes also be considered part of the device set DS1, and is considered together with the other elements of DS1 to constitute a system, S1. The PC 220 (more precisely the system unit) is used in conjunction with monitor 222 and keyboard 224, as well as other peripheral or input/output (I/O) devices such as a mouse, not shown. Those PC elements together constitute the device set DS2 (which may for some purposes also be considered to include the PC system unit) and system S2.

Figure 2B:
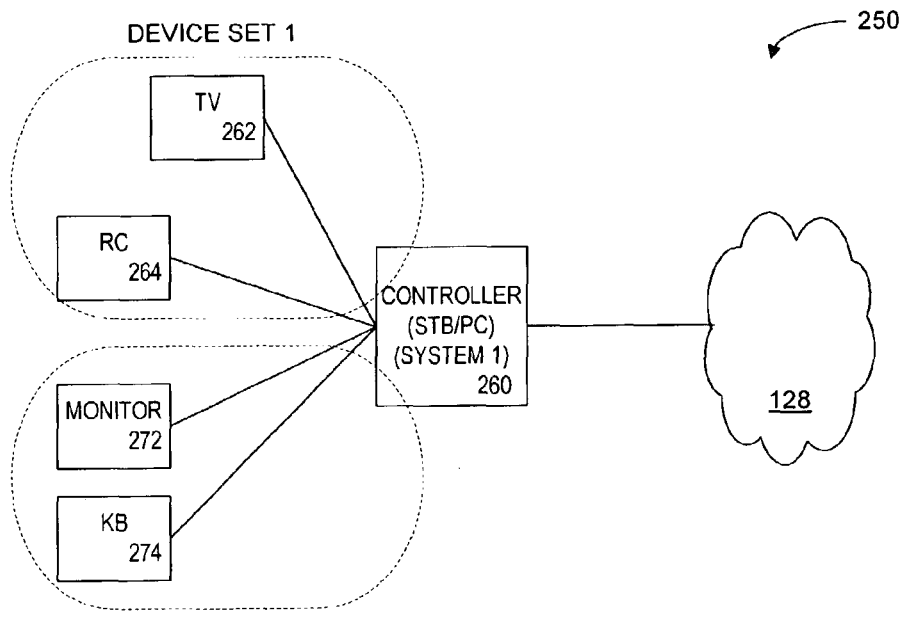

FIG. 2b depicts an alternative case of an integrated system in which a single set of hardware takes the role of controller 260 providing functions of both a TV STB and a PC system unit, equivalent to devices 210 and 220, and thus represents a single alternative system S1. In this case TV receiver 262 and remote control 264 constitute an alternative embodiment of device set DS1, and the PC monitor 272 and keyboard 274 constitute an alternative embodiment of device set DS2. Again, the controller may or may not be meant to be included in references those device sets, but it should be assumed to be excluded in references that distinguish the two device sets. In this special case, if both capabilities were fully developed such that one function was not clearly subordinate to the other, the overall system complex could be considered both TV-like and computer-like. The device sets could still be considered to be either TV-like or computer-like respectively, not both, and they could be considered not independent of one another with regard to processing, as described further below.

It will be understood that the definition of membership of specific UI devices in device sets may at times be somewhat fuzzy, and may involve membership of one device in multiple device sets. For example, a wireless keyboard might be usable to input to either or both of the TV and PC, depending on how it is set up and used. Similarly, a remote control might be used to control both the TV and the PC. It will also be understood that the connections among devices that comprise a device set might be made using any suitable connection method and topology. Such connections are now typically direct connections, whether wired or wireless, but emerging configuration alternatives might provide for such connections to be made through network 128, whether a single HAN, or one of multiple such networks. Such networked configurations might further facilitate flexible and fuzzy composition and reconfiguration of device sets. Broadly speaking, the membership of a device in a device set will be understood in terms of the current dynamics of the user browsing activity, and the systems that such devices communicate with at a given time, and that often the use of display devices might be the essential determinant of a device set.

Actual embodiments can be expected to be determined by a complex mix of factors, only one of which is suitability to the browsing task. These factors include legacy equipment installed base constraints, industry tradition, vendor/intermediary/consumer market power, bundling, provisioning, policy, standards, regulation, and the like. Thus methods that are adaptable and broadly applicable to a wide range of configuration alternatives that may not be the ideal choices may be beneficial.

A key aspect of MMUIs is the concept of device sets, and the distinction of device sets is sharpest in the case of independent systems. A key attribute of an independent system is that it has its own processor(s), and is thus capable of running applications and driving UI device sets in a reasonably independent fashion, depending on the nature of the application and its dependence on external storage, network, and server resources. For example, an independent system is normally capable of running a "thin client," such as a browser, even if support for a "rich client" or "thick client" application may be limited. An equivalent hardware appliance with similar independent processing capabilities is also considered independent.

A closely related factor is whether a device in question is used as an I/O device between the user and a processor, or as an intelligent processor that is peer (or in a client/server role) to another processor. Subtleties arise when multiple intelligent devices are used together, such as when an intelligent system acts in a role that makes it subordinate to another intelligent system, more or less as a simple I/O device, and when it acts in multiple varying roles. Thus independence can be a matter of degree, and can be more operative in some usage roles than others. A criterion that can be helpful in clarifying these cases is whether the system is sufficiently independent to be considered by the user as a separate computer, usable separately, or whether it produces the illusion of a single computer (e.g., that may have multiple devices sets attached).

In a hypothetical distributed configuration, for example, an intelligent tablet or monitor device could be considered independent of a supporting PC if the tablet runs its own browser (such as under Windows CE) to obtain hypermedia resources in resource format (such as HTML) and render them into presentation format for display (such as display buffer image format), and could be considered not independent of the PC if it is driven as a replicated display by the PC, with rendering controlled by a browser at the PC and using a technology such as Windows Terminal Services (WTS) or the like, to transfer the resultant presentation to the tablet at the level of display buffer image format (or coded changes thereto). WTS and similar offerings from CITRIX use MICROSOFT Remote Desktop Protocol (RDP) or the closely related CITRIX Independent Computing Architecture (ICA), which are related to the ITU T.120 standard, to support a relatively dumb thin client that for the most part offers basic I/O terminal function only. Continuing this hypothetical, it should be noted that an independent structure alternative of this class could be the much simpler (and more efficient one) architecturally, in that a browser on the tablet can act as thin client directly to a Web server, using a base PC only as an intermediate network routing node, as opposed to an dependent structure in which a tablet operates as a WTS or CITRIX style thin client I/O terminal to an PC (WTS or CITRIX style) server, which in turn mediates input and display I/O to support a browser on the PC (driven by that terminal) as a second level of thin client (to a Web server). It will also be understood that either of these PC-supported structures would still be independent of a separate TV system with which it might be used for coordinated browsing. In the same manner, such a tablet device could be supported or driven by a TV/STB system (instead of by a PC), with the same possibilities for dependent or independent structure alternatives, and potentially using the same protocols. If such thin client devices become popular, this might be an attractive way to add MMUI support to a TV/STB system, incorporating off-the-shelf terminal devices—devices that a user might already possess or acquire for other uses as well.

A minor variation on this kind of distributed I/O theme is represented in systems like X Windows, which uses the X protocol to define a separation between an application and its display, with a windows manager that runs on a client and the application on a server (which X refers to as server and client, respectively, in reverse of the now common convention that is used herein) and in the I3ML (Internet Interface and Integration Markup Language) proposed by COKINETICS that applies somewhat similar concepts to distributing Windows UI controls. Here again, if the core browser functions of converting resources obtained in resource format to presentation display format is done at a server, this could be considered a dependent I/O device architecture with respect to the server, for purposes of this discussion.

These issues also relate to hypothetical configurations where an intelligent remote control might be used with a TV/STB system or other devices. A key factor is whether the device is used as an I/O device between the user and a processor, or as an intelligent processor peer to another processor. A dumb remote is considered part of the device set of the device it controls, so a multi-function remote used to control multiple systems may at times participate in multiple devices sets. A smart remote, such as one based on a PDA might also operate independently, thus constituting a separate device set (and separate system) in that use. Thus a PDA acting as an independent but coordinated browser in conjunction with an ITV system could be considered independent and a separate device set in that use (being a peer processor), but to the extent that it also serves directly in emulation of a standard remote to the ITV system by sending standard remote control commands as activated by a user (as a simple I/O device), that use could be considered dependent in relation to the ITV system controller and thus part of the ITV device set. Similar variations in roles may arise in the case that an intelligent monitor is used as a TV monitor, with more or less added intelligent functionality.

These issues can also get complicated in some cases of a single system driving multiple devices. One instructive example is the use of a browser with a dual-display PC, and some hypothetical multi-monitor configurations are considered as examples of how the methods proposed herein might be embodied in selected cases. First, consider the basic structure of a single system controlled by the single keyboard and mouse, but having two directly attached monitors. This can be considered to be one "augmented" or "enriched" device set, as opposed to two separate device sets, since only a single input device set is used, and this is really just a case of adding more screen area of similar form factor. Further, at a software level, two monitors attached in such a way may actually be seen by the browser application software as a single monitor of double size, because standard Windows and APPLE Macintosh multi-monitor support provides for a virtual desktop that offers applications a mapping from a single extended virtual frame buffer seen by the application (browser) software to the two real frame buffers (corresponding to the primary and secondary monitors in Windows terminology) that drive the monitor devices. In such a configuration (whether using a virtual desktop or a separate, real display, an independent display in Windows terminology), coordination of browsing across the multiple monitors could be much simpler than for an independent system configuration with independent device sets, because all browsing can be done using a single set of input controls to a single browser instance that simply controls the two display monitors in much the same way that it could ordinarily control multiple windows on the same display monitor. Such a single browser instance could have full, exclusive, direct access to, and control of, all browser state information, including all UI inputs and other I/O events, all caches and work areas, all storage, and the like, and thus could drive the two displays in the same way that it could drive multiple windows on a single display (if it could even see the two as separate displays). Thus in this case, basic support for simple targeting of alternate displays is a relatively simple variation from the existing function of targeting to alternate windows on the same display, and use of an exporter/importer transport function might not be required. The browser could simply control activity in the second display area by selecting windows on that monitor (or that portion of the virtual monitor).

A variation on such a case could occur if, as an added feature, the user were permitted to open a second browser process instance, and coordination across browser instances were desired. In such a case, the addition of export/import functions could be required, but this could be somewhat simplified in that much state information (such a page caches, history lists, and the like) may be in commonly accessible storage, and thus need not be included in the export/import process. This case is also simplified in that, being on the same machine, the two browser instances share common access to the hypermedia storage layer, and can communicate via intra-system means.

A further level of simplicity to be expected in such a hypothetical configuration is that, using standard multi-monitor support for a PC (or Mac), such displays must be functionally equivalent, driven as standard PC displays, with a possibility of only the minor differences in size and resolution that is typical of PC monitors. This means that the rendering and presentation need not be adapted to deal with varying display characteristics (at least not beyond the basic levels of adaptation that might optionally be used at the server by highly tuned Web sites that sense a range of standard display resolutions using standard Web and browser support and adjust the pages served accordingly).

It will be understood that mirroring of displays, in which a display image is exactly duplicated on a second display, offers a related function that is widely available, and can be used to provide some basic capabilities in support of a multimachine-type UI, even though, as is clear from the teachings herein, it is generally desirable that the images in different device sets not be identical.

Specific components of the systems portrayed in FIGS. 1 and 2 tend to be somewhat divergent in current technology embodiments, and vary in accord with form-factor, but can be expected to increasingly converge toward similar or common technologies. These components include all of the usual elements of such systems, such as CPUs and other processors, clocks, various specialized logic processors, including, CODECs (Coder/Decoders), DSPs (Digital Signal Processors), ASICs (Application Specific Integrated Circuits), PLDs (Programmable Logic Devices), caches, RAM (Random Access Memory), ROM (Read-Only Memory), and other memory and storage devices including volatile and permanent storage used for transient and persistent files, buses and connectors, various transducers for local and remote communications and device interfacing, including radio frequency (RF), Infrared (IR), optical, fiber, coaxial cable (baseband or broadband), telephone cable, multiplexors/demultiplexors, and modems or other analog-to-digital converters, and direct connections to peripherals, including input/output devices, including displays, keyboards, and pointing devices, and to other equipment, including A/V equipment, including TV monitors, speakers, microphones, and cameras. Elements supporting current TV/STB functions may further include, in the current OpenCable STB for example, tuners for in-band and out-of-band signals, NTSC and QAM demodulators, Point-of-deployment (POD) modules, MPEG-2 transport demuxes, MPEG-2 decoders and graphics overlay processors, AC-3 decoders and audio synthesis, NTSC encoders, IEEE 1394 interfaces and RF modulators, RF inputs/outputs, digital and baseband audio inputs/outputs, baseband video, S-video, composite video, and component video inputs/outputs, and various digital inputs/outputs including game ports, data ports, and IR receivers and transmitters, as well as displays and keypads.

These systems also typically include software, including systems software, such as operating systems, network software, and middleware, and applications software. Such categories are suggestive and relative to the mission of the system. For example, browsers may be variously categorized as applications, middleware, or even operating system elements. Operating systems may be standard systems such as MICROSOFT Windows, UNIX, LINUX, and APPLE Mac OS X, or embedded operating systems such as MICROSOFT CE, PALM-OS, WINDRIVER VXWORKS, MICROWARE OS-9 and DAVID, as well as other system software such as Jini, JXTA, .NET, Web servers, Web services, agent systems, and programming languages and environments, such as JAVA, C, C++, C#, J2ME, JavaTV, Java Virtual Machines, FLASH, and the like. Standard file systems and database management systems such as relational (typically using SQL) or object or object-relational databases may also be employed, as well as alternative data structures such repositories and registries LDAP (Lightweight Directory Access Protocol), and storage structures, such as tuple spaces. The term "database" is used herein to refer collectively to all such collections of data. It will be understood that any suitable systems and application software languages, environments, tools, frameworks, and systems may be applied in these systems and in embodiments of the methods described herein, and also that all descriptions of methods herein are meant to be inclusive of embodiments based on object-oriented design and programming. It is also noted that alternative designs might be embodied entirely in hardware and/or firmware, such as based on ASICs and/or PLDs, and that, unless otherwise indicated or clear from context, software is meant to include such hardware/firmware implementations of functions that might be commonly supported in software.

Application and middleware technologies might include those based on traditional "thick client" architectures that provide high function within a user system, Web-like "thin client" architectures that rely heavily on browser functions and thus might limit local client logic and storage capabilities and be highly dependent on a server for richer function, and "rich client" architectures that might provide much of the power of a thick client, but might be capable of operating within a browser runtime environment and thus gain many of the deployment benefits of a thin client, or any combination or variation on these models. Thus it should be understood generally that the system elements described here might be embodied in distributed forms that draw on remote systems and services. Such remotely distributed embodiments could draw on supplementary resources, including hardware, software, and data, as well as management and support services. In such cases, the remote elements (e.g., Web servers, Web services, head-end servers, or the like) might operate essentially as Application Service Providers (ASPS) to provide functions that might otherwise be local to the user, and thus might be equivalent to non-distributed embodiments for many purposes. It will be understood that smart clients may have attributes of both thin and thick clients, and unless otherwise indicated or clear from context, references herein to either thin or thick clients are meant to be inclusive of smart clients that share similar attributes relevant to the context.

It is further noted that local and/or remote elements may have agent-like roles and functions. These might include services as agent for the user (such as, for example, coordination functions as described herein, program guide/selection services, and the like) and/or services for other parties (such as advertising targeting services). Such roles could be independent of location, such as in the case of ad targeting selections, which might be done at a head-end or a STB.

System elements may preferably conform to formal or de-facto standards, such as OpenCable, Open Services Gateway Initiative (OSGi), Universal Plug and Play (UPnP), Home Audio/Video Interoperability (HAVi), Video Electronics Standards Association (VESA) Home Network group (VHN), Architecture for HomeGate (AHRG), AUTOHAN, MHP (Multimedia Home Platform), DASE (Digital TV Applications Software Environment), and the like. Digital Rights Management (DRM) and Conditional Access (CA) technologies may be provided, including devices and associated protocols for decryption and for identification of users and their entitlements, including OpenCable Point-of-Deployment (POD) modules, smart cards, High-Bandwidth Digital Content Protection (HDCP), or others. As used herein, references to DRM are meant to be inclusive of CA.

These devices, device sets, and systems are meant to be representative of the full range of current and future devices and configurations that may be suitable for use by a user or group of users to view hypermedia content such as ITV, whether in a home or office, or other context such as in a car or using wearable devices (such as head-mounted display, HMD), or immersive environments such as CAVE, or even implantable or bionic devices, which may include heads-up display, retinal projection, neural or EEG (electroencephalography) interfaces, and appropriate controls. Devices include the full range from conventional and digital TV and enhanced TV, PC-type devices, whether desktop or portable, personal digital assistants (PDAs) and cell phones. It is expected that there will be ongoing convergence among all sorts of devices that allow access to and interaction with content, but that such devices will continue to group into families with different form factors and usage orientations. Major categories are likely to be as shown, with TVs being oriented to passive across the room viewing, primarily tuned to video, PCs oriented to active lean-forward use, primarily tuned to rich multimedia interaction, and PDAs for handheld use, with more limited screens and controls.

Content sources are intended to include all electronically accessible media, notably TV, movies, audio, multimedia, Web and other text, and online transaction systems. TV includes broadcast, satellite, cable, video-on-demand and pay-per-view, as well as stored content on varied storage media. Local storage includes hard disks, DVD, CD, VCR, TiVO/Replay, etc. Multimedia includes all forms of video and audio including hypermedia and virtual reality. Web and other computer content and transactions include all forms of Web content, wireless portal content, shopping and other transaction systems, text and multimedia databases and search systems, data processing and information systems, and the like.

Networks include direct connections between these elements, and various advanced network services, and these are essentially equivalent with regard to the intent of the coordination methods described. Major categories include home networks and LANs, whether wired or wireless (using such technologies as infrared (IRDA standard, etc.) and Radio Frequency (Bluetooth standard, 802.11x, etc.), the Internet, including the Web and streaming media and e-mail and other applications, and wireless networks including analog and digital telephony and access to Internet and other content and transactions, including access through portals using such technologies as WAP and iMode.

Figure 3:
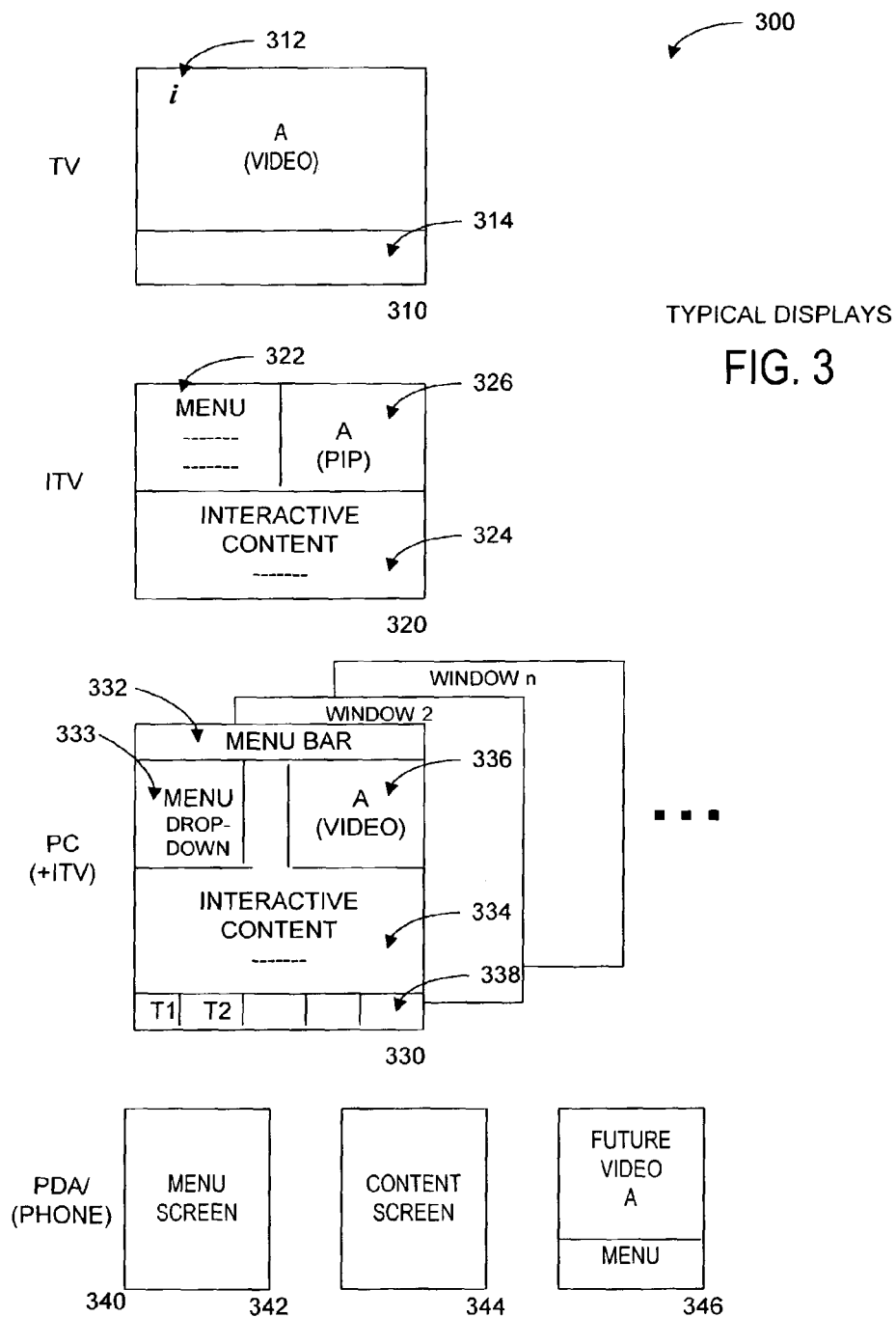
FIG. 3 is a schematic diagram of a number of exemplary user interface display layouts according to certain embodiments of the present invention.

Turning now to FIG. 3, therein is depicted exemplary typical displays for ITV hyperbrowsing. These may include standard TV screens and standard computer and PDA screens, with a wide variety of combination cases, and with variations as to form factor both for the display and the input controls and devices. A simple example is basic TV/video screen 310, depicted as presenting a video program "A.". This is just a standard video image as normally presented directly onto a TV monitor, of whatever resolution, whether standard definition or high definition, or otherwise. Optional variations relevant to ITV systems include the overlay on the main screen of a simple graphic, sprite, or bug 312, shown here a an "i" like the bug used by the WINK ITV system, that is displayed when ITV content is available for the video segment currently showing. Other simple variations include addition of simple overlay area 314, representative of various similar overlays that can be used to present text or other information (which may cover a portion of the TV image, or cause the TV image to be shrunk. Similar overlays may be inserted into a video signal at a distribution source, as is now common for news and sports programming, such as on FOX, but with digital STBs, such overlays may be inserted by the STB or ITV system at the user site.

A more advanced ITV screen typical on what may be produced by a common ITV system driving a TV is shown as ITV screen 320. This represents an active navigation of ITV hypermedia or hypermedia-like resources, including menu 322, which provides a simple list of options, usually in simple text, but potentially with graphics as well. In a typical navigation process from the basic program screen 310, such a screen may be obtained as a result of entering a select key on the remote control, but it may come from any interactive step, using any of a variety of navigation controls. On selection of an entry from the menu, interactive content screen 324 may be presented. Depending on system design, this may fill the screen, or appear with the menu 322, or may include a further menu, not shown. A further feature shown is picture-in-picture (PIP) frame 326, which is a region of the screen used to present a reduced scale video image. This may be the base program to which the ITV enhancements relate, or some other video resource. Alternatively, such a video frame may revert to full screen, and exclude other items from view.

The comparable, but much richer ITV screen typical of a more high-resolution computer based ITV or similar hypermedia browsing experience is shown as PC ITV window 330. This basically has all of the function typical of GUI displays. Typical features include menu bar 332 with active menu drop-down list 333 that responds to a user selection without need to change other screen areas, interactive content 334, which may be a Web page or other format, video window 336, which may be placed in a variety of fixed positions or positioned by the user, or embedded in interactive content page 334, and task bar 338, which can be used to switch among other active windows. Window 330 may appear in a full screen maximized view or an intermediate size (as shown), or may be minimized to be hidden except for the appearance of a tab on the task bar 338, which can be clicked to bring back display of the window. Additional windows may appear concurrently, in various configurations, such as stacked as shown, tiled into a mosaic of frames, and the like, or remain hidden in virtual layers, including cases of layers that are selectable with tabbed control indicators or other control schemes. Presentation alternatives may exploit any suitable combination of Multiple Document Interface (MDI) and/or Single Document Interface (SDI) window formats.

Also comparable, but simpler, is an example of a relatively constrained PDA/phone screen 340. Here activity typically results in replacement of one screen with another, sometimes with limited combinations on one screen, as shown for menu screen 342, content screen 344, and video screen 346, shown with a small menu area included. Use of video on PDAs and phones is not yet common, but is expected to become so.

It should be understood that in addition to conventional GUIs and the basic UIs specifically addressed herein, these methods are also directly applicable to other UI approaches. These include advanced interfaces that go beyond the traditional GUI of the WIMP (Windows, Icons, Menus and Pointing Device) paradigm, including LifeStreams, data walls, and richer 3DVR, collaborative virtual environments (CVEs), and multi-sensory-modal UIs, as well as methods for flexible cross-platform and/or cross-device user interfaces, such as XUL (XML User Interface Language) and XUP (eXtensible User Interface Protocol). It will also be understood that while these display variations have been described in connection with their traditionally usual hardware context, that connection is not essential, and that there may be uses with other hardware configurations, such as, for example TVs that support high resolution GUIs (such as on high definition monitors), TVs that provide for two or more screens (perhaps in a manner similar to that of multi-monitor PCs), PCs that present low resolution ITV-style UIs (such as for lean-back use); and other variations.

One simple UI variation that deserves mention for its common use in current TV/STB-based ITV systems is the use of alternative navigation methods to obtain interactive services that are not directly coupled to a base TV program, but may be obtained by entering a special channel number or by selection from an EPG. Variations on these methods have been called virtual channels or walled gardens or portals (and these may also be described as asynchronous). Like Web portals or walled garden services, these may provide some selection of services, such as weather, news, sports, shopping, and the like, that are available on demand. It will be apparent that, for purposes of the methods described herein, selection of such a virtual channel directly, via an EPG selection, or by any other method is just another navigation action, and that the session transfer methods described herein can be applied to any such navigation action, using similar command variations to specify the targeting of a transfer request.

Figure 4:
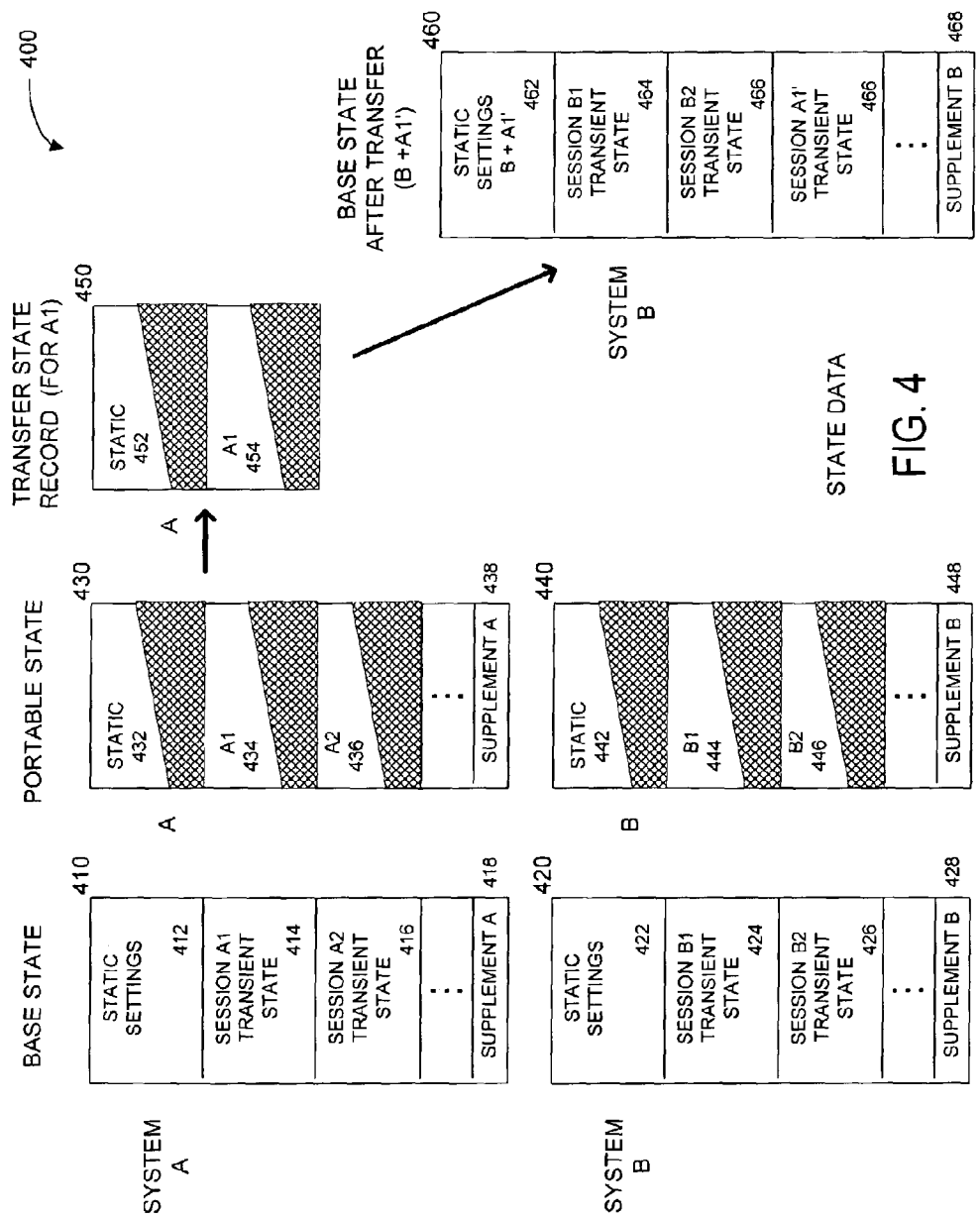
FIG. 4 is a schematic diagram of an exemplary structure for state information relating to systems within the assemblage of FIG. 1, relating to the coordination of a multimachine user interface according to certain embodiments of the present invention.

Referring now to FIG. 4, therein is depicted an exemplary schematic of state data relating to two systems and in a migration process. Depicted is a base state 410 for a system A, and a base state for a system B, where each system has multiple browser sessions, A1, A2, B1, B2, and the like, each of which may constitute a distinct user session. A complex user session may actually involve active use of multiple software tasks, each constituting an application session running different software applications, such as writing with a word processor and referring to Web references, but this discussion addresses the case of sessions based on browsing tasks. This is further simplified by considering user sessions on different browser instances at a given device set as separate browser sessions, so a user session may have multiple browser sessions. Some discussion is given to migration of such compound sessions combining multiple browser instances at a given device set, but for simplicity, much of the detail focuses on the case of migrating a single browser session. Based on these teachings, extension to the multi-session case will be straightforward for one skilled in the art.

One aspect of the present invention is the abstraction, extraction, and exchange of session state data that specifies the current state of a live interactive session in progress. The base state 410 of a given system A includes static settings 412, which control user options as to how the system behaves and presents itself. These include image brightness and contrast settings for a display and a wide range of preference settings for a PC or other system and its suite of associated software applications, again with emphasis here on the browser.

Complementing this is the transient state data 414 that defines the current status of an interactive user session relating to browser session A1, and similar transient state data 416 for session A2. A system may have a number of sessions in progress at once, whether independent or related, each defined by the state of navigational position through multimedia content (including the time-position in continuous media content and the special position in spatially-oriented content), the contents of various input and output elements and controls, the nature and configuration of open windows, menus, drop downs, text entry boxes, check-boxes, etc., as well as the current state of work files, buffers, databases, logs, in-flight transactions, embedded logic objects helper applications (such as streaming media players), etc. The transient state data for a browser includes the identity (URL) of the resource being viewed, and at the time of link traversal, includes all current state on the link arc and the process of traversal. Depending on the nature and state of the session, and on the type of systems being used, some or all of this transient state data may be needed to migrate a session from one system to another.

Supplement data 418 for system A, not normally specified explicitly, can be formalized to further describe the characteristics of that system A (such as coding conventions and other basic architectural attributes) that may need to be, known to embody a corresponding session on a dissimilar system B.

The portable state 430 defines the subset of all such static and session state data that may be needed to migrate any or all selected sessions from a system A to any other supported system B, and the superset of data needed to migrate a single specific task. This may exclude some local state data in each portion of the base state that is not relevant to re-establishing a session in useful form, and at the desired granularity, on another system.

Given a request to transfer one or more sessions from A to a specific system B, a transfer state record 450, shown here for session A1, can be assembled. This includes only the relevant data to the specified sessions, and only the subset of that state data that is relevant to the capabilities of system B. This portable state information can then be used to add an equivalent session A1' to system B. This is shown in the schematic of the base state after migration 460 for system B. Depending on the nature of the request, this equivalent session may present the current resource presented for A1, or the new ending resource resulting from a link traversal initiated from A1. Also depending on the nature of the request and relevant user preference settings, static settings data from A might or might not be relevant to the transferred session A1'.

In various embodiments, supplemental data may be employed. Such supplemental data might, for instance, be employed in converting system-dependent data to a recognizable and usable interchange format or canonical form. In various embodiments, such supplemental data might, for example, be included in the state record Turning now to FIG. 5, therein is depicted exemplary further details of a migration as it is effected. System A 510 is shown as including session A1 520, a set of user interface devices and controls 530, and a state importer/exporter/tracker 540, which may be implemented as a module that can be used with a standard browser. Initiation of a migration request results in the creation of transfer state record 550. (The term state set may be used synonymously with state record.) This transfer state record is used when a migration is triggered, which may occur in multiple ways. One way is that a user at one system requests that one or more sessions be migrated or transferred from a system A to a system B. For the example shown, a user at system A interacts through available user interface (UI) controls to conduct a session, and then makes a request to migrate a session to system B. State importer/exporter/tracker service component 540 provides these services. In the example of a user at system A requesting that session A1 swing to system B, this request is processed by the exporter services on system A 540, which extracts the portable state, creates a transfer state record 550, and passes it to system B 560. The corresponding importer services 590 on System B then use that data to activate an equivalent session in-progress, A1', on system B. Alternatively, the migration may be triggered by other means, for example based on coding of target attributes for the link. Processing of such cases is essentially the same.

Figure 5:
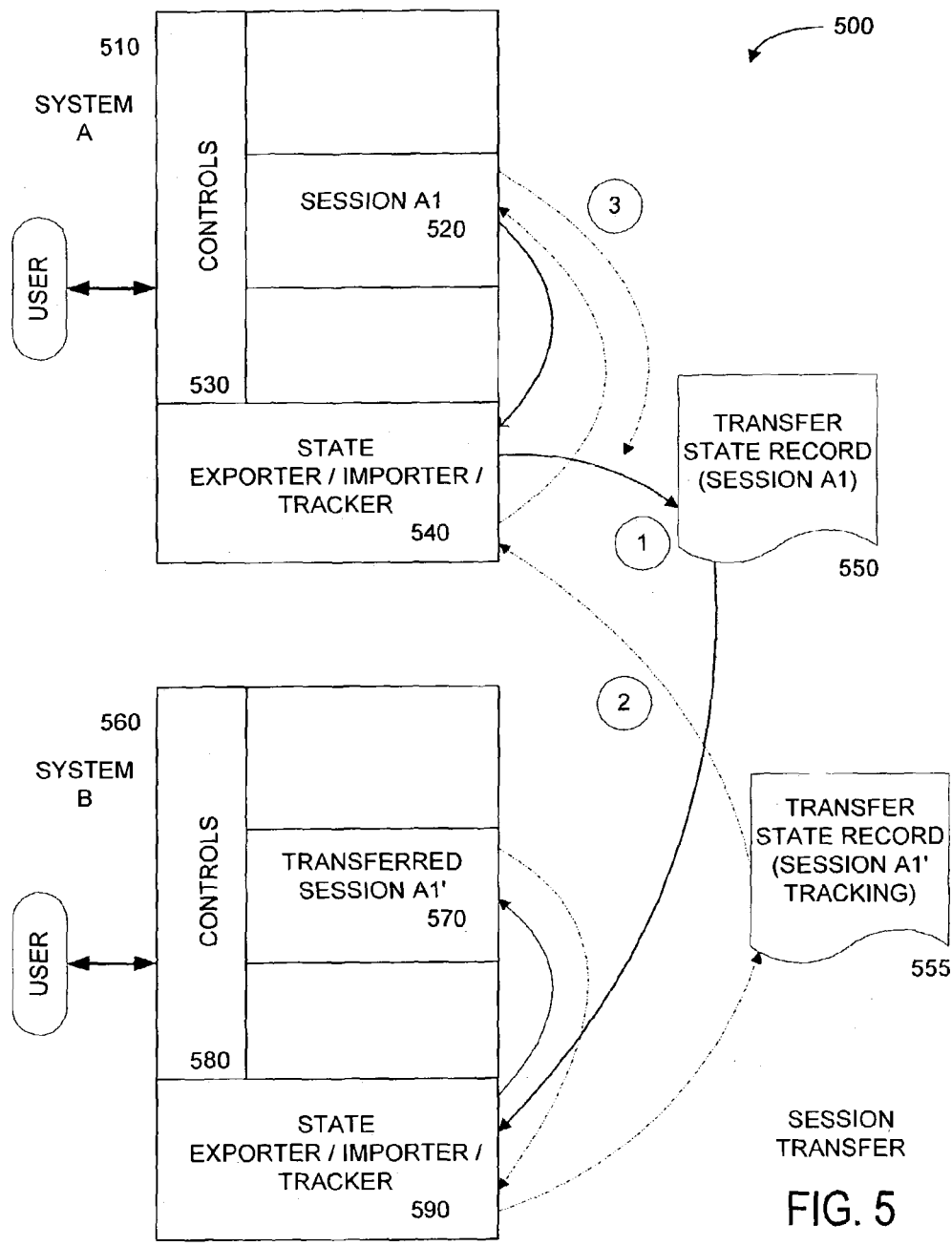
FIG. 5 is a schematic diagram of an exemplary process, performed by the systems of FIG. 1, for transferring state data according to certain embodiments of the present invention.

Optional features may allow the user to specify any of a range of cases for coordinating ongoing activity on the two parallel sessions A1 on system A and A1' on system B. These may include terminating the original A1 on system A or leaving it unchanged. In the case of migrations from a base TV program, leaving A unchanged might typically be preferable, but for migrations from interaction with currently-displayed enhancements for an ITV program on a TV, terminating the enhancement session may be preferable. For the case of migration from a PC, leaving the session unchanged may be preferable. An optional capability provides for ongoing interaction with the two sessions as one linked, shared session on both systems, acting like a collaboration system (or a fully synchronized multimodal session). Variations could make the session viewable on both systems, and could permit either or both systems to interact with and control the ongoing activity of the session. This is shown in FIG. 5 as additional transfers of state, with #1 creating the session on system B, as already described, #2 relaying an interaction on system B back to system A, and #3 relaying a subsequent interaction on system A back to system B. Such relays of ongoing interactions can be conveyed by transfer state records such as the session A1' state record 555 shown for #2. Thus users could treat the sessions A1 and A1' as a single logical shared session, in a manner similar to that used in conventional collaboration systems, in which all significant interaction events are replicated and synchronized as they occur. Such systems might add the features described here for non-synchronous migrations as an added feature.

Figure 6:
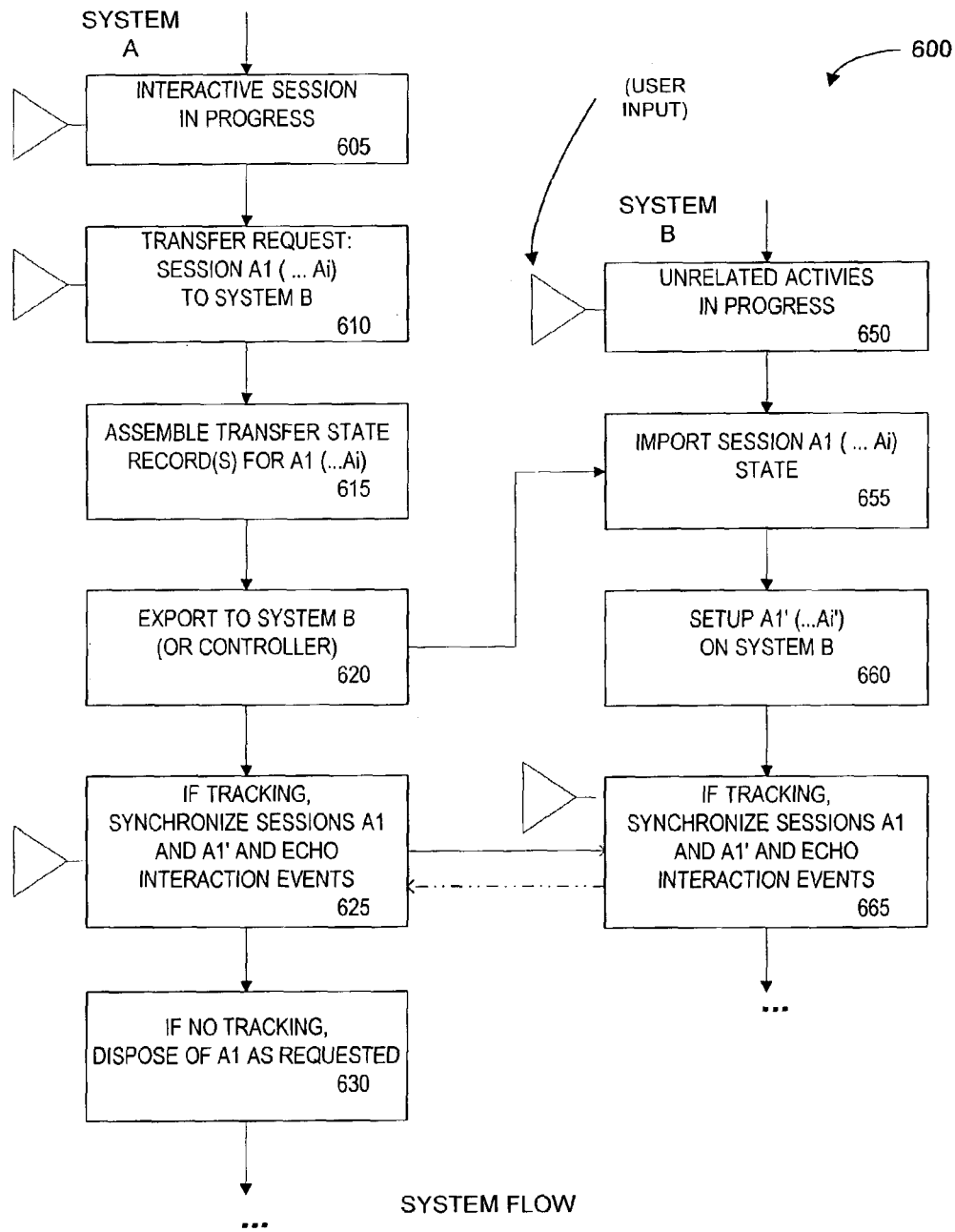
FIG. 6 is a flow chart of an exemplary process, performed by the systems of FIG. 1, for transferring state data according to certain embodiments of the present invention.

Referring now to FIG. 6, therein is depicted the flow of an exemplary process 600 of transfer showing export and import of state. The process begins on system A with an interactive session in progress (step 605), in this case a browser session A1. A transfer request to transfer the browser session A1 to system B is initiated by reception of some trigger event (step 610). Typical trigger events include a user request to re-target an ending resource or to duplicate the current resource to the target system, whether to a new window or an existing window. Alternative events include link attribute coding as specified by a target attribute (following the model HTML) or a show attribute (following the XLink model) which may be triggered on link activation, or on load, as specified by an actuate attribute. To prepare for that, a transfer state record is assembled by exporter/importer/tracker for browser session A1 (step 615). With all necessary information on the session to be transferred assembled and packaged for transfer, that state record with any associated information is exported to system B (step 620). This may be done by direct communication to system B, or via some intermediary controller system. Depending on options selected, the session A1 at system A may be terminated, left in as is to continue independent of the transferred version A1' running on system B, or, if collaboration/synchronization features are supported, tracking may be applied to keep the two sessions synchronized as events occur on either or both of system A and B. In the case of such tracking, the exporter/importer/tracker on system A exports similar state records (or simplified event records) to echo all relevant interaction events to system B (and imports any corresponding events from system B, as noted below) (step 625).

Meanwhile, at system B, unrelated activities are presumably in progress (step 650). Alternatively, system B could be idle, or it could be off, and might preferably have support features to sense and activate it on receipt of a transfer request. On receiving the transfer request (from step 620 on system A), the exporter/importer/tracker on system B imports the state record for session A1, interpreting and converting details as needed to accommodate any differences in capabilities, architecture, and preferences at system B (step 655). The exporter/importer/tracker then sets up session A1' as an active browser session on system B, loading the desired resource, and setting up other aspects of context as appropriate in accord with the transfer state record (step 660). If the target is to an existing browser session, this setup activity can be limited to making just the changes resulting from the transfer. Optionally, if collaboration/synchronization tracking was requested, further steps by exporter/importer/tracker on system B will maintain tracking to echo all relevant interaction events in either direction (step 665). Such tracking may optionally involve any number of additional systems as well (with additional transfers to first set them up, as well).

As noted, embodiments may add the MMUI support methods just described to existing browsers, using methods that will be apparent to those skilled in the art. In some cases this may be done in the form of external modifications that could be done by third parties, and that may be retrofitted to installed systems. For example, with MSIE (version 4.0 and later), there is formal support for Browser Extensions, relying on APIs that provide access to browser functions, including MSHTML, the WebBrowser Control, and the associated objects, interfaces, functions, enumerations, and hosting features and ActiveX Hyperlinking and Travel Log and other features that is extensively documented on the Microsoft Developer Network site (including Programming and Reusing the Browser, WebBrowser Customization, and related sections). Similar capabilities may also be available for other platforms, including PDAs, tablets, and STBs. Alternatively, new versions of browsers may be created to add this functionality. It will be understood that such functionality can also be provided by other, more dynamic methods for adding program code to supplement existing browser function, such as, for example by using Java applets, ActiveX controls, or the like.

It will further be understood, that in general, the methods described herein provide these MMUI browsing capabilities as a routinely available browsing feature that can be invoked at any time during any browsing session, for any browseable resources from any source, independent of any special support from any particular resource server that provides resources requested during the session, and without special need for any code obtained in association with any particular resources requested during the session. An exception might occur in certain embodiments, such as, for example, those that use code distribution methods that deploy code dynamically, as delivered in association with particular resources and/or resources obtained from particular resource servers, such as for example in applets in particular pages from particular Web sites, in which case the scope of such capabilities might be restricted to browsing that is directed to those resources and/or servers. However, it will be understood that in embodiments that employ a remote portal service, as described below, that portal might provide selected functions in support of these methods, and might possibly do so using dynamic code components that it causes to be served, but that dependence on the use of the portal as a facilitating service might not necessarily introduce any limitation on the range of resources and servers that can be accessed with the facilitation of that portal.

As noted, state records can be transferred directly between coordinating systems, or via intermediary controller systems. Other variations may also be useful, such as using special state intermediary repositories or databases. Standard interchange structures with well-defined formats and based on standard interchange frameworks or metalanguages such as XML may be desirable to facilitate interchange of such state details among systems that may have heterogeneous architectures and may use different browsers (or editors). One method is to communicate state via a tuple space. Linda-like tuple spaces offer attractive properties as a state/event exchange medium for coordination systems in general, because of their flexibility and associative properties, and their application to the methods described herein will be apparent to one skilled in the art. Relevant developments include implementations of programmable XML dataspaces that support distributed, federated tuple spaces and that add reactive properties for more flexible dynamic and rule-based behavior, and related work such as that described by Cabri, XML Dataspaces for Mobile Agent Coordination, SAC'00.

At a broad level, the transfer process described herein may appear to be similar to software task migration, in that a task at one system is migrated to a second system. However, the transfer process described herein differs for at least the reason that it is the session state of the task—not the actual program performing the task—that is migrated.

According to certain embodiments of the present invention, the transfer may draw on application awareness of transfer functionality to facilitate export and import of state. It will be understood by those skilled in the art that these methods of transfer-aware application support, relating to export and import of state, could be applied not only to browsing applications, but to most other kinds of applications as well, including for example, word processing, spreadsheet, analysis, drawing, database management, transaction processing, and the like. Adaptation of these migration or transfer methods to such other applications would primarily involve adaptation to the particular elements and granularities of state relevant to the particular application and need.

While adding migration-aware functionality might impose a development cost on each application, these methods could be simpler, more efficient, and more readily achievable than more general application-transparent methods, including those that might operate primarily at an operating system or programming environment level. Alternately, perhaps to provide "transparency" to applications with regard to transfers, application awareness of transfer functionality might not be drawn upon.

These methods have been described for the case of a hypermedia system architecture and coding conventions similar to those now in use on the Internet (with HTML, XHTML, and XLink) and in current ITV systems, but they are equally applicable to alternative embodiments, as will be clear to one skilled in the art. Current Internet and ITV systems generally are based on outbound links that are contained within a starting resource, but for some types of resource, such as image or video, the link may not be in the resource itself, and thus technically a third-party arc with respect to that resource, but is directly associated with it, being contained within the context in which the resource is distributed, such as the Web page that loads an image or video, or the TV channel that includes a TV program and has associated enhancement, such as in the VBI (Vertical Blanking Interval, such as NTSC Line 21 or PAL line 22) or VANC (Vertical Ancillary Data) or in the MPEG stream containing the TV program, possibly using SMIL, or in some other stream from the same feed source, such as a data or object carousel, or the like. Other past and possible future hypermedia systems provide richer linking methods, including richer use of third-party arcs, and the methods described above are equally applicable to such architectures.

Basic Device Set Management and Communications

As foundation support to the browsing process just described, it may be desirable that a device set management process that performs basic setup and update functions be applied to pre-identify and dynamically discover device sets that may be used in coordination with any given system, to define combinations of such device sets as composing designated device set groups, and to set preferences for use of device set groups and device sets within groups. This provides a framework for determining what transfer options should be considered and taken under specified conditions.

This communications process could desirably be based on and compatible with related lower-level processes and standards defined for linking such existing devices and systems, such as networks and/or gateways based on UPnP, HAVi, OSGi, Rendezvous and/or the like. Methods such as defined in those standards could be applied to enable basic communications among the devices, to provide discovery, presence, registration, and naming services to recognize and identify devices as they become available to participate in a network, and to characterize their capabilities.

Such a lower level network service could be employed as a base for the middleware and/or application level coordination services described herein. Useful communications services could include messaging services that could be used to communicate session state transfer requests, event services that could be used for tracking session-related events, as well as streaming services that could be used for relaying signals from one device to another as different presentation device sets come to need access to resources. Naturally these higher level services can be provided independently of such standards or any available software that supports them, to the extent needed to support desired devices and services, but use of available software and services could simplify implementation and have numerous well-known benefits associated with use of standards and COTS (commercial off-the-shelf) devices and software.

It should be understood that the lower level services provided by such network and gateway standards typically relate primarily to interconnection of devices with regard to routing of signals (e.g., between content access source devices and presentation devices) and of commands (e.g., between controller devices and devices that are subject to command), but that it might in the future be desirable to extend such standards to include support for the kind of session-oriented coordination and state transfer functions described herein. It is further noted that HAVi uses the term "target" in connection with remote control action and observation commands to refer to hardware devices, not applications, and this usage differs from the hypermedia application-related notion of link targeting addressed herein.

It may be desirable that communications among local systems and devices be done using local network facilities, such as a LAN or HAN or the like, or direct local connection, and that wide area networking to other locations be used primarily for access to external resources and services. However, limitations in available facilities and support may make it necessary at times for such communications to be via WAN, as well, even though this may be counterintuitive. This is likely in near term embodiments, such as with STBs that have communications to head-end cable or satellite systems (and through them to the Internet), but not directly to local PCs or other systems. Legacy STBs may have no external local communications capability suitable for such use, and even those that do may not be commonly connected to the same network as the PC. PCs and the like may in many cases connect to the Internet via dial-up or DSL or other facilities unrelated to those used for the STB. In such a case, the more circuitous external path may be quite serviceable for the coordination tasks described herein. Such a path could be a pure Internet path, such as using DOCSIS support from the STB to a separate cable modem that connects to the PC, and which merely routes through the head-end, or it could use other protocols from the STB that may require conversion and relay to the Internet by a server at the head-end.

This method of relay via a wide area network can be broadly useful, including for cases that do not involve cable TV services and STBs, but might employ other network and device technologies. Such use of a WAN could substitute for a local connection between any device sets to be coordinated. For example, a PC or PC-DTV system (or a TV/STB), or other device set might obtain resources via IP or other protocol over any satellite, wireless, DSL, fiber, or other transmission path (or locally) and could coordinate in a similar manner with an independent device set (that also has remote communications facilities) over that or any other bi-directional wide-area path. Such linkage could be on a direct peer-to-peer basis or be mediated by a server (whether remote or local). As a further example, a DVR, home media server, advanced TV, PC-DTV or the like might obtain streamed video and movies from an Internet service such as that of REALNETWORKS, and could coordinate a session relating to those resources with related activity, such as an enhancement session, at another device set, through the Internet. Such coordination might involve direct transfers to and from the second device set over the Internet, using the methods described above, or use relay through a remote server, such as one that might be provided by REALNETWORKS or others. As will be apparent to one skilled in the art, such relay via a remote server, and possible provision of related value-added services, could be done in a manner substantially equivalent to that discussed further below with regard to cable head-end servers.

The hardware context that has been described may be impacted by the emergence of "modular" computer systems in which a core computer module may be swapped in and out of multiple sleeves, carriers, docking stations, or other connection matrices and used in conjunction with different user interface I/O device sets of varying form factors, such as desktops, notebooks, tablets, and PDAs.

For such hardware devices, by providing for hot swapping such that the transient I/O state of a session could be reestablished with a swapped device set, an effect having some similarity to a session transfer could be achieved by physically moving the core module from one device set to another.

According to embodiments of the invention, such hot swapping capability could be provided by adapting the export/import functions such that a transfer was done, not by transferring the state information to another processor, but by recognizing the change of I/O device sets connected to the single core processor and reapplying the resource rendering and adaptation functions to take into account changes in resolution and related UI style adaptation, as described further below. This would effectively substitute the renderings on one set of devices with the equivalent set of renderings on the new devices. In addition to this cloned resource case, transfers could also involve a link traversal, with a change from a starting resource on a first connected device set to a selected ending resource on the new device set, but the cloned case would be simpler and perhaps more generally useful.

However, much like a brain transplant, such a core module transfer would disconnect the original device sets and presumably move or halt all sessions controlled by that core module. Accordingly, such an implementation would not address, for example, the general objective of MMUI use relating to the ability to use the multiple device sets at will, such as in a multitasking situation in which each of multiple sub-sessions may be concurrently active on different ones of the multiple device sets. For that kind of use, multiple processors (or a shared/integrated processor configuration) would still be needed, with transfers accomplished as described above, regardless of whether the processors were modular or not.

Push and Pull Methods for Controlling Transfers at Either Source or Target Device Set Embodiments of these methods can allow that transfers be triggered from either the source or the target device set. One case, as described above, is a "push" trigger that is activated while browsing on the originating (source) device set. The alternative case, which can be provided as a complementary feature, could permit the user to act from the target device to trigger a "pull." In this case, instead of system B waiting to receive a transfer request, a command on the as-yet-uncoordinated PC could actively request the transfer from the TV, signaling to the TV's exporter to send a state record back. In a basic embodiment, this could be as simple as a request to the TV for its current channel, which can be accommodated with any TV that responds to basic commands such as might be provided with network support (such as HAVi). This could enable a simple user command to "present enhancements to the channel I am now watching." The state record can also include time-position information and more specific address details on the current program resource to accommodate various kinds of programs, including stored resources, video-on-demand, streamed content, advanced feature states such as camera angles, second audio program, closed-caption, and the like, as well as other details, such as any that might be relevant to a link arc, including perhaps an anchor position or region, a pointer position or area of focus, and/or the like. Pull transfers can also be supported during fully interactive sessions (on all kinds of device sets), including the same functions as described for push transfers, and with the same flexibility in specifying whether the original session is to be terminated or left as is (or put into collaborative synchronization).

Pull transfers might add some additional complications, in that such transfers might be supported only at appropriate breakpoints in browsing activity, and only with appropriate permission. An enabling control could be provided as part of the exporter to work with the browser to ensure proper function, consistent with the granularity of state transfer supported. This might involve refusing some pull requests, queuing some requests to be held until a suitable activity breakpoint is reached, or satisfying some requests as of a recent prior breakpoint state. For example, during a forms entry process, a pull request might be refused, held until the form is submitted, or accommodated with the state set back to the initial state of the form. Security methods might presumably be desirable to verify that push and pull requests are permitted on both sides, as noted below.

Various embodiments of the present invention may allow for a basic level of enhancement activity to be active on an ongoing basis. Such functionality might be employed, for example, to provide continuing display of menu screens and base-level enhancements related to current TV programming. Such activity might, for instance, be driven by time-based links or triggers associated with that programming. This might be useful, for example, when a second device set is to be routinely used for such enhancements. Such activity could be established in accord with various specifications and preferences controlled by the user and/or the programmer.

In various embodiments of the present invention, once such an activity is established as a coordinated session, it might be appropriate to treat any relevant change of TV state, such as channel changes, VOD program changes, or use of trick-play or time-shifting functions, as causing implicit transfer requests to maintain that coordination automatically. Such operating conventions could, for example, give the effect of a second screen that is always coordinated with whatever is on the TV, and thus might be applied as the standard operating practice for the simple coordination services, such as, for example, the portal-based services described below, or other similar modes of use.

Resource Access

With regard to the underlying hypermedia resources, it may be desirable that these methods rely on the device sets making access to the same resources from the storage layer. Given that heterogeneous device sets such as TVs, PCs, PDAs, and the like require significantly different presentation styles, this is may be accommodated by adaptation at the client, and this may be based in part on alternative style recommendations contained within the resources. Thus, for example, an ITV enhancement resource (such as a Web page) could be coded to indicate one style of presentation for a TV screen, perhaps the same or slightly richer presentation for a PDA, and a significantly richer presentation for a PC. As has been recognized for the related case of phone and PDA access to the Web, this reliance on a single source with multiple style codings, such as using XHTML or CSS, offers significant advantages in content management and flexibility, and this has recently led to broader attention to device independence within the W3C. Useful methods might be drawn from the ongoing work of the MPEG-21 Digital Item Adaptation effort, as will be apparent to one skilled in the art.

This distributed, specialized, ad hoc approach to rendering also simplifies the demands on the browser, and facilitates optimal control of rendering appropriate to any device. Each system can be equipped with a browser specifically suited to the rendering tasks appropriate to the device sets it normally supports, avoiding the need for a common super-browser able to support any device that may be joined into a MMUI. Similarly, it avoids the need for coordinating alternative browser rendering processes dynamically, since binding is to the common stored form of the resource. Details of varying adaptations can be left to the target browser and need not be resolved until presentation time.

Other efficiencies may also be achieved by direct access. One relates to bandwidth efficiency, since stored forms of resources are generally designed to be compact and bandwidth efficient for the particular kind of content involved, while alternative methods of transmitting data in a display image or other partially rendered form may be less efficient. Another relates to the complexity of a two level relay and conversion with an intermediate system, as described previously with regard to the WTS architecture. A further example of benefits of direct access in the case of video is in the use of receiver-driven layered multicasting (RLM), which layers video into multiple multicast streams so that a receiver subscribes to only the streams necessary to get a desired resolution. Since a PC device using video as secondary content, or possibly for pointing device/screen support secondary to the TV (e.g., as a way to point to objects on the TV screen using the more convenient and precise pointing devices of a PC device set, such as one in which the TV screen content is mirrored on the PC monitor), could need less resolution than a TV or HDTV, the PC could obtain the video at this reduced, less intensive level. This may obviate receiving the additional layers at all, or at least eliminate them from being forwarded from a TV system to the PC device set (in whatever format).

This single-source approach may be valuable in simplifying the task of ITV deployment, by cleanly decoupling content issues from presentation system implementation details, except for cleanly specified style variations. Content producers need be less concerned about which architectures and form factors are being used for viewing, and need not face fragmentation of their markets caused by incompatibilities in viewing system. At an initial, base level implementation, all enhancements could be coded for a TV form factor viewing alone, and such resources could be usable, if not optimal, on PC form factors and on most tablet and PDA form factors. Thus content providers can have full reach to all form factors, and can selectively add style variations to those resources and for those form factors that warrant the investment. Techniques for automated style transformation (based on set rules and style sheets and/or more adaptive programmed transformation methods) could also be applicable with more or less workable results. This is similar to the conversion now done in some cases for phone access to Web pages, but it can be expected that up-conversion from low to high resolution, as desired here, could be much more effective than down-conversion, as done for Web-phones. A promising short-term method is to create server-based adapters (or proxy servers) do this up-conversion and concurrently adapt access and coding from native proprietary ITV formats to Web format.

These services could be architected much like "clipping servers" used for down-conversion of Web pages for access by phones and PDAs, but instead performing the up-conversion to Web pages in what might be called a "composition server" that combines small pages and short, simple menu controls into larger, richer pages with more powerful and varied controls. Over time, a preferable method may be to adapt current ITV content and presentation systems to use Web technologies and standards (such as HTML and HTTP, or newer standards such as XHTML) as native formats for resource access and coding, still providing for the small pages and simple menu controls suited to TV form factors as at least one of the included styles (but gradually adding the improved capabilities to finely control alternate style codings for richer form factors, as described). Advanced standards for style specification and transformation such as CSS (Cascading Style Sheets), XSL (Extensible Stylesheet Language), XSLT (XSL Transformations), or RML (Relational Markup Language) can also be applied, as can the use of embedded programming objects such as ASP (Active Server Pages), JSP (Java Server pages), or the APACHE Struts Framework. As will be apparent to one skilled in the art, any of these current and emerging methods can be used to give the effect of variant resources for each of a number or form factors. For example, use of RML or XSLT could permit page templates coded in HTML, XML, XHTML or other formats to be transcoded (to or from one another) based on the structure of the content and the context of the target device set to allow for changes in UI elements, pagination with automated insertion or collapse of links, and other styling actions, and related methods can be used to control the styling of link presentation and traversal as well.

It should be noted that in embodiments where direct common resource access is not practical, it may be necessary for link arc and/or resource data to be transferred as part of the state information (or as a supplementary element or stream of elements). An example of such information might be ATVEF triggers and embedded resources.

Linkage and Transfer from Pure Video Sessions to an Enhancement

The case of transfer from an interactive resource is generally as described above, but the case of transfer from pure video is in some ways simpler, with some aspects that may be further clarified. For simple video there is less context or state information needed, with one element being the identity of the program and another element being the time position within the program. In certain cases there may also be spatial selection information, such as when activating a "hot spot" as a starting resource that indicates a specific region, corresponding to some viewed object (such as an actor or player, or an item of merchandise). Some or all of this basic information is readily available from any advanced TV system or STB, and can be expected to become universal as such systems and associated home networks proliferate. It may also be obtained by external means, even with basic TV devices, as noted below. (Certain cases may also involve active enhancement resources, as well.

According to embodiments of the invention, if the video is from a realtime broadcast (or other realtime source, such as a camera), the time position can be taken to be just the current real time. Should it not be realtime video, or should it be desired that it not be treated as realtime, time-position information (relative to the beginning or some other reference point) can be obtained by a number of methods, including reading embedded time code data, or externally tracking time-position. The TV exporter can extract or derive such time code data to include in the state record. If VCR-like trick play functions or other hypermedia controls are allowed to alter the play of the base program, and synchronization of enhancements at another device set is to be maintained, then a tracking process can be used to advise the other device set of the resulting changes in state (time-position) as they occur.

Program state information may also be available from an intelligent remote control, which will ordinarily have information on the channel or other program setting last set, and which may also have time-position information, or be able to construct such information based on analysis of the commands it issued (as long as there are not intervening control inputs from another source that the remote is unaware of). From this perspective, it should be understood that to the extent it is an intelligent command device, such a smart remote can be considered the controlling processor for a TV (in parallel with the STB or other control system) for purposes of coordinating activity with another system, with or without special support from the STB. In the case that an intelligent remote control includes more robust viewing state awareness, such as in the case of a remote control that provides EPG access and viewing control, its ability to serve as a source of state information is enhanced. Other external devices may also be used to sense and transfer the TV state, such as a device that monitors IR signals from the remote control, or that senses channel indicators on the TV set or coded into a video image. One method of providing coding of program identifiers or links or other such data within a TV program resource in a form that can be extracted externally even from a standard TV set with no special signaling support, is to insert video-image-based or audio encoding into the TV program. Such codes may be directly understandable by the local devices as a program or resource identifier or as link arc information or the like, or may be relayed to a remote service for interpretation. Other alternative sources of such state information may be DVRs and similar devices, as discussed below.

It will be understood from the discussion of program identification issues above that when employing basic methods of linkage, current channel identification can, in various embodiments of the present invention, be used in conjunction with external sources of schedule information to more specifically identify a current program. Such basic methods of linkage might include, for instance, those that identify a current channel but do not directly identify current programs in a more specific manner.

For example, standard program guide listing information might be employed in more specifically identifying scheduled programs. Accordingly, particular standard program guide listings might be selected based on knowledge of a particular distribution system serving a user and/or knowledge of the user's time zone, and be referenced by time and channel to obtain further program identification details. Further sources of external data might be employed to correct for cases in which actual program distributions varied from their planned schedules. Moreover, such further sources of external data might, in various embodiments, be employed in identifying advertising programs and/or other programs not listed in standard program guide listings or the like.

Such further sources of external data might, for example, be obtained directly or indirectly from programmers, advertisers, and/or other parties. Alternately or additionally, such further sources of external data might, for example, be obtained by broadcast monitoring and/or reporting activities, such as those employed in monitoring commercial airings and/or closed-captioning. Such monitoring and/or reporting might be done in realtime. It is further noted that such monitoring and/or reporting could be done with respect to any program distribution system, and that a variety of distributions of monitoring systems, as well as of the associated data collection and distribution services, might be employed. A wide variety of such methods will be apparent to one skilled in the art based on the teachings herein, and a number of such methods are discussed further below.

In addition to identifying state, TV systems also may present challenges in identifying link arcs. As just noted, video may be treated as containing links, or as using third-party arcs. In the case of simple video, third-party arcs may be obtained in the form of a linkbase, from a TV feed-related source, from the Web or elsewhere, or may be derived by some other link-like process that leads to a source of associated material that may be synchronized with the TV program or not.

More advanced systems, such as those employing ATVEF/DASE/DDE, DVB-MHP or similar methods, may embed link arc information into a TV stream, such as using VBI or MPEG, or into related channels such as a DSM-CC, ATSC or DVB-MHP data or object carrousel. In the case of ATVEF, for example, triggers are embedded into the TV stream as real-time events (called broadcast triggers) that employ the current stream as starting resource and may contain a URL for an ending resource, along with a human-readable name, an expiration date, and a script, which is to be executed by a trigger receiver object within the ending resource, either automatically or after some user selection. Receiver Web pages containing trigger receiver objects are expected to receive and process the script to cause the desired presentation action. It will be understood that this may give an effect generally equivalent to that described above for encoding automatic triggering behaviors using actuate attributes, and, unless indicated otherwise or clear from context, any reference herein to one such method of encoding automatic triggers is meant to be inclusive of any other such methods. ATVEF also provides conventions for a Local Identifier URL Scheme (LID) which serves as a URL relative to a given namespace that can be local to a distribution channel that can be used for resource delivery and that may be apart from the Internet, such as by broadcast, cable, or satellite.

ATVEF also provides for bindings to the particular channel standards that are to be used, for session announcements in accord with SAP and SDP, which may include multicast, and for a Unidirectional HTTP (UHTTP) protocol that adapts HTTP to one-way channels (with provision for separate back-channels). ATVEF Transport A provides for support of a data return path or back-channel, while Transport B is for one-way broadcast. One problem with ATVEF and similar real-time linking/triggering schemes is that they may have difficulty in adapting to storage and replay of content time-shifted to a time other than the original broadcast. Another problem is that the trigger information, as well as the associated enhancement resources, may be inaccessible to an independent system that is to be coordinated, unless it has its own duplicate TV tuner, STB, and entitlements (even if such access is to be used only in coordination with a TV for a single viewing). Thus, specific URLs might be directly accessible to a TV/STB, and/or to a separate PC containing a TV tuner capable of receiving ATVEF or similar triggers. However, such link arc information might not be accessible to a separate PC lacking a TV tuner. Moreover, even where a separate PC contains a tuner, the tuner might need to be manually tuned to the same channel as that on the TV.

Taking a closer look at ATVEF as an instructive example, it noted that ATVEF provides a protocol for ITV resource presentation to be controlled by triggers transmitted in parallel with a TV program, as announced in a session announcement, with links to enhanced content that may be found on the Web or staged to the local system via a channel in the broadcast or multicast system. Session announcements are broadcast using a special SAP and SDP protocols on a single well-known IP multicast address and port to indicate the availability of trigger information and related content, and (for analog and many types of digital broadcast) specify the TV broadcast they relate to. The client may present this automatically, or on user approval. Only one enhancement is displayable at one time, and ATVEF suggests protocols for determining whether transitions, controlled by triggers, are automatic or subject to user approval.

ATVEF does not provide for multiple independent enhancements, or for co-viewing of enhancements. "Only one enhancement may be displayed at a time" (according to ATVEF Specification v1_1 r26, Appendix D). More specifically, it is noted that ATVEF is oriented to announcement of a "primary" stream and of corresponding "mutually exclusive variants" that may differ in language or attributes such as suitability to varying devices. As ATVEF does not provide for multiple independent enhancements, or for co-viewing of enhancements, it may not be suited to the flexible environment of a PC-class device, as described herein, and its ability to support many windows and frames, the windows and frames perhaps having varying levels of visibility.

With further respect to ATVEF, it is noted that ATVEF triggers include:
  A required URL which refers to the corresponding enhanced content
  A name, which is user-readable, and can be used to label a selection presented to the user
  A time of expiration, after which the triggered content is to become unavailable
  A script attribute, which may execute in a trigger receiver object within an HTML page, such as to navigate a frame to a new URL ATVEF provides that such URLs may be "http:" URLs on the Web, or "uhttp:" URLs receivable over a unidirectional broadcast channel, or local "lid:" URLs within a locally cached namespace. HTML pages can be coded to cause a trigger to place a TV frame within a Web page, to overlay a Web page over a TV background, and to transition from a Web page back to full-screen TV, and may specify "tv:" protocol links to specify a channel to be tuned to and presented.

The ETVCookhook page on storage (http://etvcookbook.org/system/storage.html) notes the problem of storing enhancement trigger streams for later playback of recorded programs, and states that ATVEF Transport A triggers in Line 21 or Text Channel 2 can be stored on videotape, but that Transport B cannot, and that "PC Synchronous enhancements are incompatible with recording. Since the content is pushed to the user PC in sync with the broadcast, it will be out of sync with any playback from a home VCR or PVR. This problem seems to have no solution."

It is noted that this problem is solved in various embodiments of the present invention. For example, the problem can be solved through the use of a time-based table of triggers and links as outlined above, or other similar methods. Such a table need only be archived with an appropriate identifier and made available at playback time, and that service may be readily provided from any of various sources, as described herein. The table entries can be used with a clock-based driver to give the effect of a realtime trigger stream, either at the portal or from a local application (such as a browser accessory).

Current 2-box "Enhanced TV" offerings (such as, for example, those from the ABC and PBS networks) may be problematic in that they require the user to know the identity of the current program and to know how to locate a corresponding resource, which is a Web page for that program, and manually navigate to it, after which the Web enhancements can be navigated with purely temporal synchronization maintained from the Web site. For example, for the show "Who Wants to be a Millionaire," a user must go to www.abc.com, click a button marked ETV, then pick Millionaire (and then select the time zone). For a similar service produced by ACTV for MTV2, a user must go to www.mtv2.com. This is obviously awkward and burdensome to the user, and limits the ability of such offerings to gain wide use. It is further complicated by the fact that the user may be unaware of the existence of such a page, and that there is no consistent pattern for how different program sources make such pages available—there are no navigation conventions that are common to many programs. It is evident from the teachings provided herein that this should preferably be supported as an automated link traversal that could relieve the user of these tasks and the need for related navigation knowledge, and that is responsive to the dynamics of channel surfing, swapping, video-on demand, trick play, picture-in-picture usage, personalized ads or other content, and/or similar features. Prior so-called "synchronized TV" schemes can be thought of as providing a relatively "dumb" form of synchronization, and one of the benefits of the methods described herein may be to enable a "smart" synchronization that remains coordinated with an individual user's TV activity.

An alternative embodiment could make use of a table of associations that could serve as a simple linkbase to allow automated traversal from the TV program to the Web-based enhancements. Such a linkbase could be pre-defined by the user, or preferably obtained from the Internet or some other service. Still other embodiments might obtain such linkbases from other sources, such as embedded in the TV distribution feed, much as for ATVEF. This method can avoid the problems of need for access to the TV signal to obtain link arcs, and of time-shifted viewing noted above.

In particular, such a linkbase could be structured similarly to an EPG. This could exploit the simple basic structure of the EPG as being a two-dimensional data array, with one dimension being time and one being channels, that is readily searched by those two keys. To use such a structure for a linkbase is just a matter of logically placing the link arcs for a given time and channel in the corresponding grid slot. This could be done in a separate EPG-like structure, or integrated into an EPG and possibly distributed by the same services that provide EPGs. Multiple arcs could appear within a given grid slot, with starting resource information that narrows them to specific sub-intervals or to specific time/region portions of the resource, and with other attributes that permit selection of alternative links based on defined parameters and filters, such as to personalize links based on a user profile, or to give users a choice. This method of providing a collection of link arcs having time-interval attributes (start and end times for enabling the link, relative to time position in the starting resource) serves as a more flexible alternative to the sending of link arc triggers in real-time. The effect of real-time triggers can then be derived by processing the linkbase in a sequence that is in accord with the time-interval attributes.

Such EPG-like linkbase structures can be composed at multiple levels, for example, one at the program and channel level, with multiple alternative links as just described, one at the feed source level, including all channels from a given distribution source, such as a cable or satellite system or an Internet streaming service, and one aggregate level that combines multiple such distribution sources into a broader suite. Such linkbase portions may be acquired pre-assembled, much as for an EPG, or some may be dynamically constructed from various sources and with updates in real time. In certain embodiments, a linkbase manager program might be used to assemble and maintain this linkbase structure, in conjunction with one or more external linkbase supply services.

To better accommodate programs that are not appointment viewing and synchronized to a given real time, but can be obtained on demand in some recorded form at flexible times, an alternative to the time-based EPG structure is a one-dimensional table keyed on program identifier or resource address (such as names, URLs, URIs, and the like). As DVRs and similar devices proliferate, most or all TV programming may tend to fall into this category after its first availability. This may be moderated by the use of time-phased release windows, such as currently used with movies, that could restrict viewing, copying, and VOD access for some initial periods. In any case, such a structure can be used in combination with the EPG-like version to provide a flexible combined linkbase system that can be searched either by a definitive and unique program identifier, or by a time and channel combination.

It should be noted that current methods of embedding links into TV program transmissions (such as ATVEF) can be limiting, and that provision of linkbase metadata in a format that is separable from the associated TV/video program mediadata encoding can facilitate more flexible use of the linkbase, such as to facilitate use with stored programs. Whether provided as a complete linkbase, or locally assembled during reception of a linkbase stream, such a table need only be archived with an appropriate identifier and made available at playback time. The table entries can be used by a clock-based event driver to reconstruct a realtime trigger stream on demand, either from a remote server or from a local application (such as, for example, using a browser accessory).

Also, reflecting the wide range of possible linkbase embodiments, it is helpful to think of linkbases as possibly being virtual, in that they may not be physically assembled into a single data structure of the sort just described, but that the effect of such a structure is obtained by some process of finding and using link arc data based on time and channel identifiers, based on unique program resource identifiers, based on link arcs being supplied with the program, or any other suitable process, and that certain embodiments could work with any suitable form of virtual linkbase and any suitable data structure. Such a virtual linkbase might also be embodied purely as a process, such as in the form of a resolution service that resolves program identifiers into link arcs (or linkbases), acting much like a name resolver that given a starting resource identifier returns one or more ending resources (along with other link arc supporting information).

It should also be understood that multiple alternative sources of linkbases relating to a single base program may be accessible, possibly from multiple providers, and that viewers might be given controls to determine which one or more linkbases are to be applied at any given moment or time-span or anchor position, with what priority among selected alternatives, including controls for passive (automated and implicit) or active (explicit by the user) selection of alternative link arcs at the time of link traversal, as well as preference-setting controls to pre-set such choices. Such alternative linkbases may be organized into linkbase channels, and the controls might operate as "linkbase channel" (LC) and/or "enhancement channel" (EC) selector controls that operate much like a secondary selection to the conventional program channel selector control. Thus the user might first select a program channel, and then select one or more linkbase channels to be applied. In addition to applying such linkbase channel settings on an ongoing basis, further or alternative functions might provide for user selection at the time of link activation from a set of links corresponding to alternative linkbase channels. For example, this might be controlled using a drop-down list control or a cascading set of drop-downs.

It should be understood that transfer requests could be structured to provide for one set of linkbases to be active at one device set, with another set of linkbases active at a different device set, with the linkbase selection being included as part of the state set. This could further exploit the power of MMUIs to allocate interaction with different sets of linkbases to different device sets, such as to allocate tightly coupled and non-intensive linkbase channels to the TV and loosely coupled but perhaps more intensive channels to a PC. Access, selection, and resolution of alternative linkbases may be facilitated by servers acting as linkbase proxy servers. Specific methods will be apparent to those skilled in the art based on the teachings provided herein, such as using methods similar to those described by Page, et. al., Its About Time: Link Streams as Continuous Metadata, at Hypertext '01, incorporated herein by reference.

Thus a transfer from the TV could assume that the PC needs only basic TV state as a starting resource to identify a third-party arc and establish a "transferred" browsing session with the corresponding ending resource. That ending resource might be a resource (such as a Web page) that is generic to the program (whether the specific program episode, or all episodes of a series), or one specific to the current time span within a program, or more specifically to a current time and an indicated image region. In the case that the arcs are embedded in the TV feed, those arcs may be interpreted at the TV, and could be followed there to view enhancements there, or could be passed to the PC or other device set as part of the state at the time of transfer. Alternatively, the target system could have access to the same links or linkbases, and enhancement resources, either directly, or via the TV system.

As use of DVDs, DVRs, Internet streamed video, or other similar alternative video sources becomes common, the DVD, DVR or computer or other controlling resource access device may sometimes serve as an alternate device to the TV/STB in controlling what is viewed on the TV. In such cases, the session transfer activity might originate from that device, rather than the TV/STB (or in combination with it), and the methods described herein in the context of control by a STB should be understood as applicable to DVDs, DVRs or other similar devices as well. This may facilitate implementation of coordinated services for those cases, since providers of those devices may be more open to addition of the coordination support software, or the user may have direct ability to add such software. In the case of a DVR, for example, the DVR could create and forward the state record as described above, activated by either a push or pull request. DVD and DVR function and Internet stream access can be readily provided on standard PC systems that offer considerable extensibility. That also means that centralized, single processor/single system embodiments, as described below, may also be readily applicable in those cases, although in many cases it may be preferable that two separate systems be dedicated to video and PC functions. It is further noted that with DVRs, a common usage mode is to have even live programming (such as from cable, satellite, or broadcast) be obtained through the DVR (to enable pause, and other special features), and such practice may extend to Internet-sourced programs as well (and DVRs can include DVD players), so that coordination from a DVR may be applicable to most or all content viewed. The above discussion of linkbase information is also relevant to content stored on a DVR or other local storage, and such linkbases may be stored with the video content (embedded or separately), or may be obtained from another source.

Video content streamed over a network (such as the Internet) can be treated in much the same way as from conventional TV distribution sources. Embodiments of linkbases may be embedded, in separate streams, or separately sourced.

It will be understood that some simplification of the methods described herein for smart synchronization can be applied, for instance, in the special case where links are supplied in association with a video stream (e.g., in the case of ATVEF) and where that same stream can be made available synchronously to an alternative device set (e.g., in the case of a PC containing a TV tuner that can receive the same signals as a TV, including the same links). In such a case, the second device set need only be tuned to the same channel to receive links that are supplied in common synchronization with that channel on the TV. In such an embodiment, the smart-synchronization task can be understood as one of effectively ganging the tuners in each device set, such that when one changes channels, the other changes correspondingly, without need for any manual coordination action by the viewer. Thus the state record might in some embodiments be as simple as an indication of the current channel, to be sent whenever a channel change is made, and the import process might consist of using that state record information to mirror the channel change, and then, at the PC, to set up browsing based on use of the links provided in association with the designated channel. Similarly, if a TV were driven by an Internet video stream having associated links, then synchronization of a PC could, for example, be achieved by causing the PC to receive the same Internet stream on a simultaneous basis, and then drawing upon the corresponding link associations that that stream provides. Embodiments might include a wide range of selective controls over when and how such ganging and coordination is to occur, such as those of the kind described below.

The various forms that linkbases might take, and how they might be applied in various embodiments of the present invention, will now be further discussed.

A linkbase might generally be thought of as relating a program to a series of triggers and/or links keyed to time. Such can be implemented in a variety of ways, including, for example:

- Conventional ITV hyperlinking approaches, such as those in the ATVEF standard, in which URLs or other kinds of links and triggers are embedded in the content stream or in an associated realtime stream.
- Multiple streams of triggers specifying alternate URL links might be separately identified and transmitted.
- Indirect coupling of such streams of triggers to any number of alternative sets of links might be enabled by abstracting these triggers to carry a generic trigger identifier instead of a specific URL, to be used with a mapping table of alternate URLs associated with the triggers.
- A similar mapping effect based on the broadcast stream might be implemented by using a proxy service to translate from the original primary enhancement trigger URLs to a set of corresponding alternative URLs.
- Instead of a trigger stream, this linkbase information be abstracted into a time-based table of times and triggers, or other similar data structures, as described above.

In any case, if the original source has made efforts to identify and specify appropriate points of interaction in an associated trigger stream, this information can be exploited in adapting the trigger stream to specification of an alternative set of enhancements. A time-based table permits a simple decoupling from the primary content stream and might offer a more concise specification, but a mapping based on ATVEF-style realtime URL trigger stream might exploit the broadcasting of the original content triggers. The particular choice of these or other similar methods may depend on a wide range of technical, infrastructure, content sourcing, business, and other factors, in ways that will be apparent to one skilled in the art based on the teachings herein.

TV Programs as Hypermedia Resources

It should be noted that some issues arise with regard to the unique identification of TV programs (and similar non-Internet resources) relating to ambiguity and imprecision in conventional naming and locating methods. These issues relate to the identification of link arcs originating from a TV resource, and also relate to the reverse problem of linking to a specific TV program. Unlike Internet URIs, URNs, and URLs, a reference to a TV program by channel and time may not be precise and unambiguous, since it refers to a time slot that only loosely and unreliably corresponds to a specific content resource entity, which may be broadcast early or late or not at all. Current issues in identifying TV in a hypermedia context are summarized in TV Broadcast URI Schemes Requirements (W3C Note 21 Oct. 1999) which distinguishes a four layer hierarchy of service, event, component, and fragment and two dimensions, one schedule-related and one content-related. That note describes locating methods based on EPG-style channel and time, by query to a service based on a partial description, by reference to stored resources, and various other cases relating to data carousels or encapsulated IP datagrams, as well as others, and notes that "technology-dependent" content identifiers such as SI (system information) data in the broadcast system are not satisfactory. However the problem remains that the vagaries of broadcast may make standard schedule-related identifications unreliable for content identification purposes. Broadly speaking, much of the difficulty comes from the history of broadcast as a channelized push medium oriented to appointment viewing under full distributor control, as opposed to hypermedia as primarily open pull under user control, and it can be expected that the two will be harmonized, with both orientations being supported in an overall context that is more Web-like. Such a more Web-like resource identification approach may be useful for current Web-based Internet streaming, and may be similarly applicable to VOD or other on-demand or personalized services, whether via cable, satellite, Internet, or other distribution methods.

It can be expected that globally unique content identifiers, such as, for example, CRIDs, ISANs, or V-ISANs, will ultimately be usable for TV programs, and that in the interim, useful sets of non-standard and non-unique content identifiers used in various broadcast systems, such as SI information, can be used in conjunction with system identifiers and other supplementary information to precisely identify specific content resources. For purposes of ITV and similar hypermedia, such precise identification (serving more or less effectively as a universally unique identifier, UUID or globally unique identifier, GUID) may be practical and desirable, even if system specific, and it may be desirable to employ such identifiers for coordinating systems and device sets in accord with the methods described herein. Thus in identifying the state of a TV system, it may be desirable to obtain and transfer such SI or similar information, and in some cases the use of time and channel identifiers may be unnecessary.

This issue of precise resource identification may be important to precise control of coordinated viewing. Simple channel or stream-oriented identification of a resource may not well suited to providing specific control of a resource that is to be presented on a transfer. For example, such identification may not be fully deterministic as to whether the resource that will be found in a channel or stream at the time of activation (or at a specified time) will really be the resource that was named, or some other resource that happened to appear. For example, a request to transfer the same channel while watching one program, might occur as a program change (or commercial interruption) occurred, and cause some other program to appear instead. In simple cases of continuing viewing, this may not be a serious problem, but if the desire was to begin interaction with a program that just ended, the desired function might be impossible. Thus in linking to an enhancement with another device set as target (especially if using third-party arcs), it may be desirable for the behavior to ensure that the current program at the source device set be treated as the starting resource for a link traversal to be completed at the target device set. Similarly, as noted above, and as is a known problem with DVRs, a request to activate a resource at a given time may not obtain the desired resource. (This is different from the problem of URLs disappearing or having changed content, in that the URL precisely corresponds to a single, entire, discrete resource, even if the identity of the resource is not guaranteed to be invariant. Further, when a resource is substituted at a given URL, that is usually intended to be treated as a valid substitution.) By using hypermedia-style link arc references that identify programs by a precise logical or physical identifier, these schedule-related ambiguities can be avoided, and more desirable and stable linking behaviors may be obtained.

A similar issue relates to the expected behavior on loading a resource. In a TV context, it is generally assumed that one tunes in to a program in progress in real time, and starts viewing from some more or less precise "current" point, except in the case of the newer, secondary alternative of video on demand. Ina hypermedia context, it is more common to expect the reverse, that a video resource will be viewed on demand, from the exact start, with realtime streams being a secondary alternative. A harmonized model might provide for consistent default behaviors, using consistent rules for whether a program is activated from the start (such as time=start) or from a current point as default (such as time=now), and for whether a user can override that, in an effect similar to using a DVR to time-shift and pause broadcast programs. Resources might be identified as having either a realtime or on-demand presentation type that is coded in by author/producer/distributors, and which may be subject to override by the user. For example, a live Olympic broadcast might be normally activated in realtime, but with a simple command variation, activated at the start of the program. Similarly, alternative camera angles might default to realtime, but have overrides to start at one or more reference points, for an instant (or not so instant) replay effect. The same can apply to loosely related or unrelated enhancements, some of which may default to realtime, and some not. A simple convention in link appearance or in link activation controls might be used to indicate to the viewer whether a link was coded for realtime or on-demand entry, so the user could better decide whether to accept or override.

Such codings may also indicate whether the realtime start is in reference to some external broadcast or other event, in which case it might revert to non-realtime at the end of that broadcast interval, or in relative time reference to some other stream, in which case that relative reference might remain in effect. Thus tuning to the Olympics the next morning might start it at the beginning of the previous night's program, but any internal relative references might play in synch with the reference (such as alternative camera angles synchronized to the main program). These codings might take forms such as time=now-absolute, time=now-broadcast, time=now-relative to resource name. With a full set of codings and browsing controls, any combination of link traversals and time bases can be provided for (with control by user, author, or some combination), such as, for example 1) from stream A (at time=t), actuate stream B from either time=t or time=0, on either the same or a designated device set, or 2) from stream A (at time=t), actuate another presentation of A on another designated device set, at either time=t or time=0, or 3) from stream A (at time=t) on the TV, actuate linked stream B on the remote control/tablet, at either (specified) time base, or 4) from stream A (at time=t) on the remote control/tablet, actuate linked stream B on the TV, at either (specified) time base, or 5) from discrete resource C on the TV (such as an enhancement text screen), actuate some resource D (continuous with any specified time base, or discrete) on the remote control/tablet, or 6) from discrete resource C on the remote control/tablet (such as an enhancement text screen), actuate some resource D (continuous with any specified time base, or discrete) on the TV, and any other similar combination. Similar controls and codings can recommend, override, and determine how presentations of starting resources are to behave after a traversal, such as whether they are to continue running on their current time base, or to be paused while enhancements or alternative resources are viewed, and then resumed from the last time position. Such a continuation could give an effect such as that of a conventional advanced TV change of camera angle while such a pause could give an effect such as that of an interpolated enhancement as defined above. The use of time parameters as just described, or using similar methods, enables specification (by user and/or author) of a rich variety of behaviors, including all of the variations after Behrens listed above.

It should be noted that in certain embodiments synchronized enhancements might be based on resources, such as HTML pages, that could ordinarily be discrete, but that have a time-based synchronization imposed on them that could qualify them as continuous resources. With regard to the control methods just described, these can be considered as having elements that behave as discrete resources within the bounded time segments in which they are active. It may be desirable to give the user the ability, using controls similar to those described above, to control whether such resources are presented in accord with their suggested synchrony to a related base program, or to decouple that time-based behavior to support asynchronous browsing.

These methods can be understood as supporting viewing of streams in "hypertime." Hypertime can have flexible connection to realtime, and hypertime for each resource may be related to hypertime for other resources in flexibly linked ways. Just as a user traverses a hypermedia resource tree in (path) ways he defines, based on recommendations and options that are authored in, he traverses hypertime trees corresponding to those resources in (temporal) ways he defines, based on recommendations and options that are authored in. Details of an exemplary set of hypermedia timing controls are provided in the W3C documentation on "The SMIL 2.0 Timing and Synchronization Module." This can be contrasted to conventional advanced digital TV, which includes multistream elements such as alternate camera angles and synchronized enhancements that can be switched to or swapped, but without true hypermedia browsing controls. In that case the user can only select viewing options as a passive observer, with no temporal control, selecting among views that occur independent of his observation (except for the possible option to apply trick play functions once such a view begins). An author similarly has limited flexibility to offer or recommended options, and essentially edits elements into a single, fixed temporal stream (or set of parallel streams). In hypertime, the user can draw on rich and flexible author-coded recommendations, and, if given suitable browsing controls, can actively determine whether available views are activated and "real-ized," and on what time-base, in a customized, personalized reality. Hypertime is defined by its navigation and control path, and is stateful with regard to time, involving rich, multidimensional state in terms of specific resources, time-bases, time reference linkages, and history and path of resources viewed. Conventional advanced TV simply flows as streams, and is generally stateless with regard to time—apart from a simple channel history, state information is not material (except to the extent that DVR/VOD functionality provides a simple, limited offset, or "time-shift" from realtime). Hypertime can be understood as essentially a full virtual reality with regard to time (and may include natural video and realtime elements), while conventional video is medium that is essentially in realtime.

From this perspective some discussion of various senses of the term "realtime" may be helpful. One sense relates to the nature of the time base. Unless indicated otherwise or clear from context, the term "realtime" as used herein with respect to time base may be thought of as relating to a universal, common, standard base in absolute time (e.g., in the case of a live camera or microphone), or as relating to one of possibly multiple time bases shared among multiple viewers (e.g., in the case of an appointment viewing broadcast by a particular distributor of content that might be pre-recorded). It is in these aspects regarding the nature of the time base that realtime is contrasted herein from hypertime.

However, "realtime" is also used herein in a second sense, with respect to the degree of synchronicity with regard to nearness of events in time, as exemplified by common usage of hard realtime or near-realtime as implying a high degree of nearness, and not necessarily implying any reference to the nature of the time base, whether "real" or not. It will be understood from the teachings herein that methods and issues relating to synchronicity or nearness in many cases differ little, if at all, in cases of synchronicity relating to a real time base or in cases of synchronicity relating to a hypertime base. For simplicity of exposition, those methods are, at various points, described herein using the term "realtime" in this second sense, and the relevance of those methods to synchronicity in hypertime is meant to be included as may be appropriate to the context. For example, unless indicated otherwise or clear from context, methods described as relating to realtime trigger streams can, in various embodiments, be applicable to trigger streams operating with reference to any appropriate time base, including the virtual time bases of hypertime.

Consistent with this, EPG functionality is currently grafted onto advanced TV as a different kind of element, one that is not a stream (and does not contain streams) but which can point to a stream. In terms of hypermedia, however, EPGs are just compositions of resources: EPG functionality is just a link from a resource, resources can be streams or discrete, and such links are essentially the same whether they come from streams or from discrete resources like text.

Thus, in principle, any suitable set of hypermedia resources could potentially serve a program selection task, and thus could serve as an EPG. Continuing in this spirit, it will be further understood that the basic program guide functions might extend in a variety of dimensions beyond the currently common embodiment of an EPG, with typical emphasis on a time-channel grid of programs. Such extensions might include various structured listing formats based on genre or personal interest categories, less structured hypermedia formats (e.g., flexible graph structure formats), formats that integrate with media asset management/library/archive system functions, including assets stored locally, such as in a media server, and those stored remotely, such as in a VOD service or on the open Internet, formats offering advanced recommender and agent services, viewer-community-generated guide/selection/rating information, and the like. Further, the entire open Web might be employed as a program guide. Unless stated otherwise or clear from context, the term "EPG" will be meant to be inclusive of any electronic data structure that provides a program guide function. Thus it should be understood that all of the methods and embodiments described herein for ITV or hypermedia browsing are meant to be inclusive of any form of EPG application, and of any other particular application of hypermedia.

System and Communications Configuration Alternatives

According to embodiments of the invention, the specifics of the communications among coordinated devices may vary depending on the available and installed network technologies. As described, it may be desirable that embodiments be based on full-function home networks, conforming to standards such as UPnP and HAVi or the like, and using systems that include (or are modified to include) software support for the methods described herein. These networks may offer open and potentially universal connectivity, along with rich support services, and such systems can exploit that connectivity to provide the desired MMUI capabilities, as described. Unfortunately, wide use of such network solutions may not be readily available due to technical and business constraints, and alternative configurations may be needed to provide the desired MMUI functions. A variety of representative cases and methods relevant to ITV services are outlined in the section just below, and it may be apparent that similar methods can be applied in other variations.

Figure 7A:
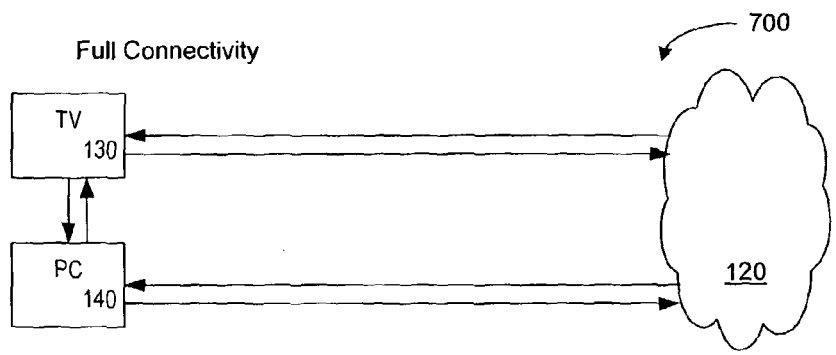
FIGS. 7a, 7b, and 7c are a set of block diagrams of exemplary alternative communication configurations in the assemblage of FIG. 1.

Referring now to FIG. 7, therein is a schematic abstracting elements of FIG. 1 which may clarify some typical application environments with regard to the connectivity that may be preexisting or added in certain embodiments of the invention. FIG. 7a depicts a case of full, bi-directional connectivity such as might be typical in an embodiment based on a digital cable service to and from the TV 130, a HAN or other local connection between the TV and PC 140, and full network 120 connection to and from the PC. Network 120 may be, for instance, the Internet and/or any combination of networks that might interconnect bi-directionally, including the Internet 124, wireless network 126, cable, or other content/connectivity 110. The local connection might be pre-existing for various reasons, or added to support the methods described herein. For sake of simplicity, optional local storage 160 is not shown in the figure.

Figure 7B:
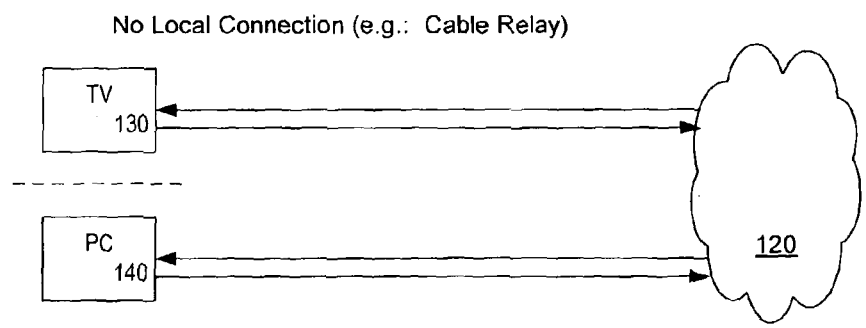
Figure 7C:
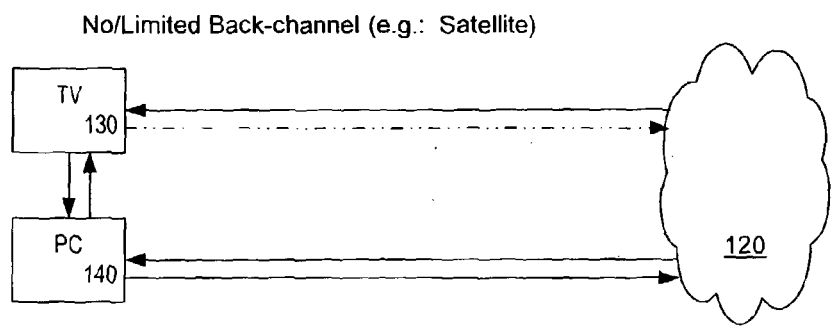

FIG. 7b depicts a case in which the local connection between the TV 130 and PC 140 is lacking, as may be common in many homes at present. FIG. 7c depicts a case in which the back-channel from the TV 130 to the network 120 is lacking or limited, such as, for example, by being intermittent and/or costly, perhaps in terms of connection establishment, duration, bandwidth, and/or reliability. This may be common in current DBS satellite systems, older cable systems, or traditional broadcast TV systems, such as those using a dial-up back-channel. These alternatives are relevant to selected embodiments described herein, and based on those examples, similar methods applicable to other variations will be apparent to one skilled in the art. For example, one such variation might involve the use of a remote path in one direction, and a local path in the other, such as in the case that state control messaging from a PC to a TV is conveyed remotely, but state information from a TV to a PC is obtained locally, or vice versa.

Consideration of alternative configurations can be viewed in terms of at least two dimensions of variation, one being the hardware, software, and communications configurations of the relevant systems to be used to effect the MMUI at the user location, and another being the nature of the hypermedia or ITV service with regard to how resources are organized and accessed. Details of what state is needed and how it is transferred may vary somewhat from case to case. Further, in some cases, common access to resources by all cooperating systems may not be a standard capability and may require special support or work-arounds.

With regard to base TV and video content resource sourcing alternatives, some possible cases include:

TV: Sourced through the TV source (such as currently intended for TV use)

IP: Sourced from the Internet (such as currently intended primarily for PC use)

Stored: Stored forms on disk, DVD, DVR—generally follow similar patterns to original sources, but may introduce additional issues Flexible (parallel-source): Proposed herein as combined sourcing through either the TV source (broadcast, cable, satellite, etc.) or the Internet, as well as possibly also on stored media, and preferably designed to be used on either TV or PC—this may include IP streams within a DTV/DVB context.

With regard to enhancement content resource sourcing alternatives, some possible cases include:

TV: Sourced through the TV source, intended for TV use

IP: Sourced from the Internet, intended for PC use

Stored: Stored forms on disk, DVD, DVR, could follow similar patterns to original sources, but being stored may introduce additional issues, such as loss of live interaction with others Flexible (parallel-source): Proposed herein as combined sourcing through either the TV source or the Internet, as well as possibly also on stored media, and preferably designed to be used on either TV or PC.

The sourcing of the base TV or video and the enhancements may be common or mixed. One mixed case is that of TV sourced video with Internet (IP) sourced enhancements. It should also be understood, that the line between TV and IP sourcing can blur when IP is used within a TV distribution infrastructure, such as embedded into MPEG streams, or in DOCSIS, or the like. For purposes of applying the methods described herein, key variations relate to whether both kinds of content resources are directly accessible to all systems being coordinated, and if not, whether one is to be relayed to another, or the systems may be limited to presentation of only the resources they have independent access to. For example, current two-box ETV service offerings represent a case where the video is generally viewed only on the TV system and the enhancements are generally viewed only on the PC system, unless the PC is configured with a TV tuner as a PC-DTV combination system, or the TV is configured with Internet access and a Web browser. Various combinations of the methods described herein can be used to add increasing levels of coordination to such offerings. It may be desirable, however, to provide flexible parallel sourcing, by making equivalent enhancement resources available via both the TV signal and the Internet.

It will be understood that the form of the state record and how it is created might also take many alternative embodiments, depending on what data is most readily obtained. For example, in some cases data might be obtained in terms of channel tuned to, along with information on other viewing controls such as time-shifting that govern what content is viewed. In other cases, data might be obtained from the playing of the program itself, such as from identification data received in association with the program and/or from data sensed or recognized within the program. Such identification data might include, for example, any of the identification data noted above.

With regard to the hardware, software, and communications configurations of the relevant systems at the user location, some representative possible cases include:

ClosedSTB: A proprietary and closed STB without special provision for obtaining state information and with constraints on modifying software to add MMUI functions (typical of current STBs)

OpenSTB An open STB (or advanced TV) that offers all STB functions and allows coordination functions to be included with flexible linkage to PCs via gateway capabilities (possibly as a third party modification), such as an STB conforming the OpenCable specification and including its POD module capabilities, or the like.

CooperatingSTB: A closed STB that cooperating operators and vendors may permit to have the same coordination features as might be provided in the open STB LiberatedSTB: A combination of a closed STB with external facilities to extract or duplicate state information to support MMUI coordination, possibly without any cooperation from STB manufacturers or system operators ControllableSTB: A closed STB with the addition of signaling terminations for remote control signals to facilitate relaying of control actions, and for non-composited video-out and enhancement-content-out to facilitate relaying and filtering of content. (Such a case might be desired by system operators to facilitate external provision of the coordination function, without risking compromise of access controls or software integrity.)

PC-DTV-Open: A PC that drives a TV, with OpenSTB function, which can be used as equivalent to OpenSTB, but can also provide full PC function directly integrated with TV functions, allowing a centralized coordination embodiment (PCTV-Central)

PC-DTV-Closedout: A PC that drives a TV, but which (lacking OpenSTB with POD module features) cannot receive encrypted cable or satellite services (except as slave to a separate STB) (typical of current PC-DTV systems)

Coordinating-Remote: The usual dedicated remote control could be replaced by a PDA (or tablet or other PC-like device) that has IR (or other suitable) signaling capability and is programmed to act as the remote, thus allowing integration of the liberator functions with the remote control and optionally with the target PC/PDA device (i.e., itself or another device).

DVR/Gateway-Controlled: In TV configurations with a DVR or full-function gateway, the primary control of video viewing may be from that external device, allowing the coordination function to be placed there, as described above.

Issues in selecting among such embodiments involve a wide range of technology, business, legal and regulatory issues, especially with regard to the tight control currently exercised by system operators over the STBs that connect to their services. Embodiments may be highly dependent on their decisions (and the level of their continuing power) in this complex business/regulatory environment.

It will be apparent that the suggested capabilities of the OpenSTB, CooperatingSTB, and PC-DTV-Open configurations can readily support the addition (primarily in software)

of methods of providing MMUI coordination functions described above both for unrestricted broadcast TV, and with full access to closed cable and satellite systems using the conditional access features of the STB or an associated POD module-type device. Such access to cable and satellite service resources may be highly desirable to a commercially attractive ITV service. The DVD/Gateway-Controlled configuration is also readily extended to coordinated use, again primarily in software. As noted previously, while discussion herein general follows the conventional split of functions between TVs and STBs for simplicity, embodiments of the present invention are meant to apply to alternative distributions of function between such devices, including cases of integrated TV/STB devices. Such functionality might, in some environments, involve duplicative functional capability in both an advanced TV and a STB device. In such cases, even if the STB is not open, intelligence and network facilities in the TV receiver or monitor might, in various embodiments of the present invention, be applied to support some or all of the coordination functions described for the OpenSTB configuration in a substantially equivalent manner.

The LiberatedSTB, ControllableSTB, and Coordinating-Remote configurations are representative of new hardware configurations and associated methods that provide alternative ways to obtain a range of more or less similar functions using current or future equipment that constrains access to signals, resources, state information, and controls. These methods generally involve measures to:
- intercept control inputs and/or other sensible indications of state from the remote control to the STB, and inject emulated remote control signals to the STB
- apply logic to model the state of the STB based on the available signals, in order to drive the STB export/import function
- optionally, obtain program content signal outputs from the STB and relay them to the external device set.

Such external methods can provide the functions that might have ideally been built into the STB. The objective is that they do not impede the function of the STB, but add intelligent communication and coordination functions that the STB does not provide for itself. One class of these methods, represented by the LiberatedSTB, is based on use of an external device that intercepts signaling from the remote to the STB, such as by using IR sensors and lamps placed near the STB, much like for current VCR commander cables from STBs or Cable commander cables from VCRs. Serial cables may also be usable as a control input to the STB, as can HAN connections. IR input directly to the STB could be shut off (such as by physical masking) to avoid uncontrolled signals. The liberator device could have sufficient intelligence to model the state of the STB, at least with regard to the current channel being viewed, and possibly also other control details as well, and to communicate that state to the coordinated device set in either push or pull mode.

That forwarding might be by IR, wireless, or other suitable means. Similarly, the liberator device could be responsive to interpret requests from the coordinated device set to issue IR, or serial, or other control commands to the TV/STB, such as to change channels or control trick play functions or other advanced features, as appropriate. Given that signaling failures might cause some loss of synchronization control relay, such losses might, in various embodiments, be corrected by user re-entry of commands. For instance, the user might be cued to the need for such corrections by display of the last channel change or other control signal. It may be expected that over time, remote controls may shift from IR to Bluetooth or other wireless HAN or PAN signaling, and it should be understood that all of the configurations described as relating to IR are meant to be adaptable to such signaling, and as will be apparent to one skilled in the art, they may be somewhat simplified as a result of the greater flexibility and ubiquity of such network connectivity.

Figure 10:
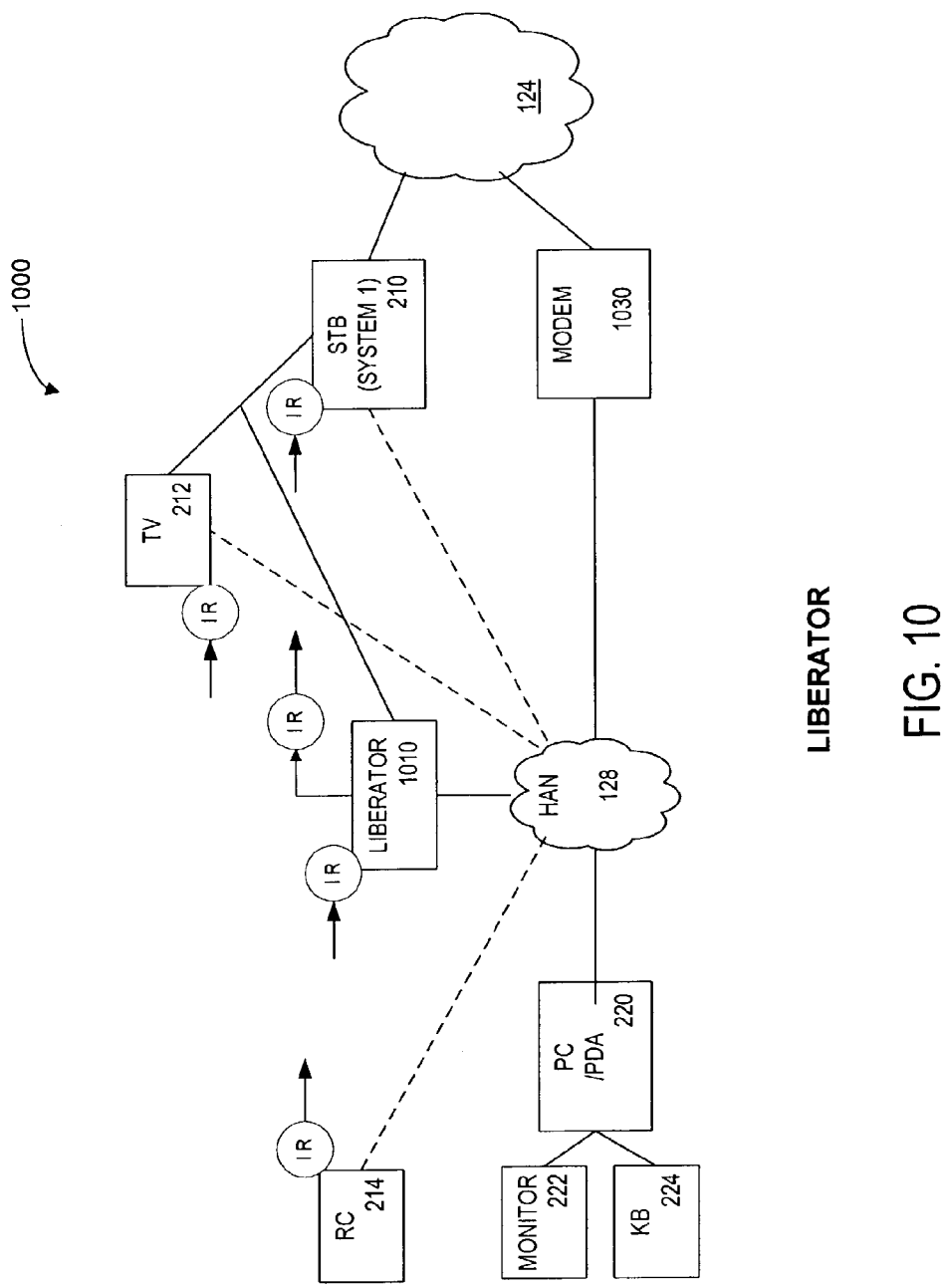
FIG. 10 is a schematic diagram of an exemplary LiberatedSTB configuration.

Turning now to FIG. 10, therein is depicted a schematic of an exemplary LiberatedSTB configuration. In addition to the devices shown in FIGS. 1 and 2, liberator device 1010 is shown as connecting to the cable connection between the STB 210 and TV 212. This connection might be a conventional coaxial cable connection, and might interpose the liberator device 1010 such that it controls all signals passing to the TV, and can interrupt, modify, and inject signals to the TV 212 as desired, or in alternative embodiments this might be a passive connection, such as using a T connector, or absent. Also shown is HAN 128, as distinct from Internet 124 or other wide area network. Depicted is an exemplary current common configuration wherein a HAN (employing, perhaps, 802.11) is linked to a wide area network (e.g., the Internet 124), and wherein the two sub-networks are linked via a modem 1030 (e.g., a cable modem, a DSL modem, or a dial-up telephone modern).

For simplicity, STB 210 is shown as connected to the Internet 124, instead of the perhaps more common linkage via, for example, specialized cable or satellite network protocols and facilities. IR input and output connections are also shown and indicated by the direction of the arrows. These include an output for remote control 214, which conventionally drives control inputs at STB 210, or alternatively at TV 212. The liberator device 1010 is shown as having an input for tracking the signals from the remote control 214, and an output for injecting controls to the STB 210 and/or TV 212. This output might be on a cable, which might connect to the liberator device 1010 via a USB, 1394 or other suitable connector. It will be understood that a while a HAN connection between the PC/PDA 220 and liberator device 1010 is shown, this might alternatively be a direct cable connection of any suitable kind. It will also be understood that such a direct connection might be more conveniently made to another nearby device, such as, for example, a standalone or STB-bundled or DTV-bundled cable modem, and that network connections might then pass signals to and from the PC/PDA 220. Also depicted with dashed lines, as optional variations, are inclusion of HAN connections for the remote control 214, STB 210, and TV 212.

It will be understood that an alternative functional distribution for such a liberator method might place most of the coordination control logic, including that for the modeling of the SIB, in a PC or PDA or other such device—which might also be the processor device that controls the coordinating device set—so that the only hardware to be added to such standard home devices might be the IR signaling connections, which in this case might attach directly to the PC/PDA. In such case, an inexpensive adapter device having IR input and output capability and acting as a remote transducer could be employed to link such a coordinating device to the STB.

Such a transducer/adapter might be a simple cable connector, much like current commander or "IR blaster" devices (with the addition of two-way sensing and control), or might convert the IR signaling to a simple network signaling that might link to the PC or other device over a wireless network adapter. In the latter case, the adapter might be placed much like the liberator device 1010 in FIG. 10, but most of the logic might be in the PC/PDA 220. Such network signaling might conform to relevant standards for sensing and control signals such as, for example, UPnP or HAVi. Such an adapter might also have broader uses as a way to make a non-network aware device, such as a legacy TV or STB, or a home audio or other entertainment appliance with IR capability, participate in a home network environment at some useful level of compliance with relevant standards for sensing and control of entertainment devices, essentially acting in the role of a proxy for the device.

Thus, such a device might act as an intelligent adapter that connects TV and other entertainment devices to PC-type devices over a HAN. This adaptation might provide proxy or gateway functions that rely on specific functional translations based on the intelligence of the adapter and known device functions, or it might be effected in a more general way, such as, for example, a network bridge that adapts at the protocol level between devices on disparate networks (e.g., between wireless 802.11 computer networks and wired 1394 entertainment networks) to hide the differences among networks in performing functions that would be supported in a homogeneous network.

It will be further understood that linking adapters similar to those just described might also be useful for other purposes, such as for distributing content from a PC or PC-like media server or storage device to a TV or other entertainment device, apart from the session transfer and coordination objectives described herein. Thus, for example, video, pictures, or audio stored on a PC might be fed to a TV or audio or home theater system. In such cases, the PC device might simply drive the TV device as a passive presentation device. It might have no need to know the current program/session state of the TV, because its only function is to replace or suspend that.

Network adapter devices might be developed and marketed with this capability of passing media content from the PC to the TV as such a passive presentation device, apart from the present invention with its bi-directional transport of session state information. Such media connection adapter devices might also have IR sensing capabilities for responding to remote controls, and might further include IR injection capabilities for controlling STBs, such as to support DVR functionality (e.g., to select a channel to be recorded).

Should that be the case, it will be apparent to one skilled in the art, based on the teachings herein, that such distribution-oriented adapter devices might also be extended for used for session transfer and coordination. Such extensions might simply require the addition of software to the adapter device to provide the added communication services that might enable the network connections provided by the adapter to be used for exchange of state information, preferably in either direction. In some embodiments, the necessary basic network transport functions might actually be present in such a product, and need only to be exploited by suitable software in the PC and TV to export and import state through that lower-level network facility.

For example, in the case of a TV/STB or other entertainment device that supports remote command and control (e.g., via UPnP, HAVi, and/or the like), the PC might simply use those command and control features to read current states and to coordinate its own sessions and alter the TV sessions accordingly. In the case of a less capable TV/STB, the adapter might monitor remote control signals from the TV remote to detect channel changes, and might also be caused to insert commands to the STB, as described above. In such cases, software might need to be added to such a media play-oriented adapter to add these desired control functions, or it might be possible to piggyback on similar functionality that might be provided to support standard DVR control functions. In other cases, addition of an IR blaster to support command injection might also be required. Depending on the openness of the software environment provided by such products, and on the presence of connectors, such as 1394 or USB or the like, such additions might be suitable for aftermarket upgrades that can be installed by consumers.

It will be understood that other devices that might be employed in homes in conjunction with televisions might also provide a useful base for providing the functions just described. These might include, for example DVRs, gateways, game machines, home theater controllers, and the like. The case of a DVR/Gateway is described in particular, below. A game machine might become interesting for such use, for example, in the case that the machine has a tuner or equivalent facility for accessing TV program content that might pass through it from STB to TV and a connection (e.g., an Internet connection) that can link it to the PC/PDA to be coordinated. Such a configuration might then be augmented with software, and possibly the addition of an IR output suitable for controlling the STB, to provide the liberator functions described above.

Other methods might also be usable to capture state information, potentially including any kind of sensor that can obtain information that can be used to determine a current channel or program, or to recognize any actions that change such selections. Such methods might be based, for example, on data intended to identify a program, or on data or features that are characteristic of a particular program. Examples of the former are identification coding methods, such as those listed above, and might include NIELSEN AMOL data in the VBI, or V ISAN or other digital metadata. An example of the latter is monitoring of the sound or image or light from the TV to recognize a current program or ad.

For example, the content-based ID technology used for broadcast monitoring of the airing of advertisements by specialized services for advertisers, such as, for example, AUDIBLE MAGIC or IDIOMA, might be adapted to use within homes. Another alternative is technology of the sort used by SHAZAM to enable cell phone callers to have a currently playing song identified, even in high noise environments such as bars. Such methods might be adapted to use a microphone connected to the user's PC to capture the current program audio, convert it locally at the PC to a signature based on attributes of the sound pattern, and send it to a central portal or other server facility for determination of what program it corresponds to, based on searching a database of programs for the matching signature. While such methods might be applied continuously, more selective matching might, in various embodiments, be more efficient.

In some cases, such databases might be maintained for other purposes, and thus be made available for this use at relatively low cost. Such recognition might be particularly efficient, for instance, for appointment viewing (e.g., viewing of scheduled programs), since the viewer sample and the source samples would be known to have synchronization, and could be captured and compared in real time with just a short trailing window. For example, a short segment that was broadcast a few seconds ago could be compared to segments that were captured at the viewer's location a few seconds ago.

It might, for various embodiments, be preferable that such methods be passive, non-intrusive, rely only on content inherent in the program (e.g., metadata that might be included for other purposes), and/or that there be no need for cooperation in its production or distribution. However, alternative methods might, for instance, actively insert special coded signals that are designed for easy sensing and recognition into the program as it is distributed. Such coded signals might include, for example, the image coding used by VEIL INTERACTIVE for TV broadcast verification, the audio coding techniques used by NIELSEN for ratings purposes, and/or other video or audio coding or watermarking methods.

Active coding might be inserted by program producers, or by distributors, such as cable or satellite operators, or other parties. In some cases, such as possibly with the NIELSEN data, such coding might be routinely available for most or all programs, and thus effectively non-intrusive with respect to these methods. Similar techniques might be used to sense and recognize that a channel change occurred, or that a program change within a channel occurred, including program transitions relating to ads, and thus trigger further matching actions to track that change.

Examples might include a momentary silence or empty video frame that might occur when digital channels are changed or ads are inserted, or a distinctive sound or light pattern that might occur when analog channels are changed. Alternatively, such matching might be triggered on demand as a result of some user action. Another similar method might involve a passive monitoring device that can be inserted into the cable path, such as between the STB and TV, or in front of the STB, to sense video or audio or control signals that can be used to identify a current program. Such monitoring might relate to an RF or an A/V signal, for example, or to other methods of sensing patterns in digital coding.

Another example of recognition using metadata that is included for other purposes might be the use of closed caption data, which could be extracted, relayed, and matched to known programs using methods similar to those just described for recognition of the content itself. Reference databases of closed caption data might be maintained for other purposes, and thus available at relatively low cost. Such closed caption data may be included in the data stream sent from STB to the TV.

In such a case, passive monitoring could readily be applied to extract the closed caption stream, for example, by duplicating or piggybacking on standard TV receiver functions that obtain such signals, whether in a device constructed for this purpose, or in a TV or DVR or PC, or other available device. Such passive monitoring might also include extraction of associated time code data. In one embodiment this data might then be passed, via the PC, to the portal service, which might then match it with known closed caption streams to determine the program. It will be understood that this, and many of the other sensing and/or coordination functions of this kind, might also be built into the TV monitor or receiver, especially in configurations in which such monitors or receivers have intelligent processing capability.

Another method of linkage according to various embodiments of the present invention could be to use an IR receiver at the PC or PDA (e.g., the standard IR transceiver commonly included with current PCs and PDAs) to receive standard channel change and other control signals from the remote control to the extent possible. Depending on physical layout, the PC/PDA might be able to receive such signals with more or less reliability, and might use simple software to recognize the remote control commands, and thus be used to coordinate the PC session activity with corresponding effectiveness.

Various passive reflector or relay devices and/or shields and/or aiming devices, and/or other methods might be used to improve such IR communication. Employed, for example, could be active relay devices such as simple repeaters that receive an IR signal and output a corresponding signal. Further options might apply current and/or simplified enhanced versions of home automation devices, such as the devices offered by XANTECH, NIRVIS SLINK-E, and the like. It will be understood that various methods for relaying infrared or other control signals, such as proprietary schemes that run over various kinds of A/V cables, including coax, and S-Link, might also be applied, and that all of these alternatives might be viewed as various points on a device communications spectrum that extends to more advanced, functional, and standardized schemes like 1394, DVI, and HDML and network services like UPnP and HAVi, whether based on wired or wireless links, any of which might be used as substantially equivalent for purposes of MMUI coordination.

Additionally, viewers might be asked to take the further action of aiming the remote control at the PC/PDA and issuing redundant commands to facilitate coordination. This re-entry might be employed for commands that can be repeated without causing further action at the STB, such as entering a channel number, or other functions such as favorite channel. It might also be workable for commands that do have a cumulative effect, such as channel + or −, or last channel, if the remote can be aimed to not reach the STB when communicating to the PC/PDA. In this use, the coordination might be only semi-automatic, and such IR signaling might be useful for semi-automated services as described further below.

The ControllableSTB is suggested as a new class of STBs that make varying degrees of limited provision for coordination function external to the STB. This could permit STB vendors and system operators to enable coordination to occur external to their systems, with well-defined inputs and outputs and strictly limited exposure. Such a configuration is also especially advantageous for the case that enhancements are embedded in a TV transmission, and thus not readily accessible directly by another device set (such as through lack of a tuner and/or lack of conditional access rights). Outputs from such a device could include 1) detailed control event streams to allow external interpretation, modeling, and reaction, 2) TV signal enhancement trigger or linkbase data, and 3) full relay of embedded enhancement streams. A method for relay of all such data could be to convert such data to an IP format and forward it via LAN (wired or wireless), but other output signals and connector types may be used, including basic A/V or RF out signaling and use of the 1394 Fire-wire connector included on advanced STBs.

One simple form of relay is to provide a slight modification of a standard STB to open it minimally by providing intermediate outputs for use by a liberator device. The liberator could be a separate device, or integrated as a hardware or software-only adapter into a PC or other system to be coordinated. Digital TV set-top boxes are routinely equipped with facilities to connect to a TV source (typically analog or multiplexed digital QAM) and convert (tune, demux, decrypt, decode, and compose to A/V or RF output) that signal for use with a TV monitor, but do not have facilities to make that signal available in a form suited to further processing by a PC. The STB uses an internal CPU to composite additional elements onto the base video, in response to user interactivity. The box outputs the resulting composite A/V or RF, but not the base program A/V or RF or the raw supplementary data obtained from the broadcast signal. It may be desirable to enable selective pass-through of those additional elements to shield the set-top box from the interactions on the PC/PDA system, and separately apply them for the PC/PDA, so that there is no change to the base program A/V or RF on the TV (and further, to allow separate interactions at the TV). Preferably the PC/PDA interactions could generally not be passed back to the set-top box (except when a transfer to the TV is intended), but rather processed at the liberator, which could then use a separate path to get individualized ITV enhancement responses without interference to the main TV screen. It may also be desirable that the liberator could separately obtain both the basic video and the additional elements (in raw form) from the set-top box, and act as an intelligent session-sharing device for the TV and PC/PDA. (Separate interactions intended for the TV could be handled normally by the STB.)

Thus various combinations of ITV outputs for a given program that could be useful in different embodiments are 1) the standard A/V or RF output with the base program only, for basic TV, 2) a demuxed and decrypted MPEG or similar stream that could give an external liberator or other device access to the content needed for full independent interaction (which might be output to a second A/V or RF connector, or via LAN), and optionally, 3) a composited signal with the base program, ITV bugs, plus selected enhancements directed to the TV-out as an alternative output, for use when interaction is intended to target the TV (which might be output at the standard output connector). This process could be done separately for each of 1) the basic TV signal and 2) the supplementary digital interactive control content that might be coded in a VBI or DTV format, and 3) any of multiple PIP elements. Such separation can enable the user to select various combinations of output to either TV monitor or PC (via the liberator or adapter system). Thus with full pass-through, either device could enter inputs and both devices could show a common result screen. With selective pass-through, one useful setting could be for PC interactions to cause change only to the PC display, so that it could be used for interactive content supplementary to the TV program without interfering with the display on the TV.

Similarly, a liberator box could relay remote control signals to the coordinated device set using the same kind of IR or wireless signaling as the TV remote, as has been suggested above, but it may be preferable to convert those signals into an IP format for communication with the PC over the LAN (802.11, Bluetooth, etc.). This could eliminate the need for the coordinated device set to receive IR, and can also eliminate the need for such a device to send it. This is useful, whether for relay, or simply for a PDA or tablet to act as a remote control without the limitations (distance, line-of-sight, reliability) of IR signaling. Note that the use of IR signaling for remote controls may desirably be replaced by such wireless RF facilities as ultimately being more powerful, economical, and flexible, just for its conventional functionality, and this could further expand the range of devices that are readily coordinated.

A configuration suggested as the Coordinating-Remote type can be applied as a straightforward variation on any of the prior cases, one in which the function of the remote is subsumed by a PDA (or tablet or the like). Here the signaling control need not be inserted between the STB and remote control, but can be integrated with the remote control device. The task of making the PDA work as a remote follows the existing example of the OmniRemote software for the Palm. Relaying to the PDA (if the PDA is the target device), and shielding of the STB from undesired interaction signals can all be done internal to the PDA. In simple such embodiments, the only need for special support at the STB is for cases where a content signal must be passed from the STB (the TV-sourced cases), and such a device could be simpler than the ones that handle control signaling as well. If the target device to be coordinated is some system other than the PDA that acts as the remote control, then relay functions to that device from the PDA/remote could be included as for the above cases.

As noted above, the DVR/GatewayControlled configuration can be useful in situations such as where a DVR acts as the primary control for a TV system. In this case the DVR acts much like a liberator in handling the remote control and driving the STB, and is thus fully aware of and able to control the key aspects of state in a straightforward manner. The DVR can be connected to the PC/PDA device through any convenient method. Note that DVRs may in some cases be integrated with the STB, and in some such cases they may be more closed in regard to extensibility.

It will be further understood from the foregoing that in a case where enhancement data is passed from the STB through a "TV" output that is used as input to a DVR/Gateway (which, in turn drives the TV) in a form that might permit that data to be read by the DVR/gateway, the latter device might use that data, as provided, to cause those enhancements to be displayed on the TV that it drives. For example, enhancement data might be supplied encoded into an analog TV signal, such as in the VBI, and such enhancement data, having undergone any necessary unscrambling by the STB, using its conditional access features, might then be included in the VBI output intended for the TV.

The DVR might next obtain the data out with the VBI, and use it, much like a STB ordinarily would, to add enhancement overlays to the TV image that it outputs to the TV in composited form, as described above for the liberator. In cases where digitally coded enhancement data is similarly included in the output from the STB, similar use of it by a DVR/gateway might be made. It will be understood that in such a usage, a DVR/gateway, or similarly a game system, might act essentially in the role of a STB to control presentation of enhancement resources on the TV, and that such a configuration could be considered in many respects to be a case of a distributed function STB.

It will be understood, as discussed above, that such a DVR/Gateway-controlled configuration might function with high-level coordination intelligence (e.g., comparable to that described for a cooperating STB) or with lower levels of intelligence (e.g., in a role more like that described for the LiberatedSTB) where the DVR/Gateway simply serves as a convenient base for such liberator functions. Accordingly, state information could be obtained and exported at the browsing control level, such as channel setting, program selection, and trick-play command information, and/or sensed at the level of program play, such as in the sensing of program ID metadata embedded in or associated with the program currently playing.

Thus, the DVR might, for example, coordinate with the PC/PDA at the level of rich state transfer records, relay lower-level state data, and/or relay raw data to be recognized (e.g., closed caption data). To the extent that DVRs become widespread, linked into HANs, and/or made open to software additions, they might be viewed as an increasingly desirable base for such coordination functions. It will be understood that such use of the DVR as a liberator device could be possible in cases where it does not act as the primary TV/STB control device, for example, because of its capability to monitor the signal passing from the STB to the TV, however that is controlled.

An additional variation of interest involves the use of voice control, based on speech recognition, as a replacement for a conventional key-driven remote control. This can be done with portable devices such as the KASHNGOLD InVoca Deluxe, but may also be based on other devices, such as a PC using software such as AUTOMATED LIVING HAL2000. Voice activated control based on a PC could be used to drive a TV/STB, and could optionally also drive functions on the PC. Thus such a PC can provide the signaling and state management functions for the TV/STB much as described in connection with the liberator, using only a control connection to the TV/STB, such as IR, serial, or wireless LAN. All of this could be placed in a laptop or tablet configuration, but for reasons of size, packaging, physical connections, power, and the like, it may be desirable to split functions between such a portable device and a base unit, which could be another PC or a special device. Such a split could be achieved through peer-to-peer connections (preferably wireless), or using a client/server or I/O terminal structure, such as ones like those discussed above in connection with intelligent monitors or tablets. Such a PC-based coordination method could be used with a conventional remote as well, by linking the remote to the PC instead of the TV/STB. That could be somewhat awkward with regard to the limitations of IR signaling, but could be more suitable for a remote using other wireless networking.

Given the range of embodiments addressed here, some review of key aspects of the basic methods may be helpful. Provided that content and control signals are obtainable as described for each case, the common task remaining is the higher-level control logic that implements the exporter/importer for the STB. (The import/export at the other, computer-type device set is largely independent of these variations.) This requires modeling of the state of the STB, as a surrogate for direct access to its internal state. A state model is maintained by keeping track of all control actions, and applying them to a state machine model that simulates relevant aspects of the logic used by the STB to present the basic TV and enhancement content. Such models can be created for each STB type and each ITV programming/sourcing format. This logic can be placed within the liberator device, or can reside remotely at the target system. The latter may be preferable in terms of hardware cost, and availability of software and network resources to facilitate programming and support. In that case, the liberator acts as a simple peripheral device that relays control signals under the control of coordination software in the target system that manages the control of both device sets.

Granularity issues also apply much as described previously. Coarse-grained embodiments that only permit migrations at a few well-defined interaction entry/exit points are simplest to accomplish, and may be best suited to the constraints of a liberator embodiment. The mixed access case of TV-sourced base video plus IP-sourced enhancement resources could reasonably involve limited support for interaction at the TV/STB, so the granularity might be correspondingly limited. The simplest such cases could just pass the current channel and optionally an activation signal when interactive functions are desired, and could also optionally add relay of TV-sourced trigger events.

It should also be noted that coordination with regard to EPG content (which might be carried in the VBI or DTV broadcast or sourced separately) is particularly simple because of the well defined and limited functions required and its limited, fixed points of coupling to the TV content, so shifting those functions to an alternative device set is simpler and might be done apart from the more general coordination functions. It is further noted that, in certain embodiments, enhancements and/or other content linked from EPG listings and/or associated advertising content might also be handled by the methods already described. Thus, for example, the EPG might be viewed on the TV and the enhancements on a PC, the EPG, itself might be viewed on a PC and activate primary program viewing on the TV, but enhancement viewing on the PC, or any other combination of targeting that might be desired at any given time.

An alternate embodiment of the communications required for basic coordination that may be desirable in the near-term is to do this through external WAN communications as noted earlier. This may be particularly relevant to early acceptance of ITV to finesse the problems and delays of funding and completing installation of more advanced systems. As depicted in FIG. 7b, many STBs currently installed are not connected via a LAN to alternate device set candidates such as the PC, but these systems can, instead, be linked via a remote location such as a head-end. These STBs may already have software capable of transmitting current channel and other key viewing event state information to the head-end, such as to enable tracking of viewing, use of services such as VOD and PPV, and targeting of advertising, and are addressable to identify the specific STB device. In that case, no new deployment may be needed, and all linkage and processing needed to provide state record assembly and transfer could be accomplished at head-end server locations. Should that software not be in place, it should be relatively simple to add it as a software-only upgrade to the existing STB devices, perhaps using standard software download/install capabilities. Such externally mediated transfers might be most easily accomplished as pull transfers, but addition of simple software functions at the STB (again, possibly using existing, installed hardware) to support activation of push transfers based on simple commands should not be difficult either. At a more fine-grained level, specific link activation and arc data (including ATVEF trigger data) could be sent from the STB to the head-end for relay to an alternate device set (or caused to be sent directly from the head-end).

Such externally mediated coordination could be enhanced by value-added server functions. For example, a cable or satellite operator (or other party) could operate an Internet portal that mediated the communications described by allowing user PCs to log in to a secured account to link to the state information on the TV (for any of that user's STBs) and request pull transfers (or receive push transfers). Such a portal could have a scope that covered all channels and programs obtained through that operator's service, whether scheduled or on-demand, and could optionally include similar data on other resources, such as broadcast channels, Internet video sources, and digital movies (broadcast or DVD, or whatever), and thus serve as a primary entertainment portal for the user, and it will be understood that such an entertainment portal service could be integrated with a general purpose Web portal. Even with very simple state transfer functions (including push transfers), such a coordination method could be responsive to channel changes, channel surfing, channel swapping, video on demand, trick-play controls, picture-in-picture viewing, and similar dynamic behavior at the TV, and thus be far more effective than current "two-box" system that employ, for example, manual user entry of program-specific URLs, and wherein there may be a need to enter time zones and other data on a program-by-program basis.

Because of the sensitivity of such detailed viewing data, privacy and security of such data may be vital, and could be assured by both policy and technical measures of kinds well known for such data and Web-based services. The basic functions of such security measures are to identify and authenticate any PC user seeking access to data for a TV, and to use an access control list or similar specification of privileges to determine that the user at the TV and at the PC correspond to one another, at either an individual or family level, as may be desired, or are otherwise to be granted access privileges, with support for the case that different ID schemes and authentication methods may be used at the different device sets. It should be understood that privacy issues that would ordinarily relate to use of such personal data for unauthorized purposes, such as for marketing purposes, are not inherently applicable, because in this case the data would be relayed from the user's STB only to the same user's PC as a service to the user as data owner, and could be restricted from disclosure to any other party and not used by the relay operator for any other purpose.

Nevertheless, there may exposures that call into question the technical and business integrity of the relay operator. Accordingly, additional security might be added by restricting any external transmission of state information to times that are specifically authorized, such as only when the coordinating PC is actively logged in and enabled by the authorized user. This might normally be done in software at either or both of the PC and the STB, but direct controls could also be provided at the STB, possibly in hardware, to allow a user to shut off all such transmissions if desired.

For additional security, encryption could be used in a VPN (Virtual Private Network)-like tunneling scheme that is private to the user. In such embodiments, the user might control keys at both the STB and PC so that the portal provider merely relays transfer records without being able to read them, and all use of those records (e.g., all resultant control functions) are initiated local to the STB or PC. Thus the user at the PC could determine what viewing state information should be used to request remote resources, if any, and the portal would have no knowledge of viewing activity apart from the receipt of such user-controlled requests.

In cases where enhancement linkbase information, such as ATVEF triggers, is embedded in a primary program such PC-controlled requests to the portal could include requests to provide such triggers for a specified program (optionally with other details such as a time-position), whether as a consolidated linkbase or as a series of triggers, each of which could be pushed by the portal at the appropriate time. It will also be understood based on the teachings herein that additional security and authentication might also be provided by use of a controlled network environment, such as in the case of a cable modem that provides connectivity to the PC. Employed in such a network environment may be hardware addresses and/or IDs, and/or set ranges of network addresses, (e.g., IP addresses) that might be known and/or controlled by a cable operator or the like.

Figure 8:
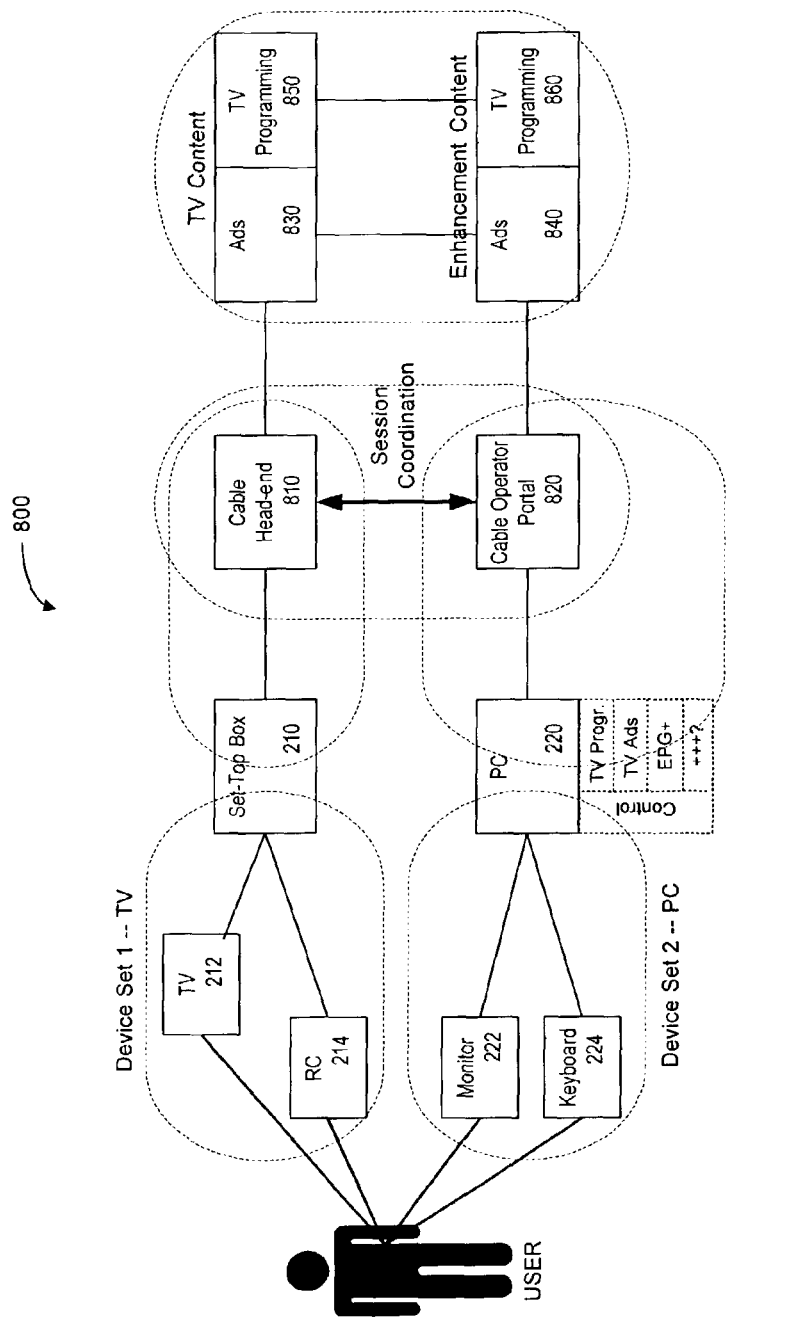
FIG. 8 is a block diagram of details of an exemplary portal facilitating session coordination linkage in the assemblage of FIG. 1.

Referring now to FIG. 8, therein is a schematic depicting exemplary elements of such a portal. Using the example of a session coordination/relay portal operated in association with a cable TV service, in this embodiment a conventional set-top box 210 is connected by cable and/or similar technologies such as HFC to the cable head-end 810, which provides access to television content in the form of TV programming 850 and/or ads 830. An independent conventional PC 220 is connected using the Internet and/or any other suitable network to the cable operator portal 820. The portal could include functions of a conventional Web and/or ITV portal, such as to access linkbases and/or starting resources to hypermedia resources, whether in a walled garden or throughout the open Web, and this might include uses to reference enhancement content resources relating to TV programming 860 and to ads 840.

Linkage between elements of the head-end 810 and the portal 820 may provide a path for the transfer of state information in either direction, thus enabling session coordination between the TV device set and the PC device set. This state transfer may enable the transfer of sessions, and the association and selection of enhancement resources in accord with the current state of the TV. Also depicted with the dotted lines, in conjunction with PC 220, are optional thick client software enhancements, including control functions, possible functions relating to TV programming and ads, an extended EPG, and/or possible other functions such as described further below.

It will be understood that this and other schematics herein may represent network paths in a linear series, for simplicity of understanding typical flows, but that any or all of those paths might use common networks, depending on the technologies and topologies available. For example, both the linkage of the PC 220 to the portal 820, and of the portal 820 to the content 840 and 860, might be via the Internet. It will also be understood that differing embodiments might distribute functions differently, with such variants being especially relevant within groupings of related functions, such as, for example, those suggested by the dotted ovals, so that the particular structure of elements depicted in this example might take different forms. Thus, for example, a rich variety of distribution alternatives might be employed regarding the allocation of functions, systems, servers, data, and the like between the head-end and the portal.

Similarly, as discussed with regard to thick and thin clients and ASP services, allocations between the STB 210 and the head-end 810 could vary, as could those between the PC 220 and the portal 820. It will also be understood that while the portal is described in these examples as being operated by or in association with the cable operator, such a portal might be entirely independent, perhaps with a path for suitable interchange of state information being provided in some way. Such a path for interchange might, for instance, be from the head-end or directly from the STB, and might be employed at the portal or the PC. It is noted that other variations are possible.

Since basic Web HTTP services are oriented to pull requests, support of push transfers from the TV and of advanced tracking and synchronization could be accommodated with more advanced techniques using HTTP or alternative protocols, such as are commonly used in Internet chat and collaboration applications, or like those used for ATVEF trigger reception. Such chat and collaboration protocols include, for example Internet Relay Chat (IRC), Short Message Service (SMS), Simple Mail Transport Protocol (SMTP) Jabber, Wireless Village, and proprietary instant messaging networks such as Yahoo!, Microsoft Network (MSN), ICQ, and AOL Instant Messenger or NetMeeting and T.120.

Similar methods have been employed in simple, program-specific telewebbing services, such as those operated by ABC and by GOLDPOCKET, and the kind of cross-channel coordinating portal services described herein might apply those protocols or variations on them, and/or might be built on top of the server and content management infrastructures used to deliver those services. Related issues of fine synchronization of enhancement resources with a base program, including techniques for frame-accurate synchronization could be addressed using the methods of those services, and/or of similar services, including that addressed in Architectural Design of a Multi-Agent System for Handling Metadata Streams (Cruickshank, Agents '01), incorporated herein by reference.

Such use of a portal to link a TV to a PC can also provide other benefits by making resources of the PC usable in conjunction with enhanced TV services, such as to draw on information from cookies and other PC-resident-data and applications (subject to suitable security measures), as described further below. This can reduce the need for information to be obtained from a user at the TV, and exploit the ability of the user to easily maintain personal profile and support data at the head-end/portal from a PC. In cases of multiple STBs in a household, such as in multiple rooms, or of advanced STBs that support multiple TV sets, including STBs with gateway functions, such relay associations could be specific to any selected TV set, and similarly, multiple such relay processes could be concurrently supported with any of multiple PCs, perhaps used for multiple TVs and/or for multiple viewers of a single TV.

Such relay via the head-end can involve transfers in either direction. In addition to state transfers from the STB to the PC, user commands at the PC could drive actions at the STB, again with simple software enhancements that can be provided at conventional STBs and head-end servers. Aside from the advanced case of general ITV or hypermedia session transfer, simpler transfers could permit the PC (or any other Internet-connected device) to serve essentially as a remote control to the STB for specific functions, such as, for example, channel changes, camera angle or other viewing option changes, PPV or VOD requests, and provision of EPG functions at the PC that control operation of the STB. This method of relay through the wide area network is also applicable to the more general relay of TV-related signals (streams) from a STB to other intelligent devices that is described below (for transmission via IP over local facilities).

Another embodiment of a relay facility is suited to a likely configuration for near-term connectivity that may precede the availability of full-function home networks. It may be expected that STBs may, in many cases, integrate with cable modems (using DOCSIS or similar protocols). Such combinations can also be expected to offer wireless IP LAN connections, using technologies such as 802.11 (a, b, g, or other variations) or others such as Bluetooth (or similar PANs). Such facilities may lack the rich HAN and gateway functions promised by UPnP and HAVi, but could enable direct local communication of STBs to PCs and other similar devices using facilities that can be expected to be in place to meet the conventional individual Internet access needs of such systems. Because the cable modem may in some cases be integrated with the STB, it can be expected that they may be designed such that IP connectivity between the two will be available (or readily added with software only). In that case, such a configuration could provide the necessary path for local coordination, allowing transfers to be pushed or pulled from the TV to the PC using this IP path.

The above discussion gives many examples of how the coordination services described herein can be adapted to a range of hardware and network variations that may be suited to current and future systems. It will be apparent that other similar adaptations can be made using combinations of these or similar methods and configurations to adapt to meet other needs and work with other configuration alternatives.

According to embodiments of the invention, the signal relay function addressed in numerous variations above is also suggestive of a more broadly useful method for extending a STB or similar TV receiver device to convert the TV signal to a digital stream, such as in MPEG format and carried using IP, that can be passed on to another system through widely available home network communications. This could be in the set-top box or a separate liberator, or in a home gateway, and could be linked by any LAN or wireless technology, such as 802.11 (Wi-Fi) or Bluetooth. For STBs lacking wireless support, the 1394 connection could be used to attach an external wireless transceiver device, and this could be a desirable way to enhance installed base STB hardware. This content may include the primary video signal, or any secondary video signal selected during an interactive session, whether an alternative live feed, or a stored video or multimedia program. This relay could be usable in support of coordinated viewing and interaction, and supplementary to the coordination of remote control interactions outlined previously, using currently available PC/PDA devices. It could also be usable in support of uncoordinated use of a PC or tablet or any other suitable appliance (including additional TVs) to access ITV programming, without the need for special hardware or direct connection to a set-top box or other broadcast TV source.

Such a single point of conversion could reduce expense in the home by eliminating the need for TV receiver hardware in alternative device sets, such as a PC/PDA. It could also reduce wide area network bandwidth requirements for access to broadcast programs by avoiding the need for video streaming over the Internet (or private IP unicast or multicast facilities) when an existing airwave, cable or satellite broadcast channel is already carrying the program. Such relay is essentially an enhanced home gateway function and could be part of the STB, or inserted between the set-top and the TV monitor, or elsewhere, and could be transparent to existing devices. It could obtain the TV signal, convert it to an appropriate streaming format such as IP, and output it over the home network to any device that wants it. Thus it serves as a central/shared receiver of TV, from a source that may be non-IP, that can convert that program to an IP format for use by other devices in the home. This uses the TV transmission plant for wide-area communications, uses a single TV receiver facility in the home, and efficiently distributes the program in IP format within the home for use by any IP-capable device. For example, using such a relay to insert a broadcast video window into a conventional Web page could be more efficient than using IP streaming to obtain the same video over conventional Internet paths (and could do so without the need for a tuner in the PC). As will be apparent to one skilled in the art, various decoding and decompression facilities can also be provided by this common receiver device, to transcode to a different compression scheme, or no compression, for local retransmission in the home, and various DRM and conditional access features can be applied to limit uses in accord with access rights.

According to another embodiment of the invention, as depicted in FIG. 7c, the back-channel from the TV/STB to the TV service might be lacking or limited, as may be common in current DBS satellite systems, older cable systems, or traditional broadcast systems. In such systems, for example, the back-channel might be entirely absent, might, be provided as an intermittent dial-up modem connection over a phone line, or might be a relatively low speed channel over satellite or cable. In such cases provision of a back-channel could be by a local relay to another system, such as an Internet connected PC.

Providing such a relay path by direct wiring or by including WLAN support on a TV or STB, or as an add-on adapter, might provide such systems with the equivalent of full connectivity for the various levels of coordination described herein through that alternate path. This could include full interactivity in one-box and two-box modes, as well as any level of coordinated mixture. In such embodiments, some set of basic enhancement resources might be provided through the direct uni-directional path to the TV, possibly for use on that device set, with additional resources obtained through the Internet path, possibly for use at the PC, but either device set might have access to any resource through the local relay path.

Sensory Mode Transfers and Heterologous Modes

Most of this disclosure focuses on cases of transfers that change the locus of work and the use of different device sets having homologous modes, but the case of changes of heterologous sensory mode may also be important and the same methods can be adapted to such cases, as will be apparent to one skilled in the art, based on the teachings herein.

For example, such a transfer might occur between a speech-based browsing segment using a phone, and a display and button-based browsing segment using a PDA or PC. A user might call by phone to check on his scheduled flight departure, find that he will not make it, and verbally request that the "reschedule my flight" link be traversed not to the phone, but to the PDA, to allow for easier scanning and booking of alternatives. Instead of re-identifying himself and the flight he wants to change, the browser could be opened to the reschedule page with that context re-established. Conversely, the user may confirm a flight on the PC, and traverse the confirmation link with the indication that the confirmation response is to be targeted to his phone, so he can run off. It is noted that the methods described herein do not require special coding of fixed alternatives at fixed points in specific resources, such as by placing explicit alternate buttons on the confirm-this-flight checkout page for: confirm to Web, confirm to e-mail, confirm to Web-phone, and the like. The methods described here instead make such options standard in form routinely available at any traversal point in a session, with full plug-and-play access to all available and suitable device groups.

It may be helpful to clarify some issues relating to emerging requirements for synchronization across multiple heterologous modes, particularly cases that explicitly combine speech with other modes, such as for mobile use. This objective has some parallels with the objectives that have been addressed herein, but might differ in that primary concerns might relate to tightly coupled, fine-grained, synchronized coordination of multiple simultaneously active heterologous modalities of input and output, and to the special issues of synchronizing GUI interactions with speech input and outputs, based on such complex mediation processes as speech recognition and text-to-speech. This might involve complex synchronization of events and browser activity and use of advanced methods to provide conceptual translation and alignment of related resources (such as speech segments and Web page text) between these very different modes. To support this, it might be desirable to develop new markup for hypermedia resources that makes explicit provisions for simultaneous use of multiple heterologous modes, creating a tightly coupled, unitary experience. Such a unitary experience might be expected to be oriented to support of a single user task, and at any given time might typically involve a single common resource, or a set of equivalent, parallel resources, simultaneously presented in multiple heterologous modes, that is correspondingly responsive to inputs from any of those modes. Similarly, ongoing navigation might be ganged so that any mode of input applies to all active heterologous modes in parallel.

Thus in MVC terms (as described below), the tightly coupled heterologous modes might present multiple views of a single common or replicated core state model, linked by tightly coupled or fully integrated view controllers. In contrast, homologous device sets differ to some moderate degree in adaptation, relating to issues such as display resolution and fineness and richness of input controls, but are inherently similar in operation and in their presentation of hypermedia resources. The markup methods addressed herein are directed primarily to this case where alternative homologous device sets might be used in sequential sub-sessions or with limited simultaneity, creating a loosely coupled experience supporting related but disjoint activities or tasks. Such disjoint, loosely coupled experiences are supportive of multitasking (or task transitions) by the user, and at any given time might typically involve different (and non-equivalent) resources at the different device sets, which might have varying levels of correlation and/or linkage of activity depending on the user's task, navigation path, and work style, and in which inputs relating to a given task and/or sub-session are typically restricted to the device set presenting the resource that addresses that particular task (apart from commands to transfer a session activity). Similarly, ongoing navigation might desirably have an affinity to one given device set unless stated otherwise. Thus in MVC terms, the loosely coupled homologous modes might present largely independent views of disjoint, but typically more or less correlated, state models, using what might be logically separate view-controllers. Nevertheless, the UI methods taught herein and the UI methods that might be developed to support that kind of tightly coupled and heterologous multimodal sessions could be adapted to align with one another, and, as will be apparent to one skilled in the art, many of the methods taught herein could also be applicable to those objectives as well.

According to embodiments of the invention, methods relating to heterologous multimodal browsing might further involve use of a browser architecture that could be based on a single, central MVC model of interactions that could be used by multiple browsing view-controllers, and which would thus be unlike common browsers. Such a method might employ techniques used in some fully synchronized collaboration systems.

Alternately, the methods that have been described herein might be employed, for example, as add-ons to conventional browser architectures. Such embodiments might not require a single central model, although one could be employed if desired. It is further noted that the event stream simplification strategies described below could also be beneficial to such heterologous multimodal browsing.

The methods described here are for the most part not specifically oriented to context-aware applications, except with regard to current browsing activities as a context, but it will be apparent to one skilled in the art that they can be useful in such embodiments, and can be extended accordingly. The methods described herein have been described primarily with regard to aspects of context (state) that are internal to one or more systems available to a user, with some limited input and inference regarding the user's intended device set usage and task characteristics, and how to exploit those systems and that state information to provide coordinated application functions.

Naturally, to the extent that more extensive external context information (such as from sensors and physical objects and/or from other knowledge of the viewing environment and user behavior) and corresponding application support functions are available, these methods will generally be applicable to those state data and functions as well. For example, sensor data on the movement of a user might be used as a cue to transfer a session from one device set to another, and more specifically, this might include cases such as pausing a session if a user gets up from his seat, or transferring/activating an enhancement session if a user reaches for a tablet. Some further aspects of the invention that draw on awareness of external context, such as the use of such data as a surrogate for direct access to state information, are described below.

Model-View-Controller Embodiments and Event Stream Simplification Methods

The methods just described apply equally to conventional browser designs, and to possible new designs based on a model-view-controller (MVC) architecture that separates functions in terms of an underlying model, which encapsulates application state and includes the hypermedia storage layer, a view that presents that to the user and obtains inputs, and a controller that defines behavior and responds to user interactions with the view to cause changes to the model. Such architectures may simplify support for features such as device independence and collaboration, as well as multimodal features, by isolating such issues from the model.

The variations described earlier relating to multiple systems and independence of systems and browser instances apply to MVC architectures as well. MVC designs may provide for coordination of complex and distributed multi-device-set and multisystem browsing based on coordination or synchronization of separate model instances, in which each instance contains state information for the device sets and processes it supports, or alternatively by using a centralized model that contains all state information, as the driver for all views and controllers. In the case of the centralized model, as for the single browser instance, coordination is relatively simple. This can also be thought of in terms of a single centrally controlled application program.

For the case of distributed models, just as for multiple browsers and independent systems, the coordination requires more attention. Reviewing the methods described herein in terms of MVC concepts is useful, both to clarify how the methods apply to an MVC architecture and to further clarify the conventional case. Two alternatives are that the exporter/importer/tracker be built as 1) an adjunct to the model that performs exports and imports in support of transfers to other models (essentially the case already described), or 2) alternatively as a mediator that intercepts (or mediates) controller actions as state change events, and broadcasts them to other coordinated models. The first can be done essentially without any preparation prior to the transfer request, as an ad hoc collection and export of current state data from the browser (the model). The second involves ongoing collection of the event stream that drives state changes as they occur (which can be more or less independent of the internal structure of the browser/model), but which may be limited in its ability to transfer all state information needed to perform sufficient input re-feed to correctly initiate a synchronized replica, to the extent that the collection process is not started prior to relevant state-change events (at least those that are not fully reflected in the hypermedia storage layer). Thus the second may be architecturally cleaner, but may require enabling tracking well before any transfer, which can be problematic in terms of performance and usability. Both of those alternatives can be applied to either MVC or conventional architectures. Both involve an export/import activity, the first being essentially a consolidated batch export/import of all relevant state at once, the second being an event-by-event approach. The methods described above allow the burden of full logging of all events to be reduced by limiting state export/import to the aspects and times needed for transfer of work locus when requested. Thus all models need not be synchronized at all times (which is unlike the case for collaboration or for fully simultaneous use of multiple modes). Further detail on these state tracking simplification and reduction methods is provided below.

Features and Functions

As noted, these methods may be applied with a variety of triggering conditions, hypermedia systems, user system architectures, and form factors. Details of user interface, link arc coding, presentation and implementation may vary accordingly. Some of the features and functions include:
 Communications support and device set management—types, discovery, grouping, and standards
 Coordination control center
 Alternative transfer activation/deactivation control methods and standing sessions
 Asynchronous transfers, retention of transient links, and simplified transfers
 User controlled targeting during browsing
 Link attribute controlled targeting for authoring/production
 Priorities and preferences for managing device set use
 Source and destination session behaviors and synchronized tracking options
 Congruent behavior of independent, dependent, and centralized systems
 Transactions, editing, cookies, and peer/server state
 State tracking simplifications
 Security, privacy, and digital rights management
 Hypermedia edit applications
 Venue/kiosk-based coordination
 Flexible and deep integration with other applications
 Sensory mode transfers
 Virtual and augmented reality
 Revenue models
 Comprehensive framework for MMUI browsing
 Deployment staging considerations and alternative approaches
 Additional aspects relating to advertising and commerce
 Further aspects of multi-channel MMUI services
 Broader aspects of multi-channel hypermedia
 Open EC linking on the Internet The following discussion explores some representative embodiments of these methods under various usage scenarios.

Communications Support and Device Set Management—Types, Discovery, Grouping, and Standards These functions and scenarios may naturally depend greatly on the nature of the systems and device sets available to the user. For convenience, classes of devices with similar form factors and technologies may be grouped as device set "families." Some representative cases include a standard across-the-room TV with a digital STB with a remote, which may be used in conjunction with a desktop PC located within easy reach. Supplementary device sets include a notebook PC or a tablet PC with a wireless LAN connection that can be used from a sofa, and kept handy on an end table. Current notebook or tablet form factors are fairly suitable for such use, and improved designs can be made more convenient, and styled for various home décor tastes. Such a high-resolution device set enables power browsing for intensive tasks. Another device set is a PDA-style form factor that is more compact, easier to handle in a casual setting, and less expensive, but also less suited to power browsing and intensive work. Such devices might be have a charging pad base unit designed for convenient nearby storage.

According to embodiments of the invention, a user may want to have an array of such options available. A major advantage of the methods described here is that they can be embodied in simple software that can be added to any independent browsing-capable system, including legacy devices, to enable coordinated use on demand. The use of modular design and standardized base level communication provides the ability to make it easy to support coordination on an open basis for any browsing-capable system, by simply adding the necessary exporter/importer and device set management software. This eliminates the need for all cooperating devices to be provisioned in common. Any devices at hand can be discovered and activated, including all systems owned by a user, as well as systems that may be temporarily available, such as PDAs, notebooks, or tablets carried by visitors to a home or other venue. Such devices need not be dedicated to a given coordinated browsing configuration and to browsing use, but can be brought into such use at any time on an ad hoc basis. Thus hardware expense becomes a minor factor, as users obtain various intelligent devices of various form factors for other purposes. Most households can soon be expected to have a rich complement of computers including desktop, tablet, PDA, and cell phone form factors, and any of these can readily be made capable of coordinated browsing use. As coordinated browsing becomes common, families may wish to acquire special living room or den-oriented tablets that might stay on the end table for more or less dedicated use, but that is not necessary. A bedroom system may be used more casually, so a smaller PDA-like device may be preferred, as might be the case in a car, as well. New designs might provide for furniture with built in devices, such as seating with tablets that pull out of an arm, like an airline bulkhead seat or lecture hall fold-away tray, or end tables with hide-away or swing-out devices. Other form factors may also appear, such as special glasses with heads-up display.

In considering device set groups for an ITV system, for example, one group may be the ITV system alone, a second group might be the ITV system with a specific portable notebook PC, and one might be the ITV system with a specific PDA. "Generic" groups could be definable as consisting of families of devices of a given form factor, with specific device sets assigned to corresponding generic groups. This can simplify control and adaptation, such as with regard to preferences and default behaviors, allowing a level of generic specification that is common to all device sets of a given class, with a further level that can be specific to a device set. Thus any similar tablet, for example could be handled on a similar basis. Groups may be defined as overlapping and having common members, so for example an ITV-centric group could define the ITV system as a primary device set and a PC laptop as a secondary device set, but the same devices could also be members of a PC-centric group that defines the PC as primary and the TV as secondary. The same PC might also be primary or secondary in one or more other groups that might have a PDA, and be used without an-across-room TV. Similarly, device sets may be grouped into subset or variant cases that facilitate adaptation to changes in the presence or absence of specific devices within a device set. This can be useful for example when a tablet may be used with or without a keyboard. Such a structure provides a rich basis for setting preferred and default behaviors that can be invoked on a task-appropriate basis at different times, and that can serve as a context for targeting actions by the user and for coded targeting controls set by authors, producers, or distributors of hypermedia resources.

Coordination Control Center

Some embodiments might also provide for a control center application to package and organize support of coordination functions. This might include access to the various setup facilities, such as for managing device sets and groups, and for generic viewing control and support functions. Such services may be implemented for each participating system. Such services could be provided on a coordinated peer basis, so that no system was dependent on any other single system for these functions, but alternative embodiments could be based on a central master system for a defined scope of systems and services. Coordination of these services could be through any suitable protocol, including the use of the central master system and database, or any peer protocol, and can be based on distributed storage local to each device, or some use of shared storage at a local or remote server, including use of SANs or NAS.

According to embodiments of the invention, viewing control and support functions might include services as an entertainment portal, EPG, DVR-style library or archive manager, and the like, whether provided locally or remotely, and whether integrated into one package or service, or composed of various linked services, such as might be composed with Web services. Implementation on a PC might be as a local application (preferably cooperative with the browser), or as a remote ASP service, possibly enhanced with a browser accessory, applet, and/or other component (e.g., FLASH) that provides selected local functions. This can provide a control panel offering functions such as to facilitate access to portal features and to support a pull transfer from a TV or other active device. Such a facility could also provide browsing controls that integrate with the browser for MMUI use.

Alternative Transfer Activation/Deactivation Control Methods and Standing Sessions Also desirable may be the ability to control targeting by simply activating or deactivating a device. If so indicated in the device set preferences, one way to transfer a session in some cases, such as from a TV to a designated enhancement device set, such as the tablet at the sofa, could be to simply power on the device. The device could join the network, check its coordination attributes (which may be self-contained or obtained from a network source), determine that it is to seek transfer of enhancements to the current TV program (or initiate a new enhancement session associated with the simple video session) on startup, and initiate a transfer pull request accordingly. Thus a user could view the current base enhancements (such as a menu of current selections) for the current TV program simply by pulling out the tablet. In some embodiments, such an activation might transfer an enhancement session already in progress on the TV, transferring its more rich state, and with preset options for the disposition of the transferred session on the TV. Similar simple controls can also be offered for use of a PDA in coordination with a PC, or for other combinations.

According to embodiments of the invention, corresponding options could also be set on deactivation of a device, such as to automatically transfer a session before termination. For example, it might be desirable to return an active enhancement session to the TV on deactivating a tablet device. Further options might push state to another device set, or to some intermediate caching storage or session proxy system or repository, in a ready but inactive mode, allowing the other device to activate the session at some future time, even if the originating system is unavailable, in what can be considered a pull from cache. By using a session cache proxy in this manner, a session can effectively be swapped out and held in limbo, with no active device sets, until a user requests that it be pulled and activated at any capable and authorized device set. Such a feature can also be useful as a standard browser feature for saving and restarting sessions even for a single device set, whether using an external cache, or one internal to that system, to provide functions far richer than current bookmark capabilities.

A related feature might also be desirable is a similar push transfer (via caching proxy) capability to trigger activation of a target system from the originating system, if the target system is not currently active. This might be desirable to simplify transfer to a device not yet ready, especially in cases such as for a time-specific link that might not be directly actionable by the time the new device was ready. Such a push could be completed when the intended target system was activated and became accessible.

An additional feature is that of a standing coordinated session, such as for a tablet that is routinely available for use with a TV. Settings could provide that the default for this device is for it to maintain a simple enhancement session with whatever TV program is active, and automatically present the main menu or home page associated with that programming (possibly changing with time-position) to serve as an always-ready interaction device. For such a case coordination could be maintained to allow this standing session to maintain awareness of selected state changes on the TV, notably when a channel change occurs. To support that, it may be desirable to provide a limited event tracking mode (based on a bifurcation of base video versus enhancement activity), in which only channel/program change events (and optionally additional elements such as, for example, pause and other VCR-like trick play actions, and/or ATVEF triggers) are transferred. Similar standing sessions could be provided, separately, or in a presentation additional to the program related session just noted, to present generic information from a portal service. Such a second-screen service may be more attractive to viewers than the method proposed by some ITV services of "force-tuning" the TV to a portal screen at power-on.

Note also that the related concept of standing enhancements that are always available from a default source, which source may be defined by a well-known convention (whether or not a standing session is activated), represents an advance from current models in which enhancements are not assumed to be available unless a specific indication is given. As ITV develops, an expectation of enhancement may be the rule, not the exception, even if the default enhancement is quite limited. This goes beyond the idea of always-on enhancements, and the use of virtual channels to create generic portal or walled garden services, to include dynamic, program-specific resources. It may give the effect of a special virtual channel or portal that may be dynamically associated with each of any or all programs.

Asynchronous Transfers, Retention of Transient Links, and Simplified Transfers

Building on the above methods, the ability to defer a transfer to a future time will now be discussed. Such functionality could allow a user immersed in a current program to initiate transfer actions that could be held in a pending state, so the user could continue viewing the current program without further interruption, and attend to the transferred activity at some more convenient time in the future. Such features may be particularly attractive to program providers who wish to avoid loss of their audience to tangential activity. It will be apparent that this can be provided using the same methods and with a variety of user interface options. Deferral of any number of transfers can be accommodated by saving the transfer state records. Enabling of such deferral could be a standard feature, wherein transfers are routinely held until actuated at the receiving end, or could be indicated by command at the time of transfer. Activation of a continuation session could be automatic, as described above for power-on, by a simple explicit action to enable the next session transfer, or by selection among a list of pending transfers that may be identified by source, time, link descriptor, or any of various other identification cues that could be stored with the state record. It should also be recognized that such deferral of a session might be a desirable new feature even within a single device set, where the transfer is just over time, not across device sets, and that this is readily provided using the same methods.

Thus rich controls and information displays might be provided to allow users to view saved transfers, and to allow authors to suggest how they should be handled. Displays of pending traversals might be organized by some combination of program, time, advertiser, category, and/or other grouping criteria. Such might have transitory, time-specific character and could maintain the relationship of the link to its starting resource. This concept of flexible targeting in time might be understood as another dimension similar to that of flexible targeting in the space of device sets. Thus, the traversal of a link might be controllable not only as to which device set is targeted, but when it is to be targeted.

The methods described for user and author/producer or other control of targeting to device sets should be understood as being also applicable to control of targeting in time. Thus, for example, users and authors might be provided controls and coding methods for specifying whether link traversals are to be synchronous or deferred. Further, where methods of controlling targeting to device sets are described herein, it should be understood that similar methods may be used to control targeting in time. Such targeting in time could provide for user activation of deferred transfers, and could also provide for scheduled automatic activation, such as for activation at the end of a program or segment, or to coordinate with an activation feature that schedules TV program viewing, such as might be provided with an EPG. As indicated above, a list of selected links organized in terms of factors such as the starting resource of the links could have broad utility for organizing complex browsing tasks that extend over time.

A related useful feature is the ability to save and permit delayed activation of time-position-specific links, such as for example ATVEF triggers. In current ITV systems, such links become unusable and are typically discarded once their time-scope has ended. Such links could instead by saved in a special history linkbase. A variety of user interface methods can be applied to using such saved links. One is simply to record the entire program in association with the links, to allow replay and delayed activation in the intended context at the appropriate relative time positions. Another is to provide a reduced variation of the program on recording, such a keeping only snippets of context video, or using reduced resolution video or still reference frames to provide a context the user can relate to apart from the full base program. Another is to just list the links with the context parameters, and optionally with a text descriptor which may be provided with such a link (in a manner similar to the use of an "alt=" text label that is coded in an HTML image-related IMG SRC link for use as an alternative to the image itself in case the image is not presented). To the extent that such links have a time-scope that is coded with respect to real time, they could be adapted to define their scope in time relative to a program start time or current time code or frame number, either directly or through a separate time base offset factor. Numerous variations on these options will become apparent to one skilled in the art. Such facilities can provide an effect similar to asynchronous or post-broadcast enhancements, but with added flexibility to both author and user in determining when or if such links should be available.

While the orientation of much of this discussion has been to transfer of full sessions with relatively rich state, it should be noted that it might also be desirable to provide simpler transfer functions based on simplified variations on these methods. This might be of particular value, for example, for activation of simple transaction activities, where the communication process involved in the session transfer is used to provide a more limited communication to an alternative device set, or just to a remote server. This can be thought of as similar to the case of a transfer at the start of an ITV enhancement interaction, where state is minimal, and little more than the link arc-related data need be transferred. For example, a TV program or advertisement may contain a link to enhancement information or to initiate a transaction, and the session transfer process may be simplified to simply pass on the link arc data. The receiving device set might simply provide a list of received resource links, much like a special bookmark or hot list. As noted just above, this feature might also be used at the same device set, simply as an action deferral method. In some cases, the transfer action might relate to no more than a simple user request for action by an advertiser or vendor, in which case the methods described here can be adapted to send the transfer state record to a remote server, and the state record is used as a form of transaction message, with no further action by the user required, or with simple confirmation actions only. In such a case, the transfer record might include rich user information, such as billing address, shipping address, and other personal profile data. Such a simplified transfer record can be transmitted using any appropriate protocol, including HTTP, SMTP, SMS, other message protocols, or the like. One very simple variation on this is to trigger an e-mail to the user, and such an e-mail could contain a link relating to further information or actions to be taken.

Another very simple variation could generate a Web page containing relevant information, links, and possibly forms for additional input. These relay processes could include application processing that adds transaction-specific elements, either at the STB or at a head-end server, but can also be limited to a standard process that simply packages link arc data and sends it to the PC or any designated alternate device set (with only a basic relay involvement at the STB and/or head-end). This pure relay process could avoid the need for any application or link-specific support at the STB or head-end, and could allow an interaction at a TV to produce an effect similar to that of having clicked a link at the PC (that produces a corresponding Web page or e-mail message). Such methods can also benefit from the user identification and profile data that might be available from the alternate device set, such as in a cookie, database, or application—data that may not be readily available at either a STB or the head-end (at least not without burdensome user entry). Thus for example, a user could order an information package or product, and have fulfillment and payment details provided by the portal and/or the user's PC, with any maintenance of user data at the portal managed from the user PC. Depending on the communication configuration alternatives, as discussed above, such communications can use any suitable combination of local and remote paths. Again, such simplified coordination might either be synchronized with the primary browsing session, or asynchronous. It should be noted that this kind of simplified transfer can be useful with current low-end STBs, in communication with a head-end server, as described earlier, and that, depending on the particular type of request to be accommodated, such transfers can be routed to an alternate user device set for further action by the user, or simply acted on at a head-end server. In this way the simplified methods can effectively be used to provide a limited-function ITV service, and one that can be configured to operate on its own, essentially as a message service, independent of any more advanced browsing functions.

It should be noted that in the case of commercial programming or advertisements, an additional level of variation in program identity could be involved, in that the relation between advertisements and surrounding programs could be complex. Not only might a given commercial be used with many different surrounding programs (and at many times), but personalization and targeting might cause alternative commercials to be seen by different viewers of the same program. A variety of methods can be used to ensure that interactions associated with such commercials are handled appropriately, for example by including identifiers for both the specific commercial and the surrounding program, as well as other identification of the commercial avail slot, as part of the state information transferred, and by structuring further interactions to use that information to control the response, and possibly to forward that information, optionally with other profile information, demographic information and the like, for use with any remote transaction or other support or monitoring activities.

Again, depending on the particular embodiment, all such state information might be transferred directly from the TV/STB, using whatever path is available, or some state information, as well as other supplementary information, could be included in the transfer record as part of a relay mediated by head-end servers. Thus, for example, even in the case of targeted ads, rich interactions could be supported by using software at a head-end to coordinate with a PC, with little or no modification to installed STBs.

User Controlled Targeting During Browsing

User controlled targeting at the time of any link traversal may be desirable, as it allows the user fully dynamic control in adapting the presentation experience to the task at hand, as it changes through a complex session of interaction. The essence of non-linear hypermedia is that they branch in accord with the non-linear nature of human thinking and task flow. Needs and preferences may change from moment to moment, depending on the path taken and on external factors.

Thus, in TV-centric use, a user starting from a TV program may be signaled that relevant enhancements are available for use if so desired, or the user may spontaneously seek materials related to a program. As ITV becomes widespread, signals may not be needed to indicate general availability of enhancements, but may be desirable to flag items of special interest. Such signals may be a visual bug, as used in WINK, other visual indicators on the screen or on a device within view (such as a set-top box), sounds, or any other signal.

In any case, the user may take various paths from a TV program. He may have a quick casual interest and be content to interact with the TV system in classic one-box ITV mode, without bothering to use any other device sets. However, he may have a more intensive need, prefer richer function, or want to use a separate device set to avoid disturbing others who are also watching the TV. In that case enhancement content should be directed to an alternate device set. A likely hybrid case may be to trigger some initial interactions on the TV, such as to see a menu of current options, possibly check some EPG information or similar basic and readily requested information, and then perhaps finish or instead decide to go deeper on the PC device set. Thus desired features are to target from pure video to either the TV or the PC, and to target from enhancements on the TV to the PC. In either case, it may sometimes be desired to traverse to a linked resource on the changed device set, such as to go deeper, or to transfer the current resource to the alternate presentation device set, such as to interact more richly with it. For example, in a t-commerce application, the user may be about to order merchandise, and decide that the PC offers better function for filling out an order form for a complex item (such as a new PC).

In such usage with enhancements to a TV-centric browsing experience, it might normally be preferred that the base TV program be considered as a linked session distinct from the enhancement session, so that transfer is understood to transfer the enhancement session, but not the base TV session.

Activation of a transfer by the user may take a number of forms. One key variation is whether the transfer consists of the link actuation that opens a new destination resource, or a cloning that duplicates the current resource in the new setting, effectively cloning the existing session at the target system. This corresponds to the difference between shift-clicking a link on a Web browser (such as MSIE) to open the link ending resource in the new window, and using the File/new/new window menu selection to instantiate a new window with the same cloned resource as the current window. Similar control options might be provided to allow user control of whether a link traversal is acted on synchronously or deferred for asynchronous use, and to provide for scheduling such deferred activations.

An additional capability for TV-oriented viewing with a MMUI configuration, and readily provided using the methods described, is to offer some simple commands for swapping and altering video views using PIP (or embedded window) support. A simple command could be a PIP-flip, which for example, could start from device set A with resource 1 in full screen and resource 2 in a PIP, and causes a transfer or swap to device set B with resource 2 in full screen and resource 1 in a PIP. Variations could cause the PIP on device set A to close, and/or omit the PIP on device set B. A simple control command language or macro facility could allow addition of other similar functions by vendors or users.

A wide variety of specific UI controls can be used to provide these and other similar functions, both as standard features, and as user variable options, as discussed further below.

Link Attribute Controlled Targeting for Authoring/Production

While it may be generally desirable that the user have ultimate control of his loci of work and use of device sets and the corresponding targeting of resources, it is perhaps best left to the content creator to determine or at least communicate to the browser a recommended targeting. This may be useful to control details of targeting of individual resources within the constraints of the device sets that have been put into active use by the user, and can also be useful for activating available device sets as well. Embodiments may support both user and author-driven modes of control, as well as means for setting preferences and priorities to govern how such controls interact.

Insight into how link attributes may be used and interact with user controls can be gained from current Web browsing usage, as well as from other hypermedia systems, but broad use of ITV will likely lead to further issues and enriched features, which may be handled by straightforward extensions of the capabilities outlined here that will be apparent to one skilled in the art.

Reviewing existing practice, HTML has long had basic features for targeting windows and frames within windows. HTML 4 provides for the attribute "target=frame-target" to specify the name of a frame where a document (resource) is to be opened, which can be used in elements that create links, image maps, and forms. Frames may represent an entire window or a designated region within a window. Names can be assigned to frames via the "name" attribute. A set of reserved target names provides for generic controls, such as, for HTML 4.01:

_ blank: The user agent should load the designated document in a new, unnamed window.

_ self: The user agent should load the document in the same frame as the element that refers to this target.

_ parent: The user agent should load the document into the immediate FRAMESET parent of the current frame. This value is equivalent to _self if the current frame has no parent.

_ top: The user agent should load the document into the full, original window (thus canceling all other frames). This value is equivalent to _self if the current frame has no parent.

XLink provides for similar targeting behaviors, but with somewhat different coding conventions and terminology. Here, the "show" attribute has functions corresponding to the HTML target attribute, specifying the desired presentation of the ending resource on traversal from the starting resource. Values currently provided for include:

new: An application traversing to the ending resource should load it in a new window, frame, pane, or other relevant presentation context. This is similar to HTML _ blank replace: An application traversing to the ending resource should load the resource in the same window, frame, pane, or other relevant presentation context in which the starting resource was loaded. This is similar to HTML _ self embed: An application traversing to the ending resource should load its presentation in place of the presentation of the starting resource. This is similar to an HTML alt=attribute, as used with an image IMG SRC link SMIL provides for similar attributes, generally consistent with XLink, and the related XHTML standard. The SMIL 2.0 Linking Modules attributes include:

sourcePlaystate, to control temporal behavior for the originating presentation when a link is traversed, with attributes of play, pause, and stop destinationPlaystate to control temporal behavior for the originating presentation when a link is traversed, with attributes of play and pause.

show, much as for XLink (and serving to set defaults or override the sourcePlaystate attribute)

For SMIL target, "This attribute defines either the existing display environment in which the link should be opened (e.g., a SMIL region, an HTML frame or another named window), or triggers the creation of a new display environment with the given name. Its value is the identifier of the display environment. If no currently active display environment has this identifier, a new display environment is opened and assigned the identifier of the target." SMIL also provides for an area element that can associate a link with a spatial portion of an object, as in HTML, and with a temporal portion of an object (a time span).

None of these existing methods of using attributes have comprehended the proposed extension to multiple device sets, but based on the teachings provided herein, the details of providing such extensions will become apparent to one skilled in the art. Target attributes and special reserved names such as these are readily reinterpreted and extended to work with windows on multiple named device sets. Frame target names can be used to refer specifically to frames (or other similar designations) on multiple displays, and such names could be specified as a simple name, or in a display-frame hierarchy, such as for example in the form of "display-target-.frame-target." Alternatively, an additional attribute could be provided, such as "display=" to be used in combination with the target attribute. The special HTML or XLink reserved names might be used largely as is, with the addition of new ones such as, for example, following the HTML model:

_ altblank: The user agent should load the designated resource in a new, unnamed window (or more completely, a SMIL region, an HTML frame or another named window) on the alternate display (whichever that is, based on some set of rules for determining which is the alternate display if more than two displays are enabled).

_refblank: The user agent should load the designated resource in a new, unnamed window (or more completely, a SMIL region, an HTML frame or another named window) on the referenced, (specifically) named display.

Alternatively, a separate new displaytarget attribute could be defined, with a separate display-target name value, and with separate but similar special reserved names.

Additional special reserved names might be provided to specify alternative displays in a generic manner, such as, for example:

_TV: The user agent should load the designated resource on the TV display

_PC: The user agent should load the designated resource on the PC display

_tablet: The user agent should load the designated resource on the tablet display _PDA: The user agent should load the designated resource on the PDA display _RC: The user agent should load the designated resource on the Remote Control display _computer: The user agent should load the designated resource on the whatever computer-like display (if any) is the alternate to the TV With such names, it may also be desirable that precedence rules provide alternate mappings, so that, for example, all map to a single display if there is only one enabled, _PC and _tablet map first to one another, and _PDA and _RC map first to one another, and that all of the non-TV names map to _computer if their preferred mappings are not enabled. A list of values might also be permitted, such as _PC, _PDA, _RC, to indicate a priority sequence depending on which of several devices may be available.

Embodiments may be standardized through widely supported bodies such as W3C or others, and the details of coding conventions of the kind just described (or equivalents) could be determined in accord with the applicable standardization process.

With regard to the issue of whether to automatically activate device sets that may not already be active, it may be preferable to consider device sets as "enabled" if they have been defined as being available for use in the current device set group, even if they are not powered on or fully active at the time. In this case, additional attribute codings may be used to specify whether a device set that is enabled but not active is to be activated as a result of targeting.

As noted above, resource coding might exploit advanced markup in XHTML or similar languages to explicitly provide for variant presentation styles to different device sets and form factors. Certain embodiments might also provide coding structures for different device sets and form factors to be used concurrently, with coordinated inputs and outputs, and sensitivity to relevant events, such as based on the DOM event model, with selection of presentation styles made accordingly, such as using CSS, XSL, XSLT, or RML. Such methods may also provide the ability to detect whether a given class of device set is available or active, or becomes active, and alter the specified presentation of the resource accordingly.

Preferred embodiments could also support coding much like the "actuate" attribute that XLink provides for to communicate the desired timing of traversal from the starting resource to the ending resource. This includes attribute values of "on Load" to indicate that traversal should be immediate on loading of the starting resource, as is the case for an HTML IMG SRC link, and "on Request" to indicate that traversal occurs only on an explicit post-load triggering event, such as clicking on a link, or a timer countdown, such as for a redirect.

A further feature is to support a link coding that has no ending resource (or equivalently, one in which the ending resource was the same as the starting resource, or equivalently, the special reserved resource name "self"). Such a link might be equivalent to opening a new window with the current resource (and associated context). This feature had little motivation on a single display, but is useful in a MMUI to establish a session at a second device set, and could be used in resource coding when such action was to be recommended. One example of a use where this could be desirable is when a video sequence that contains spatial hot spots was beginning, so that an enabled tablet could be placed into session with the same video resource in order to facilitate precise selection of desired objects within the image.

It should be noted that alternative methods of specifying MMUI affinities may also be desirable in some applications. For example, instead of the method just described for embedding markup within resources, an alternative is to define a structure of resource categories or types, with specified device set targeting affinities for any resource of a given category or type. This is similar to the simple, highly structured multimedia menu and navigation schemes that were widely used for pre-Web interactive systems (and now used for some ITV systems), and while this may be less general, flexible and powerful than a markup based scheme, it may be simpler to implement and apply. For example, such a scheme might define a navigation hierarchy having base video, interactive indicator bugs, first level menus, i-th level menus, brief text pages, long and multi-page text pages, embedded video, links to embedded video, and links back to primary video, and special-purpose application screens, such as for chat or forms entry, with specifications that might have the first levels default to the TV display, and further levels default to the alternate display, possibly with links to primary video defaulting back to the TV. A table of screen associations can be used to relate types of resources to devices sets. In usage, this could be loosely analogous to the current system tables that define application associations to file types, allowing files to be opened by double-clicking them, and could add screen affinity as a similar association. The coding of such types might be standardized in accord with the MIME (Multipurpose Internet Mail Extensions) protocol, and might be defined as types, subtypes, or parameters, or it might be defined in accord with MPEG-7 using its Description Definition Language (DDL). Also applicable may be certain aspects of the iTV Production Standards Initiative Specification Version 1.0 (ITVPS), incorporated herein by reference, that was released on May 6, 2002.

The ITVPS provides an XML framework for specifying content, presentation and behavior that is intended to provide a common nomenclature for interactivity that can be used in production and content management, and support adaptation to various delivery and presentation systems. Such presentation systems may include components acting as a content logic engine. The specification provides XML schema and DTDs to define structured content types for types related to games, polls, leaderboards, and the like. These structures can specify content both directly, and by references such as URLs.

Some examples of how the above methods could be applied to control transfers in accord with a possible extension of such a specification include:

Predefined or implied type-based relationships to device sets, such as certain content types appearing on certain device set types. For instance, all polls, all games, or all leaderboards, or certain sub-types thereof, might have implied targeting such as primary-device-set polls versus secondary-device-set polls, and so forth.

Dynamic variations on such type-based relationships, such as might be defined in tables or other data structures. For example, Type A polls might be given affinity to a given device set while Type B polls might be given a different affinity.

Explicit target coding within the ITVSP XML coding, such as with coding similar to that described above for link attributes More finely granular typing, such as high-level elements of a given type appearing on a primary device set but lower-level elements within that type appearing on a secondary device set. Such may include the use of implied, externally specified, and/or explicit coding at such finer granularity.

Selection at the level of links from the ITVPS to other resources, such as with link attributes like those described above.

Selection within the resources that are linked to from the ITVPS-defined portions, and by further links such as by using any of the methods previously described.

Any such transfers could be specified as author recommendations, and could also be subject to user control as well.

In various embodiments, a simple content presentation category structure adapted to control MMUI browsing May employ a three-pane interface. The interface could provide a "Play" pane for media playback, a "More" pane for contextual information, and an "Explore" pane for flexible browsing of related resources that provides Web browsing functions. Such could provide a three-category structure similar to, but perhaps simpler and more generic than that of the ITVPS.

One embodiment of a MMUI based on such a structure might have "Play" screens default to a TV device set, perhaps with an option to re-allocate that class of resource to the PC device set. The embodiment might have the "More" screens go to whatever device set the user selects, perhaps with a default set to either TV or PC by the system provider or author. The embodiment might further have the Explore screens default to the PC, but perhaps with user option to re-allocate that class of resource to the TV. In such an embodiment, authors might still have the ability to specifically code target affinities into each individual resource or page, independently of the pane type and its implied default affinity. As described before, the user options to assign a targeting affinity might include both settings that have continuing effect, and one-time selections that specify the handling of an individual resource or link traversal.

Similar methods could also be applied to other standards that might emerge to support richly structured content. One current example is NewsML (News Markup Language), an XML-based standard that provides for collections of news items and related metadata that can be constructed in multiple ways, with specific named relationship types between items such as "see also", "related news", or 'for more detail." The various methods of targeting described above could apply to such structures of components having named relationship types, both at the component and relationship type level. Such content structuring and typing, and the related support for substitution of alternative elements as equivalents or complements (such as summaries or abridgements) and for choosing between inclusion or reference, could also facilitate dynamic adaptation to different form factors and systems.

SportsML is another emerging standard of this kind that addresses such content types as scores, schedules, standings, statistics, and news. Other similar standards for other kinds of TV, video, audio, text, and other hypermedia content, including TV serial episodes, movies, dramas, sitcoms, newsmagazines, music programs, and other specific or generic formats might be developed and include targeting provisions of the kind described herein. Such formats could effectively complement those addressed in the ITVPS standards to address all kinds of hypermedia content with defined typing structures. Details of application to these and other similar variations will be apparent to one skilled in the art.

As suggested in the section on asynchronous transfers, similar markup attribute coding methods may be used to indicate whether a link is to be presented and traversed synchronously, or deferred for use at a later time. Such a facility might be used to encourage synchronous viewing of enhancements that are closely related to the primary program and brief in nature, but to discourage synchronous viewing of enhancements that are more tangential and perhaps more likely to distract from the primary program and/or commercials.

It should be noted that when a link is authored for deferred traversal, it might also be desirable to allow further control over whether the presence of the link is presented synchronously, or whether its existence remains hidden and later appears in some list of links and/or other control that provides access to enhancement content after the primary viewing. Thus alternative attribute codings might include:

show the link for normal use, with user option to defer
show the link with deferred traversal as default, with user option to override to synchronous traversal
hide the link and place it into a deferred link list for later use Details of such coding schemes for temporal targeting might depend on the particular markup language being used, but could be similar to the methods described herein for device set targeting with the particulars being apparent to one skilled in the art in view of the teachings herein.

Priorities and Preferences for Managing Device Set Use

The methods described provide for a blend of user and author involvement in determining the targeting of resources for presentation, and as noted, a system for setting preferences and priorities could be desirable. This may take a wide range of forms, depending on the richness of the embodiment and the nature of the balance between author and user that is sought. Details may also depend on the range of content types, content sources, form factors, tasks, and users being addressed, and may evolve as users become adept at using increasingly advanced features.

The structure for setting user preferences may be expressive as to what kinds of tasks should be done on what device, with what rules for transfers and choice of alternative UI configurations. This structure may provide defaults, wizards to allow custom configurations to be chosen based on a few selections, advanced customization and personalization of fine details, the use of multiple settings to allow different presets to be used in different contexts (e.g., presets for contexts defined to relate to different types of tasks and/or for different combinations of active device sets), support for different rooms (e.g., with presets for devices associated with a room and/or for portable devices that may be used in multiple rooms), and support for multiple individual users (e.g., with there being personal settings for each user). The systems could apply settings based on defined conditions, but let the user override them at any time.

A standard structure for setting user preferences could be defined and implemented across a wide range of browsers for consistent use by any system participating in a MMUI browsing experience. Such a structure could start with the defined methods for author targeting in the coding of resources, and for user control at actuation time, such as described above, and could add a preference structure that allows the user to define preferences as to when and how to moderate or override the coded (author suggested) attributes with regard to specific attributes, device sets, and other usage contexts. This structure could also provide for UI controls to be used at link activation time to control targeting, and specify what level of user controls to enable with what default settings and when they may or may not override the resource codings and preferences.

A simple example of mixed user/author control in current browsers that is suggestive of desired expansions is the use of new windows in current versions of MSIE with current HTML. The default for a simple link (traversed with the standard left-click action) is to open in the current window. A user may force a link to open in a new window by shift-clicking the link, or by right-clicking and selecting the "open in new window" option from the pop-up list. This new window feature is popular for viewing resources from a list of links, such a search results page or menu, while leaving the list in place in the original window. An author can code a link to automatically open in a new window (using target=_blank), and this is popular for cases of loosely associated resources, such as references, or for links to another site, when the author wants the current resource to remain available. Currently the coordination of these methods is not well provided for, and it may be difficult for a user to override a coded attribute, or for an author to be adaptive to user controls, and this is compounded by the fact that the author coding is not transparent to the user, so the targeting to a target=_blank may come as a surprise to the user. Some limited override capability may be available in special controls (such as dragging a target-_blank link to the browser address entry box to open it in the current window). These simplistic controls, and the lack of transparency into coded attributes results in conflicts between site authors and users with different tastes, and no clearly desirable solution.

Addition of features to set preferences and priorities by the user, and to make coded attribute behaviors visible (such as by using alternate cursor shapes, colors, or other effects) could be desirable to make such behavior more predictable and controllable. Thus a basic structure could relate the following for each link attribute behavior coding:

what intent was suggested by the coding what visible UI cues prior to activation was suggested by the coding what actual behavior should be taken based on a user preference what actuation-time overrides could be make, using what controls Further capabilities can be built upon such a preference and priority structure to allow preferences and priorities to be defined as named sets that apply under specified conditions and also to be manually activated or deactivated as desired. These could be set in two major dimensions: 1) the dimension of device set groups, and what options apply with which groups, and 2) the dimension of task modes, where different behaviors are defined for different task modes. Task modes might be defined to relate to general activity types, such as casual, intensive, multi-tasking, and the like, where the user sets the activity type that is operative at any stage of a session, and changes that as desired. Task modes might also be defined by convention and set globally by authors/producers, using attribute codes, to set modes by content type, which might be similar to task type, or more specific, such as extended content, annotations, references, or special applications, or to set modes corresponding to navigation levels, such as menus, content, subordinate content, and special applications. Other sub-dimensions of task mode might include private versus shared, utility versus entertainment, and the like. Settings might also be variable with respect to different device sets or device set groups, both in terms of form factor, and such factors as location, such as living room versus bedroom versus kitchen versus auto versus walking versus sitting outside the home. Given the number of dimensions and variables possible, this could be simplified by building in standard default schemes, with simple alternative schemes pre-set as default or selectable as a unit for average users, and with advanced structures accessible for change at a fine level by advanced users (or their support providers). A further variation in controls can be provided to allow users to override markup suggestions (or other produced-in schemes) on a one-time, session, or permanent basis. Some embodiments might also add various learning techniques to gather knowledge of user behavior and apply artificial intelligence and related inference techniques to infer the user's desires. Such behavior controls can be obtained and composed from a combination of sources, including the user, the author (including the full range of sourcing and distribution players), and from hardware and software vendors, third party services, and other users.

In the case of an alternative embodiment of targeting controls using an explicit category structure for resource types and affinities that is based on the types set at time of authoring, as described above, user controls operable at time of viewing might be similar to those described earlier, and a similar preference override feature could be applied to change such target affinities on a type-by-type basis.

Source and Destination Session Behaviors and Synchronized Tracking Options

As noted previously, there are issues of what behavior is desired at each device set after a transfer, and these behaviors can be defined by a similar combination of defaults and preferences, author coding, and user selection. Basic alternatives may be specified for whether sessions end or pause or continue, whether some or all windows change state (e.g., close or minimize, change size, change focus, change position (including tiling or level of overlap), and/or the like), the disposition of related UI elements (such as parent frames; for example), and/or whether device sets are deactivated or powered off. In the case where a session is paused, the simple default behavior might be that the user be able to interact with it at the source device set independently of the transferred session at the destination device set. Alternatively, the option might be provided to bring the paused session into synchrony with the transferred session, which could be essentially equivalent to requesting a pull transfer back.

As with other control options, these alternatives may be defaulted by a system, set as user preferences, coded by author/producers using formats similar to the SMIL source-Playstate and destinationPlaystate attributes, and controlled by the user at the time of actuation. As described with regard to control of targeting above, these behaviors might be fully automatic and/or be controllable by a single user action or other simple command sequence.

The previous discussion emphasized the issues of behavior at the destination device set, but a similar richness of options, coding schemes, and user commands could be provided to address the disposition of the source device set as well. Such markup schemes could be expanded to not only specify author recommended behavior, but to also specify priority in cases in which users and authors have conflicting preferences. In various embodiments, the relative power of user and author could be set by default, authors could use markup to specify rules for under what conditions they defer to users, and/or users could have preference controls that specify rules for under what conditions they defer to authors. As described below with regard to congruent behavior, all of these markup controls, user controls, and preference systems might be largely independent of alternative system configurations, but could alternatively be specified to take such variations into account, perhaps prescribing different behaviors in different cases.

It will be understood that a reduced set of behaviors might be applied in the case of a fixed allocation of resource types to devices sets and/or in the simple case in which all TV program enhancements are viewed on a second device set. Such a simple case may be, for example, one in which a PC portal is driven by a cable head-end relay in connection with basic STBs. In certain such cases there might be no presentation of session activity relating to enhancement on the TV device set, with such activity always being directed to the PC device set. This might be viewed bearing similarity to a case of all links originating from a TV program resource being directed to a new window, wherein the new window is always targeted to the alternate device set and never appears on the TV device set.

These behaviors could take a different shape if the optional tracking/synchronization feature is provided and selected. In this case, the source session might normally remain active and be kept in synchronization with the destination session, which might be instantiated with the same resources active, and with equivalent session state. In the usual case, user action might be permitted at either device set, and could trigger an event transfer with the essential state information to replicate the effect of that event at the other device set, just as if the user action had occurred there. Alternative forms of tracking may be provided, as options, to make one of the device sets operate in read-only fashion, so that it may receive UI events from the other but not originate UI events. Certain embodiments might also provide for temporary disconnection of a device set from active tracking, but with the capability to save events at either location for later re-synchronization when the device set reconnects, similar to the analogous capabilities in (and possibly building on the facilities provided in) advanced collaboration systems such as GROOVE.

Tracking support can be implemented on a single user or multi-user basis. Multi-user support is typical of conventional collaboration or groupware systems, and requires additional attention to managing user identity, security, privacy, privileges, and the like, with regard to both an individual user and the membership of multiple users in an active collaboration tracking session. It will be understood that groupware collaboration is directed to this issue of multiple users, and conventionally assumes that each user has his own SMUI system (typically a PC, and typically at different locations), with the objective of giving the multiple users the illusion of shared access to a single system that reflects the actions of any of them. Such systems must maintain full synchronous replication of all UI input and output events to each participating system, which is not what is generally desired when a single user uses multiple device sets (and may wish to allocate tasks or sub-sessions to a single device set, as extensively described above). As will be apparent to one skilled in the art, the collaboration tracking/synchronization methods used in conventional SMUI groupware systems are readily adapted to extend the single user, MMUI tracking methods that have been the primary subject herein to the proposed further inclusion of multi-user, MMUI collaboration tracking as a complementary mode of use. In drawing on groupware art to extend it to the objectives of a multi-user MMUI, it is useful to recognize that a range of methods have been used in groupware relating to different coordination levels of display (image) broadcast versus event broadcast, the use of centralized versus replicated state control, and whether the applications are collaboration-aware, and these issues have parallels with the MMUI architectural variations described herein. Recapping the teachings provided herein with regard to the variations just noted, the objectives of browsing can be well met in most common cases with methods that are collaboration-aware and MMUI-aware, and with the granularity achievable with selective event replication. These may be applied in either centralized or replicated state control contexts, depending on the platforms to be supported. Nevertheless, MMUI techniques could also be accomplished by display replication, and software environments could be provided to permit applications to be MMUI unaware.

It should be noted that some support of management of user identity, security, privacy, privileges, and the like may be desirable even without multi-user collaboration features. This would protect the security of individual users, and allow for multiple independent users of the systems supporting the MMUI to set individual preferences, maintain individual history lists and other individual context information that could persist across sessions and be protected from interference by other intervening users, such as other family members or office mates. It should also be noted that a further useful feature in a multi-user case might be to transfer a browsing session to another user, whether at an alternative device set, or using the same device set. The former could be useful to pass activity to another TV viewer who has his own personal device set (whether collocated or not), and the latter could be useful to change the context of a session to take on attributes and privileges associated with the second user, such as to conduct a transaction. The details of supporting such controls and transfer features will be apparent to one skilled in the art based on the teachings herein.

Congruent Behavior of Independent, Dependent, and Centralized Systems

Described in the foregoing discussion has been the case of a true MMUI, where the coordinated device sets that compose a MMUI are independent systems, being driven by separate processors. From a user and application perspective this is just one end of the broader MMUI (or MDUI) spectrum from centralized systems to partially interdependent systems to fully independent systems. From a technical implementation perspective, it is the one that is most challenging, given the need to transport and reestablish all relevant aspects of session state. Most of the teachings provided herein for that case are also applicable to the more centralized and interdependent cases, but embodiments for those cases can be greatly simplified by exploiting common elements and common access to state information.

Examples of alternate embodiments of a MMUI with variant, more centralized architectures are possible configurations 1) of an advanced TV, with PC-like capability and able to directly drive a tablet, laptop-like or PDA-like I/O device set, or smart remote control, and 2) of a PC-DTV system that supports an across-the-room TV monitor and remote control in addition to the usual PC I/O device set. These are fundamentally very similar, but can be expected to differ in that they come from very different hardware, software, infrastructure, and business "cultures," that shape them quite differently. Other architectures that may be more or less centralized may relate to more PC-centric assemblages, such as Pebbles-style PC-PDA combinations, combinations of intelligent tablets used in conjunction with PCs, assemblages that loosely couple TV STBs with separate home entertainment controllers, video game systems and many others.

Externally, it may be desirable that the MDUI behave consistently for browsing and transfer of work locus regardless of the system architecture (true MMUI, centralized, or whatever), effectively masking such internal implementation details from the user, except in so far as attention is needed to set up and manage configurations, device set groups, and such. It may also be desirable that the user be generally unaware of whether he is browsing across a system with one processor and software image, or one with many.

Internally, with regard to software implementation, much simplification is possible in the case of a centralized system in which all device sets are driven by a single control processor. In this case it is possible for all browsing to be done with a single browser software instance, with direct access to all browsing state and context information for all of the device sets in use, and with true common access to the hypermedia storage layer, as well as to all system storage, including persistent storage and transient storage used for resource caches and system caches and other transient state information. Thus much of the import/export/tacking function is obviated. Instead of transferring sessions and state, the essential task reduces to pure coordination of sessions and state across device sets, which depending on embodiment, may be generally similar in nature to that of coordinating browsing with multiple windows on a single device set.

It should be noted that such centralized session processing and control limits the overall function provided in a number of ways. Ability to add and remove a device set from coordinated use may be limited. The central system must be capable of recognizing and driving all desired device sets at a level that is sensitive to their form factor and rendering capabilities. Thus, for example, whether based on a PC or STB, the centralized browser must be equally at ease with the details of device control and of rendering presentation resources for a high-resolution PC screen, a TV (SD or HD), a PDA, or a display-equipped remote control. In general, the openness of such architectures to systems and device sets of widely varying architecture and configuration, provisioned from varying sources, and assembled and applied in an ad hoc fashion is more limited and difficult to adapt to unexpected requirements. With the decentralized methods described herein, all that is needed for an arbitrary system to participate is an exporter/importer that is capable of transferring session state in the standard, high-level format and granularity established for any member of a MMUI device set group.

Intermediate cases may be addressed by these methods as well, and depending on their architecture, more or less of the transfer import/export process could be required to achieve coordination. Systems may be technically independent in that they are separable and use independent processors, but for purposes of coordinating a MMUI, they may run in a centralized application mode. Common collaboration systems like MICROSOFT NetMeeting and others based on ITU T.120, run in this mode, as do some thin-client terminal systems like Windows Terminal System. In this case, the device set displays are not driven by local applications, such as browsers, that render onto them locally, but by display replication from a central system that runs one central copy of the application that does the rendering. Coordination across device sets is at the level of direct UI input/output actions, not at the level of sessions. There is really just one application session. Thus many of the constraints of a centralized system generally apply to this architecture as well.

A similar variation that exists at a software level is also to be noted. A single controller system processor, or multiple processors in a tightly coupled, shared memory, multi-processor system or a cluster or other assemblage such as a grid system presenting a single system image may run multiple independent browser instances (running as separate software processes) that share the operational logic of the processor(s) and other basic system resources, with each instance controlling separate device sets, and each capable of coordinated use together, much as for independent browsers. A very simple example is that of running multiple instances of a browser, such as running two instances of MSIE on a Windows PC. In such a case, some aspects of the context may potentially be commonly accessible, such as page resource caches, history lists, cookies, and storage systems, but details of session state (such as current page, navigation path, window configurations, and forms data entry state) may be local to each browser instance. Thus MDUI coordination might not be supported across those browser instances without the addition of the methods for state transfer described herein, simplified somewhat by the common hardware, software and context elements in ways that will be apparent to one skilled in the art (such elements may not need to be transferred, or may be transferred by reference only). Another example might be a case of running multiple different browsers on the same system, such as might be done for an advanced TV with PC functions or a PC-DTV system that might run a conventional ITV browser for enhancements oriented to the TV, and MSIE or Netscape for Web browsing. Here again, coordination might not be possible without adding support for the coordination methods described herein, and here the simplifications relate primarily to the simplifications of communication within the integrated hardware environment.

To complete this discussion of independence, it should be noted that there is a more extreme case of independence, that in which common access to the hypermedia resource storage layer is not available or readily used. This may occur in cases where network access is constrained, and devices may have only limited capability for signaling one another. A related variation is where resources are distributed on physical media (that are mounted locally) and separate access is more readily provided than shared access. In such cases, the transporter and state records could be expanded to add context details on the resources in use sufficient to synchronize or transfer desired portions of the resource content along with the session that presents them. One example might be that of enhancements to a video (or music, or other) resource that is on CD-ROM or DVD, where one device set may have a copy of the stored resource, and the alternate device set may have a duplicate copy, or a server-based copy, or just the associated enhancement resources.

As a further clarification of the concepts addressed herein relating to session transfers and synchronization as they relate to various configurations and embodiments, it may be helpful to view session transfer as composed of two related but distinct sets of methods. One set of methods concerns the low-level task of coordinating state, including the basics of state transfer, import and export, and the various levels and forms of synchronization. The other set of methods concerns the related higher-level task of managing the desired behavior of sessions as viewed by the user at the source and destination device sets. Considered behavior might include, for example, how sessions end, pause or continue at a source device set after a transfer and/or how appearances of transferred sessions are presented at the destination device set.

It is noted that the perspective just described can help provide a unifying framework for consistent understanding of how these functions apply in varying embodiments such as centralized or distributed systems, or in fully synchronized systems. It is further noted that the perspective can be thought of in terms of a matrix, having two rows corresponding to the two tasks of 1) synchronization and 2) managing visible behavior, and having many columns each corresponding to the distribution embodiment cases.

In such a matrix, the basic state coordination methods (the first row) may address the issues of distributed and independent systems. In a simple case of a fully centralized system, state might be readily accessible to a single browser instance that handles all device sets. The basic aspects of exports, transfers, and imports could be reduced to trivial tasks, if not eliminated entirely. The case of multiple browser instances can be viewed as a case of software function distribution within a centralized hardware configuration, and might be more complex, as described above.

In the case of independent systems, these methods might need to take on richer form, and from one point of view, the state transfer/synchronization task may be to make the multiple systems act as if they were centrally controlled and had shared access to the state of the session (or sessions, as expanded below). From that view, fully synchronized systems (which might include cases of systems synchronized using collaboration software) might be thought of as simulating a centralized system, and thus the synchronization process might be viewed as effecting a kind of virtual centralization. In an extreme case, full synchronization could be maintained at all times, and the virtual centralization could be ongoing.

One way or another, lower level session state could be made available for control of all device sets. To summarize across the cases, this could be largely inherent in a centralized system, could be provided by the export/transfer/import methods described for independent systems, and could be similarly provided in cases of full synchronization. With this perspective, synchronization could be viewed as an added feature to session transfer, or, alternatively, one could view session transfer as an added feature to synchronization. From this perspective the cases of a centralized system and of a routinely synchronized system could provide a similar base for coordination. Both could have ready access to the relevant session state information, but both still could need to apply the kind of higher-level methods described herein to control the view of session behavior presented at the device sets.

Further considering the matrix view, the higher-level task of MMUI session coordination (the second row) may be largely the same regardless of the physical configuration and however state data is made available. This higher-level task could provide the desired controls over whether sessions end, pause, or continue at a first device set after a transfer, and other aspects of how their presentation to the user should be altered.

Much of the discussion herein is oriented to the case of independent systems, and often refers to the case of sessions being terminated at a source device set after transfer to a destination device set, and of being established at the destination. From the perspective just described, however, it will be apparent that in a centrally controlled system or in a fully synchronized system that gives the virtual effect of centralization, detailed implementation of the methods described might be such that the session might only appear to be terminated. Such might be the case, for instance, where just one underlying session is maintained, one that is to be presented in different views to each device set, but which is no longer to be presented to the user on the source device set. Similarly, establishment of the newly transferred session might just be a matter of making it visible. Except where stated otherwise or clear from context, such references to session termination or establishment should be understood as including embodiments in which it is just the appearance of the session that is terminated or established.

This higher-level coordination can be understood as coordinating the appearance of a session as seen from each device set. The term "co-session" may be used to refer to each visible presentation of a coordinated session as it may appear at each device set. In the distributed cases described extensively herein, an embodiment may completely terminate a co-session that is to be ended at a source device set, but still might possibly save its state as a special history record that can be re-activated. In a centralized embodiment (real or virtual), the same effect might be achieved by simply removing the co-session from view. This might appear as a complete removal, or be presented using other techniques. Such techniques might include minimization of the corresponding window so as to leave a vestigial representation such as an icon in a taskbar or an entry in a task list. This might also be thought of in terms of "opening" and "closing" of sessions, or more precisely, of session presentations.

Thus, consistent with other discussion herein, an aspect of the methods for this higher-level coordination relates to the controls that might be provided to enable users and/or authors to determine the disposition of transferred co-sessions such as whether they disappear, and whether they are restored to view showing the state at which they were left or continue to be synchronized with the state of the co-session that was transferred to another device set. As noted regarding congruent behavior, it may be desirable that, for the most part, these behaviors be largely independent of physical distribution.

In following that principle, it is noted that one behavior that was discussed in the context of a distributed embodiment was the case of pausing a source co-session, and that if that feature is to be provided in a centralized case, special support might be required to save the state as virtually "paused" for that one device set (perhaps being essentially a matter of taking a checkpoint) while the co-session on the other device set continues and changes its state. In such a case (e.g., for any of the distribution embodiments), the paused co-session might be re-activated, possibly with controls that determine whether it appears as it was when paused or is first brought into synchrony with the co-session that had continued. In the case of activation with the state as at the pause, the session could, in some embodiments, continue independently from that point as a forked, and now independent, co-session. Alternatively, the transferred co-session could have been treated as a forked session at that time, and controls could be provided for later re-joining the sessions based on adjusting to the state of either selected one. The term co-session, as used herein, may refer to sessions having a full range of relationships, including forked sub-sessions and enhancement sessions that might become divergent or be loosely coordinated, as well as to tightly coordinated or fully synchronized sessions.

It will be further understood that these higher-level control functions may be temporally coupled with the lower level transfer functions in that they coincide with the time of export and import, but logically decoupled and implemented separately. As noted above, in the centralized case, the low-level state export/import/transfer function might be implicit or trivial. Also as noted above, an alternative embodiment for physically independent systems might provide for each to be maintained in full synchronization. In such case low-level state transfers could occur routinely to maintain synchrony, even when no higher-level session transfer was invoked, and might have little or no direct coupling with such transfers.

Transactions, Cookies, Peer/Server State, and Editing

Further issues in coordinating MMUI sessions apply in cases where state is complicated by transactions and related data entry, cookies, and state for an associated server or peer system session. Many similar issues apply when editing of hypermedia resources is supported. Methods for addressing these issues are described in this section.

For both transactions and editing, additional details of state related to user input to transaction entry forms, such as for example HTML forms (or XForms), or to an edit-capable browser or equivalent program, must be maintained in the state record to enable a finely grained session transfer capability. This relates to the relatively fine granularity of data entry input and control interactions, as opposed to the more coarse granularity of link traversal in simple browsing. The simple solution is of course to not support this finer granularity, and to have transfers ignore any such entries if not submitted to the server or committed as completed edits to a resource in the storage layer. Such a solution may be quite satisfactory in many uses, and users could adapt to avoid intermediate transfer attempts, or live with the task of re-establishing the entry details that were lost. This limited level of support is consistent with how some (but not all) current Web forms processing handles the back button, where the form is presented in its original empty state, and any user entries are lost.

Naturally, more complete support may be desired by users, and this can be enabled by including the edit state details in the state record when exporting and importing a session. Specific methods for this may vary with the details of browser or editor implementation, as will be apparent to one skilled in the art, but the basic result is a structured list of all edit entries, including such metadata as needed to identify the elements and positions to which such entries refer. In the case of form fields, this could list entries by field name and value, or, as in the case of XForms, provide an XML structure for the form entries and values. In the case of resource editing, such details might be a trace of changes similar to that maintained by a word processor for use in undo/redo commands, and for recovering changes after a crash (including replaying all intermediate events, using snapshots of state, and hybrids of the two). Emerging standards for access to resource structure and manipulation events, such as DOM and the DOM event model may be used to capture such finer-grained state elements. This would permit access to such events as entry to and completion of a form, and to the filling of fields within a form. Other finer-grained state details may also be captured by similar means, including well-known interaction points in browser interaction widgets, and can thus be used for more fine-grained coordination. Methods for forms input capture are similar to those used in browser form-filler programs and autocomplete features. A Microsoft facility, IPersistHistory, enables the saving of forms state data for use at a later time on the same machine, and similar techniques can be adapted to extract this data for export. For example, this data can be obtained from (and inserted into) the Dynamic HTML Object Model used on IE 4.0 and later browsers, using the IHTML-FormElement Interface, and other browsers offer similar access to the document object model (DOM).

Also a factor in finer-grained local state is the use of embedded logic and of plug-ins or other support logic that extends standard browser functions. The simplest solution, again, is to set a granularity that ignores the internal state of such elements (such as by starting them over), and this may be quite satisfactory for many applications. A more complete solution is to address granularity at the level of user inputs, in which case methods similar to those described for forms and editing can be used, including tracking and replaying all intermediate events, using snapshots of state, and hybrids of the two. Capture of full software process state is also possible, but much as for the browser itself, would involve a level of complexity that may not be warranted.

Regardless of the level of local granularity desired, transactions (including queries, e-commerce, and the like) and many other kinds of remote sessions maintained between user system and a remote peer or server system are usually stateful, and require support if that user session is to be transferred to another device set. Such situations can be understood as involving a user session that at some point enters into a remote session with the peer or server, such as to place an order or to obtain services that involve a continuing session identity over a series of interactions. A given user session may over time have multiple (sequential or overlapping) remote sessions associated with it. Thus to transfer a session, while it participates in a remote session in a way that allows the remote session to be maintained, requires that the relevant state information for that remote session effectively be transferred, and that the transferred local session be able use that information to re-establish and join with the corresponding remote session. In the case of a centralized browsing system and single browser instance, this is relatively simple, since most of the change is invisible to the remote system, but for independent browsing systems it is more challenging, since the network address and other system-specific information (security certificates, system identifiers, and cookies, associations with shopping cart information and other transient or intermediate transaction state, and the like) for the new system may be changed. Similar issues and methods apply to client-side wallets, passports, or other identification, profiling, and preference data.

An intermediate, somewhat simplified, case occurs when the transfer occurs at the point of actuation of a traversal that begins a remote session. In this case, the transfer process need only transport and import all persistent cookies (or other persistent state information) that may be associated with the domain of the specified server for the target system to be able to initiate a session with that cookie information.

The more difficult case is that of a transfer after the session has been initiated from the first user system. One method of handling this case is to hide the change in address from the remote system, and this can be done by relaying through a proxy server that is set up to mask the true address of the user system. Such a proxy would preferably be secure and trusted to protect against unauthorized or spoofed session transfers. This proxy could be located at the first user system, and that would offer the benefit of enabling the proxying to be started mid-session on an ad hoc, as needed basis, using the already-established network address. More generally, such a proxy-like server can be embodied in any local controlling devices, such as a gateway, set-top box, or any PC, to allow multiple coordinated devices in the home to appear as a single device and single client IP address to the remote server, again retaining transparency at the server. In this case the control device would replicate the cookie or other server-visible state information just like the other (local) state data, or could maintain the cookie (or the like) at the proxy (in a manner similar to that used in proxy servers that support wireless devices).

Similar proxy functions can also be provided by a remote server, whether an independent proxy server, or integrated with a remote service. One alternative approach is to add support to the remote peer or server system to enable it to be aware of the session movement and to adapt to the changed network address and system identity. This might take the form of protocol-level support at both the client and remotely to deal with replication or migration of a client that is treated as a single user. This could also be done in a manner generally similar to support for roving IP addresses that is intended to support mobile devices in Mobile IP, based on remote proxy-like approaches in the network (in that case at the wireless access node, and thus transparent to the server), and in more advanced context-aware portals. Such support could also draw on the somewhat related methods used in Windows "roaming" support to allow a user's basic (static) Windows system preferences to be passed to a server and used to personalize a second PC to the same settings. In this case, the state replication logic described earlier might maintain the distinct identities of any network-visible and network-addressable client components. This can be further supported by the browser transfer process by sending a transfer notice to the remote system stating the details of the new systems address and identity, and again preferably providing security authentication information to protect against unauthorized or spoofed transfers.

Server sessions may be particularly critical to support of ITV services that rely on head-end server support to provide functions supplementary to those of limited-function STBs, such as analog STBs or basic digital STB models (such as, for example, MOTOROLA DCT2000 or SCIENTIFIC ATLANTA Explorer 2000). This may include cases where many or most interactive functions are controlled by the head-end server, with the STB acting essentially as a thin client I/O controller that is architecturally similar to WTS, CITRIX, or X Windows (even including remote PC-like functions such as using the PEACH NETWORKS technology acquired by MICROSOFT). In such a case, coordination could be managed at the server, using the methods described in regard to the STB, but with alteration of the communication paths to include the wide-area communications required. Such communication could be routed from the server to the STB on the cable or satellite facilities, and then locally from the STB to the PC or other coordinated device set, but might more readily be routed from the head-end on an alternate path to the PC, such as via the Internet. This method of using the TV/STB as a thin client-based device set, with support at the server for coordination with a PC-type device set could be very attractive as a way to provide rich coordination using current installed base hardware, with little or no change to STB software, with most or all of the added software at the head-end (linking over the Internet to enhanced browsing software at the PC). This is a variation on the embodiment described earlier in regard to state transfer via head-end and Internet. Further variations could add flexibility to offload intelligent function from the head-end to coordinated. PCs, including such functions as basic interaction navigation support tasks, more advanced browser functions, such as interpretation of image region hot spot metadata as link arcs (similar to that done at the head-end by VEON servers), and specialized and supplementary services.

A further extension of this approach could place all coordination and state management intelligence at a remote server, acting as a central controller, so that all local device sets operate as (more or less) stateless thin client/terminal systems. Such thin client/terminal function could be at the level of display image replication, or at a level of simple browser rendering and basic navigation functions. More generally, this method permits a spectrum of embodiments that vary in terms of how coordination function is distributed among TV-type system elements and PC/PDA-type system elements at the user location, and head-end or other remote server-based elements, including mixed cases supporting multiple distribution architectures. Such methods can be used to build a range of extensions from current 2-box ETV offerings that offer greater integration and coordination of the two boxes, potentially including the high levels of flexibility in targeting enhancements to the TV or the PC/PDA described above, and that can work with installed-base STBs as well as more capable units. It will also be apparent that such methods of placing coordination functions at the server may also be applied for coordinating state for server-based functions (including transaction functions) in general, as an alternate to the more peer-to-peer and distributed methods described above, and that such methods may be particularly attractive in contexts where the necessary reliance on remote services is not viewed as a disadvantage. Note that in such cases, the Internet path could happen to be physically on the same cable as the TV signal, such as by using a DOCSIS Internet connection, but be logically distinct.

State Tracking Simplifications

The methods described herein for state transfer at varying levels of granularity offer significant advantages in simplifying the coordination task. This can be understood as exploiting strategies for limiting when events are tracked and how they are collected and communicated. Existing and proposed systems for collaboration and systems for simultaneous multimodal interaction generally require ongoing collection and broadcast of state-change events in realtime while such activity is active, and collection and storage of such events for later synchronization if delayed activation of such features is to be permitted. In the case addressed herein of session transfers, this support can be selective as to what is collected and what is exported. The methods described herein seek to reduce the portion of state exported to the minimum needed for a given function.

This was presented in terms of ad hoc batch export/import of state, where relevant state is extracted from the current model (or the internal state of the browser) at the time of the transfer request, but the same strategies can be selectively applied to event-oriented methods, like those used in collaboration and synchronized sessions, as well. Instead of extracting state from the model, event-oriented methods can be thought of as tracking events that cause changes to the model as they occur, before they cause the change to the model, such as in a mediated model-view-controller structure, and then replaying the events to replicate the corresponding changes to the state of the model. To further clarify that simplification process in terms of such an event-tracking embodiment, the specifics of what event-related state details need be retained and transferred depend on both the nature of the activity and the granularity of coordination desired. Simple logic in the browser or exporter can monitor events, and discard those not needed (such as for being out of scope). This simplifies event tracking, export, and import. For coarse granularity, events may be at the level of resources visited, loaded and/or presented) Current state could have no history at all, but could have some defined range of history, so that, for example, entries within some defined number and path distance could be saved, and any excess could be deleted. For finer-granularity, edits, forms entries, and intra-resource navigation events could be recorded, but once there is a commitment to the storage layer, or a traverse to a resource that replaces the subject resource, some or all of those may become irrelevant. Alternative embodiments may flush all such events, or reduce them to a minimum end-state set that removes those that are redundant or reflective of a transient intermediate state.

These simplifications may also involve combining events into new but equivalent composite events that consolidate the effect of multiple intermediate and partial actions. Thus for example, a final set of forms inputs might be retained (to support backtracking), but not any intermediate actions that were altered. In MVC terms, this can be thought of as maintaining a secondary, parallel model, one specific to modeling only those aspects and granularities of state relevant to transfers to other models. Such methods can enable considerable economy in retention, transmission, and import of state, particularly if a possible transfer or synchronization is to be enabled long before it is actually requested, and can make it feasible to have such a capability active and in place at all times, unlike less efficient methods that might tend to be used more selectively, and thus might not always be ready for use when desired.

Because of that, these methods are also useful to parse out redundant or obsoleted events in the case of a collaboration or a simultaneous multimodal application, in those cases that realtime synchronization is not active and some set of events is held for future use (such as after a connection or reconnection), when synchronization is to be established based on this pending event stream. The same simplifying parsing and deletion functions can be applied, and this may make wider use of such applications feasible as well. This simplified method can be used in alternation with full synchronization, so that this secondary, simplified model is maintained locally until synchronization is desired, when it is used in an input event re-feed process to bring the systems into initial synchrony, which is then maintained by synchronous event transfers, and then reverted to when synchronization is deactivated. These methods apply both to systems of conventional design, and to those using model-view-controller designs. Expressed in MVC terminology, what these methods do, in at least one aspect, is enable systems to operate with independent models, but to coordinate those models when needed, in a simple, low cost manner, regardless of whether based on a central intermediary, or a purely peer-to-peer process (or some combination). Having independent models can be a significant advantage for systems that may be used separately, in disconnected mode and/or in different applications, thus enabling ad hoc coordinated use. To make such methods robust in the case of a varying number of active and inactive group members (collaboration participants and/or device sets), it might be desirable to determine synch-points when members enter and leave the active group that can be used to define intervals that have no membership change, within which simplifications can safely be made with no risk of affecting a re-activation for a member at an intermediate state that reflects some but not all flushed events.

Also, while the examples of event stream simplification given here are oriented to browsing events, it will be apparent to one skilled in the art that similar event reduction methods can be defined, based on the principles described herein, for event streams relating to many other applications. For example, these methods apply with only minor adaptation to a shared/synchronized notepad/editor application, and quite similarly to a shared/synchronized sketchpad. Similar simplifications for a shared/synchronized calendaring system could eliminate large numbers of events relating to scheduling of items that are later deleted or moved. Similar methods can be used for contact managers, discussion forums, file management, image management, games, computer-aided design, supply chain management, and other shared/synchronized applications.

Some other methods for simplification of state tracking that may be useful in some embodiments are noted. One method that can be useful, such as when assembly of a full state export is costly in processing, is to use a hybrid of full state exports and event logs. This may be implemented in a manner similar to the checkpoint/restart method used in data processing transaction logging, where a full dump or image copy is made periodically, and an event log is maintained only from the time of the last checkpoint. Another form of hybrid is to supplement the purely current internals of a model by maintaining some aspects of state in a partial event log-like form, which may be useful for aspects of state in which history is relevant, such as for a browsing navigation history. It should also be noted that in synchronizing video to begin viewing at the same point as the originating system, the need for replay at the new system can be avoided by including the current time-position as part of the state, and time-normalization methods can be applied, using calculated delays, reference time servers, and the like, to adjust for transmission latency. Thus where a pure event-based synchronization method might have difficulty positioning a stored video to an intermediate time (without playing through it and incurring delay), current time-position data enables random access to the desired position.

Security, Privacy, and Digital Rights Management

Allowing sessions to be migrated from one system to another may call for attention to extending current and future methods for ensuring security and privacy, and for digital rights management (DRM). Such could allow authorized users to have proper powers on both systems, and to exclude others and to prevent spoofing or other security flaws. Similarly, depending on the specific context, rights and entitlements to digital resources, including conditional access and copy protection, could presumably be provided to a user without regard to the device set used, or alternatively, with only incremental cost for access from a second device set. This may also involve the use of multiple point-of-deployment (POD) modules for hardware-based control of such functions, or an enhanced POD module with support for controlling multiple systems. Specific methods for doing this relating to user identities, device identities, network addresses, and other identification, certification, and authentication methods will be apparent to those skilled in the art. Further aspects of DRM are addressed in the discussion of revenue models.

Hypermedia Edit Applications

While most of the examples discussed have focused on browsing pre-defined content, the same principles should be understood to apply to edit applications, and the value of multiple screens is especially clear there.

Limited multi-screen edit already is already used for specialized video editing systems, with editing tasks on the PC that drive viewing of (pure) video on a directly controlled TV monitor. As personal editing of music, video and stills gains popularity, limited editing functions may be expected to be provided on TV-based home media systems. For example an APPLE iPhoto-like photo viewer/editor may allow showing slide shows on TV. Such a show could be created on the PC, and presented (as read-only) on the TV, but some limited edit could be desirable, such as to change sequence, delete or add images, change timing, etc. This could be done purely on the TV system, but here again, the ability to seamlessly transfer that task to a coordinated PC could be desirable. That could permit more complex tasks such as searching a library, enhancing photos, etc., and could allow such tasks to be done in real-time by one person during a group viewing that continues without interruption. For example, while showing a presentation of vacation pictures to a new girlfriend on a TV screen, the host might decide some photos of a prior girlfriend should be unobtrusively deleted from the show. This could be done effectively with a coordinated PC/PDA/tablet, if such functions were well coordinated and commonly used. Similar functions could apply to music playlists and compilations, and to video content.

It will be understood that such edit applications might draw on either push or pull state transfers, as described above, and that such state transfers might include cases where a coordinated browsing action is deferred and where the state information might be built into a link arc. Similar to the asynchronous transfers described above, such applications may be understood to include embodiments in which the state transfer record might be used to create a link arc that could be caused to be embedded in the resource being edited.

For example, in editing a resource on a PC, it might be desired to pull the current state of a currently active TV or video program from a TV or other hypermedia player, and use that to create a hyperlink to that program and place it in the edited resource on the PC. The resulting resource created at the PC might then be used as an enhancement resource for that TV program. Such a link might be constructed with either directionality, whether to trigger the edited resource from that point in the TV program, or, conversely, to activate viewing of that point in the TV program from the edited resource.

Future hypermedia may also be more readily editable, unlike the current Web, but like other hypermedia systems. In that case, coordination of browsing/edit functions might be even more widely applicable. From this perspective, chat, bulletin board forum services, and Weblogs, and other forms-driven applications, represent a current, limited form of browser-based editing on the Web, and one where the proposed coordination could be beneficial, such as to facilitate chat on the PC/PDA/tablet during a TV viewing. For example, the coordination can allow seamless activation of chat associated with the currently viewed TV program, possibly involving a specific set of participants that regularly chat about that program, such as a specific chat group or room or instant messaging buddy list group.

Venue/Kiosk-Based Coordination

An application of coordination that highlights the value of coordinating loosely coupled devices is the case of a venue that provides systems for coordinated use with customer systems. These may be considered as venue or location-based services that are delivered using a kiosk or other device set provided at the venue.

One example is a hotel, which may have a TV system that provides TV, ITV, and Internet connectivity to guests, in which the guest may connect a portable computer (or PDA) to a network jack. Current systems provide such services to a PC as simple, uncoupled, network access only. Adding coordination enables the guest's portable computer to be used as a lean-forward device in conjunction with the ITV system. This kind of loose coupling is essential to the separate provisioning/ownership/control/security issues of the guest/venue relationship. Similar services can be provided at airports, Internet cafes, etc. Similar services can also provide full function PC kiosks for ad hoc use with PDAs. Various well known security measures could be used to control what information is sent from the personal system to the kiosk system, to provide secure transient services on the kiosk that are reliably erased after use, and to certify the integrity of identities and such safeguards.

Conversely, the venue-provided TV could be used as an auxiliary display for PC-driven content, such as viewing DVDs or playing games (PC or Internet-based).

Similar applications also relate to the advantages of ad hoc use of independent PC/PDA devices in home or office contexts (as opposed to dedicated, fixed function, multiscreen systems). Other example apps:

Hotel reservations/guest services/tourist info/T-commerce—video plus ITV on the TV, shifting to the PC for more detail/interaction intensive tasks, and tasks that depend on PC-resident resources Education TV plus adjunct Web/applications—view lecture and related content on the TV, get supplements on PC (simulations, references, notes/annotations, and the like)

Multiplayer games—main shared view on the TV, controls on the PC, if available, and optionally add more players on a bring-your-own PC screen basis Flexible and Deep Integration with Other Applications It should be emphasized that coordination functions can extend well beyond browser functions to include data/file transfer, distributed transactions, and Web services between coordinated devices. This adds further value to the use of "loose," ad hoc coordination of independently capable and separable devices.

Services on the more personal device can support integration with personal applications, ranging from simple file downloading and saving from the Web or other hypermedia to deep integration with personal thick-client applications and databases such as INTUIT Quicken and the like. Such applications might benefit in a wide variety of ways from both the differing device set form factor characteristics, and from coordinated use of complementary hardware, software and data resources. For example, such applications might apply thick client capabilities or other advanced GUI methods to more fully exploit the high-resolution, lean-forward device set. Some examples are listed in the section above with emphasis on the hotel/venue context, but, as indicated, those and other similar examples might apply as well in home and office environments:

An example of such integration includes seeing financial news on TV, getting details on ITV (on either the TV or PC), initiating a stock trade that links to an electronic trading service and a PC-based portfolio system (like Quicken), and then using the portfolio analysis system (at the time, such as to evaluate asset allocation, or later). Wide availability of such kiosk/venue-based convenience services might add to the appeal of thick client applications in spite of mobility requirements.

Another example might be to use DVR and personalized EPG functions (on the PC or TV), based on rich personal preference profiles on the PC, to control use of the TV in a hotel room.

EPG applications might also use advanced GUI controls, possibly using a thick client, to provide a more powerful interface for browsing a schedule grid, such as with spreadsheet-like GUI features that can reveal details of a current cell (program) of interest and can enable rapid scrolling in two dimensions and across multiple parallel worksheets/grids (for further dimensions) Also provided may be other advanced data manipulation controls, such as for viewing genres or recommendations, perhaps using methods similar to pivot tables. Such an EPG could combine the power of a thick client PC-based EPG with an ability to show what is on the TV and change what is on the TV that is similar to that provided with an on-screen STB-based EPG. It will be understood that similar functions might be offered for music, whether on digital radio, TV music channels, or the like, and might indicate what is on along with enhancements such as for ordering copies. Such a guide function might also integrate with media server guide and media asset management functions.

Other applications might also be tuned to MMUI use in coordination with TV or other video applications such as special "power" tools for browsing sports statistics and controlling fantasy league play, or such as game consoles (which may be virtual). Similar tools could be applied to educational and distance learning uses of video and hypermedia, adapted to any of various subject areas. It is noted that video games might be associated with broadcast or other video programs, such that coordination of game play with the TV program becomes desirable, much as described primarily with regard to more basic forms of browsing. It will be understood that the coordination methods described herein are fully applicable to coordination of games, whether using single or multiple device sets. This might include various methods for specifying a game or portion of a game as an ending resource, and/or of having game actions cause TV program changes and/or time-position changes, including the advanced methods for deep integration with thick clients, as discussed, the details of which will be apparent to one skilled in the art based on the teachings herein. It will further be understood that any such applications or tools are linkable resources, so that all of the methods described herein for associating enhancement resources with a viewer's browsing activity are fully applicable to such resources. Thus, the range of services that might be associated with browsing activity by these methods is essentially unlimited, and any specialized services could be effectively associated with the browsing contexts they might be relevant to. In this way these methods might not only provide a set of content resources to enhance starting resources, but also might link in arbitrary suites of tools suited for use related to such starting resources.

A further example might involve provision of unified messaging services that couple e-mail and chat and similar messaging services provided on the TV. Such might be implemented in an ITV context, with related messaging services on a PC, PDA, and server-based equivalents such as for cell phone, pager, or Web-based services. Such a unified environment could provide integration of mailboxes and message files, contact lists, and the like.

Other similarly integrated extensions of personal productivity applications, media viewing applications, and other applications will be apparent to one skilled in the art.

Services on the TV or kiosk device may also benefit from use of the personal device for control of that device and its service functions (such as smart remote control of content viewing), and in the case of a venue such as a hotel, for venue-related services, including transactions, commerce, and concierge services at a hotel kiosk.

As automation grows, access to such personal applications and databases from any device and for use with any service may become increasingly important. Without coordination of TV and PC devices, it may be impractical to save information from a TV interactive session for use with the PC, except through use of an intermediary network-based storage relay service. Such a service could involve additional steps, and additional security exposures. Similarly, PC data can be more effectively used to better personalize (or be used directly) in the TV session, as for the hotel DVR/EPG example. This applies broadly to uploading or using data resident on the PC, such as personal application data, including personal productivity applications such as contact lists and e-mail and collaboration management, finance and personal business in conjunction with an ITV session.

Any suitable means of distributed application integration may be used, including remote procedure calls or message oriented requests, and Web services using SOAP (Simple Object Access Protocol) and XML (and related service discovery and brokerage services such as UDDI, WSDL, and the like), as well as simple file download/upload. Once serious use of ITV has begun, it may become increasingly valuable to have full integration of ITV-based services with PC-based applications. Application-specific integration methods, such as those using Open Financial Exchange (OFX) and Interactive Financial Exchange (IFX) could also be desirable.

From a broader perspective, it should be understood that these capabilities go beyond pure UI capabilities relating to MMUIs and use of complementary form factors, to include rich distributed processing capabilities that allow multiple systems to be used in browsing, and in related activities that integrate advanced and/or specialized processing, data access, and service functions from multiple systems into the browsing process.

Recapping some earlier discussion of entertainment portals, integration of a suite of entertainment related functions might have market appeal, and such functions might be delivered using various combination of local thick client function and thin client function that draws on remote ASP-like services. As noted, thick client capabilities tuned to such needs might offer particular advantages, such as those relating to UI and data access speed and power. For example, an embodiment of the present invention might take the form of a package that includes a thick client that combines a suite of the entertainment-related functions just described, and that draws on remote resources for content and added functions. Such a package might take the form of a core package that includes MMUI browsing support, some additional core features which might include EPG functions and/or content and device management functions such as those supportive of a media control center, and one or more sets of additional functions which might be optional components such as "productivity" suites for interactive tasks relating to sports, movies, news, and the like.

Virtual and Augmented Reality

As device sets and UIs evolve toward rich use of VR, such as in immersive environments, representations of virtual device sets may become more relevant to UI design and usage than the details of how those representations are implemented, whether using real device sets, or simulations of various input and output artifacts available to the user (such as display screens, viewing regions, keyboards, buttons, haptic devices, cameras, microphones, and the like). In such embodiments, MMUI issues apply to the virtual device sets, as well as the physical ones, and it is coordination of browsing activity across the entire suite of virtual and real device sets to meet the needs of the user that is to be desired. The task of providing a MMUI that allows user control, in some combination with author recommendations, is essentially independent of whether the device sets are real or virtual. The task of implementing browsers to support those MMUI features, whether on centralized or distributed systems, is essentially as described above. Any adaptations required in any specific VR embodiment will be apparent to one skilled in the art.

Revenue Models

According to embodiments of the invention, the MMUI features and services described here may generate revenues in a wide variety of ways, depending in part on whether they are local to a user's site, based on remote services, or venue-based, and on whether they serve the user alone, or facilitate revenue generation indirectly by enabling transactions, commerce, advertising, or the like. MMUI features can add value to device sets and systems, generating revenue in the form of increments to device prices, operating system or application software prices, or as separate software products. MMUI features and services can also be offered in conjunction with ITV, Web, DVD, or other hypermedia services, whether local or remotely based, and thus enable price increments on a subscription or item-oriented basis. Those features and services can also add to the value other remote services, such as e-commerce or information services, and generate revenue by increasing price or sales volume of those services. Similarly, venue-based services may generate revenue in the form of direct charges based on duration of use or units of service, or indirectly by adding to the value and price (or sales) of related services. Services for transport or relay of session information and related content, and services relating to portals, may also generate revenue in the form of service fees from users, carriage fees from content providers, and advertising or sponsorship fees. Numerous variations on such themes will be apparent to one skilled, for example, in the arts of entertainment, e-commerce, e-business, and system/appliance businesses, and some further detail is provided in the discussion of various applications herein.

Embodiments in which state information is relayed through an external service might be viewed as providing a rich example of the variety of possibilities for revenue participation and for the ability to relate such revenues directly to MMUI transfers. Users might pay a fee for the relay service, pay on a subscription basis, pay per show, pay per state change, or pay on some other basis. Advertisers or programmers might pay for such a service. Advertisers might find the ability to link rich and highly interactive enhancements to TV ads to be very valuable, and might be expected to pay for such services based on criteria such as number of ad viewings for which relay is possible (perhaps in a manner analogous to Web ad impressions, pay-per-impression), number for which relay is activated (perhaps in a manner analogous to click-throughs, pay-per-click), number of activations (such as if multiple activation opportunities per ad are provided, and perhaps also analogous to click-throughs), number of leads obtained (pay-per-lead), number of transactions completed (pay-per-transaction), or other such variations. Many of these and similar pricing schemes might be applicable to embodiments providing direct transfer of local state as well.

These methods might also facilitate the ability of advertisers, programmers, and others to offer incentives to user participation that operate across multiple device sets. For example, advertisers on TV might offer incentives to encourage viewers to interact with coordinated enhancements at their PC. Such incentives might include, for example, games or quizzes, with or without prizes, special offers, lotteries, cash, mileage credits, value points, and/or the like. This could benefit the advertiser by increasing sales by direct response or by enhancing brand awareness, benefit the viewer in the form of the incentive offered (perhaps in addition to the inherent service value), benefit the system or service provider by generating fees from the advertiser or the user, and benefit many parties by incentivising greater use of interactive features and leading to further development of advanced interactive capabilities.

It should further be recognized that the possibility of providing for fee the service of transferring browsing to an alternate device set in turn entails the related capability of determining when such service is to be enabled. Thus this introduces a new class of entitlement for which conditional access control methods might be applied. For example, a cable service provider might track entitlements to view specific channels, perhaps in a manner such as is now done for premium channels, and could similarly track entitlements to enable transfers of state related to any or all channels, whether by using external relay methods, or by local communications. Thus a user might subscribe to session state transfer services for all subscribed channels, or only for certain channels, or even certain programs, such as on a PPV basis. Such selective service might also be sponsored by advertisers, whether broadly or on an individualized basis. Conditional access technology could be readily extended to selectively control transfers, based on the teachings herein, as will be apparent to one skilled in the art.

It should be noted further that this method can provide a way to charge for and control access to the use of links, and it may addresses the case of third party links as well as embedded links. Such a method of conditional access and charging for third party links could be applied more generally, to any use of third party links, even on a single device set. This could be useful if it were held that the use of a resource as the starting resource for a third party link involved a kind of intellectual property right belonging the rights holder for that resource. In such case, the use of this method to provide digital rights management in the form of conditional control of entitlements to display or activate third party links to such content could be beneficial in allowing rights holders and others to ensure that uses of such resources in conjunction with third party links were only permitted in accord with suitable business terms, such as payment of fees. Exploiting this structure to allow third-parties to freely create new works directly associated with and/or linked from existing works while providing for fair compensation to the rights holders of the starting works could form the economic and operational basis for a major new class of composite works. Naturally, if it were held that the owner of a starting resource had no such rights relating to third-party links, then an open market in enhancements created and delivered by third parties using the methods described herein might be developed.

Comprehensive Framework for MMUI Browsing

It is suggested further with regard to the methods described here that the whole is far greater than the sum of its parts. In at least one aspect, these methods provide a comprehensive framework for browsing using a rich and flexible MMUI, across a wide spectrum of systems, device sets, hypermedia types, and browsing application forms and tasks. By providing a single common framework, a consistent user interface, shared support facilities, and common infrastructure these methods can be applied in unlimited combinations and extensions to make the use of MMUI browsing feasible in varied contexts and niche applications in which creation of a less comprehensive, specialized point solution may not be economically feasible, and for which the user learning curve for the concepts, features, and controls of a specialized system could seriously limit acceptance and use. The methods provided here and the UI concepts and metaphors they embody can be broadly applied on a consistent basis, with only a moderate level of adaptation that is of a kind that could be recognized as natural to the context (by both users and developers), and thus readily understood and implemented. While convergence of TV and computers has been much discussed, this work offers the first broad method to achieve meaningful convergence in the user's interface to, and use of, TV and computers.

Stepping back to look at the broad concepts of use of a MMUI, some representative examples of typical useful modes of coordination may clarify some of the many ways the invention can be used. Implementations might offer any or all of these combinations, as well as other variations. These examples are summarized in the table in Appendix A.

Beginning with the section headed Display Set Options, the first column lists the major elements of viewing and interaction along the lines of the examples of FIG. 3. The next two columns describe display options on each of the TV and PC/PDA. The last two columns describe the scope of commands and other user interactions from each of the TV remote control and the PC/PDA. Some explanatory notes on the table:

The PIP elements may be implemented, for example, as either a true hardware PIP in the TV (with two A/V or RF input signals), or as a software-defined window or frame controlled by a video compositor and/or computer.

Video windows within a browser screen are notable with regard to how the liberator method for access to a broadcast signal, as described above, could enable replacing a standard streaming IP source with a more effective broadcast source.

The combinations of display and control may be different for each element type, or even for different instances of element types, and standard and customized usage preference profiles might be used to provide for one or more useful combinations.

A typical use may be that a primary video program be viewed on the TV for maximum effect (theatrical immersion), and that interactive text such as browser screen (or secondary video elements) be viewed on the PC/PDA for ease of reading and interaction, and to avoid disturbing viewing of the ongoing TV program by the interactor or others. Varying uses of PIP elements then follow this affinity, so for example, an interactor may optionally see the main TV program image in a secondary PIP on the PC/PDA, while other viewers may optionally see that related interaction activity in a secondary PIP on the TV, thus viewing the main program without obstruction. The further dimension of how users can control the various Display Set Options is summarized in the section of Appendix A headed Control Options.

Focusing on the lower levels of system configuration and communications paths, the sections headed Direct signal sources and Signal relay list some of the alternative embodiments in cases where resource inputs may be directly sourced, or relayed from another device set.

Some additional examples may be helpful to clarify the range of flexibility provided by the methods described herein. These examples will highlight the ability to control use of multiple device sets both within the course of a task, such as changing from a lean-back to a lean forward device set as a task becomes more intensive, and for multitasking among tasks that may be more or less related, such as to maintain coordination among multiple tasks using full MMUI function. This may be illustrated with the example of a group of viewers of TV sports, according to a representative embodiment.

One usage scenario might provide rich multitasking with simple allocation of MMUI activity by setting all enhancements to be viewed on a coordinated PC. Here the TV and PC might be connected, either locally or via the WAN, and viewing of any channel on the TV might cause a transfer that places an enhancement resource screen on the PC. Turning to channel A to watch game A could cause the current enhancement resource for game A to automatically appear in a new window on the PC. This screen might be a main page synchronized to the game, and show current play summaries and statistics, with links to supplementary details. Such a page might be dynamically synchronized with the game in a manner that employs ATVEF triggers or other methods. During a time out, a viewer might change to channel B to see what is happening in game B, and that channel change could cause a transfer that opens a new window with a similar main screen for game B. This might be given focus and overlay the screen for game A (it could instead be set to appear behind it), but the game A screen could still be available by the usual actions, such as clicking on its exposed portion, clicking a task bar, or Alt-Tab keystrokes.

Similarly, a change to channel C to check on game C could have a similar result, possibly with some maximum number of active windows, with further channel changes causing older windows to close (e.g., the least-recently used, least frequently used or the like). The viewer might then switch back to channel A, and in this case the transfer might simply result in the already-open window for game A being returned to focus. Depending on options selected, that window might show whatever resources were last active in the browsing sub-session related to that channel, such as had been left after a period of surfing through various enhancement resources. Alternately, the window might continue to be responsive to enhancement triggers from that program, or it might simply be reset to a main menu screen for the current program in that channel, or some other variation. This might then continue as channels are changed among the same set of channels, or an evolving set of channels.

A scenario that sticks to a single channel on TV, and uses limited multitasking, might instead start with a casual check of enhancements shown on the TV screen. As more detailed statistics and perhaps play in a fantasy league was pursued, the user might request a transfer to a PC for lean-forward interaction, possibly removing all overlays from the TV. This action might continue, and on seeing some screen of general interest to other viewers, the PC user might transfer that current PC Web page to the TV to be rendered in a variant form suited to the TV. Multiple viewers might each have PC devices, and might individually select the same or different contexts to be transferred to their individual PCs for independent use. Some overlay screens might also remain active on the TV, including the case of some screens for a given channel on the TV and some for that channel on the PC. Enhancement resources might also include video such as instant replays, alternate camera angles, and the like, and such resources might also be viewed on either device set.

In conducting such MMUI sessions, the viewer might use the PC screen on a more or less active and continuous basis. Just as visual bugs on the TV screen have been found useful to cue viewers to the availability of enhancement materials, similar cueing might be desirable in MMUI applications, for instance, when such enhancements are not ubiquitous and/or not expected to be ever-present. Such might be the case, for example, during early deployments, off-hours, and/or on channels with limited enhancement coverage. Similar visual cues on the TV might be applied in such cases, but alternative cueing methods might also be desirable, using any of a variety of viewer-sensible cues.

One method might be to provide such cues at the PC. Such PC-based cues could, for example, be visual (e.g., blinking of flashing indicators or alert windows), object level cues (such as selective marking of specific objects in the video image), and/or audible signals. Such audible signals might be useful, for example, in cases where the PC is put aside when not in active use. In any case, a distinctive set of such cues, such as different tones or blink patterns, could be offered to signal different sorts of enhancements. These might differentiate more specific, time-sensitive or time-related, and/or otherwise important enhancements from other, more basic enhancements. Such multi-level cues might be of value, for instance, in distinguishing generic enhancements that might have only a basic level of relevance to the program (e.g., a generic menu screen or generic reference data) from more specific enhancements that, for example, add significant value to specific program segments.

A scenario that combines both multi-tasking and variable use of the MMUI device sets might involve using a TV to view main menu overlays on the TV. The overlays might automatically appear in synch with any current channel or only on command. Initial interactions might be done on the TV by one or more viewers using standard remote controls, or using their PC/PDA device sets as remote controls. At some point, a user might request a transfer from the TV to the PC. Similar actions might be taken for additional channels, leading to a status like that in the first example with three games being viewed but with some mix of screens on the TV and the PC. Further channel changes might synchronize enhancement screens on either or both devices. Thus there might be active screens or windows on both the TV and PC associated with each of several channels. The TV screens might be seen only when the channel is on, while the PC windows might remain open but change focus as channels change on the TV. A user might thus watch several games in such a surfing mode, with fully coordinated enhancement viewing on both the TV and the PC.

Similar coordination of multiple sub-sessions might be applied to replays, whether broadcast or effected locally using a DVR, with enhancement screens related to both the live program and the replay segment. Multiple viewers might do the same, possibly with different sets of resources on their private lean-forward devices. PIP functions could add a further level of multitasking, and that also could coordinate with alternate device sets. Such a rich and intensive level of interaction might at first seem unduly difficult by current standards of TV use, but an emerging population of increasingly skilled heavy media users would likely find this kind of rich multitasking to be highly satisfying. In the scenarios just described, the transfers that track the channel changes might be predominantly push transfers. The original activation might be either by push or pull.

As noted above, such methods could also be applied to heterologous mulitmodal sessions. One example might be to coordinate telephone calls with ITV activity, such as by providing a "place call request" control within an enhancement resource and/or associated with the video program itself. Such a place call control could be used with commercials to facilitate direct response. Embodiments could include, among others, sending the transfer request to a remote server to effect an outbound call from a call center, such as via an ITV back-channel or via the Internet, or sending the request to an intelligent phone at the consumer location that calls inbound to a call center. With such approaches, for example, the place call control could be used from either or both of a TV or PC/PDA device set, as determined by the user and/or the author.

While the above examples have been described primarily in terms of channel-oriented realtime program viewing, the same capabilities are readily provided in more individualized cases where trick-play is used, where programs are obtained on demand, and/or where programs are personalized as to content. Embodiments might have varying distribution of viewing control functions, such as in the STB or head-end, so that state relay might take various routes depending on what communication paths are available and where the information is most conveniently obtained.

Further information regarding embodiments applied to advertising content will now be provided. It should be understood that ads could be treated as being separate programs of a special kind and related to a primary program. Accordingly, as in the examples above relating to channel changes, the start of a commercial might trigger the opening of a new screen or window for enhancement content relating to that ad. Such triggering might be done in a variety of ways, such as, for example, using special logic related to insertion of commercials, or based on ATVEF triggers. Alternatively, such coordination could be done asynchronously, as described earlier, to allow for later activity that does not interfere with realtime viewing of the base program or other following ads.

In addition, various techniques might be applied to individually target ads to addressable households or individuals. Such may serve to shift from the group broadcast model of TV to the one-to-one targeted, personalized, and customized model of Web advertising. Such models may translate rather directly to streamed Internet delivery and to VOD cable delivery in which the program stream is inherently directed at a specific target receiver, and may also be adapted to more traditional TV group distribution modes. For example, some such schemes might combine a traditional channelized delivery of regular programming with special methods for inserting ads into time slots on an individual basis.

In general, personalized ads involve having multiple alternative ads and/or component parts of ads (perhaps including dynamically created, data driven, individualized elements) which might be selected for targeted presentation based on various individual and/or household characteristics such as location, demographics, psychographics, history, behavior, interests, channel and program viewed, and/or the like. Embodiments could vary in where the selection is done, such as at the TV or STB, or at the head-end (possibly in a special ad server or insertion system), or even by the user. In any such case, the identity of the ad that is shown may not correspond to the channel that is tuned to for the base program. In the case of VOD, the channel might be a special customized channel, and in the case of channel-oriented programming, the ads might be selected and inserted into an ad slot without being determined by the particular channel that the base program is on. In such cases, a program identifier for the ad might be used as the relevant state information that identifies the ad as a starting resource, and associates it with links to enhancement resources.

Various embodiments might obtain that state information directly from the STB, or via relay through the head-end. Alternatively, some embodiments might exploit availability of that information from within the head-end, or an associated ad server, such as in the case where the selection is determined or at least known at the head-end (perhaps acting as a distributed ASP-style support service to the STB). The same methods could be applied to services that might use similar dynamic methods to customize programming other than ads.

It is noted also that the sorts of MMUI usage just described, with multi-channel TV viewing and associated use of multiple Web sites and/or other similar resources, may cause new opportunities for advanced targeting of advertising messages to arise. Thus, instead of targeting to a specific program, and possibly a specific TV user, and separate, independent targeting of a Web visitor at a given Web site (which may or may not be inherently related to the TV program), ads can be targeted based on the combination of resources viewed and the dynamic behavior of that activity.

For example a user watching game A might see one ad, but a user watching game A and B as well as both corresponding Web sites might see another ad. A user shifting only occasionally from one channel to another might see one ad, and one moving rapidly back and forth might see another. Thus any combination of resources and dynamics (e.g., both resource history and timing or pace) might be used to differentiate targets. Advertisements might also be used to influence viewers of one channel to switch to another. Such counter programming ads are not used on conventional TV, but in the more complex environment of multi-resource, multi-channel, MMUI viewing, this might be attractive and valuable. Similarly, it should be understood that in the case of custom assembled ads, such as those provided by the VISIBLE WORLD system, the enhancement resources presented might vary with the specific combination of ad components selected. Combining both embodiments could enable enhancements to depend on both the specific TV ad customization(s) applied and on any concurrent viewing of other channels and of other enhancement resources, such as those associated with the other channels.

Embodiments of these methods may be oriented primarily to advertising rather than the base programming, and in such cases, special coordination portals of the sort described above might be specifically oriented to commercial content. In any case, incentives might be provided to viewers to encourage viewing of such commercial enhancements. Incentives might be related to simply having a device set actively connected to such a portal, to responding to interactive elements of any kind, and/or to particular kinds of interactions or transactions.

Another example of a beneficial use of the methods described herein relates to providing increased flexibility in the use of basic information overlays or add-ons such as those that are presently included in non-interactive television services. It has become increasingly common for some programs, such as news and sports programming, to contain information overlays in the form of tickers or banners or similar formats at the margins of the screen, including rich combinations of elements. Such materials are essentially forced, default enhancements. Some may cover portions of the TV image, and others may cause the image to be shrunken to make room for the added information, but in either case, the primary program video image is compromised, and the result may annoy or distract many viewers.

The methods described herein enable such forced enhancements to be made more flexible and discretionary, so that they can be enabled from view, disabled from view, rearranged, and/or selectively transferred to an alternate device set. For viewers who use a PC as secondary device set to view such programs, the ability to transfer such enhancements to the PC could be highly desirable. As described, control of such targeting might be done as needed by viewer command and/or set in advance as preferences. Further, such control might address cases when a second screen is or is not active, specify different behaviors for different classes of such enhancements, and/or provide for multiple alternative settings that can be selected by the viewer or based on set criteria. Such flexible handling of enhancement content, including enhancements that are pushed to the viewer, could, for instance, enable viewers to usefully receive and/or work with a broad range of information services that could have widely varying degrees of relation to current program viewing. These might include, for instance, broad portal-type services, and might be particularly useful for alerting services, such as, for example, news alerts, financial alerts, and/or for extensions to the Emergency Broadcast System, providing new levels of power and richness.

Deployment Staging Considerations and Alternative Approaches

As discussed herein, MMUI services in support of coactive browsing might be embodied in a variety of configurations capable of suiting varying stages of introduction in varying environments. Fuller and/or more cleanly integrated embodiments might involve direct integration with coordinating devices and systems (e.g., STBs), perhaps including software support and/or suitable network connections among cooperating devices in the home. Less deeply integrated embodiments might involve "pasting-on" or "bolting-on", perhaps via the use of adapter devices and/or circuitous network paths. In various implementations, less direct and integrated embodiments might serve as evolutionary paths to more integrated embodiments.

It will be further apparent from the teachings herein that coordination of TV viewing with related Web activity might be desirable, and that by extension, even crude levels of coordination might be valuable to viewers, programmers, and advertisers. Aspects of the methods described herein for providing a portal for coordinating Web and TV activity can be beneficially applied in basic, partially automated form even without the direct, automatic coordination afforded by the state transfer and tracking methods described herein.

A basic benefit of MMUI coordination is that a viewer's access to resources on the Web is placed into a degree of correspondence with what they are viewing on TV. Still, in various embodiments, a limited approximation of full synchronization and automatic following of activity across device sets might be employed. A cleverly effected portal service that is personalized to the user's viewing habits might provide a semi-automated coordination service that delivers a level of value, especially for certain types of viewing. Such functionality could allow for use across channels and/or program alternatives with reasonable and useful correlation to program content, despite lack of full and/or automatic coordination with actual viewing. In the implementation of such embodiments, thought might be given to how much effort is required to use such a portal relative to alternatives lacking such coordination support, and/or how much value that support adds.

Without any portal service or direct coordination, viewers might be able to obtain Web resources associated with TV programming that is viewed on an independent system only by navigating to a Web site that might be specifically associated with the program being viewed. This would require a viewer to know how to find such a Web site, and to actively navigate to it whenever access is desired. Such navigational burden limits the appeal and usability of such services to highly motivated and well-informed viewers. An effective cross-channel portal service could significantly reduce that navigational burden, for example, by often making accurate prediction of what a user might be viewing.

Further, such a portal service might be useful even when it predicts incorrectly. For example, in various embodiments an incorrect prediction could act to narrow alternatives and/or provide navigation aids such that only some few manual steps are needed to find the desired resources. As a specific example, the portal might load a resource for the program deemed most likely, but might also provide convenient direct links to the next most likely programs, perhaps organized in order of likelihood, so that a near miss would add only one click to get the user to the correct resource. Further navigation structures could organize all likely alternatives for rapid selection.

Such a portal might differ from the functions provided by a program guide (EPG), for example, in that it might reduce the need choose among alternatives by giving preference to programs, perhaps including ads, that are currently airing or about to air, and linking not to descriptions of the program suitable for use to select viewing, but rather to enhancements useful to those who are already viewing the program. Such enhancements might include, for instance, enhancements for coactive viewing of related and/or supplementary information. Such functionality be applicable, for example, to both scheduled and on-demand programming. It will be understood, however, that such enhancement-related functions might be combined with and provided as an extension of a program guide service, just as integration with general purpose portals was previously suggested, and it is noted that such integration might offer added data for inference of current viewing, as described below.

To make such estimates of likely viewing behavior in the absence of direct, precise, and/or accurate state information, and to otherwise narrow the options to a small set of likely programs, a portal service might draw on any or all of a variety of estimation methods based on other kinds of available information about the viewer and his viewing context. Such methods might include any of the techniques generally used to personalize, customize, adapt, and apply learning and external data in other kinds of Web-based services, as well as methods specifically oriented to TV viewing context and behavior, and might particularly include some combination of the following:

A portal might draw on program guide schedule information, which along with knowledge of the viewer's zip code, metropolitan area, TV programming distribution service, and/or current time, could limit its scope to programs currently airing and accessible to that viewer. Similarly, the subset of video-on-demand options could also be narrowed.

A portal might draw on personal preferences and/or behavioral data that indicate a viewer's habits and tastes to make estimates of probable viewing behavior. Such personal preferences and/or behavioral data could include, for instance, data relating to TV viewing, Web browsing, and/or other activities. Personal preferences and/or behavioral data could range in level, perhaps including factors such as channels or networks, specific shows, genres, actors, subjects, and/or the like, and/or how such factors vary by time-of-day, recent behavior and task work style, participation of other household members or guests, and the like. Combined with program guide data, such information could allow for reasonably accurate predictions of viewing at given times.

A portal might collect feedback on browsing behavior, such as clickstreams, including clickstreams associated with program enhancements relating to particular programs and/or sets of programs. The portal might analyze such clickstreams to learn when its estimations were confirmed by viewing and related browsing and/or when navigation to resources related to other programs was done, the latter perhaps being suggestive of prediction errors. Such feedback might be from an individual user, and/or might draw on the behavior of other users identified as being similar, such as with collaborative filtering techniques.

A form of clickstream data could be obtained in relation to the use of a program guide service, which, as described above, might be usefully combined with a portal. The most recent click on a currently airing/available program entry in an EPG might, in various embodiments, be employed as an estimator of the currently viewed program, and other recent clicks on currently airing/available programs might, in various embodiments, be employed in determining likely alternatives. Prior history patterns relating to use of the EPG might also be employed in estimating the currently viewed program. Thus integration of such EPG services might both add value to the viewer, as a TV-related service that benefits from MMUI coactivity, and add to the effectiveness of the portal as a semi-automated linking portal.

A portal might also be specialized, for instance relating to a specific genre or group of programs such as news, movies, sports, games, reality shows, kids shows, and/or the like. Such specialization could further narrow the options and make use as a coordination tool more effective.

The kinds of data just described might be obtainable automatically from various sources, including external databases and information sources, or by advance entry of personal preference and other context data that can be used on an ongoing basis. In some embodiments, such data might be obtainable by environmental sensing, both with regard to the viewing activity, and more broadly.

Broadly speaking, such methods might offer a way to give a portal context-awareness, based on a wide variety of inputs other than specific knowledge of the TV viewing state or direct entry by the user at the time of viewing. This might be viewed as a particular case of context-aware computing, one that draws on information related to TV viewing for a given user or set of users at a given time and place, and this might be considered an aspect of synchronicity. Such context-awareness might then enable the portal to usefully support MMUI browsing even lacking definite information on TV state. It will also be apparent to one skilled in the art, based on the teachings herein, that determining context based on knowledge of a schedule of external events, the time, and/or the preferences of a user (e.g., as predefined and/or as subject to automated learning based on observed behavior and explicit or implicit feedback) might be applied to a large class of context-aware computing tasks unrelated to browsing.

Further discussing the use of such a portal in navigation to TV-related enhancement content, the actions taken by a user will now be considered. As described earlier, the viewer might have his PC set up to include a portal toolbar that is always present and connected to the portal service. Lacking that, the viewer might merely navigate to the portal manually, such as using a well-known single URL, or possibly using a bookmark or home page setting or similar shortcut. The user could be logged in to the portal, so that the portal could apply its methods on an individual basis to predict likely current viewing behavior. Viewer identify might be switchable among household members as desired through manual logon controls, or inferred based on analysis of viewer behavior or other information. A resource that provided enhancements for the predicted program (e.g., a main menu page for the program) or for the current segment of the program might, for instance, be automatically loaded at the start of viewing and/ or at set intervals (e.g., every half-hour and/or at scheduled program end times), and/or might be refreshed and/or altered at appropriate times (e.g., according to triggers and/or other cues identified as being for that program).

In addition, a supplementary menu of links to enhancement resources for likely alternative programs might also be presented, whether as a simple list, or with advanced controls such as a drop-down. Thus in cases where the portal predicted correctly, the effect would be equivalent to that of a fully automated coordination portal. Where the prediction was incorrect, a single click might often be sufficient to reach the correct enhancement resource, and thus serve as a useful near equivalent to the effect of full automation. In either case, the portal could learn which outcome occurred and use that information to seek to improve its future predictions. For the richer variety of VOD offerings, and/or use with a DVR or other home media archive, a more extensive navigation facility might be provided, again possibly exploiting knowledge of the relevant VOD provider's current offerings and/or DVR archive contents possibly in combination with knowledge of user preferences and behavior.

Such semi-automated portals might be particularly effective, for instance, when applied to limited programming categories, such as specific genres or niche uses. These might include any of the following, and/or other similar uses:

News, and the subcategory of financial news, with enhancements relating to current news stories, related prior stories, and associated reference material, and the like. Unlike a conventional network or other news site, this might be organized to highlight stories just aired and related enhancements, possibly including time of airing and a key, possibly with a time log for aid in navigation.

Sports, with enhancements related to game, team, player, and league statistics, scores, fantasy games, and the like. Unlike a conventional network or league site, this might be organized to highlight the game predicted to be viewed, as well as other likely alternatives viewable at the same time.

Movies, with enhancements related to cast, credits, reviews, and the like, as well as sales of DVDs. Unlike current network sites, this might highlight movies on multiple channels, and unlike movie databases, it might feature the particular movie predicted to be viewed.

Games, with enhancements related to the TV game, or related games, including at-home competitions—with cross-channel coverage Reality programs, with enhancements related to audience participation, including voting, chat, bulletin boards, and the like, as well as supplementary video and other content Music, with enhancements related to artist, album, and background and the like, and sales of CDs—with cross-channel coverage.

Similarly for documentaries, series, and other genres.

As noted for some of the above, enhancements for any of these or other categories might also support "t-commerce" sales related to the program content, as well as enhancements to advertising that enable self-service, deeper interaction, and transactions. It will be understood that the enhancements provided through such a service might, but need not, include enhancements offered by the programmer of the TV program. A variety of enhancement channels might be provided, relating to programming and/or advertisements, with selection among them controlled by the portal provider and/or the viewer, as described above.

It should be noted that the genre of news inherently has a level of cross-program synchronicity that might be usefully exploited to offer a semi-automated service that provides high value. Many programming services (channels) provide news, but all are based on inherent external synchronization to the actual occurrence of news events. Thus while each channel differs in the details of news item selection and treatment, most of the items covered within a relevant interval of programming, such as a half hour news program, might be largely the same.

Accordingly, if a semi-automated portal were specific to news, it might be marketed to frequent news viewers, and even when its predictions of a specific channel were wrong, the enhancements might be largely relevant anyway. For example, the viewer might be able to use the "incorrect" enhancements with only minor disadvantage, or to easily change to the correct channel to get the small improvement that would offer. Further, it might be that news viewers have high network/channel loyalty, so that a favorite channel might be preset or learned, and re-set when that changes. Such preferences might be specific to time of day, and to individual viewers in a household. In such cases, the predicted channel would often be the correct one. Since such viewers might still change channels occasionally, such as when major news is happening, such a combination of favorite channel prediction with convenient cross-channel capability might be very useful, and relatively simple to implement. Similar methods would apply to any other content that has a high level of synchronicity across channels, and/or a high level of channel loyalty.

It will also be understood that such a semi-automated coordination portal might be suited to early implementations of services that could be put into use without any need for cooperation of key TV industry participants, such as distributors, programmers, and STB and middleware providers, and with standard home entertainment and PC/PDA devices that need not be linked to one another. As described above, third parties might provide enhancement services for use in such an implementation. Such practices might or might not involve intellectual property rights of the TV programmers that own the rights for the programs that serve as starting resources. It will be further understood that while such portal service functions are described as being provided by a remote Web-based portal, equivalent functions at any of the levels described here might alternatively be deployed in local, thick client form, or other embodiments, as well. Similarly, it will be understood that some or all information on current programming schedules might be downloaded in advance, and used with regard to current time, rather than obtained at the time of use.

One alternative embodiment of the portal methods described herein might be based on SMS or similar services, such as using a cell phone or PDA. SMS-based enhancement services have been used in Europe to enable TV viewer response and participation. Similar to going to a known program Web page in prior synch-TV embodiments, a caller can register their cell phone at a specific cell phone number (or Web site) to receive programming alerts and interact with a given program. Again, such prior services are currently program-specific, but the methods described herein might be applied to allow a cell phone to be registered to a cross-program portal service, and receive such alerts and interact at any time, or to be activated and deactivated as desired with a simple activation message.

A further alternative, which might be used in place of or in combination with the above methods, is to use communication methods which might be unreliable or which might require viewer action to provide more or less reliable indications of viewing state. For example, as described previously, liberator configurations, particularly the example of simply using an IR sensor packaged with a PC, might provide state signals that are not reliably received and/or that require double entry by the viewer. Such signals might provide unreliable cues to current channel, or might involve a semi-automatic form of coordination control drawing on limited user input, that might at times be simpler than the above example in which inferences are corrected by user action at the PC. For example, the viewer simply pointing the remote at the PC and repeating the channel entry command might serve to maintain desired coordination, whether instead of or in addition to the inference methods just described.

Broadly speaking, the alternatives described might be viewed as falling into three general levels of sophistication, which might correspond to possible levels of market introduction and deployment:

A basic level is the semi-automated coordination service just described. While the utility of such a service might be more limited that the other levels, it might be put into service with relatively limited resources and with little or no industry support.

An intermediate level is the fully automated coordination service based on any of the various "paste-on" or indirect methods described, such as those referred to as liberator configurations, or similar variations. These might provide full service, but possibly with some awkwardness of setup or inefficiency that might limit the extent of consumer acceptance and use. Intermediate level solutions might also include embodiments that provide automation in one direction, and not the other, such as for example, one in which the PC automatically coordinates to the TV, through either a local or remote path, but in which coordination from the TV to the PC is semi-automated, or vice versa.

A third level is the fully integrated service that is fully supported by the participating device sets and systems. This might have the advantage of being totally seamless and without any barriers to user installation and setup, other than for changing default preferences to individualized setting, but might be most demanding of hardware not currently deployed.

As noted above, in categorizing alternative methods of automated coordination, an additional dimension of distinction can be viewed as that between those that rely on linkbase information being distributed with the primary program, and those that make a separate association of such linkbase information with a program. Many of the methods described herein with regards to portals relate to separate associations, and to the use of alternative associations that such methods may facilitate. Alternative embodiments may rely on linkbase information distributed with the primary program, such as in the form of ATVEF triggers or other encoded forms of URLs or other embedded linking codes, and/or direct inclusion of such resources with the program distribution. Such methods may effectively specify a specific set of enhancement resources.

Nevertheless, it will be understood by one skilled in the art based on the teachings herein that a variety of methods, such as, for example, proxy servers or other methods of intermediation and translation of links, including redirection, might be used to redirect such links to alternate sets of ending resources, while drawing on the supplied set of starting resource specifications, and thus to achieve similar results. One might think of the direct distribution method as a case of being pushed from the TV program to the enhancements, and indirect method as one of pulling from the TV program to the enhancements. Use of alternative enhancement sets might seem somewhat more natural in the case of pulling, but might be applied to the case of pushing as well, perhaps, for example, in the manner just described.

It will be apparent that such alternative linkbases might be created using any appropriate methods, including those of the kind typically used by original programming producers, whether done in advance of use, and/or in real time as a program is broadcast. Methods particularly suited to independent and realtime production might draw on prepared resources and automated and/or semi-automated realtime processes for identifying subject matter in starting resources and creating links to enhancement resources that are dynamically assembled from the prepared resources. Such methods might draw on the various techniques already in use for the similar tasks of automated and semi-automated production of conventional Web content.

Appropriate methods for identifying subject matter in video starting resources might include reference to program guides and other external metadata, reference to metadata included with the program, including closed-caption data, and recognition of audio and visual elements or features of the program. Semi-automated methods might be desirable to draw on automated methods, while supplementing them with human judgment, insight, and oversight. It will be understood that processes for association of starting and ending resources based on these or other similar methods might be provided as services. These services might be provided for fee to providers of content resources, both starting resources and ending resources, to enhance the value of such content and the ability to market that content. Such services might be based on any of various combinations of software, ASP-like automated services, and services based on editorially created associations, whether as independent services, or as part of a linking portal.

As a variation on these methods, it will also be understood that integration of a coordination portal service with the VOD ordering service of a cable operator or other programming distributor might also provide the PC with direct knowledge of such programs being viewed on the TV. Since such VOD programming is generally controlled from the head-end, such coordination of state might be fully achievable with no special communication with the STB. Further, instead of controlling VOD services exclusively from the TV, such integration might be bi-directional, enabling PC/Web based control that might offer many of the various advantages described herein for enhancement viewing, and other features, including powerful PC-based program guide services. Such methods might also be permitted to interoperate with conventional TV-based control of VOD services, and notification of such activity might also be relayed to the PC from the VOD servers at head-end, even if other state changes that might be targeted to the STB, such as simple channel changes, for example, are not similarly relayed.

Also, as described above, similar coordination relating to advertisements might be driven using information from ad servers, and such coordination might be a valuable commerce enabling service in itself. It is further noted that even in cases where a coordination portal is operated independently of the TV system operator, and integration with VOD operations might be limited, linkage of such a portal to a VOD operator's service might be valuable to the operator to provide the advanced program guide and VOD ordering services such a portal might offer. In such cases, fees might be payable by the VOD operator for such order generation and placement services. As described above, various user identification, authentication, and security measures might be applied to ensure the integrity of such processing of VOD orders from the open Internet, in contrast to the conventional case of such orders originating from the STB to which the order is to be served, and having a known location/identity within a closed cable network that is typically under an operator's full control.

It is further noted that such a capability for external placement of VOD orders, such as from the Web, can be valuable in providing broader interoperability between Internet-based services, and those using specialized transport facilities such as cable or satellite TV distribution. For example, a cable TV distribution network might be an effective way to distribute high-quality video to homes, even if that video is found on the Web, and regardless of whether it is to be viewed on a TV or on a PC. More particularly, consider the example of BMW Films promotional videos, which were first offered on the Web, via streaming, and more recently made available on cable TV VOD systems. These offerings are currently totally independent, in that all Web requests are streamed via IP to the PC, and all VOD requests are selected from the TV and sent to the TV.

Using the methods described herein, a user might select a film from the BMW Web site, using a PC (or, alternatively, using Web access via the TV), and order it to be delivered via the user's cable VOD service. The availability of such video to the VOD system might be prearranged, as is currently the case for BMW films, or might be enabled dynamically, such that any video source might be connected to a VOD service head-end. It will also be understood that while viewing on the TV might be the default result, home network facilities might also enable viewing on a PC, whether the one that placed the order, or another one. This mixed-facilities transport might be done using any suitable formats, protocols, and controls, including, for example cases of conversion from IP to specialized cable/VOD formats/protocols with possible reverse conversion in the home, such as for PC/Web viewing), or cases of tunneling of IP packets through the cable/VOD protocols for simple extraction in the home, and including cases in which channels and/or bandwidth normally reserved for VOD are allocated to such Internet-sourced traffic.

Such methods might be valuable for distributing content from commercial sources, as well as from independent video sources, such as ATOM FILMS or THE FEED ROOM. A variety of business models might be applied in such embodiments. Carriage fees might be charged by cable or satellite operators to content sources, and/or fees might be paid by such distributors for premium content. The distributors might in turn, charge such premium content fees directly or indirectly to the viewers that order the video. This might be thought of as having the effect of making the cable or satellite distribution path serve as just another form of routing for Internet services, even if the protocols are not Internet protocols, thus effectively embedding those facilities into the Internet, thus making them more broadly useful.

From this perspective, it can further be seen that such an effect of functional integration of TV or other specialized media distribution facilities into the Internet can enable the full range of interactive services and business models to exploit that embedded video distribution channel. For example, the methods of "smart syndication" previously proposed for simple Web-based media, in which customized content is created with the intention that it be intelligently targeted to and/or selected by small sets of viewers, or even a single viewer, and used as a carrier for commercial messages and/or interaction opportunities that are targeted to appeal to those particular viewers, might be adapted using the methods described herein to work with VOD or other customized TV services as an outbound video channel, and to use the Web as an inbound interaction channel. It will be understood that such outbound video might be customized dynamically, with all of the flexibility normally associated with Web-based content. Thus such a coactive combination of TV and Web media could give the effect of a single, integrated, closed-loop, intelligent medium, with all of the power of the Web for personalized interaction and customized, dynamic content and services, while exploiting all of the power of specialized video distribution facilities to deliver captivating, high-end video experiences, including HDTV and other advanced DTV services.

Extending the discussion of enhancement services, another class of such services might be those that provide a particular kind of support functions across all kinds of programming. One simple but useful example of such a service is the "what is on now" service. Such a service is currently available in single-screen, centralized TV systems, in the form of the EPG "info" function that gives information on the program that is currently active. As noted above, the methods described herein enable an MMUI service in which this EPG-like info function is provided at an alternate device set. This model of a simple function to indicate "what" might be extended similarly to other common information needs, such as who, where, when, how, why, and the like.

One very useful example is a "who is on now" service, which might be referred to as a "who-bot" or more accurately a "whonowbot." Such a service might use a simple command, such as a single key entry, to invoke the "who" function, which might then produce a list of the people who are on screen at the moment. For movies and dramatic programming, the results might be the subset of the cast list that corresponds to the current scene, possibly both role name and actor name. For news and documentaries, it might list the announcers and the subjects of a scene. For sports this function might list the players active in a current play, as well as coaches or officials on screen.

It will be apparent from the teachings herein that such a whobot service might be created by using a combination of knowledge and or inference of the program currently active obtained using any or all of the methods described, combined with pre-existing, or specially created databases that relate people to time within a program, including databases created in realtime as the program airs, to infer who is on-screen, and selected by any of a variety of inference methods. Such methods might draw on information organized by patterns of channel, program, people, times, topics, genres, and other such factors. It is noted that processing of closed caption data might be a particularly good source of data for such uses. It will be understood that such information might also be obtained, perhaps more directly, by image recognition, but the other methods described herein might avoid the difficulties of such a task.

Whatever the methods, the result might be a list of people and/or roles, in order of likely interest, for each of the one or more programs inferred as being the likely intended current program that is the subject of the request. Such a whobot result might be presented as a special screen in response to a who command, and/or might be a default or optional service perhaps included in a portal control panel and/or similar area of a screen. Such a portal control panel and/or similar area of a screen might be left active and/or visible. It is further noted that such a portal control and/or similar area of a screen might updated automatically and/or continuously, and/or on command, as desired. The service might then in turn provide links for each such person to related information, filmography, biography, and other related content, and/or related products, such as CDs, DVDs, or other merchandise.

As an additional level of intelligence, this service might learn about who the viewer knows and shows interest in, both to rank the candidate people responses, and possibly to provide an option to exclude people that the viewer is very likely to know well already, and thus presumably does not intend to be asking about. Such learning might exploit categories as described above, and might also apply collaborative filtering methods to draw on knowledge of others with similar interests.

Further to the who service and the what service, similar methods will be apparent based on the teachings herein for other services. For example, a where service might give the location of what is being viewed and/or of where the program originated from. As another example, a when service might place program content and/or its creation in time, how, which might give background on how the program was made and/or on how an activity being shown is performed. As yet another example, a why service might give background on the motivation of the subjects and/or creators, and other similar functions. By, for instance, focusing on simple repetitive tasks, much of the difficulties of more broad-based inference tasks might be avoided. The methods need not interpret the meaning of the question and the intended form of response—those are given, and are highly repetitive. Accordingly, simple inference and learning processes can be applied with good result within that constrained, but utilitarian, formulation.

Using the whobot as an example, it is noted that such a service might be valuable in other contexts, unrelated to media viewing. For example, such a service might be desirable in the real world, to indicate who is within a particular vicinity. Such a service will be illustrated with a PDA as an example, but it is noted that such a service could take various forms, and could work with any of various devices.

A PDA whobot might respond to a single command and present a list of the people a user might be expected and/or wish to know that are known or inferred to be in the user's vicinity and presumably visible. This might be done by using both context and database information, in combination with inference methods, and all keyed to the real time as of now as the relevant context for inference, and as the common point of reference for making associations with other data. The databases might include a personal organizer, and the context data might include location data from a schedule and/or from a GPS or other location service, as well as data on relationships, such as to infer that if the user has a meeting with person 1 now, he might be asking about person 2 who is a colleague or friend of person 1. This might also include a history database, and learning processes to tune the inference process. As with the TV whobot, the rankings might be weighted by who the user knows well, and would not be likely to be asking about, and who the user may or should know less well as likely intended targets. Similarly, a telephone whobot might go beyond simple caller ID/name information that is in one-to-one correspondence to the calling phone, to suggest other people who might be using that phone, based on relationships, schedules, location data, and the like.

Additional Aspects Relating to Advertising and Commerce and Third-Party Linking Rights It is also noted, given the capabilities of independently-sourced, alternative, third-party links as described herein, that enhancements associated with ads viewed on TV could potentially enable a new form of commerce that changes the coupling between advertisements and the consumer actions that result from them. This could allow a portal to provide for enhancements and/or t-commerce sales offered by parties unrelated to those distributing the ad. Barring any legal impediment to such indirect exploitation of synchronicity, such t-commerce revenues might be a significant factor in making such coordination portal services profitable.

Considering further how new forms of commerce might be enabled by this flexible coupling of ads and independently sourced third-party enhancements, it is useful to consider the relationships between three kinds of parties: the producers of goods or services that are the subject of the ad ("producer"), the creators and distributors of the ad ("advertiser"), and the sellers of the goods or services that benefit from consumer action triggered by the ad ("seller"). In traditional retail, ads are typically controlled by producers, and lead to any seller chosen by the viewer. In traditional direct marketing, the advertiser and seller are one and the same, and may be independent of the producer. Sellers may also fund advertising that directs customers to that seller even in situations where that is not directly actionable, such as in the case of TV ads for retailers. Hybrid cases may also occur, such as auto ads funded cooperatively by manufacturers and local dealers. The third-party ad linking capability adds a way for a seller to funnel the consumer action resulting from the ad to feed directly into its sales process, and to potentially do this without any cooperation by the advertiser, through use of the third-party link mechanism.

For example, once a portal determined what channel a viewer was watching, by direct or indirect methods such as those described above, it might then determine what ads would be presented to the user. Even where ads are individually addressed, informed predictions could be practical even in cases where direct coordination methods described herein were not available. Thus the portal service can effectively capture all such ads and offer enhancement resources that exploit the ad to provide information and a place to buy the product or service.

In most current situations, ads that are not specifically targeted to particular sellers are funded by producers, who obtain revenue from sellers as part of the wholesale cost of the goods. A new model of independent advertising that differs from this might be enabled by the methods described. This might occur if it is determined that the advertiser has rights relating to third-party enhancements linked to his ads that are used for selling, based on copyright (or "adrights"), or can in some other way oblige such sellers to pay fees relating the sales derived from their ad. If the advertiser can enforce such rights in order to obtain fees from the sellers, it can fund the ad from those fees, independently of the producer.

This model could then work in a way that might be viewed as being like an affiliate sales model in reverse. Conventional affiliate sales models are operated by single sellers, such as AMAZON.COM, who offer advertiser-affiliate relationships to many Web sites that act as direct marketing advertisers, and who are paid referral fees for any sales they refer to the seller, as tracked by means of specially coded links. Thus the relationship could be that of possibly many advertisers to a single seller who operates the advertiser-affiliate program. In the new model enabled by the methods described herein, the relationship is that of possibly many sellers to a single advertiser who operates this new seller-affiliate program. Instead of the advertiser controlling links to the seller, and competing with other such advertisers, it is the independent seller controlling third-party links from the advertiser, and competing with other such sellers for the preferential use of their links by consumers. Such sellers could effectively provide linkbase services that viewers might select from and use. Such linkbase services might be obtained either directly or through broker services, whether by active request and selection, or by implicit association with some program or Web service, or other facility used by the viewer, including a portal service as described herein.

This might enable an open market for advertisers, in which any independent advertising creator/distributor can pick among products and producers, fund an ad on its own, and profit from the sales it generates through third-party sellers. Thus instead of advertising being a service business that is indirectly funded as a cost of sales through either producers or sellers, at rates which generally do not correspond to results in any direct way, it becomes a direct profit center, with direct revenue from the sales that it drives. This could enable new levels of entrepreneurship, results-orientation, efficiency, and profit in the advertising business. Thus any advertiser might be able to promote any product or service, and any seller might be able to exploit any advertisement or promotion, perhaps in accordance with basic minimal business qualifications.

An independent advertiser wishing to employ this model might act to identify and/or quantify such sales, and/or to collect from the sellers. This might be done by use of various methods to search out and identify third-party links that use the ad as their starting resource. One method for identifying sellers could be to use bots that simulate viewers, so that those bots request third-party seller links from each identifiable seller for each ad of interest to determine what links are offered. This could be done by advertisers, or by a clearinghouse service analogous to copyright clearinghouses. Once the fact of such links by a seller for an ad is established, administrative processes can be applied to accomplish the remaining quantification, audit, and collection tasks. Such bots could be applied to all sellers that might be identified by searching and tracking all methods that are used by such sellers to attract viewers to use their services.

Similar issues of tracking independently sourced third-party links might apply to copyright aspects of third-party linking, as described above. The method of using bots to locate such links just described, might be useful for such tracking of copyright usage as well.

For all such tracking and auditing tasks, alternative methods might be based on requiring that browsers provide "click-from" data to the owner of the starting resource and/or to some clearinghouse service. Currently, Web servers that provide ending resources commonly collect click data, and servers that provide Web pages with embedded outbound links can use various techniques such as redirects to capture information on clicks from those pages. Such data might also be obtainable independently from browsers or browser add-ons that collect such data and report it, whether in real time or in periodic batches. While use of third-party links is not yet common, a browser that supports them might readily report on their usage in the same way. In the case of independently sourced third-party links, however, the owner of the starting resource might not be able to cause redirects. Also, the use of browser-based reporting is currently limited, and the user might typically control whether such features are used.

Thus it might be desirable to provide a browser-based tracking and auditing capability that would be reliably applied to all links that might use a given resource as a starting resource without dependence on the cooperation of the user. This might be done by ensuring that only browsers that include such functions can be used to work with the resources that are to be controlled. One way to accomplish this might be through the use of proprietary and/or closed protocols and/or resource coding or encryption formats that could be restricted to use with compliant browsers.

Such might be in the form of special add-on viewer software that is used with a standard browser. Business practices and copyright controls might be more or less effective in limiting the use of non-compliant browsers. More complete assurance of the integrity of such practices might be achieved by using methods for verifying the identity and integrity of systems, commonly described as trusted systems, in conjunction with DRM systems that might require such tracking and auditing to be invoked for specified resources. For example, the methods proposed by the Trusted Computing Platform Alliance (TCPA), or similar methods proposed by Microsoft for its Palladium software, might be used to ensure that a resource can only be viewed in a trusted environment and that a viewing system that provided for a trusted implementation of such tracking and auditing functions must be used. It will be understood that depending on the particular software environment, various alternatives might be applied to the packaging of such functions, such as, for example, basic identity and trust support in the trust system, setup of link tracking and audit in the DRM system, and actual tracking and reporting of link activation activity in the browser system.

With such methods it might be practical to ensure to an adequate level that all independently sourced third party links can be tracked and audited, and thus to enable effective assessment of fees relating to the use of such links. This might support the business methods just described, whether with regard to licensing of content linking rights, or with regard to compensation for advertising link value, as well as to other similar new business methods. Depending on the particulars of such business methods, such fees might be assessed to the provider of the third-party links, and/or to the provider of the ending resource of the links, and/or to the viewer, or to any combination thereof. Fees might also pertain to the act of offering of such a link to the user, even if the link is not actually traversed by the user, and in such case the tracking might be extended to the mere presentation of such links.

Other new aspects of advertising and commerce could also be enabled by the methods described herein. As background to this, advertising and commerce offer presentation might be viewed at two levels:

One is in the form of linked enhancements or enhancement channels, in which an ad or commerce offer is presented as an ending resource linked from a base program as a starting resource, such as in the case of enhancements to TV or video ads, or other kinds of linked content. Such linkage may be between similar or dissimilar media types. Much of the discussion of advertising herein relates to such linked offers, with the media types being a combination of TV and Web-like resources. Two sub-cases are the one in which the starting resource is itself an ad, and the one in which the starting resource is a non-advertising content resource.

Another is simple placement of ad or commerce offers embedded in or adjacent to a content resource (in space and/or time), commonly, but not necessarily, of a similar media type. Such embedded ads might include traditional Web page banners or other current and future forms of Web page-related advertising, and follows the model of other media, including conventional TV, in which the ad is simply adjacent to a content resource.

Another is a compound form in which simple embedded ads might be directly associated with a resource that itself is a linked enhancement to another resource. As described further below with regard to the example of FIG. 9, such an embedded ad might be placed within or adjacent to any specific enhancement page. Such an embedded ad might also usefully be placed with an enhancement viewing control panel, such as for a portal service or equivalent local control center function. Again, sub-cases relate to whether the base resource is itself an ad or not.

While the discussion herein is in terms of simple cases in which advertising and non-advertising content are distinct, it will be understood that most or all of these methods and variations are equally applicable to hybrid cases in which the distinction is blurred, without a clear boundary between an advertising segment and a non-advertising segment. Such cases might include, for example, cases of sponsorship and of product placement, in which commercial messages and images might be integrated into a program. In such cases, link starting resources might be defined with regard to such fine-grained elements as a time segment, an image region, and/or an object, for example.

These cases of advertising and commerce tied to linked enhancements enable a new richness in placing offers and in relating them to a viewer's activity context, drawing on available knowledge of synchronicity. In addition to general knowledge of the viewer, and/or of any resource and ad is adjacent to, this linkage and synchronicity enables exploitation of knowledge of a program, such as a TV program, being viewed by the viewer at a given time:

In the case that the base resource is an ad, these methods might allow enhancements, or ads adjacent to enhancements (or related control centers) to be used for offers related to the subject of the base ad. One application of this is the open market advertising model described above.

In the case that the base resource is a non-advertising content program, these methods might allow enhancements or ads adjacent to enhancements (or related control centers) to be related to the subject of the base content program. Applications of the latter might be to enable various enhanced forms of advertising or commerce to obtain revenue support for a portal service and to provide new commerce-related services to viewers.

This combination of enhancements to base programs, for either or both of content programs and advertising programs, with embedded ads in those enhancement resources enables a new richness in advertising and commerce relating to TV and other video. With regard to the case of the base program being a non-advertising content program, marketers might take full advantage of knowledge of the base program to define offers that relate to specific aspects of the program, such as for example, people, places, plot, subject matter, actors, music, product placements, and/or references, as well as relationships to broader aspects of the theme or mood of the program. Unlike simple adjacency-based ads related to a discrete media resource, enhancements linked to continuous media add a level of richness and of variation over time. Such thematic basis for offers might, for example be used in the simple example of book offers, in which books that related to any of the themes of the program might be offered. This could extend similarly to other products or merchandise, such as music, video, travel, and more loosely to any kind of product or service that might be sold by exploiting an association or common element with the base program, or inferences about the viewers who might be watching that base program.

Such offers might be placed in or adjacent to enhancement pages related those programs, in special ECs dedicated to such offers, and in or adjacent to the control center screens. Since control center screens might be most often visible, that positioning might be of particular value. Thus the use of such new forms of advertising might be a major revenue source for such a portal or portal-like service.

As further development of the portal business model, a multiplicity of distinct revenue streams might be enabled, separately or in combination, notably including:

Subscriber fees for access to some or all of the portal services, possibly with some services provided at no charge, and other premium services charged based on usage or subscription, or various similar schemes.

Advertiser fees and/or commerce revenues for offers placed through the portal service, as just described.

Carriage fees for provision of enhancements to viewers, as noted previously. EC providers might be willing to pay carriage fees to gain viewership, and might fund such fees out of subscription or usage fees, and/or advertising or commerce offers that they manage themselves, or might subsidize them for reasons of promotion of other business, activities, or advocacy of points of view that such carriage supports. It will be understood that such fees might involve not only the simple service of carriage as transport, but also the service of the portal as a demand and viewership aggregator that might help the EC provider find an audience. Such a business model might become particularly relevant in the case of a portal that supports multiple ECs, in which each EC might compete for an audience, and the portal serves as the marketplace that puts a large population of viewers within easy reach.

Market data fees for sale of data relating to viewer usage patterns, including ratings data for viewing of TV as a primary program, and clickstream data for enhancements, such as via the Web, as described further below.

These interrelated classes of revenue could be viewed as deriving from the role of such a portal as a marketplace that brings together viewers, content providers, and advertising/commerce participants in a mutually beneficial and self-reinforcing market ecology. As noted, such a portal-based market ecology could operate independently of the base program content production and delivery business that it build on. Multiple portals might then compete on their ability to aggregate viewers and EC providers, as well as advertisers or other commerce operations, and might achieve economies of scale and scope based on their success in doing that.

Expanding on the rich variety enabled by this model, it is noted that content and services of such a portal might include content obtained from independent sources, content created by the portal operator, and content created by portal users, members, and/or subscribers. Based on the teachings herein of open access to enhancement channels, and their aggregation, it might be expected that other members might value user-generated enhancement content. Such user-generated content might generally be available to all users, but it might also be made possible to restrict such content to closed groups of users, such as for example family members, buddy-list members, and the like. Similarly, such content might or might not be limited to, or preferentially accessible to, users of the portal in which they were created.

Such user-generated enhancement content might relate to widely published or broadcast base programs, such as TV programs or movies, or might relate to user created base programs, such as home movies or videos. This might be done using a variety of automated and manual aids, as described elsewhere herein. It is also noted that the line between such forms of content might blur, as video (and audio) editing tools facilitate creation of rich hybrids of published and user-generated content, and as portal services allow for wide distribution of user-created content. Examples are clips, re-edits, montages, and compilations. With the broad proliferation of personal video editing tools, these practices might develop much like sampling and DJ compilations in music. In the case of widely viewed base programs, individuals and/or businesses might take on the role of independent commentators or guides, and in the case of wide broadcast in real time, might create their enhancement channel content in corresponding real time. Thus, examples of the range of possible providers of ETV/ITV supplementary content include:

Program providers/producers—the core creatives, with the ability to shape the primary content Networks and cable channels—a distinct team that may team with the program provider, but may not.

Local broadcasters—cooperative with the networks, but with complementary local orientation.

Cable/Satellite operators—an end distribution service that might have less tie to the creation, but might be closer to the users and the community, and that would typically have special access to the STB.

Advertisers and agencies—the core creatives for the ads, who might highly value use of an interactive channel for that and might prefer to control it, and might be desirous of a broader role in some programming.

Sponsors (and agencies)—more deeply connected than simple advertisers, and with an interest in presenting enhancements to a program that play up their special focus, and presenting an opportunity for the program providers to do sponsor-specific versions under a custom publishing model.

Alternative voices—less privileged in access to creation of the base content and distribution channel, but able to offer unique perspectives to select audiences. These might include major independent provider/producers of a stature comparable to the primary program provider/producers, as well as a more varied and open ended set of fan-zines, enthusiasts, counterculture, parody, education, etc. Such independent providers might be particularly able to innovate breakthrough ideas in creative content interactivity and in media technology.

End-users/viewers—desirous of using this new medium for rich forms of direct communication, whether one-to-one, or in groups.

Such an increase in variety and richness of sourcing roles might go hand-in-hand with a corresponding increase in variety and richness in distribution roles, as complex, Web-style distribution methods such as syndication, superdistribution, viral distribution, peer-to-peer sharing, and the like are applied at any or all of the many stages of content creation; editing, and enhancement, and involving any participants, such as those just listed. Similarly, the base programs might also involve rich combinations of commercially-provided content, viewer-provided content, and mixtures and/or edits thereof, and might be distributed through a similarly rich combination of channels.

It will be understood that while discussion herein refers variously to open content, open linkbases, open enhancement channels, and related aspects of open inclusion of content and metadata provided by individual users and/or subscribers of browsing and portal services, and by independent content and linkbase provider businesses and related services, practical considerations may impose some limits on such openness. For example, it might be desirable to exclude items based on attributes of the item, or of the provider of the item, such as relating to abuses of legal and/or community standards of integrity, honesty, civility, propriety, obscenity, responsibility or other similar basic standards. Limitations might also apply to age, or to basic levels of qualification It will be understood that in practice openness of participation might not be absolute, even if relatively liberal and non-discriminatory standards are applied, and the term "substantially open" is used herein to indicate this more precisely, including for example cases of minimal requirements such as membership, registration, and/or subscription, and/or basic requirements of age and/or qualification. Unless otherwise indicated or clear from context, references herein to openness to individuals, subscribers, content providers, service providers, and the like will be understood to refer to substantial openness that need not be absolute.

It is also noted that rich variations in business models might result from the interplay of these many sources of supply and demand for these many varieties of content, all connected by portal services, as described herein. Given this rich and dynamic interplay of supply and demand, it should be understood that the direction of revenue flows might vary for any or all of the flows described here. Similarly, alternative business structures relating to which entities benefited from revenue generating functions such as advertising/commerce, and which entities incurred related costs might also bear on the direction and amount of revenues.

Such can relate to any and all of the revenue/cost streams relating to provision of such services, among any and all of the various players within the industry that combine to provide them, including advertising, commerce, programming of base and/or enhancement content and/or linkbases, distribution system operations carriage, customer service, program guides, middleware, ad serving, consumer electronics and computer equipment, user subscriptions or usage fees, and the like. Accordingly, it is noted that:

EC providers might pay carriage fees for distribution of their EC links and/or content, but under different conditions of supply and demand, such as high value and demand, they might demand license fees for that instead.

Similarly, user-generated content might be contributed without fee to the portal, or even with paid carriage, possibly indirectly in the form of service usage fees incurred to the user in posting such content. In such case, the portal might thus obtain revenue both for the creation and distribution of such content, from both the content provider and the content consumer.

Conversely, in other situations, such content might be given higher value, and thus generate payments to the user/provider, and such payments might be directly or indirectly related to popularity and/or fees obtained by the portal for that content, possibly including indirect revenue, such as from advertising. Thus, for example, users who are fans of a program might be enabled to develop enhancement content for a given program, and to self-publish for distribution through the portal, and to obtain revenue for that.

Similarly, the boundaries between pure content programming, sponsored programming, and advertisements might vary over a continuum, so that the question of carriage versus license and the amount of such fees might depend on which parties benefit from related payment streams, such as subscription, sponsorship, and/or commerce that are realized external to the portal.

Subscription fees might be charged to users, but again, advertising and commerce might involve direct or indirect payments to users in any of various forms.

It is further noted that multiple such portal services might be linked to one another, such as in syndication structures, to add a yet further dimension of flow of content and payments. It is further noted, as mentioned before, that the kind of portal service described herein might integrate with other content portals, including conventional Web portals, and new forms of video oriented portals, and that revenue streams for such added services might also be relevant, and that these too could involve multiple parties and flow in any direction.

Similarly, while much of the discussion herein of portals driven by cable or satellite head-end operators described models in which the portal might be operated as adjuncts of those services and/or on their behalf, where those operators might benefit directly from the various MMUI/portal related revenue streams, it is noted that alternative models might operate such portals as independent businesses. In such cases relationships with such operators might not exist, or might relate only to state relay activities. Again, revenue flows relating to such state relay might go in either direction, with payments to operators for carriage of state records and/or triggers to the portal, for example to the extent that such carriage was valuable in enabling the portal to obtain revenue, or payments from operators to portals for provision of associated MMUI coordination services, for example to the extent that cooperation in enabling such services was valuable to the operator.

The same might apply to liberator devices or other adapter hardware or software, which might for example be bundled with services, provided to consumers for a fee, or be given to consumers at no charge or with cash and/or non-cash incentives.

Given the variability in the direction and nature of these flows, due to variations in such factors as business models and market conditions as described in these and other similar variations, it should be understood that, unless indicated otherwise or clear from context, references herein to license fees and/or carriage fees, as well as similar terms for costs and/or fees, are meant to be inclusive of converse cases of negative or reverse fees as well. Additionally, reference to license and/or carriage is also meant to be inclusive of fees that may not strictly involve license and/or carriage, but that have similar characteristics, such as, for example, sourcing fees, and/or distribution fees, respectively.

It is also noted that various community communications services can also be portal business model aspects. Such community communications services could include, for example, chat, IM, bulletin boards, Weblogs, and/or other real-time or asynchronous communications among viewers, along with related presence awareness and contact/relationship management services. As noted above, MMUI features are particularly relevant to use of such communications in conjunction with TV/video viewing. The value of community services might be especially true for realtime broadcast, but might apply to asynchronous viewing as well. As part of a portal strategy for aggregating viewers and services as a marketplace that adds value by linking them, the use of community/communications services to link viewers in communications related to their viewing might be applicable.

Such could relate to known communities and/or to the power of the networking service to create new communities as needed. Viewers could be expected to seek out portal services that offer desirable communities that serve social and/or collaborative needs, and once a part of such a community might be reluctant to leave it. They might also seek portals that effectively introduce them to individuals or existing communities that serve their new needs as they arise. Because such communications, and pools of users that can be selected from to create potential new communities, are essentially unique, this might serve as a unique, persistent, and relatively sustainable advantage to a service that can build strong membership and communities that might create switching costs, one that might last after other differentiators might become commoditized. The linkage to TV viewing could present a basis for organizing and building communities, for example, because people like to interact with people who share their interests, especially when that connection is made in real time for current activities.

Another portal service might be to assist users in finding fellow users who are watching the same program at a given time—and to factor that criterion in with other selection criteria—and then to maintain relationships with such users. The association of video programs, including movies, with communities might offer a very powerful social service, including, for example, such features as:

Supporting creation and operation of self-organizing and self-selecting groups, such as movie clubs or sports clubs, that share interest in a more or less narrowly constrained class of programs and wish to gather and communicate in any of various ways, whether in real or virtual form.

Supporting matching services that are based, at least in part, on identification of common interest and/or actual real time synchronicity in viewing of specific programs or groups of programs.

Combining community groups and matching services, such as to select among the full set of synchronous viewers of a program, as one level of screening, by application of additional screening criteria to find small subsets or individuals having particular mutual interest. Such additional criteria might include explicitly stated matching criteria and/or implicitly stated criteria, such as automated content-based associations.

Such services might be used in conjunction with other methods, such as for example to flag individuals on a buddy list that were watching the same program.

Options might be provided to control the scope of synchronicity matching, such as nationally, regionally, and/or within a given distribution system or locale, or based on synchronicity at a given time, and/or over a range of times or showings/episodes.

The common bond of such synchronicity might be especially strong when active, but might carry over into enduring common interests as well. Thus, such services based on synchronicity in viewing continuous media might provide a highly dynamic and richly selective catalyst for social organization, especially when used in conjunction with conventional methods for organization and selection in virtual communities.

The establishment of strong communities might enable a portal to obtain premium subscription revenue from viewers, and to leverage that to obtain premium rates from other portal participants, including content providers and advertisers/commerce partners. Similarly, all content created by viewers, whether as free-standing content, or as communications to other viewers, could enter the pool of resources that might then be subject to association with media programs, so that member-created content might become a significant and valuable component of the content resources addressed by such a portal service, and again, one that might be unique, or at least preferentially accessible, to a given portal.

All of the features and methods described herein for associating enhancements with programs could be fully applicable to associating communities and sub-communities—and their related communications content and media—with program viewing, as being just another kind of resource. This could include doing so as an ending resource associated with base programs, and/or as a starting resource for other content and services, such as for content or services associated with or aimed at communities and their communications processes. Again, as noted above, this also applies to any other kinds of services and/or tools, since all of these might be treated as just another kind of resource by these methods.

With regard to the collection and sale of market data, the methods described herein for coordination of MMUI services might enable data on the viewing of TV programs to be obtained as a byproduct, and, perhaps because of those economies, allow for collection on a far broader scale than has been practical. Such data might be of high commercial value. Currently, specialized vendors such as NIELSEN collect and sell TV ratings data that is obtained using relatively small numbers of instrumented sample households that enter data using manual diary logs, in conjunction with "people meters" that are relatively expensive, and because of the small sample sizes, need to be very carefully controlled for statistical validity.

As a byproduct of the methods described herein, data on a currently active channel could be available for large numbers of households, perhaps either already present at a common portal service or readily collectable from a portal-like local MMUI browsing facility. While such data might not be statistically controlled in the same manner as current ratings samples, in which samples are chosen to be statistically valid representatives of a larger population, a variety of techniques could be applied to enhancing the value of such data:

Associated data on enhancement clickstreams might be useful in itself, as a measure of program involvement, as well as of success of commerce offers and services Such data might be useful also to weight observed viewing ratings data relating to primary TV programs, based on the level and nature of the viewer's enhancement-related activity. For example, total lack of enhancement activity might suggest the TV was on, but not being viewed. Conversely, very high levels of some kinds of Web activity might suggest the viewer was distracted from the program. Rich varieties of attention-weighted ratings data might be derived from such data using a range of methods that will be apparent to one skilled in the art.

Semi-automated synchronization actions or other context awareness methods used to support the MMUI service might similarly be tracked and used to determine whether a viewer was actually present.

Other rich data from Web or other enhancement related activity might be made available as clickstreams or the like, and might be usable in correlation with primary program ratings. This associated coactivity data might become a highly valuable new form of market data, one that can be used to derive deep insight into viewer behavior.

Thus while this data might not be inherently controlled in the same way that current ratings data is statistically controlled and subjected to rigorous built-in quality controls and validation steps, some similar adjustments might be made after collection and during processing. For example, the very large sample sizes that might become practical might, in of itself, reduce the level to which statistical errors such as self-selection and demographic skew may occur, and the associated MMUI-related data might be used to adjust for such errors, as just described. Further, even if this data is not made fully adequate as a substitute for conventional ratings data, it might be a valuable complement to it. Thus, the two methods might be used in combination, with the expensive, statistically controlled ratings data used to calibrate and adjust the more widely collected, but more possibly flawed data collected in this new way. At the same time, the more widely collected data might be more sensitive for spotting emerging patterns or trends, and for rating programs that lack mass appeal, which might become increasingly important in a many-channel and/or VOD environment.

Because such data is collected as a byproduct of providing desired browsing services, and in a non-intrusive manner, many consumers might be willing to accept some level of data use, and some attendant loss of privacy, depending on how the use of the data was controlled, and on what incentives might be provided for permitting data collection. It will be further understood that as TV viewing systems gain intelligence, widespread data collection might become more economical even apart from the MMUI and portals facilities described herein, and that some of the methods just described for using such data in conjunction with coactivity data from the Web or other sources, even if not directly coordinated, might still be useful, both to adjust, and to expand on such simple viewing data.

Another broad aspect of these methods to be noted is that just as conventional Web portals are closely related in function to search engines, the methods of providing an enhancement portal described herein might also be thought of as providing a new kind of search engine. This kind of portal that takes TV programs, or other similar media, as starting resources can be thought of as a "what I am watching on TV now" portal, one that can, for example, give a corresponding view of the Web keyed to that starting resource as a search entry. For instance, by applying the methods described herein to provide automatic association to a more or less open and full set of Web resources, the result could essentially be one of a specialized search engine keyed to "what I am watching on TV now." It will be understood that while such searching might in some embodiments be based on explicit viewer entry of the search context, according to various embodiments described herein such viewing contexts can be determined and applied automatically.

It will be further understood that these new methods might, in various embodiments, be combined with any existing or future methods ordinarily used for conventional search tasks. For example, users might be provided with a search entry form in which a search query text string may be entered just as with ordinary search services. In this enhanced service, the search might be performed in part as an ordinary search, but with the added feature of using the program viewing context as an additional factor in the selection and/or ranking of search results. A feature of this service is that, using the methods described herein, the user need not explicitly provide identification and/or other reference to the viewed resource that is to be used as a search context. In one such embodiment, the determined identity of the TV program or other continuous media resource being viewed might be used to derive an additional search term to be logically anded with the user-entered search terms to exclude non-corresponding results, and in other embodiments that identity might be used as a weighting factor that would raise the ranking of corresponding results, or to drive some other more advanced functional relationship.

Thus, as a example, a search for "Sydney Greenstreet" entered during a viewing of the movie Casablanca might return as results those resources with content related to that actor that make specific reference to that film, without need for the viewer to enter the film title or other identifier, or even to know the title/identifier. A wide variety of ways to integrate such viewing context-specific searches with more general search services will be apparent. One example might be to provide a search entry box along with a radio button control that indicates whether viewing context is to be included as a factor in the search. Another specific example is to make all searches in designated entry boxes be program-context-dependent as a default.

It will further be apparent that such program-context-related searches might, for example, be based on simple associations with the program title and/or identifier code, and/or some other specific identity—whether those associations are pre-defined or dynamically associated with target resources. As another example, such searches might be based on more indirect and/or advanced methods of associating terms and/or concepts with the content and/or metadata of such viewed resources, and then using those terms and/or concepts as components of the search query. Such methods might, for example, apply image recognition to derive a search term. For instance, such methods might derive "DC-3" as a search term if the user entered "airplane" while watching the end of Casablanca. As another example, such methods might use text-based inference, such as drawing on reviews and/or other descriptions of a film, to determine results for a search of a specified term. For instance, such methods might use such text-based inference to determine that results of a search of "tank" while watching "Saving Private Ryan" should rank results for World War II era tanks higher than those of other eras, whether by using "World War II" as a search term, or by more advanced inference methods.

These new kinds of viewing-context-related portal/search services, in turn, could enable further business models and revenue-generation methods that draw on the model of conventional search engines. Such could, for instance, involve building on the core economics of 1) aggregating viewers by offering useful services and/or 2) monetizing such access to viewers by channeling it to serve aggregations of other players, such as information, product and/or service providers who wish to make offerings to those viewers, and/or who will pay the portal/search engine operator for referrals and/or for preferential position in presentations to viewers who are associated by either an expressed or implied relevance. The association could be one that relates to what viewers were presently watching, perhaps including any combination of specific program, time-position, category/genre, channel, and/or the like. In the various embodiments, such associations might, for example, relate to either or both of the viewing context and any search queries or other transaction requests that might be explicitly stated. It will be understood that the provision of relevant material that is enhanced by such methods might, for instance not only add value to the viewer, but also make the associated offer more likely to be noted and/or acted upon, thus potentially adding value to the offering party, and thus potentially benefiting the portal/search engine operator as facilitator to both parties. In various embodiments, the value might be extracted in the form of fees, in forms such as described herein and/or in other forms that will be apparent to one skilled in the art. Differentiating and value generating features of such a service to users might then include, for example, levels of relevance, recall and precision, ease of linking and use, richness of offerings and incentives, and/or the like. It is further noted that differentiating and value generating features of such a service to EC providers might include, for example, such factors as the number and value of viewers and/or the effectiveness of the processes of matching and/or delivery of those viewers to appropriate ECs.

In further considering the value of personalized EPG functions in support of business models for enhancement portal services, it is noted that it might be desirable to charge premium fees for powerful personalization features, but that this might conflict with the desire to achieve maximum numbers of users, especially in early growth stages. One method that might be used to differentiate levels of service relates to the display of filtered and ranked program listings. Personalized EPG functions could, for instance, present only the programs expected to be desired by the user, perhaps in order of desirability, instead of a non-personalized, unfiltered mass of listings, whether organized in a grid, or in other listing structures, such as by genre or person.

It is noted that, in various embodiments, it might be desirable to give non-paying users some, but not all, of the benefits of such filtering/ranking. One way this might be done is to provide all users with the tools to setup custom filtering/ranking services, but to limit the power of the tools they can use to display the results. For example, instead of allowing presentation of a filtered/ranked list that shows only the desired items, in order, indications of selection and rank might be provided in a more limited manner, such as in the form of codes in a standard list. Thus, as a specific example, if a service were to segment programs into categories or genres A, B, C, and so forth, and to order the selections by predicted preference rank, 1, 2, 3, . . . , this information could be provided in a limited way by simply coding the entries in the unfiltered/unranked list as follows:

| Basic, coded display: | | Premium display: | |
|---|---|---|---|
| Prog1 | | A: | Prog6 |
| Prog2 | *A3 | | Prog10 |
| Prog3 | | | Prog6 |
| Prog4 | *B1 | B: | Prog4 |
| Prog5 | | | |
| Prog6 | *A1 | | |
| Prog7 | | | |
| . . . | | | |

Such a basic, coded display could act to demonstrate the workings of the filtering/ranking processes in a way that was useful, and/or which permitted appreciation of the effectiveness of the process in all aspects other than display, but with a utility that was less than that of a display format that did some or all of showing items in rank order, perhaps additionally excluding items of low rank and/or organizing items by category/genre. The above exemplary "Premium display" depicts such additional functionality.

By extending certain benefits (e.g., a basic service) to non-paying users, large numbers of users might be enticed to make use of those benefits, and to see and obtain much of the value of customization, while a significant portion of those users might sooner or later be induced to pay for a premium display service. In one embodiment, users might be given a free trial of a premium service, and revert to a basic service (e.g., that includes filtering/ranking functions but lacks the enhanced display features) if renewal for fee does not occur. It will further be understood that this method of differentiating service by presenting category and/or rank codings while limiting the power of the information display format might be applicable to any service that involved categorization, filtering, and/or ranking.

Finally, it is re-emphasized that with regard to all of the services and revenues addressed herein, the ability of a portal to support MMUI capabilities might be essential, or at least important, in enabling these services to be effective, and thus in enabling related revenues to be obtained.

Further Aspects of Multi-Channel MMUI Services

Additional detail of possible embodiments relating to portal based services, including those based on standing sessions, and cases that provide for multiple or alternative enhancement channels will now be provided. It will be understood that similar methods can be applied without a separate remote Web portal, such as by using local client-based functions instead, or in some distributed combination of the two.

As noted above, the effect of such a portal might be to provide enhancement services that potentially operate across all channels and programming supported by a cable operator or other distributor, as well as possibly other programming, including cases of multiple distribution services, and that might be provided on a continuing basis. Such a service might exploit a mixture of portal-wide resources and program-specific enhancements and other Web services, where some or all of the portal-wide pages and triggers provide control center functions for the user. Thus if, for example, enhancements were controlled using ATVEF triggers, it might be desirable to use a mixture of cross-program portal-level triggers and channel/program-specific triggers. This might be effected using portal-level pages containing ATVEF receiver objects for the corresponding portal-level triggers, in combination with specific program-level pages containing receiver objects for the corresponding program-level triggers. Depending upon the details of the implementation, a filtering and routing function might be provided at the PC, such as in an applet or browser accessory, to route such triggers to the appropriate pages and the corresponding receiver objects, and to load any pages that might not already be loaded. It will be apparent that similar methods can be applied to other triggering or linkbase delivery methods.

It is further rioted that such a cross-program portal service that might be operated by a distributor or other party might intermix enhancement resources provided by the portal operator, the programmer of the base program, or other parties. It will be understood that a variety of Web technologies might be used to enables Web pages to be composed of elements obtained from multiple sources and multiple servers, such as by composition at the server, framing (including iframe or ilayer coding or similar variations), by server or client-side include functions, use of Web services based on SOAP, and various other methods. Thus very rich and flexible combinations of sourcing can be achieved.

The use of such methods might be controlled by a multi-channel portal operator, but might presumably be based on negotiated agreement with programmers and other parties. Depending on such arrangements, some program-specific enhancements might be provided by some mixture of the portal operator, the programmer, and/or other parties, and/or provision of such program-specific enhancements might be restricted to those controlled by the programmer. A viewer might also be able to chose among alternative enhancement channels, such as with ongoing preferences and/or settings, and/or link navigation controls, thus effectively personalizing the portal.

Figure 9:
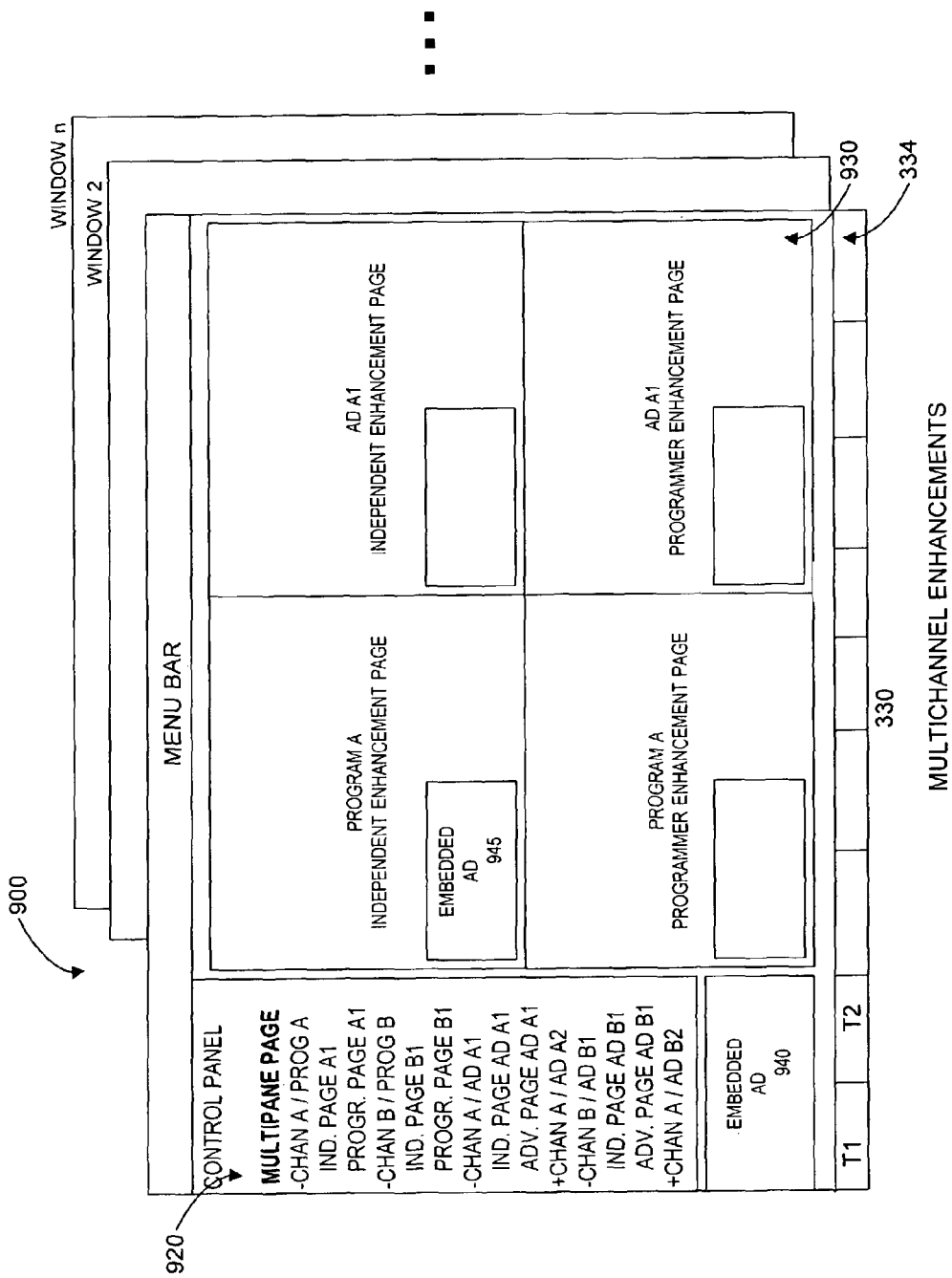
FIG. 9 is a schematic diagram portraying exemplary further detail of a user interface for a cross-program portal.

Turning now to FIG. 9, therein is a schematic portraying exemplary further detail of a user interface for such a cross-program portal. This example is one in which enhancements are routinely presented on the PC screen, possibly in the mode of a standing session, and expands on layouts of the sort depicted in FIG. 3 for the PC, to depict possible user interfaces that might support multiple linkbase channels (LCs) or enhancement channels (ECs) applying to each of multiple primary program channels. Shown in FIG. 9 is a PC ITV window 330 that is presentable to a user. Window 330 could be implemented, for example, as a standard browser screen that includes a browsing/navigation control panel area 920 that is located to the left of the interactive content area 334, and which might be an alternative to other control panel uses that are typical of browsers such as for display of history or favorites or searching. Enhancement resources could be presented in interactive content area 334. Interactive content area 334 might be one of multiple such windows that might be stacked, with each presented in a separate browser window, and with each selectable from the taskbar 338 in the usual fashion.

Also depicted in FIG. 9 as the current top window is an optional composite window format that could be used to present compact resources (e.g., menu pages and limited content areas) such that multiple frames 930 might be presented. Such presentation might, for instance be in the paned format depicted, whereby concurrent viewing of multiple enhancements could be facilitated. Further shown in the exemplary embodiment of FIG. 9 are two separate enhancement channels for each of the primary program and one ad on some channel A. It will be understood that similar composite pages might be provided for individual programs as well.

Control panel 920, which might also be thought of as a dashboard, may take any desired format, with the example here showing a hierarchical tree control for selecting among a set of enhancement resources, in this case using the common convention of a "+" at the left of a group item indicating that there are multiple items that can be revealed in an expanded view, by clicking the + sign, and a "−" that can be clicked to hide such a sub-item list. Alternatives might use buttons, icons, or images, or other indication and selection methods. The list of resources might be restricted to currently open windows or might include links to additional resources. For example, visual distinctions such as color or font style might indicate whether recently viewed resource windows are currently active. Thus, the user might use either the taskbar buttons or the control panel entries to select among open resource windows.

As depicted in control panel 920, a user might select from the composite multipane page, and from pages for each of two TV program channels, with entries for the primary program and for each of multiple ads. Such methods of maintaining and controlling multiple windows might enable powerful and flexible multi-tasking uses, by exploiting the ability of a full-function Web browser to maintain multiple sub-sessions with full state and rapid access to active resources. Also depicted in FIG. 9, are embedded ads, as discussed above, such an embedded ad 940 that might usefully be placed with the control panel 920, and other embedded ads 945 that might be placed in the various enhancement pages. It will also be understood that similar ads might similarly be placed in any or all of the various layouts depicted in FIG. 3.

In the exemplary embodiment depicted in FIG. 9, two enhancement channels are shown as active for each program or ad, with one being independently sourced, and one being sourced through the auspices of the programmer of the primary program. Alternative embodiments might not offer independent enhancement channels, or might offer many such channels, and might use simpler or more complex user interfaces and control panels to navigate such resources. The example shown here might correspond to a case where the provider of the portal cooperated with the programmers to include their enhancement channel, and also provided a single set of independent enhancement channels, one per program or ad, for example, such as ones that might be under the portal provider's own control. Thus each of these two alternative enhancement channels might be complementary and be routinely activated on the PC as part of a standing session whenever the corresponding primary program or ad was active on the TV, to be updated automatically as program-related triggers or other TV viewing state changes occur. A wide variety of behaviors might be provided for, to address such state changes, as well as user actions, and such behaviors might be governed by various rules, defaults, and/or preferences set by users, and/or portal or service operators or software providers, and/or primary program authors/programmers, as described previously.

In this example, standing sessions might be defined to routinely maintain a base level of coordination with the TV viewing. Control issues in such a case might include what number of primary program channels might have active enhancement channels held open and actively responsive to time-based resource update triggers, and what number of ads might be similarly held active for each channel. Such control might also relate to which windows are placed on top, which are maintained, and which are closed or reused. For example, one default might be to have a current and one last channel active, and up to two or three or more ads for each of those channels. In such a context, it will be understood that VOD viewing might be treated as being in a virtual channel, along with any associated ads. Conventions might also provide that ad enhancements do not pop to the top if interaction was made with enhancements relating to the primary program within the last few minutes, but that the ad pops to the top otherwise, and that ad windows remain open until the next commercial break, and then are reused, possibly with all URLs placed on a suitably structured history list, as described above. Corresponding set of rules might determine whether the program enhancement page pops back to the top at the end of a commercial break, and under what conditions the window order and focus changes when a channel change is made, as well as when and how composite pages are reconstituted. In regard to these controls, the portal operator might be considered as having the role of (secondary) author, and use author control coding techniques accordingly.

Similarly, if as in this example, multiple enhancement channels are to be concurrently active, controls might also address which of the alternative channels is given precedence to appear on top, such as whether a programmer or advertiser-provided enhancement channel or an independent enhancement channel is favored. Such a capability might be appropriate, for example, to vary prominence depending on the nature of business arrangements between the portal service operator and the programmer or the advertising distributor. For instance, where a portal operator was compensated for traffic linked to an advertisers Web site, top billing might be desired, while in cases where no such accommodation was made, secondary billing might be desired.

Similarly, enhancement resources might be specific and dynamically customized to both the viewer and the program or ad being viewed, or might be more generic, and again, this might depend on the business arrangements in place, such in with regard to levels of cooperation and compensation. It will be understood that common dynamic Web serving techniques might be used to make ad enhancement resources take forms that are highly tuned to the specific advertisement, and to the viewer. Thus these alternative configurations, controls, and set behaviors might be used to support a wide variety of options providing varying levels of power and flexibility to users, programmers, service operators, and others, depending on the business arrangements, objectives, and methods to be served. Given the potential of such services to drive t-commerce, it might be useful business practice to offer valuable suites of enhancements, both to the content programs and the advertisement programs, in order to attract viewers to use such services and thus engage in revenue-generating t-commerce as a result.

Continuing with this example, some aspects of context-awareness alluded to above are now expanded upon. Simple attentive interface methods might be employed to determine that a secondary device set was being activated or deactivated, as noted above, and/or to provide a more subtle level of transition of focus such as when a handheld device was put aside but intended to remain in a ready, active state. Such states might be distinguished as, for example "at attention," a mode of active, lean-forward use, or "at ease," a mode of more passive, lean-back readiness. Such states might be determined through sensing of motion change, such as by accelerometer, to rest on a fixed table or back to hand-held, or through some inferred or conventionally established gesture, such as, for example, a particular change in tilt, holding or stowing of a stylus, or the like, or by other means. Of course such a change might also be signaled by some explicit command.

The effect of such a mode change might be defined to change the allocation of resources, for example, by shifting tickers from a full form on the PC, when at attention, to a more compact form on the TV, when at ease. Similarly, more advanced contextual sensors, such as eye trackers, might be exploited to infer similar changes from at attention to at ease, as well as finer gradations in focus among device sets and among elements presented on a given device set. For example, parameters of the display style might be altered, whether element-by-element, or among a few preset variations. Examples of parameters that might be altered include the relative size of windows sensed as being in focus (e.g., with reduction and/or minimization and/or overlay of others) and alternative presentation modes. Such alternative presentation modes might, for instance, include such modalities as tickers versus static text windows, and variations in how intrusively and/or insistently a viewer's attention is drawn to alerts or new items (e.g., using visual or audio cues), and where they are placed. A further use of attention-based methods might be to adapt the level of detail/resolution presented in a window, or a portion of a window, depending on whether, where, and how a user was viewing it.

Broader Aspects of Multi-Channel Hypermedia

Further considering multi-channel services, it should be noted that many aspects of programming channels may apply to groupings of programs into logical channels as well as the conventional TV channels that are defined in terms of physical communications transport channels, such as those relating to radio frequencies. Logical channel groupings may have significance for branding, such as relating to the brand identification and associations of a source and its desirable attributes, or other purposes, such as genre or other categories. As programming that lacks identification with a physical transmission channel becomes popular, such as VOD, such logical channel identifications may be used to provide similar product differentiation, such as for HBO, MTV, ESPN, and the like, much as conventional Web portals refer to channels of Web content by genre or publisher. Similar groupings of logical channels have been addressed herein with regard to enhancement channels, and warrants some further clarification.

As background, current ITV systems and the Web and other hypermedia are essentially monolithic in treating all content resources as part of a single hypermedia resource space, with a single set of connecting links. Content aggregations may exist in the form of portal sites and the like, but the boundaries of such portals are just standard hyperlinks, and inherently transparent and undifferentiated with regard to user navigation. Navigation may change over boundaries of media type, such as from pure TV or video to hypertext or similar enhancements, but this is a function of the intrinsic resource media types, with no cue as to other attributes, such as their content or authorship or membership in a collection. ITV enhancements may be provided at any level of the authoring/production/distribution chain, without any inherent differentiation in user presentation or navigation of links. There are ways to provide user-recognizable cues to the nature of content within the content itself, such as by labeling or graphic branding of the content, as well as optionally by icons or text labels or the like within the display of a hyperlink, but these do not affect navigation functions—such cues have no special effect on how the resource is presented or subject to navigation. In any case, enhancements from whatever source are either available or not, and if multiple alternatives are available, the user must view and choose among them at an individual link and resource level.

This currently undifferentiated structure is limiting, and this is particularly relevant to ITV and similar video-centric hypermedia, given that the creation of enhancements may often be more or less independent of the creation of the base video. The base TV or video may be pre-existing, and even when made with ITV in mind, TV production processes tend to be very different from those of Web-like enhancements, involving different talents, skills, methods, and tools. Separate production groups may be involved with little or no coordination. Furthermore, different sets of enhancements may be suited to different audience subsets. Such issues also apply to hypermedia in general, and issues of branding and site delineation, such as how to handle links that take a user beyond a given site or walled garden, have been a concern on the Web.

Current methods for organizing, grouping, and aggregating content resources that are widely used on the Web include Web portals and the customization/personalization services such portals may provide. Still, these methods do not facilitate user recognition and selection of differentiated content. Portals provide pages of aggregated and/or selected links. Personalization in this context generally can be understood as filtering of such links. In personalization, programmed methods are used to pre-select from a superset of possible resources and links, and present a custom filtered subset of appropriate options, in the form of a custom, dynamically composed resource containing the pre-selected content and/or links. With personalization, each user sees a single custom-filtered view of the hypermedia in the form of a customized set of pages of links. There is no clear and understandable boundary or criterion for what is in our out of a filtered set, and the logic of inclusion and exclusion may often be unclear. This can make it difficult for users to get the experience they seek. The user may be able to change filter parameters, or navigate to an alternate filtering service, but must undertake multiple navigation or transactional steps to do so, and then must take similar steps to make any further change to (or to restore) those filtering processes. Conventional Web portals are just additional resources that provide Web pages that add an aggregation structure (and may offer filtering as well). This can offer a useful level of control, but one that is still awkward and limiting.

These current methods do not provide a clear and simple way to select among complete alternative hypermedia structures. The current methods fail, for example, to allow for selection among complete structures to, perhaps, enable a user to select among a variety of parallel sets of resources, each selected or filtered to address different aspects of a hypermedia need, with a single action that switches the user's session from one set of resources to another. Such a selection capability might be useful, for example, for ITV or similar browsing from video, in which alternative sets of enhancements might be provided. It could also be useful to select among alternative sets of filters. Currently there is no such facility to do this for such systems.

Currently, authors and producers may select among sets of resources and use tools to assist in such selection during content production and management, but this sourcing and composing structure is largely hidden in the final presentation of resources to the user for viewing and navigation. Thus, bugs or other cues may make it apparent to the user when enhancements are available for a TV program, but there is no clear differentiation among these available enhancements, whether by source or type or other criterion. The user has no simple way to understand or select among different sets of resources as sets of resources, not just individual resources. In contrast, via various embodiments of the present invention, a user can be provided with simpler and clearer ways to understand relationships and select among alternative resource links as entire sets, such as, for example, by type, source, function, style, depth, and the like. This is useful for ITV enhancement resources in particular, and can be useful more generally as well.

It is further noted that provided via various embodiments of the present invention is a way to enable mass market ITV and hypermedia systems to allow multiple creative organizations to create linkbase aggregations suited to different audience interests and needs, to allow users to simply understand the character of available aggregations from various sources, and to provide simple and flexible controls for users to select which combination of linkbases will be used at any point in a browsing session. Just as linear media publishing developed into an industry by going beyond individual publications to exploit branding within an aggregation process, such that a brand carries associations of style, quality, orientation, voice, orientation, and the like, that could be marketed and selected as a group, similar flexible capabilities for aggregation and branding of linkbases could enable a rich hypermedia industry.

From this perspective, the varying embodiments of systems and methods for navigating hypermedia such as ITV described herein that allow for selection of alternative enhancement channels might be thought of as providing simple and powerful way to organize the presentation and navigation of alternative linkbases. Enhancement channels can, for example, serve as a convenient way to identify and select among aggregated and customized linkbase sets that could, for instance, be easily understood and chosen by users based on their needs and tastes at any moment.

Various embodiments of the present invention exploit the nature of third-party arcs and the collection of such arcs into linkbases, to define alternative sets of arcs or linkbases identified as enhancement channels (ECs). Accordingly, a level of aggregation can be introduced that associates entire sets of link arcs related to a resource (or family of resources), and to enable a simple process of choosing among alternative linkbase sets.

Just as channels provide a way for a user to understand and select among sets of TV programs, enhancement channels could provide a way for a user to understand and select among sets of enhancement resources. Accordingly, a powerful congruence can be provided, both in terms of user understanding and action, and in terms of system structure and navigation methods. Although discussion herein primarily emphasizes the use of ECs with regard to ITV and similar hypermedia, it will be apparent to one skilled in the art that this use of a channel structure can be a powerful addition to any hypermedia system. These channels might be more broadly referred to as resource channels (RCs), and it will be understood that methods described herein as relating to ECs are meant to be broadly applicable to any kind of RC, and that just as ECs may act to provide an added dimension of links to primary continuous media resources, RCs might more generally provide an added dimension of links to any kind of resources.

For example, multiple RCs could be offered for any or all links on a simple Web page, such as by using the EC channel selector that was described earlier and is discussed below. Such a channel selector might, for instance, be activated on mouse over for any link, and could be used to select among alternative channels of resources associated with that starting resource to actuate a traversal. Other applications to non-continuous resources of methods that are described herein with reference to ECs and ECSs relating to continuous media will be apparent to those skilled in the art based on the teachings herein. In this regard, it is noted that while the term "enhancement" is used herein with emphasis on the case of enhancements to continuous media resources, any linked ending resource might be considered to be an enhancement to a starting resource of any kind, and, unless clear from context or otherwise indicated, such usage is meant to be included as well, and, similarly, the terms EC and RC may be used synonymously.

With regard to conventional television, and similarly in conventional Web portals and Internet "push" services, channels might be thought of as defining groupings of resources in ways that relate to either or both of sourcing and content affinities. It should be remembered however, as noted above, that the channels of current Web portals, unlike television channels, may be viewed as having no real navigational significance, as the channels of current web portals exist as logical channels only by external convention. For example, the channels of current web portals might only exist as channels as so labeled and maintained by the portal, and as so understood by the user. Most often, channels are understood to imply aggregation that typically, but not necessarily, reflects both a sourcing relationship and an editorial content association. These relationships reinforce one another and aid in mutual selection between channel programmers and users, where the users constitute an audience for the channel programmers and each has some understanding of the other. The concept of enhancement channels described herein is similar, and can provide a second level of selectivity with regard to a primary program channel. Enhancement channels may also be understood to apply across multiple base, or primary program channels (PPCs), providing a similar style of enhancement to each primary program channel.

As aggregations of third party link arcs, ECs are separable from the PPCs they relate to, and this may have value, for example, in terms of 1) division of labor and skills in production, so that work processes may be separated, 2) decoupling of EC content and style from that of the base program to allow for alternative presentations oriented to different market segments. This separability may have the further benefit of allowing competitive sourcing of ECs, which can potentially facilitate greater creativity, emergence of alternative voices, and greater consumer choice, as well as supporting a more dynamic and efficient market for EC production. Such decoupling and choice might profoundly enhance and expand the market for ITV and similar hypermedia.

Thus, in one family of embodiments ECs might be thought of as involving a secondary channel selector for enhancement channels, as was alluded to above. TV viewing traditionally involves a channel selector for selecting a primary program. Equivalent selections may be made by other means, such as for virtual channels broadcast in various streams, or for stored programs obtained by a VOD system or DVR or other archival or asynchronous source. Various embodiments of the present invention add a secondary enhancement channel selector (ECS), which uses information on the primary program and the available enhancements to present a concise set of alternatives for the user to select from in real time. Such alternatives may be ranked by pre-defined preferences and filters and may have preset defaults, but the essence of the channel selector is the realtime control of selection among alternative sets of enhancements. Depending upon the business context of the embodiment, such EC sets may be open, or may be limited to those sanctioned by a programmer and/or distributor and/or other party.

This concept of EC selection might be embodied in forms that blend channel selection with other forms of link selection and that does not provide clear differentiation in the controls used to select them, or might be accomplished with specific controls for channel selection, including forms analogous to the use of a traditional primary channel selection control. It might, for example, be desirable that the enhancement channel selector is always handy, and provides a simple way to select among alternatives. Alternatives could, for instance, include a subset of preferred alternatives, possibly using a simple control much like traditional program channel selectors, a more complete set, or some combination enabled by a more sophisticated control. It is noted that:

- Like primary program channel selectors, such an EC channel selector control might latch in a channel until a further channel change/selection action is taken
- Simple controls might be based on a basic remote control, and might simply enter EC numbers just as for primary channels, possibly by first hitting a special enhancement function key that changes mode, much like a channel guide key does.
- Such a key might enable a full-fledged EC Program Guide (ECPG) that displays an EPG-like service showing the alternative ECs. Such an ECPG might desirably show just the ECs associated with the current program. Other key sequences (or other controls) could change the primary channel for which ECs are to be viewed.
- If invoked from the EPG, the control might display the ECs associated with the primary channel that is being referenced in the EPG, rather than the active primary channel that is being viewed.
- This ECPG might appear on the same screen as the EPG, or preferably as an option, on an alternate screen. In a flexible windowing environment, there might be separate software windows for each of the program, the EPG, and the ECPG (as well as for the enhancements), and in a multi-display configuration, these might be physically allocated to displays in any combination, as desired.
- As described above, multiple ECs may be usable concurrently, using advanced display interfaces that can display separate ECs in separate display/control channels (DCCs), and having separate windows and controls (or by blending the enhancements), and the channel selector would preferably support that. A control could first indicate which EC DCC was being referenced (such as by rotation of focus through all active DCCS, or by a DCC number entry) and then select which EC is to be viewed in that DCC, as just described.
- In advanced systems with computer-like high resolution displays and GUIs, a wide variety of more powerful controls might be applied to create a rich ECS facility. For example, ECs might be selected from cascading drop down lists (like those used in the Windows start menu or browser favorites list). Such ECSs might be always visible in a tool bar, or might appear as needed, triggered by mouse-overs, control keys, or the like.

It will be understood that such controls may be provided as part of an enhancement portal, and/or provided as a local browser function. Such controls might, for example, be applied in setup actions prior to browsing, such as in the form of an alternative EC selection screen or control panel, and/or might also be applied during viewing, such as, for instance in a pane or additional window, or in pop-up controls, as described herein with regard to FIG. 9 and elsewhere. It will further be apparent that while embodiments of multichannel and open enhancement services described herein could be applied using MMUI-based systems, all such services might, in various embodiments, be applicable in SMUI contexts as well. Such applications might suffer only the more or less serious limitation of a less powerful user interface, and such SMUT interfaces might be extended as described herein, as well as in additional respects that parallel the MMUI facilities described herein, as will be apparent to one skilled in the art based on the teachings herein.

The ability to provide such a range of supplementary material synchronized with TV, movies (broadcast or DVD), and/or other content might be viewed as offering an entirely new dimension in media that truly blends the immediacy of TV with the dynamics, creativity, and innovation of the open Web. These might span a wide spectrum of broad general-interest entertainment portals, and highly of specialized information and supplementary services. Some possible examples, based on imagined extensions of existing brands using these methods, include:

- A Yahoo or AOL general set of ECs with broad services and multiple levels of personalization and sub-areas. Such a service might offer a page for each program with varied links and services, with varying sets for varying interests and levels of personalization.
- An Internet Movie DataBase (IMDB) EC that could always show the main page for any movie currently being viewed.
- A Travelocity EC that could provide travel information about any locales relating to current programming or commercials.
- A brokerage firm EC that could tie to currently airing business news on any and all channels.
- A sports EC that could supplement any sports programming (of any kind, or for specific sports)
- A games EC that could supplement any and all games shows, using sanctioned material from producers or independent material.
- A Pacifica or John Birch EC that could offer alternative political views related to current programming.
- A Scientific American or Encyclopedia Britannica EC that could offer supplementary content
- A National Lampoon EC that could offer parodies.
- An Amazon or Barnes and Noble EC that could offer books related to programming
- A Macy's or Kmart, Neiman Marcus or Amazon EC that could offer general merchandise related to programming.
- An About.com EC that uses specialist volunteer enthusiasts to create special interest enhancements related to programming.
- An EC Brand associated with a primary program channel brand, such as ABC, HBO, CNN, ESPN, GSN, Nickelodeon, and the like, that might be limited to programs carried on those respective channels or might cover other programming as well, thus providing a new form of brand competition.

It is noted that that each of these could be "always on" in a toolbar, or otherwise reachable via standard Web browsing facilities, depending on the user's preferences. It will also be understood that any such EC could also be provided in the form of a full EC portal, either with or without other ECs, and that the distinction between an EC and an EC portal, given the possible use of syndication and Web services methods, might become indistinct to the point that the two are largely interchangeable, and differ only in emphasis.

As described with regard to FIG. 9, an ITV presentation drawing on such ECs might be structured to give users choices as to whether a single chosen ITV stream was seen or whether alternative enhancements might be presented, either as options to be approved, or automatically in a multi-enhancement presentation. One scheme might give preference by priority to selected alternatives, but also display primary (base-program-sourced) enhancements in addition, or when no higher priority equivalent was available.

For example, a user might want both the primary HBO enhancements and the IMDB enhancements as a lower priority to be shown in addition, or might want the Merrill Lynch enhancements to have priority over the CNBC or MSNBC enhancements. The user might want the (base-program-sourced) real time enhancements to Millionaire to have priority over a less time-sensitive enhancement from Encyclopedia Britannica. Such priorities might be specified globally, and within a content/channel category structure. Rich UI alternatives might be applied to present the resources associated with any of multiple active ECs. These might include any combination of the methods described above. For example, panes/frames might be desirable for concurrent viewing of the resources of multiple ECs, while tabbed windows/pages might be useful for viewing such resources in alternation.

As noted, the lack of advance access to live programming might put independent enhancement providers/producers at a disadvantage. However, tools might be provided to scan programming and create dynamic associations in real time. Such scanning might, for example, involve automated speech and image recognition. It is noted that human editors might supplement automated tools. For instance, human editors might enter key words and/or synopses, and/or edit out poor matches. Standard templates might be used with only minor variation from episode to episode. The significant portion of programming that is not entirely new (reruns, movies, etc.), might require less processing, effort, and/or the like. The task, might, for example, be much like that of conventional live news or sports programming, where the unexpected is dealt with in a framework of preparedness. For loosely synchronized enhancements, independent sourcing might require less processing, effort, and/or the like.

With further regard to the concept of multiple ECs and the motivation for such services, the association of channels with brands will be further discussed. Brands may be thought of as well-known sets of offerings with recognized attributes, including soft factors such as psychological and social associations. Further, current TV channels may be thought of as having brands, such as MTV for youth culture and coolness, CNN for global awareness, Fox News for conservative opinion, CBS (formerly) for being "the Tiffany network" Further, specific series, shows, and/or the like (e.g., The West Wing, Friends, or the US Tennis Open) might be thought of as being associated with brands. Such might be used by commercial sponsors to select demographics and/or psychographics, and/or to benefit from the contextual image of a brand.

Similar branding might be established for enhancement channels, based on objective topical factors, as well as these more subjective factors. Even in closed ETV environments, such use of multiple EC alternatives might be desirable to exploit the power of branding as well as to enable use of task-specific selection criteria for tailoring enhancement sets to users.

Extending the discussion above, it is noted that the concepts of personalization/customization, as emphasized in interactive media, and channelization, as applied in more traditional media and as extended herein, might, in various embodiments, be related and/or complementary. Personalization as applied on the Web and proposed in emerging digital TV services focuses on building a customized experience tuned to the desires and interests of the user. It is noted that:

- Personalization can involve filtering. Filtering can employ various methods (filters) to select items of probable interest from a large set of available items, and thus might be viewed as being primarily subtractive, excluding items that fail to pass the filter.
- Channelization might be viewed as a related method which may be in part a result of filtering, or may be subsequently filtered, but channels may have a primarily additive effect in that they may draw from diverse sources of possible items, and may be selected using diverse filtering criteria. Channels in general might be independently sourced, and may be created and selected based on diverse criteria, sensibilities, and methods. A major appeal of branded channels might be the distinctiveness of their sourcing and selection.

Such distinction can have some subtlety, since channels might be public channels (which may have branding effects), but might also be privately created and defined. The use of named filters might be viewed as creating a private channel, such as a filter for world news, one for media business news, one for selected stocks, one for Astaire and Rogers movies, or one for dirty jokes. Such personal channels may be characterized by defined differences in sourcing and/or selection. Conversely, filters might be applied to compose sets of selections from multiple channels (e.g., by a logical OR). Branded channels might also have the characteristic of being publicly recognized as having a sharable personality, unlike private personalized channels. The appeal of brands might relate to this common recognition of shared taste or cachet.

An aspect of channels as addressed herein is that channels may have real diversity in both what they draw on and how they are selected. They might, for instance, be sourced from different creative sources, aggregated based on different sensibilities, and filtered based on different methods. For example, the filtering methods might differ not only in the filter criteria, but also in the algorithms, both as to details of parameters and rules and weightings, and as to fundamental methods, such as Boolean, fuzzy, collaborative filtering, agent-driven searching, and others.

In current systems, content enhancements are recognized as needing some level of selection of alternatives with regard to form, not content, such as for language and for device presentation characteristics such as cache size or bandwidth (as provided in the ATVEF proposal). Importantly, such selections relate to variant versions of what are essentially the same enhancement content items, not to selection among dissimilar alternative enhancement items. Current systems provide very limited facilities for user selection of alternative enhancements with regard to content. Virtual channels (VCs) provide a crude way to select by creating multiple primary content channels including varying sets of associated enhancements. Different VCs could contain the same primary program, and thus could implicitly offer different enhancements to be selected by selecting the VC that includes those enhancements. The two-level selection of primary channel and then a corresponding EC described herein is potentially far more flexible, scalable, and extensible, and could work well for both small and large numbers of alternatives. One aspect of this is simple combinatorial math—each of n channels might offer each of m ECs, instead of having to keep track of n times m VCs (m enhancement channels for each of n primary programs). In addition, this might allow for selection of multiple ECs to be concurrently active for a program, which simple VCs would not enable.

An additional benefit of channels is that a user can select different channels over time. Over short periods this may be desirable to accommodate changes in mood, task, pace. This might enable a user to manage his psychological flow (in the sense of flow described by Csikszentmihalyi) over time, and to adapt to changing tasks or Circumstances. In the longer term, channels might be selected based on changing tastes or fashions. Similar changes of effect might be achieved to some limited degree with filtering, as well, but that would involve much more complex variation in many filtering criteria and methods. Channels, including the concept of enhancement channels described herein, can offer a simple way to operate at a higher level (which can be thought of as selecting among pre-defined families of filters).

Related to this, it is noted that various teachings herein relate to a changing nature of TV viewing, from the historical model of ongoing channels, which happen to carry an externally defined sequence of programs, to a program-oriented medium that might or might not be organized into physical or logical channels. This might be understood in terms of the basic analog TV set, in which channels are tuned to, and the set then plays whatever program series happens to appear within the channel, compared to an advanced system, such as one with VOD or DVR functions, in which it is effectively an individual program that is selected, and any channel identity might be incidental.

As noted above, some of the benefits that might be achieved by the methods described herein relating to the use, distribution, and business models relating to enhancements include:

Unbundling of enhancement production and distribution from that of the base programming
 Decoupling of enhancements and triggers to support saved programs and time-agnostic use
 Rich features for open linkage of ads to resources
 Reduction of enhancement content creation costs relating to full exploitation of Web technologies, automation, repurposing/adaptation of content, and open participation of diverse contributors
 Ability to associate TV viewing contexts with direct access to relevant enhancement resources available in existing Web sites.
 Enabling new business and investment opportunities for entrepreneurial creation of new content and distribution models
 Bypassing potential resistance and conflicts in business models among established players who might not be supportive of introduction of new methods
 Ability to work with current and emerging consumer systems and infrastructures
 Simple, intuitive, and highly automated use It is noted that various of these address multi-channel capabilities at a number of levels. One such level is the multi-channel aspect of the base programs. Another such level is the multi-channel aspect of the enhancement channels. To clarify this further as they apply to alternative embodiments, in some cases it might be useful to distinguish between:

a linkbase starting link source, which determines how links and starting resources are defined
 an enhancement channel resource set, which determines the ending resources of an enhancement channel
 a linkbase link resolver, which enables an enhancement channel to be realized by associating the enhancement channel resource set with a linkbase starting link source.

This may be useful in considering that linkbase starting link sources might, for example, be independently produced and/or derived from links that are embedded with or otherwise directly associated with base programs, such as, for example ATVEF trigger streams, and that such starting link sources might contain and/or have directly associated specifications of ending resources. As noted above, link resolver techniques, such as those based on proxying and/or redirection, might be used to break an explicit association with ending resources and/or to permit use of open enhancement channels even where such openness was not provided for. Thus all three dimensions might be constrained, or there might be flexibility in any or all of these dimensions, depending on the embodiment.

One exemplary architecture for a flexible multi-channel service supporting open and independently provided ECs might be defined in terms of a series of tables that can be used to control what links are presented and how they are resolved. These tables might include one or more of the following entries, perhaps organized into columns:

Linkbase starting link source. This might have entries to indicate whether links and/or triggers were embedded or otherwise directly associated with a base program, or to specify a URL, or some other identifier and/or locator, that can be used to obtain link and starting resource information, and which might have associated type or other parameter information.

Linkbase resolver. This might have entries to indicate alternative resolver services. A portal service, whether remote or local, as described, which might be one of many, might imply a single resolver service, or it might provide for alternative sets of resolvers, thus effectively creating a chained or hierarchical specification of portals and resolvers. Thus these entries might be implied or explicit, and might include URLs, or other identifiers and/or locators, with parameters as appropriate, for locating one or more levels of resolvers.

Enhancement channel. The channels might be implied by the resolver or portal, but in the more general case, separate specification might be desirable, such as for example to allow sets of ECs to be independently provided, and to be reachable through the services of any of multiple resolvers and/or portals. Again, the entries might be implied or explicit, and might include URLs, or other identifiers and/or locators, with parameters as appropriate, for one or more levels of resolvers.

Applicability/Scope. This might selectively specify, in any of multiple dimensions, when the sources, resolvers, and ECs are to be applied. This might be used to define scopes that apply by time, such as to time of day or daypart, day of week, and/or specific time slots, by program category or genre, and/or by channel and/or program, so that different combinations might apply under different, defined, circumstances.

Time base. This might indicate whether selections apply to an entire program, or for specific time spans or time positions.

Presentation. This information could relate the selection of linkbases and ECs to the control of how they are presented. This would address variables such as described above, including such factors as choice of devices set, whether links are activated only on request or automatically, whether windows are full, sized, or minimized, whether they are tiled or stacked, ordering, priority, and control of focus, and other such behaviors.

It will be understood that this exemplary architecture might be cast in different forms without departing from the spirit of the methods described herein.

With regard to all of the URL or other identifiers/locators, it is noted that such might be implied or listed in a closed group, and might thus be controlled by the service provider and closed to user modification. Alternately or additionally, such might permit arbitrary entry of such specifications by users, thus providing an open facility that can support any linkbase sources and resolvers and any ECs that a user desires. As noted above, the elements contained in these tables might be controlled at varied levels and times, including, for instance:

Pre-specification by product/service providers

Ongoing specification of user-specific defaults that persist until changed, and apply across sessions, including specifications made during a setup process or subsequently Real-time navigation/presentation controls that are applied during browsing, and which may have a scope that is limited in scope, such as to a single link or a single program, or that persists during that session.

The various embodiments and user interface variations described above, as well as many other variations, might be viewed as more or less fully developed instances of an architecture involving these factors. For example, the user interface of FIG. 9 might be defined in terms of an advance specification made using this table structure to define the ECs to be included as well as the presentation formats for and across each. An alternative implementation could involve less advance setup, and use controls at the time of link presentation, such as the EC channel selector control as described above, which presents links as they relate to starting resources, and allows the user to select among alternative ECs and their corresponding ending resources at the time of viewing. Such methods might be combined to provide rich interfaces with highly flexible control. From this perspective, the overall process might thus be viewed, for example, as:

Enabling viewers to select a primary TV program and/or channel, or other similar primary resource that serves as primary starting resource Enabling specification of a set-up of 1) a base format for presentation of EC links and/or ending resources, and 2) a base selection of linkbase sources, resolvers, and ECs, such as using the tabular architecture just described Supporting a presentation of EC links and/or ending resources in accord with that set-up Enabling dynamic control to actuate links and/or perform other navigation and control, and to alter the set-up on a temporary or permanent basis.

Other dimensions of variation include how links are aggregated, and whether they are user-activated or automatic. With regard to aggregation, it is noted that simple forms of enhancement to TV or other video may be understood as un-aggregated, as simply a series of atomic links having no particular relationship (except for their association with a given program). For example this may be appropriate to simple cases of individual embedded links, or of simple series, such as ATVEF streams, within a particular program. Portions of the discussion herein relate to features and benefits of more advanced forms of aggregation, such as where links are aggregated into ECs, and where control of ECs might have a scope that corresponds to a program, or channel, or session, or other useful period of use, such as relating to viewing of one or more continuous media resources as an ongoing activity, or to sets of such periods, such as by series or genre.

With regard to activation, as described above, this may be by user action or automatic, and patterns of such control might vary in different usage contexts. For example, when viewing enhancements on a TV screen, it might be desirable to minimize use of automatic activation, so that overlay of enhancements is "opt-in" by explicit request at the time, in contrast to usage of a second screen, in which case automatic presentation of ending resources might be desirable to have some set of current enhancements "always-on," for some period, such as in the standing sessions described above.

It is also noted, as indicated above, that linkbase resolvers might form a chain or hierarchy. Such a capability can, for example, provide for rich configurations of resolvers and/or for complex relationships. Such configurations of resolvers might involve, for example, multiple sources of service, while such complex relationships might include, for example, mixtures of manually authored and automatically generated linkbases and/or enhancements, which might include complex systems of agents, filters, views, and aggregators applicable to provide useful enhancement material and value-added custom production processes, drawing from mixtures of pre-existing and dynamically generated content, Again, it will be understood that such combinations might involve any combination of advance and/or real-time specification by the user, the providers, or others.

It is also noted that some of the variations described herein can be understood as forms of "n-ary links." This relates to the idea that simple links might be viewed as binary, linking a single starting resource to a single ending resource. The use of multiple ECs might be understood as offering multiple ending resources to "a" link having a given starting resource. Conversely, automated or other generic link generation methods can be thought of as providing links with a given ending resource, or set of ending resources, to any of multiple starting resources having some common feature. This might be used, for example, for links that are generic to such features as an object, a person, a place, a series of episodes, a concept or topic, and/or the like.

In order to exploit both the richness of open enhancements, and the value of synchronicity in adding immediacy to a media such as movies and television, a new business model providing for a two stage release of new content might be desirable. Currently movies and TV programs often have release windows that concentrate viewer awareness and interest during a premiere and/or first run period, whether for weeks with a movie, or in full synchronicity for a TV program. More generally, it will be understood that such release windows may involve a series of stages, such as limited or full theatrical release, VCR/DVD, pay-per-view, and VOD release, TV network premiere, TV syndication release, and the like.

However independent enhancement providers might be unable to create the most effective enhancements in real time, or even within weeks. Thus, it might be desirable to offer a special pre-release to enhancement providers that is open to all qualified parties, but possibly restricted from the general public, that is far enough in advance of the general premiere as to permit creation of rich enhancements to be done for that premiere. Such enhancements might also be cross-linked among themselves, to create a rich hypermedia fabric. Some such cross-linking might be accomplished during the pre-release window, while further development of enhancements might continue indefinitely.

Expanding further on the discussion of rights above, in regard to open enhancements provided independently of primary program providers, there may be a need and opportunity for enhanced Digital Rights Management tools to facilitate licensing of enhancement rights. According to various embodiments of the present invention, a new category of rights might be defined for enhancements to a primary content work, to the extent that such enhancements may be determined require license. Such an enhancement use might, for example, be defined as any form of trigger or linking meant to occur in association with a presentation of a base program. As another example, such an enhancement use might be more narrowly defined in terms of any use of copyrighted or other critical elements, such as logos, images, likenesses, music, characters, video clips and/or the like, in such enhancements. A structure for licensing and charging could be applied, including consideration of factors such as:

The general nature of use for the enhancement

Covenants to exclude prohibited contexts and uses (such as pornography)

The commercial nature of the enhancing enterprise

The market and distribution

The nature of the work enhanced

The nature of the enhancements, such as, for example, synchronized loosely to time of showing, synchronized to specific time-triggers, asynchronous, or deferred.

Additional factors that might affect rates, and whether a use was to be considered fair use might include such factors as:

The extent of material to be used (absolutely and/or relative to the total work)

The nature of any transformations or alterations to be applied

The process and/or terms for payment of license fees for use of the base work

What other existing works (or categories of works) are to be included in the derived work For many of these factors, it might be desirable to apply an enforceable and/or auditable category structure. Such a structure might, for instance, be defined in XML. Pre-defined scales of license fees might apply based on such criteria, or might be negotiated by the enhancement producer. Such licensing actions and fees might also be deferred to the ultimate user under a suitably simple and robust mechanism. The latter approach might be especially relevant to embodiments in which sensitive elements from primary program resources might be virtually embedded in enhancement resources by a linking reference. In this way, the enhancement provider might not need to provide sensitive elements, but instead could indicate to a viewer's system that the elements should be obtained and included, and that process might then be considered to be a matter between the viewer and the primary resource provider.

Such a DRM extension might also include audit and reporting functions to advise all parties of proper licensing and usage, and might require integrity controls. For example, it might be required that all providers of presentation systems build in protected and trusted DRM mechanisms to prevent unlicensed uses, just as manufacturers of some recording devices include copy protection mechanisms. Such DRM mechanisms as described here might be built using the same kinds of techniques as used for more traditional content types, with possible minor variations and extensions as will be apparent to one skilled in the art based on the teachings herein.

Related to this is the possible extension of DRM to managing fair use. To the extent that DRM mechanics can be relied on to reasonably ensure that fair use is actually limited to what is recognized to be fair use based on measurable or certifiable criteria, and that other uses are permitted only if licensed accordingly, a major expansion of the media economy might be enabled. Such a mechanism might be based on software agents using rule-based negotiation. Obtaining agreement on the rules might be challenging, but as evolving DRM methods prove that such mechanisms can work for other rights aspects, a degree of trust might be achieved and the rule setting for this more advanced level of DRM might be undertaken in a positive context of cooperation.

As alluded to above, enhancement channels might, for example, be viewed as providing a simple and powerful way to organize the presentation and navigation of alternative linkbases. However, from one point of view, such is an abstraction that is layered on top of the underlying hypermedia space in which all resources of all kinds may be arbitrarily interlinked and/or deeply intertwingled. Further, it should be kept in mind that TV or other continuous media channels and programs can, in various embodiments, serve as both starting resources and ending resources in such structures of links and linkbases, without limitation. Such direct or indirect cross-linkage of continuous media resources can, for example, provide an open-ended range of powerful capabilities in hypermedia browsing. Such linkage, for instance, might take rich forms that cross continuous media resources without regard to type and/or with specific structures that cross between such types as channels, major and minor channels, alternate camera angles, primary programs and ad programs, as well as intermediated through other resources (e.g., program guides, viewer communications and messaging services, advanced transaction/information processing services, and/or the like). Such linkage services might involve rich relationships in hypertime, as described above, and might also, for instance, involve awareness of synchronicity on a realtime base for live programming or appointment viewing, and/or might highlight or select resources with regard to that realtime synchronicity. A few exemplary embodiments are now described.

As a first exemplary embodiment, there may be provided ECs and/or similar linkage services that support awareness and activation of alternative related resources, for instance, to highlight times where a change in selection might be desirable. Such alternative related resources could include, for example, alternate camera angles or second audio programs. Such a facility could, for instance, provide a new medium capability in which program producers and/or third parties could provide services that provide some of the benefits of producer-controlled changes of camera angle, language change vs. subtitles, and similar media selections by offering such changes as voluntary choices by the viewer based on advisory metadata.

Such a facility could, for example, provide an experience more open than that of full producer control, yet with guidance that a viewer might not otherwise have at hand to inform viewer controlled selections. The choices might, for instance, be presented by any of the methods described herein, including presentation of link arcs for viewer selection and activation, or as input to viewer agent systems that might intelligently manage such presentation to the user and/or automatically activate selected links to provide the effect of a custom produced, personalized viewing experience. It will be understood that such agent-mediated hypermedia experiences might consist exclusively of continuous media resources or contain mixtures of continuous and discrete resources similar to the experience described with respect to FIG. 9, and that such experiences might be made as passive or interactive as the viewer might specify, and that such factors might be altered on a dynamic basis. Similar cross-program guidance might be provided across independent channels, such as by third party EC providers. For example, viewers following a breaking news story might obtain advice in real time of related material airing on other channels, and thus be able to achieve a kind of smart, guided, content-aware channel surfing, as well as richer hypermedia experiences.

According to another exemplary embodiment, smart channel surfing might be implemented so as to exploit increased awareness of actual broadcast scheduling, including details of advertising program scheduling. Such methods might, for example, combine with EPG services and/or personal viewing support agents that draw on knowledge of viewer program and channel preferences to provide a service that ranks currently airing channels by potential desirability, possibly factoring in realtime knowledge and/or estimation of when advertisements are airing—and/or knowledge of content associations, as just described, and/or intelligent inference of activity/interest lulls that a viewer might wish to avoid. With such support, a channel up/down change command might change to the next most preferred channel, and might skip channels on which ads were active, or based on other filtering criteria.

Similarly, a view of an EPG listing grid might be ranked and filtered by the same kind of criteria to facilitate rapid selection of alternative viewing. The ad-exclusion feature might be enabled when rapid surfing is desired, and turned off when that is not a dominating decision factor. The content association features might be enabled when there is a content thread of interest to be followed. As noted, such content threads might, for example, relate to news story topics, and as another example, might relate to sports of a given type and/or league. It will be noted that current EPGs provide a relatively superficial and not completely up to the minute view of program schedules, generally lacking information on late scheduling changes, time-position-specific details of program segment content, timing of advertisements and the like. The methods described herein could make available rich data on those and other content and timing details, as well as on viewer preferences. Thus, via various embodiments of the present invention can be provided a smarter, richer, and more realtime EPG, perhaps drawing on such details for presentation to the viewer and/or for use in smarter and more information-rich selection, ranking, and categorization services.

Further, related to the earlier discussion of counter-programming, it is noted that ECs could, in various embodiments, be employed commercially to direct viewers to alternative programs by using similarly information-rich and personalized intelligence. Such ECs might be offered by programmers, possibly with added services, as a method of developing and supporting viewer loyalty to their programs, and/or might be offered by third parties as another specialized portal service that combines offerings of value to viewers and to sponsors, possibly including programmers and others. Such services might charge fees to viewers for the service, and/or to those programmers or other parties for placement of those counter-programming offers. As with other such fees, charging elements might include fees for presentation, activation, and the like.

As another example of employing the functionality discussed herein, data on realtime advertising placements across the channel grid could be provided as a very compact vector, possibly with as little as one bit per channel to indicate current status as primary program or advertisement, or with a few added bits per channel to indicate raw data or predictions on likely duration of ad slots. Such a vector might be transmitted based on various trigger criteria, such as when the currently viewed channel cuts to an ad, on request, on, activation of EPG or surfing commands, or the like. A variety of additional approaches for efficient distribution and application of detailed and realtime, or at least very near realtime, data for a variety of client-based and/or server-based embodiments will be apparent to those skilled in the art, based on the teachings herein.

Again, it is noted that discussion herein primarily describes TV, PC, and Internet/Web-based embodiments of portals and enhancements out of convenience of exposition, and that these methods apply to other content, such as for example movies, radio and recorded music, other devices, such as for example PDAs, cell phones, and other appliances, as well as single-screen TV-based access, and to other networks, such as for example SMS and MMS. For example, the same kind of portal services might be provided for SMS-based enhancements to TV programs, such as to provide a cell phone user access to open enhancement services for any TV program.

Open EC Linking on the Internet

Various core details of link handling will now be discussed in accord with an exemplary embodiment of the above methods. The exemplary embodiment is based on methods for passing state records that allow for a range of architectural variations in where the intelligence that controls EC selection and state-dependent aspects of linking are to be handled, and that work with standard HTTP, and/or standard SOAP-based Web services that are not limited to use for continuous media. For example, the state record might be passed as a simple parameter set included with an HTTP request.

Consider initially a simple application in which all enhancements to the TV viewing are directed to a second-screen device set, such as a PC-based Web browser, as in many of the portal examples described above. In this case the state record might be relatively simple, reflecting a TV context that can be specified as a current program and time-position/offset, or alternatively, with more or less precision, lacking the time-position, or in terms of some combination of channel, time-zone, and identification of the TV distribution system source that can be used to determine the program. This parameter set can be thought of as specifying the TV viewing context, and thus referred to as TVC parameters. Thus one role of the multi-channel/MMUI portal service, or of a local browser-based equivalent, can be to facilitate inclusion of a TVC parameter set with the linking process that results in a request for an ending resource.

As alluded to above, a protocol such as HTTP and/or SOAP could be employed. HTTP parameters and/or SOAP parameters, might be defined to include any or all of the following:

TZ, for Time Zone, specifying the time-zone of the viewer

DIST, for TV distributions service, specifying the cable or satellite system, or local broadcast region, or Internet service, or other source designation that controls what programs are received on what channels.

CH, for channel, indicating the channel number currently being viewed, including virtual channels, major/minor channels and the like.

PID, for program ID, specifying the particular program (base content, or advertising program), using any appropriate ID system BPID, for base program ID, which might optionally specify a base content program, which might be useful in conjunction with a PID that specified an advertising program that was viewed in association with that base content program.

TPOS, for time-position, specifying the time into the program, relative to the start, in any convenient scheme, and/or the current local time.

REG, for image region, specifying any spatial selection of starting resource, coded in any appropriate scheme, such as by a set of bounding vectors or shapes, or simple rectangular pixel coordinates, or the like.

TVCTYPE, for TVC type, specifying any of a variety of factors regarding how the TVC information was assembled and how it should be interpreted. This might include information on the source of the various parameters, whether a link was triggered automatically or by explicit user action, and/or whether program identification details are known precisely and currently, or involve various approximations, such as might be relevant to time-position, or inferences that might not be reliable, such as might be relevant to PID, CH, and other parameters.

ENDURL, for ending resource URL, specifying any embedded, explicit link information, such as might be used by a proxy service for resolution to alternative ending resources.

DEMO and USER, for demographic and user data, specifying generic and/or specific information about the user, as addressed further below.

DRM, for digital rights management information, such as to control the use of TVC data, and the management of rights relating to the base and/or enhancement content/services.

Other similar parameters

Various combinations of such parameters might be determined and assembled at the browser, and/or at a remote portal service, or other related service, using any of the methods described above. Such parameters might then be included in an HTTP request, such as within the URL field as typically delimited by a "?", in a form, or otherwise, and might similarly be included in a SOAP-based or other similar kind of Web services request. Alternatively, such data might be passed in cookies as discussed below. As noted previously, such state information might be coded using XML, and/or might be defined using object-oriented methods.

Such a request containing a TVC parameter might then be handled in any of a variety of ways. One such method might include processing at a portal to resolve it into a particular ending resource URL based on the TVC, and to pass that request on for handling through methods such as proxying, redirection, or the like. An alternative method might be similar, but might simply pass the request to a more generic URL designating an enhancement channel or other content and/or service source, complete with its TVC parameters (or with such parameters expected to be obtained separately, as described below), for final resolution of an appropriate ending resource to be made by applying those parameters at that service source.

Such an approach might apply little or no intelligence specific to the current viewing context, leaving that to the destination service. This might be consistent with an approach applying the philosophy of the "stupid network," in which intelligence is left to the nodes attached to the network, with only simple routing done within the network. Other schemes might include more network-based intelligence, or intelligence in a cooperating network of servers, such as to provide the multiple levels of EC channel selection and value-added services described above.

Continuing this example, it is noted that passing the TVC parameters to the end-server might permit it to fully manage the interpretation of context and delivery of appropriate ending resources to the extent it might desire. This can allow for implementation of a pure TVC-based portal or local TVC-based browser accessory that operates much like conventional Web browsing or portal services, but with the addition of the steps of assembling and including the TVC parameters. Alternatively, as described below, these parameters might be obtained in a separate step. HTTP or equivalent requests with these parameters can then be passed to any server. The receiving server could then handle that request in a range of ways.

If the server is a standard server that is not TVC-context-aware, it could ignore the parameters and simply return a generic resource, as specified by the URL and other available information. For example, a link to abc.com, or jeopardy.com, or abc.com/jeopardy, or bmw.com, might, with no special provision for TVC use, simply return a standard page for the designated URL, including dynamic pages using any conventional customization features. Alternatively, with added TVC-related intelligence, such servers might recognize parameters indicating that the viewer was at a given time-position into a given Jeopardy program, and thus return resources specific to that program episode and time-position, such as specific Jeopardy questions and/or answers, and the like. Similarly, a modified BMW Web site might recognize the PID as being a that for a particular ad, and serve pages that relate specifically to the cars, offers, and features addressed in that ad, and to any time positions and/or selected regions related to that ad. The BMW site might further recognize that the BPID was for Jeopardy, and custom-tailor the page based on demographics associated with Jeopardy viewers. This processing might result in translation of generic URLs (such as the home page) to context-specific URLs, such as by further proxying, redirection, and/or the like, or might simply be done by dynamic serving of customized resources suited to the TVC context without ever resolving into a more specific URL.

Again, as described above, this process of linking and addition of TVC parameters can be implemented in a variety of ways. For example, an EC portal might obtain state data from manual user entry, from devices in the home, and/or from a cable or satellite head-end and associated services, including VOD or ad servers, as well as through various inferences. It might operate largely as a conventional Web portal, making little or no direct use of that information except to append the TVC data to URLs it enables users to select, leaving the use of that TVC data that to the destination server to handle. Such appending might be done when a page containing links is served, or might involve proxying and/or redirection after the viewer actuates a link. The TVC parameters are thus available to the remote server, whether a portal, a target server, or an intermediate proxy server, or some other server, to use as desired. This enables an unlimited variety of services that are context dependent, including, for example transactions, dynamically tailored resource customization, searching, and the like. In cases where a URL ordinarily contains parameters for other purposes, such as non-viewing-context-specific transactions, searches, or other dynamic customization, the TVC parameters might simply be added to those ordinarily present, such as by appending, or by other coding methods that will be apparent to those skilled in the art.

Alternatively, such a service might itself make fuller use of the TVC parameters to present a more context-specific view of available resources, as described above. In any case, the portal might provide the usual portal functions of providing a selection of links for the user to choose from, whether in simple lists, in hierarchical directory structures, in search functions, in rich navigation structures, or any other suitable manner. It might also provide entry boxes for manual entry of arbitrary links by a user. In all of these cases, an added function is the appending of the TVC parameters to the resulting request. In a local implementation using a Web accessory, extended browser, or similar local function, a similar appending of TVC parameters might be done at the viewer's client system, and might be applicable to any link actuated by the user, or to any defined subset of such links, and/or might be selectively invoked by the user at the time of link activation. Such a local implementation might involve little or no remote function to provide such TVC-enriched links, and, again, all interpretation of this context information might be left to the end resource servers to address.

The interpretation of context at the receiving server might be done using any of the methods described elsewhere herein. Depending on the specificity of the parameters, a program might be fully identified, or some resolution might be needed. In the case of identification by channel and system, the server might need to map that data against known scheduling data to determine a program. In the case of ads, this might also require application of further parameters from the TVC, in combination with external schedule-based mapping parameters to determine what ad was viewed. In the cases of VOD and addressable ads, data from distributors might be needed, if specifics were not already coded into the received TVC.

Related to the portal/TVC services, additional services might be provided to receiving service operators to assist in these receiver activities. This might include such services as providing ASP services and/or software components, either of which might include rich application program interfaces (APIs) for control of specific functions. It might also include provision of data services for interpreting TVC parameters and resolving details of program ID, and for obtaining supplementary information/metadata on programs and ads that might be useful to enhancing context-relevance, such as, for example, from program schedules and ad tracking data sources. One simple example of such a service might be responsibility for portions of the context-handling logic might be shifted from the sender side of the TVC handling to the receiver side of the TVC handling, even if the same service provider ultimately does the work. Provision of such services and tools might be a further source of revenue to the portal/TVC service, and such alternative distributions of services might facilitate tracking data collection.

A further alternative along these lines might be one in which the relay of the TVC data was separated from the primary HTTP request, and instead is obtained in a separate request to a TVC server made by the receiver of the HTTP request. This might be done as a Web services request, such as using SOAP or any other appropriate protocol. Even in this kind of embodiment if might be useful to at least include a URL coding, parameter, or other indication to the receiving server that TVC information is available with respect to this request.

Also, in such a cases of server to server communications of TVC parameters, the TVC server might use cookies as an alternative way to receive some or all of the TVC parameters from the viewer's PC, to be relayed to the receiver server via any suitable protocol, such as HTTP or SOAP. It might also be useful to extend the cookie mechanism at the browser to allow current TVC data to be inserted into cookies at the client prior to providing a cookie to a server. Such a mechanism might also be generalized into an automatically updating subscription-based notification service that sends an HTTP and/or SOAP request, with the cookie containing the updated information, to a subscribing server whenever relevant state changes occur.

It should also be noted that such methods can readily be extended to the richer embodiments described above. For example, in the case of standing sessions and/or streams of enhancements, the inclusion of TVC parameters might be provided at the time such a connection is first established. Instead of simply sending an atomic ending resource as the result of such a request, the receiving server might send a response that establishes the standing session and/or stream of enhancement data and/or metadata, using any of the methods previously described, which might involve use of protocols specific to continuous flows and/or streams, and which might be available only on more advanced servers/services oriented to such continuous flows/streams unlike the simpler and more widely used basic protocols of the Web such as HTTP and SOAP.

Again, in contrast to current two-screen telewebbing services, a standard HTTP and/or SOAP Web request to some URL might have added to it associated TVC data. That TVC data might be interpreted by the receiving server and used to send, in response, a Web page that in turn establishes a standing session associated with the appropriate one of any of a multiplicity of programs from any of a multiplicity of EC sources. That establishment of a further session might be done using embedded JavaScript, applets, and/or similar components, as described previously. The protocol example outlined above might also be extended to provide updated TVC parameters to a server providing such services, so that it might reflect realtime changes as events occur, such as channel changes or time-shifts, or following the rich details of a multi-program/multi-channel session.

For example, such servers might establish subscriptions with the TVC-provider service, such that all relevant state change events are relayed in update TVC transmissions. Such a facility might exploit multicast features for added efficiency. Setup and breakdown of such subscriptions might be by explicit handshake, or the protocols might provide conventions for session lease, expiration, and renewal based on time or other defined events. Based on these updates to the TVC data, the associated standing sessions for enhancements might also be ended for a channel tuned away from and begun for a channel tuned to. Thus it should be understood that subscription-oriented flows might be established bi-directionally, with flows of enhancement data in one direction, from resource sources to the viewer, and flows of TVC data in the other, from the viewer to the resource sources.

Additional extensions might support the more advanced state transfers of more powerful TV viewing systems, such as those that supported enhancement sessions on the TV device set, by including parameters related to the detailed state of such sessions. Thus arbitrarily rich enhancement services providing any or all the features and services described herein might be supported by such open protocols, and with the same kind of flexible division of function between state relay providers, and state interpreters/responders.

In view of this, it is noted that methods such as this one of adapted use of standard Web protocols permit services of the kind described herein to be readily overlaid on the existing Web, such that useful results may be obtained from existing servers and resources without modification, but in which enhanced results that more fully respond to the particular context of TV viewing can be easily added by individual Web sites to the extent that they so desire. This could be a way to introduce and develop such enhanced services, by starting immediately with TVC-enhanced portal links to a broad array of existing services that might generate traffic, and encouraging the providers of those services to gradually enhance them by using the TVC data that is provided. The ability to see and measure such actual traffic might convincingly demonstrate to content/service providers the opportunity to gain value from enhanced context-specific services.

More generally, this ability to layer TVC-related enhancement services on top of standard Web protocols can allow for much greater openness and flexibility in the offering of enhancements to TV and other hypermedia, in that any Web resource becomes a candidate enhancement resource. Viewers need not be limited to the set of resources expressly developed as enhancement resources, but can be offered any Web resource, with no noticeable difference in how TVC-aware and non-TVC-aware resources are requested. The important differences, which may be largely hidden from the viewer, are in the automatic adaptation of TVC-aware resources to the TV context, and in the ability to have ongoing streams of enhancements established, automatically. Viewer control and visibility of the establishment of ongoing enhancement streams can be provided to the extent desired for good user interface control, but the technology does not require any more user awareness than is so desired.

Building further on this separation of TVC-related functions, and layering on standard Web protocols, these methods enable the provision of a class of broadly useful TVC servers (TV context servers, or TVCSs), which serve as a specialized kind of context server for a variety of applications. As noted, such TVC servers might pass their data in the form of parameters associated with an HTTP or SOAP request, or might provide such data in response to separate "back-end" requests after a request is received by a server. As noted, any Web server might make such a TNC request in an effort to customize its action to the TV context of the requesting user. It should be noted that this capability to make requests to a TVC server might be readily available not just to Web servers, but to any kind of server. One example of particular interest is the case of Web ad servers.

It is common practice for Web sites to embed ads indirectly, by coding HTML requests into the pages they serve that cause the receiving browser to make a further request to a designated specialty ad server, and to pass parameters with the request that that server can use to serve ads that are targeted based on known attributes of that user. The availability of TVC data adds the possibility of a new level of targeting, one based on the TVC-specified information on what the user is watching on TV at the moment. This additional context-related targeting might be useful, for example, both in regard to the specifics of the program, and also to the implication of that knowledge with regard to other attributes of the user, such as demographics, psychographics, interests, and the like.

Based on the teachings herein, it will be apparent to one skilled in the art that this TVC data can be provided to such Web servers using minor variations on any of the methods described, including for example appending of TVC parameters when the request is made from the browser, and/or the issuance of subsequent requests from the ad server to the TVC server, and/or communication between the ad server and the Web server that embedded the ad request. This is consistent with earlier discussion on methods for coordinated targeting of TV and Web ads. Simple linkages might enable coordination of TV and Web ads with regard to TV viewing state such as just described. Deeper integration of TV and Web ad servers could allow for deep integration of knowledge of the viewer, as well as sophisticated coordination of the message content of ads across both TV and Web sessions, both at a given time, and over time. Such deeply integrated coordination might be found valuable in maximizing the desired effect of ad campaigns, and provide more coherent and thus less objectionable experiences for the viewer. It will be understood that, in various embodiments, such integration might, for example, be achieved by providing an integrated ad serving control function that is capable of drawing on an integrated base of viewer data and ad content data (including metadata) relevant to both TV and Web viewing in order to drive coordinated serving of custom-assembled ads through both TV ad servers and Web servers, and that various alternative distributions of equivalent information and control functions might also be applied to achieve such an integrated effect.

It will further be understood that TVCs and TVCSs might be integrated with more general and broadly functional context records and context servers that support other aspects of a user's context to achieve broader forms of context-awareness. It will also be understood that TVCs and TVCSs might be embodied in object-oriented form, and that the TVCs might include and/or reference information that is supplementary to state, such as for example business and/or operational rules, behavior models, relationships of viewers, resources, services, actions, and the like, history, and references to associated data, such as for example program schedules. Such information, and the software that processes it might address support for abstraction and inference relating to the TVC and other context data, as well as for synthesis of data that might be assembled from multiple sources, such as from various devices and/or sensors at the viewer location, from head-end and other remote servers, and from manual entry and/or inference.

The methods just described for layering TVC support onto standard Web protocols can also enable a useful division of labor and responsibility, in that the enhanced linking services simply append the needed TVC information, and provide basic linking services, while the more specific interpretation of context and what ending resources to serve based on that context is left to the destination Web service to handle as it desires.

This separation of functions might have a range of important business and legal benefits, with regard to some of the issues described above, and as noted further in some aspects below. With regard to any possible rights issues related to enhancement, as outlined above, this separation of function might be useful to isolate the linking and context relay functions of the portal service, which might not have any rights implications, from the enhancement content selection and presentation functions of the EC content servers, which might be affected by rights issues. These might be operated entirely independently of the portal or linking services, and thus any rights issues might be restricted to the servers that interpret the context and serve the end resources. The TVC-related linking services might have no more responsibility for content rights than do conventional portal linking services.

It should also be understood that such a separation might also be supportive of multiple independent sources of enhancement channels, independently of the basic TVC linking service. As discussed above, EC providers might be linked in multiple levels, providing chains of value-added service, and the TVC portal/linking service might serve as the initial portal or gateway switching service that links the viewer to one or more such chains. Thus, in the general case, a viewer might be given facilities to specify to the TVC portal/linking service one or more EC aggregators that it should present in coordination with a browsing session, and that TVC portal/linking service might then present TVC-specific links to those services, with further selections of EC resources to be controlled by those aggregator services, based on the relay of TVC data to them.

For example, a portal might be set to present ECs sourced from the programming provider of the base program, perhaps along with some additional EC providers, and the user might then actuate links to the base programming provider's EC, which then uses the TVC data to activate a standing enhancement session for the duration of that program. The user might also select, or directly enter a URL, for an alternate EC, such as from an independent EC provider, which might also receive TVC data by the same mechanism, and use that data to deliver additional resources, whether as simple Web pages, or by setting up additional standing sessions. Similarly, a viewer might select among alternative shopping services that might include the primary advertisers for TV ads as they appear, and/or alternative shopping services that might also coordinate their offers based on the TVC data relayed by the TVC portal/linking service.

The example of this mechanism also clarifies aspects of third party linking by independent parties that might serve to enable legal enforcement of service fees and rights related to such links. This might be particularly relevant to the embodiments in which TVC parameters were routinely passed to linked Web sites. For example, the provision of state record data in the TVC parameters, such as might be appended to an HTTP or SOAP request, as described, might be understood as a being a value-added service provided by the portal, or by the browser or browser accessory or the like. The provider of such server or software-generated context relay services might seek to charge for the use of that value-added service. In addition to the various legal and technical means for enforcing control of such services already described above, an additional method might be to simply consider any use of the TVC by a receiving service without payment in accord with defined price schedules and terms to be a case of theft of service.

Accordingly, the provider of the TVC services might publish a schedule of fees, and indicate that the TVC is only to be used in accord with that schedule. The receiving services could then have the choice of using the TVC parameters to serve context-related resources, or not. The receiving service might be free to respond to the basic URL request in the usual fashion to serve a generic page, with no obligation, just as for any conventional request—and as would normally happen with no special programming. However, by causing their server to read and use the TVC parameters to provide a more specific, and presumably more valuable, response, they might de-facto be considered to be using the TVC service, and thus become liable for payments on the specified terms. This might be much like the case of using a signal from a cable system feed that might pass through one's apartment without having a subscription in force. Thus this might enable a simple business model for a TVC linkage provider, in which a fee structure is made known, and TVC-enriched links are provided to an open set of resources.

If the TVC parameters are not used, the function might be considered to involve no obligation by the receiver to pay for referrals except as might be explicitly agreed to with the portal. Such agreement might include, for example, options that involve fees for inclusion and/or preferential positioning of links on portal pages, including the case of search results pages. But if the TVC parameters are used to provide enhanced services that exploit that information, such as to provide pages specific to a given program, or time within a program, then fees would be payable, under threat of legal action for theft of service.

The TVC service provider might exploit this structure by ensuring that the URLs linked to are sufficiently generic that they would have some basic value to users, and thus deliver some utility even with non-cooperating EC/service providers, but that only if the receiving server does added processing and/or routing based on the TVC could more specific and relevant resources be provided to the viewer, thus increasing the value of the results for all parties. Further enhancements to such a business model might provide that some level of limited usage of such services are free, such as to encourage trial use, and to provide some level of free use for selected services, such as might be considered pro-bono. Under such a scheme, some degree of limited use might be permitted, but any use that exploited the TVC parameters to the extent that it resulted in material loss of revenue might be addressed by legal means.

Alternative methods might be used to encourage compliance by receiving servers, and/or to derive revenue from non-paying services. For example:

Encryption might be particularly effective as a way to make the TVC data available only to parties that pay fees as required. The TVC data might be encrypted or encoded in any suitable manner, such as using keys that are specific to a receiving URL and can be changed and not divulged to a receiver that is not in compliance. In such a case, viewers might continue to gain limited value from the generic links that might remain functional, but would lose the benefits of TVC-specific responses.

TVC data might just be omitted from links to non-compliant URLs.

Techniques for introducing delays, and/or for introducing ads, such as interstitials, might be used when passing on links to resources that are not paying. This might generate compensatory revenue, and also motivate receiving services to upgrade to paid service, and such actions might be well accepted by users as proper attempts to gain fair compensation.

In embodiments in which the TVC data is specifically requested by the linked server, control might be readily achieved with similar methods, as well as by using passwords, authentication, and/or similar methods to control access, as will be apparent to one skilled in the art.

It will be understood that variations on this approach for defining a service that is taken up at the option of a content/service and/or EC provider could, in various embodiments, be equally applicable to other embodiments of the methods described herein, as well as to other kinds of services. Thus, this offers a broadly applicable method for providing open matching of service requesters and service providers, in a way that enables some limited exchange with all such services, but restricts more valuable exchanges to those that use the value-added parameters, or other similar value added data and/or metadata, and thus become liable for corresponding service fees.

It will be further understood that usage monitoring and accounting of links passed to edge servers might be done in various ways. For instance, remote portal based services might use redirection and/or proxying to record all requests passed to all URLs. Similarly, local client services that provide context-enriched link handling might also cause such events to be tracked through a remote server, or alternatively, might separately report such activity to a designated service, whether in real time, or on some periodic batch reporting cycle. The resulting traffic data might then be analyzed to determine what fees are owed with regard to what URLs. In the case of requests made from a Web server to a TVC server, usage accounting data might be obtained directly by the TVC server.

It is also noted that portals of the kind described herein might also provide services as an infomediary agent for viewers. Such services might involve using personal data on attributes, preferences, and behavior such as described previously, and selectively providing subsets and/or derivations of such data to EC and similar service providers. Such services might facilitate obtaining content and services most relevant to the viewing context, and to other characteristics of the user, while operating under defined policies that protect the viewer's data from disclosure except as desired.

Such disclosures may be negotiated based on both user and service provider-specified policies, using schemes similar to those provided for by the Platform for Privacy Preferences (P3P). Such information might be included in the TVC demographic and/or user parameters, or in similar extended parameters. Again, the use of such services might be at the option of the receiver, with fees owing if and only if the data is used, or under some other agreed terms. More generally, it will be understood that the entire spectrum of linking and context coordination services described herein can be structured in a variety of ways, such as to serve as ASP and/or local services primarily controlled by the user, and/or ASP and/or local services primarily controlled by the receiving service providers, and/or services of an independent operator, and/or any desired combination thereof.

In considering the methods for exploiting synchronicity described herein, some generalizations may be useful. The very term "program" might be viewed as indicative of the fact that some kinds of content, typically continuous media content, involve the user in the play of a program over time, and thus impart a level of "activity programming" to the user's browsing experience. Such a program is typically defined by someone other than the viewer, but even a replay of a program created by the viewer, himself, might still impart an high level of programming. The browsing experience might be expected to follow this continuing activity program until some event causes a break or branch or other discontinuity in that program. Knowledge of this program thus might enable prediction of the user's ensuing activity program, and knowledge of the program discontinuity events might enable recognition of a loss of program-based synchronicity and a need to attempt to re-establish it by whatever means might be available.

Thus, any coordination of activities based on this broad synchronicity might be divided into epochs of 1) following a program in some level of synchronicity, alternating with 2) epochs of discontinuity and seeking new identifications of subsequent activity programs that might be followed to reestablish a subsequent epoch of synchronicity. The methods described might be viewed as being oriented to these epochs of "punctuated synchronicity," with groups of methods as follows:

methods for ongoing monitoring for events that signal a discontinuity, such as program-based branching triggers, user session transfer requests, other user or external actions, and the like methods used while operating in periods of some level of program-based synchronicity, such as those described for following programs, such as to coordinate programmed actions, and the like methods used while operating at times of discontinuity as signaled by such events, such as for seeking information needed to establish/reestablish synchronicity, and then using that information to (re/) establish an appropriate level of synchronicity and coordination with a subsequent program, and the like.

It is noted that similar methods might be applied to a wide range of similar activities, such as, for example, in other tasks that involve context awareness and/or task coordination in which some aspects of the context and/or task may involve specifiable activity programs. Such tasks might include physical navigation support tasks and support of knowledge work that includes program-driven activities, including any form of specified steps and/or sequences. For example, a location-based service might exploit knowledge of defined trip segments to select sets of support services, and schedule them based on predicted and/or confirmed time/location checkpoints, and to monitor for the end of a defined segment or a departure from plan. Similar methods and portal services structures might be applied to such services.

It is similarly noted that the methods described for communicating TVC data to any standard Web service using HTTP and/or SOAP might also be applied to any other kind of context data, conveyed as a context record in association with a standard Web request, whether provided with the request, or subsequently requested of a context server. Again, such methods enable the seamless intermixing of context-aware services within a broader selection of services on the open Web that might not have context-aware capabilities, and might simply ignore any context record that might be supplied, and respond in their usual way. These methods might be useful, for instance, for any kind of dynamic context information, so that a single context server can monitor it, and make it available to any service that needs it.

Although the invention has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims. In describing a variety of features usable by viewers, programmers, distributors, advertisers and other parties in the context to a variety of exemplary configurations and applications, it is intended that all combinations of such features and methods are understood to be generally applicable, with minor variations, to all such configurations and applications, and the explicit description of all such combinations is omitted merely to avoid repetition. Each of the above-noted references is incorporated herein by reference in its entirety. It is further noted that section headings contained herein should not be deemed to govern, limit, modify, or in any manner affect the scope, meaning, or intent of the content of any section, as such sections may include material of different or broader scope.

APPENDIX A

| Typical modes of coordination | | |
|---|---|---|
| Display Set Options | | |
| | Display set options | |
| Interaction Element | TV picture | PC/PDA screen |
| 1. Main video program screen | Main screen | Duplicate main screen<br>Different main screen |
| 2. Additional video PIP screen | Standard PIP view<br>Mask out (omit) PIP | Duplicate PIP screen<br>Only PIP screen<br>Reverse main/PIP |
| 3. ITV bugs and cues | Show on main screen<br>Show on PIP<br>Mask out | Duplicate<br>Show here only<br>Show different options |
| 4. ITV browser screen (or independent Web page) . . . or other "computer" screen such as e-mail, chat, etc. | Show on main screen<br>Show on PIP<br>Mask out | Duplicate<br>Show here only<br>Show different options<br>More options<br>Different people |
| 5. Video window within browser screen | Show on main screen<br>Show on PIP<br>Mask out | Duplicate<br>Show here only<br>Show different options . . . |
| 6. Interactive image hot-spots | Show on main screen<br>Mask out | Duplicate<br>Show here only<br>Show different options . . . |
| Control Options | | |
| | Control options | |
| Interaction Element | TV remote control | PC/PDA controls |
| 1-6 (any or all) | Controls both devices<br>Controls TV only<br>Migrates ITV interactions to PC | Controls both devices<br>Controls PC only<br>Migrates PC interactions (screen and state) back to TV |

APPENDIX A-continued

| Typical modes of coordination | | |
|---|---|---|
| Direct signal sources | | |
| | Direct signal sources | |
| Interaction Element | TV picture | PC/PDA screen |
| 1-6 (any or all) | Broadcast<br>IP stream<br>Stored | Broadcast<br>IP stream<br>Stored |
| Signal relay | | |
| | Signal relay | |
| Interaction Element | PC to TV | TV to PC |
| 1-6 (any or all) | Broadcast signal<br>A/V or RF signal<br>IP stream<br>Via head-end | Broadcast signal<br>A/V or RF signal<br>IP stream<br>Via head-end |

What is claimed is:

1. A method for use in a second computerized device set which is configured for wireless communication using a wireless communications protocol that enables wireless communication with a first computerized device set, wherein the first computerized device set includes a continuous media player, the method comprising:

receiving discovery information in accordance with a device management discovery protocol that is implemented at a communication layer above an internet protocol layer, wherein the discovery information allows the second computerized device set to determine that the first computerized device set is capable of exchanging data related to a presentation of a continuous media content;

making available to a user a user interface that allows the user to select to enable communications with the first computerized device set;

wirelessly receiving, in accordance with a wireless local area network protocol, state data relating to the presentation of the continuous media content on the first computerized device set for subsequent use to facilitate presentation of enhancement content that comprises information for presentation to the user that is distinct from but related to the presentation of the continuous media content on the first computerized device set, wherein the enhancement content further comprises links to Internet protocol services;

presenting at the second computerized device set, based on the state data, the enhancement content;

making available to the user a second user interface that allows the user to select a particular control function related to a parameter of the presentation of the continuous media content; and wirelessly transmitting, in accordance with the wireless local area network protocol, an indication of the particular control function from the second computerized device set to the first computerized device set for subsequent use by the continuous media player to control the presentation of the continuous media content on the first computerized device set;

wherein the state data includes at least an indication of a program identification of the continuous media content currently being presented, wherein the enhancement content is at least in part dependent on the program identification and comprises one of a cross-program enhancement and a program-specific enhancement, wherein the cross-program enhancement is related to a plurality of programs, wherein the program-specific enhancement is specific to the continuous media content, and wherein the use to facilitate is done using at least one request sent via the internet to a remote source of enhancement content.

2. The method of claim 1, wherein the particular control function allows the user to play, pause, rewind, or fast forward the presentation of the continuous media content on the first computerized device set.

3. The method of claim 1, wherein the continuous media content is provided to the first computerized device set via a closed network.

4. The method of claim 3, wherein the closed network uses at least one proprietary network protocol.

5. The method of claim 3, wherein the closed network is a cable television network.

6. The method of claim 3, wherein the closed network is a satellite television network.

7. The method of claim 3, wherein the closed network, at least in part, includes a fiber optic transmission path.

8. The method of claim 3, wherein the second computerized device set communicates at least in part via a wireless local network with the first computerized device set.

9. The method of claim 3, wherein the second computerized device set communicates via a wireless local network using an internet protocol with the second computerized device set and the first computerized device set is connected to the closed network.

10. The method of claim 1, wherein the first computerized device set comprises a television.

11. The method of claim 1, wherein the first computerized device set comprises a television and a set top box.

12. The method of claim 1, wherein the second computerized device set is a wireless phone or tablet.

13. The method of claim 1, wherein the second computerized device set is a PC.

14. The method of claim 1, wherein the second computerized device set communicates at least in part via a public Internet with the first computerized device set.

15. The method of claim 1, wherein the continuous media content is offered over a proprietary network by a proprietary system operator, the method further comprising the first computerized device set receiving the continuous media content over the proprietary network.

16. The method of claim 1, further comprising:

making available to the user a third user interface that allows the user to actuate a hyperlink associated with a starting resource presented at one of the first and second computerized device sets with an attribute specifying that the ending resource of the hyperlink is to be presented at the other of the first and second computerized device set.

17. The method of claim 1, wherein the enhancement content is presented on the second computerized device set in synchrony with associated portions of the presentation of the continuous media content on the first computerized device set.

18. The method of claim 17, wherein the state data includes a current time position.

19. The method of claim 1, wherein the enhancement content is received via a public Internet.

20. The method of claim 1, wherein the enhancement content is provided by a producer or distributor of the continuous media content.

21. The method of claim 1, wherein the enhancement content is provided by a source independent of a producer or distributor of the continuous media content.

22. The method of claim 1, wherein the continuous media content is not advertising content and the enhancement content is non-advertising content that is an enhancement to the continuous media content.

23. The method of claim 1, wherein the continuous media content is advertising content and the enhancement content is advertising content that is an enhancement to the continuous media content.

24. The method of claim 1, wherein the enhancement content is information about the continuous media content.

25. The method of claim 1, wherein the enhancement content is a provision of access to a service related to the continuous media content.

26. The method of claim 25, wherein the service is an offer of a product.

27. The method of claim 25, wherein the service is a social media communications service.

28. The method of claim 25, wherein the service is a user-to-user communications service.

29. The method of claim 25, wherein the service is a communications service from the user to a producer or distributor of the continuous media content.

\* \* \* \* \*